United States Patent
Budra et al.

(10) Patent No.: US 6,726,486 B2
(45) Date of Patent: Apr. 27, 2004

(54) METHOD AND APPARATUS FOR AUTOMATED TRAINING OF LANGUAGE LEARNING SKILLS

(75) Inventors: Elizabeth H. Budra, Albany, CA (US); Elizabeth C. Cottle, San Francisco, CA (US); Logan E. De Ley, San Leandro, CA (US); Jefferson A. Dewey, San Francisco, CA (US); William M. Jenkins, Pacifica, CA (US); Virginia A. Mann, Laguna Beach, CA (US); Steven L. Miller, Pacifica, CA (US)

(73) Assignee: Scientific Learning Corp., Oakland, CA (US)

( * ) Notice: Subject to any disclaimer, the term of this patent is extended or adjusted under 35 U.S.C. 154(b) by 202 days.

(21) Appl. No.: 09/965,530

(22) Filed: Sep. 26, 2001

(65) Prior Publication Data

US 2002/0076675 A1 Jun. 20, 2002

Related U.S. Application Data

(60) Provisional application No. 60/236,918, filed on Sep. 28, 2000.

(51) Int. Cl.[7] ................................................. G09B 5/00
(52) U.S. Cl. ...................... 434/169; 434/167; 434/236; 434/307 R; 434/362; 704/251
(58) Field of Search ................................ 434/118, 156, 434/169, 185, 307 R, 308, 322, 323, 350, 362, 365, 167, 236; 702/186; 703/22; 704/7, 251, 254, 241, 213, 270; 705/3, 26; 706/11; 707/5, 102, 104.1; 715/530; 725/37, 116; 600/545; 345/473, 952, 956

(56) References Cited

U.S. PATENT DOCUMENTS

| 4,587,609 | A | 5/1986 | Boudreau et al. |
| 4,998,198 | A | 3/1991 | Chan |
| 5,091,846 | A | 2/1992 | Sachs et al. |
| 5,255,378 | A | 10/1993 | Crawford et al. |
| 5,428,753 | A | 6/1995 | Kondo et al. |
| 5,463,762 | A | 10/1995 | Morrissey et al. |
| 5,504,874 | A | 4/1996 | Galles et al. |

(List continued on next page.)

OTHER PUBLICATIONS

Adams, MJ (1999),"*Beginning to read: Thinking and learning about print*", Cambridge, MA: MIT Press., 3 pages of cover sheet.

Anglin, JM (1993),"Vocabulary development: A morphological analysis.,"*Monographs of the society for research in child development* (58, 10).

"Annabelle's quotation guide," www.annabelle.net., Feb. 7, 2002.

(List continued on next page.)

Primary Examiner—Joe H. Cheng
(74) Attorney, Agent, or Firm—James W. Huffman

(57) ABSTRACT

A computer program for execution on a computing device is provided to cross-train students in language development skills such as letter-word correspondence, word recognition, vocabulary, and sentence and paragraph comprehension. A set of programs provide an adaptive methodology for training a student in decoding (semantic, syntactic, phonological, and morphological relationships), knowledge of rhymes, synonyms, antonyms, and homophones, spelling, letter-word correspondences, sentence comprehension, grammatical comprehension, working memory, vocabulary, paragraph comprehension, and improved reading comprehension. In each program, students are presented with an animated scene that poses a question, and a set of answers. The set of answers contain a correct response, and a number of incorrect responses or foils. The student advances to more complex levels by satisfying predetermined correct thresholds. Through repetition and intensity, the student's language skills are developed.

26 Claims, 34 Drawing Sheets

U.S. PATENT DOCUMENTS

| | | | | |
|---|---|---|---|---|
| 5,579,530 | A | | 11/1996 | Solomon et al. |
| 5,717,468 | A | * | 2/1998 | Baryla ........................... 725/37 |
| 5,717,828 | A | * | 2/1998 | Rothenberg ................. 704/251 |
| 5,722,418 | A | * | 3/1998 | Bro ............................. 600/545 |
| 5,724,262 | A | * | 3/1998 | Ghahramani ................ 702/186 |
| 5,727,950 | A | * | 3/1998 | Cook et al. .................. 434/350 |
| 5,754,938 | A | * | 5/1998 | Herz et al. ................... 725/116 |
| 5,781,745 | A | | 7/1998 | Ramelson et al. |
| 5,787,486 | A | | 7/1998 | Chin et al. |
| 5,799,203 | A | | 8/1998 | Lee et al. |
| 5,832,310 | A | | 11/1998 | Morrissey et al. |
| 5,835,758 | A | * | 11/1998 | Nochur et al. ............... 707/102 |
| 5,859,986 | A | | 1/1999 | Marenin |
| 5,873,094 | A | * | 2/1999 | Talatik ..................... 707/104.1 |
| 5,892,978 | A | | 4/1999 | Munguia et al. |
| 5,918,072 | A | | 6/1999 | Bhattacharya |
| 5,987,443 | A | * | 11/1999 | Nichols et al. ............... 706/11 |
| 5,996,036 | A | | 11/1999 | Kelly |
| 6,006,221 | A | * | 12/1999 | Liddy et al. ................... 707/5 |
| 6,024,571 | A | * | 2/2000 | Renegar ...................... 434/157 |
| 6,035,364 | A | | 3/2000 | Lambrecht et al. |
| 6,044,225 | A | | 3/2000 | Spencer et al. |
| 6,085,261 | A | | 7/2000 | McIntyre, Jr. et al. |
| 6,105,046 | A | * | 8/2000 | Greenfield et al. ......... 715/530 |
| 6,108,734 | A | | 8/2000 | Shand |
| 6,122,690 | A | | 9/2000 | Nannetti et al. |
| 6,134,481 | A | | 10/2000 | Warren |
| 6,138,176 | A | | 10/2000 | McDonald et al. |
| 6,160,986 | A | * | 12/2000 | Gabai et al. ................. 434/308 |
| 6,173,349 | B1 | | 1/2001 | Qureshi et al. |
| 6,185,637 | B1 | | 2/2001 | Strongin et al. |
| 6,275,789 | B1 | * | 8/2001 | Moser et al. ................... 704/7 |
| 6,301,625 | B1 | | 10/2001 | McDonald et al. |
| 2002/0035486 | A1 | * | 3/2002 | Huyn et al. ..................... 705/3 |
| 2002/0091686 | A1 | * | 7/2002 | Keith ............................. 707/5 |
| 2002/0107681 | A1 | * | 8/2002 | Goodkovsky ................ 703/22 |
| 2002/0132213 | A1 | * | 9/2002 | Grant et al. ................. 434/322 |
| 2002/0194081 | A1 | * | 12/2002 | Perkowski ................... 705/26 |

OTHER PUBLICATIONS

Bryant, P, Nunes, T, & Bindman, M (2000),"The relations between children's linguistic awareness and spelling: The case of the apostrophe,"*Reading and writing: An interdisciplinary journal* (12: 3/4, 253–276).

Carroll, JB (2000), The analysis of reading instruction: Perspectives from psychology and linguistics. *Scientific studies of reading* (4(1), 3–17).

Daneman & Carpenter (1980), "Individual differences in working memory and reading," *Verbal learning and verbal memory* (19, 450–466).

Ehri, L & Wilce, LS (1985), "Movement into reading: Is the first stage of printed word learning visual or phonetic?", *Reading research quarterly* (20, 163–179).

Ferster, CB & Skinner, BF (1957),"Schedules of reinforcement,"New York, NY: Appleton Century Crofts, 2 pages of cover sheet.

Fry (1984),"The reading teacher's book of lists,"West Nyack, NY: Center for Applied Research in Education, 3 pages of cover sheet.

Graves, MF (1986),"Vocabulary learning and Instruction,"In EZ Rothkopf (Ed.), *Review of research in education* (13, 49–89). Washington, DC: American Educational Research Association.

Hall, SL & Moats, LC (1999),"Straight talk about reading, "Chicago, IL: Contemporary Books, 3 pages of cover sheet.

Kucera, H & Francis, WN (1967),"*Computational analysis of present–day American English,*"Providence, RI: Brown University Press, 2 pages of cover sheet.

Laberge & Samuels (1974),"Towards a theory of automatic information processing in reading,"*Cognitive psychology* (6, 293–323).

"Language Arts Curriculum Frameworks and Standards," (2000), *Links to available state language arts curriculum frameworks and standards.* www.indiana.edu/~eric_rec/gn-inf/standards.html, 10 pages.

Lyon, GR (1997),"*Learning to read: A call from research to action,*" www.ncld.org/theirworld/lyon98.html, 10 pages.

Mahony, D, Singson, M, & Mann, VA (2000),"Reading ability and sensitivity to morphophonological relations," *Reading and writing: An interdisciplinary journal* (12: 3/4, 191–218).

Mann, VA (2000),"Introduction to special issue on morphology and the acquisition of alphabetic writing systems," *Reading and writing: An interdisciplinary journal* (12: 3/4, 143–147).

Mann, VA, Shankweiler, D, & Smith, S (1984),"The association between comprehension of spoken sentences and early reading ability: The role of phonetic representation," *Journal of child language* (11, p. 628–643).

Moats, LC, Furry, AR, & Brownell, N (1998),"*Learning to read: Components of beginning reading instruction,*" Sacramento, CA: Comprehensive Reading Leadership Center, p. 33.

Mogilner, A (1992),"*Children's writer's word book,*" Cincinnati, OH: Writer's Digest Books., 3 pages of cover sheet.

National Assessment of Educational Progress (2000), "*The nation's report card: Focus on reading,*" nces.ed.gov/nationsreportcard/reading/reading.asp, 6 pages.

National Reading Panel (1999),"*Teaching children to read: An evidence–based assessment of the scientific research literature on reading and its implications for reading instruction,*" Report of the National Reading Panel., p. 1–33.

"Oregon Literacy, Inc: *Remarks on reading*", www.hevanet-.com/literacy/features/remarks.htm, Feb. 7, 2002, 6 pages.

"Quotation Ring Homepage—The Gate to a Webring of Quotes Collections",www.gunnar.cc/webring/quotes.html, Feb. 7, 2002, 2 pages.

Raygor, AL (1977),"The Raygor readability estimate: A quick and easy way to determine difficulty", *Reading: Theory, research, and practice: The 26th yearbook of the national reading conference* (259–263).

Rayner, K & Pollatsek, A (1989),"The psychology of reading"., Englewood Cliffs, NJ: Prentice Hall., 3 pages of cover sheet.

Readence, JE, Bean, TW, & Baldwin, RS (1998),"*Content area literacy: An integrated approach,*" Dubuque, Iowa: Kendall/Hunt Publishing Co. , 3 pages of cover sheet.

"*Reading/language arts framework for California public schools*", (1999). Sacramento, CA: California Department of Education., p. 22–95.

Scarborough, HS (1984),"Continuity between childhood dyslexia and adult reading", *British journal of psychology* (Aug.; 75 (Pt 3), 329–48).

Searfoss, LW & Readence, JE (1994),"*Helping children learn to read.,*"Needham, MA: Allyn and Bacon , 4 pages of cover sheet.

Shankweiler & Liberman (1972),"Misreading: A search for causes,"In *Language by ear and by eye*. Cambridge, MA: MIT Press, p. 293–295, 297, 299, 301, 303, 306, 308, 310, 312, 314, 315.

Singson, M, Mahony, D, & Mann, VA (2000),"The relation between reading ability and morphological skills: Evidence from derivational suffixes", *Reading and writing: An interdisciplinary journal* (12: 3/4, 219–252).

Snow, CE, Burns, MS, & Griffin, P (1998),"*Preventing reading difficulties in young children*," National research council committee on the prevention of reading difficulties in young children. Washington, DC: National Academy Press, 7 pages.

Taylor, I & Taylor, MM (1983),"*The psychology of reading*," New York NY: Academic Press, 3 pages of cover sheet.

Venezky, RL (1999),"*The American way of spelling*," New York, NY: Guilford Press, p. 4–7, 51–95, 125–159, 164, 165, 168–209, 230–243.

Scientific Learning (2001), "*Fast Forward Reading*", 5 pages.

"English–Language Arts Content Standards for California Public Shcools", (1997). California Department of Education, p. 1–84.

Kavanaugh J & Mattingly I, "Language by Ear and Eye: The Relationships Between Speech and Reading", (1992), 3 pages of cover sheet.

* cited by examiner

Select an Exercise

Scrap Cat
Canine Crew
Chicken Dog
Twisted Pictures
Book Monkeys
Hog Hat Zone

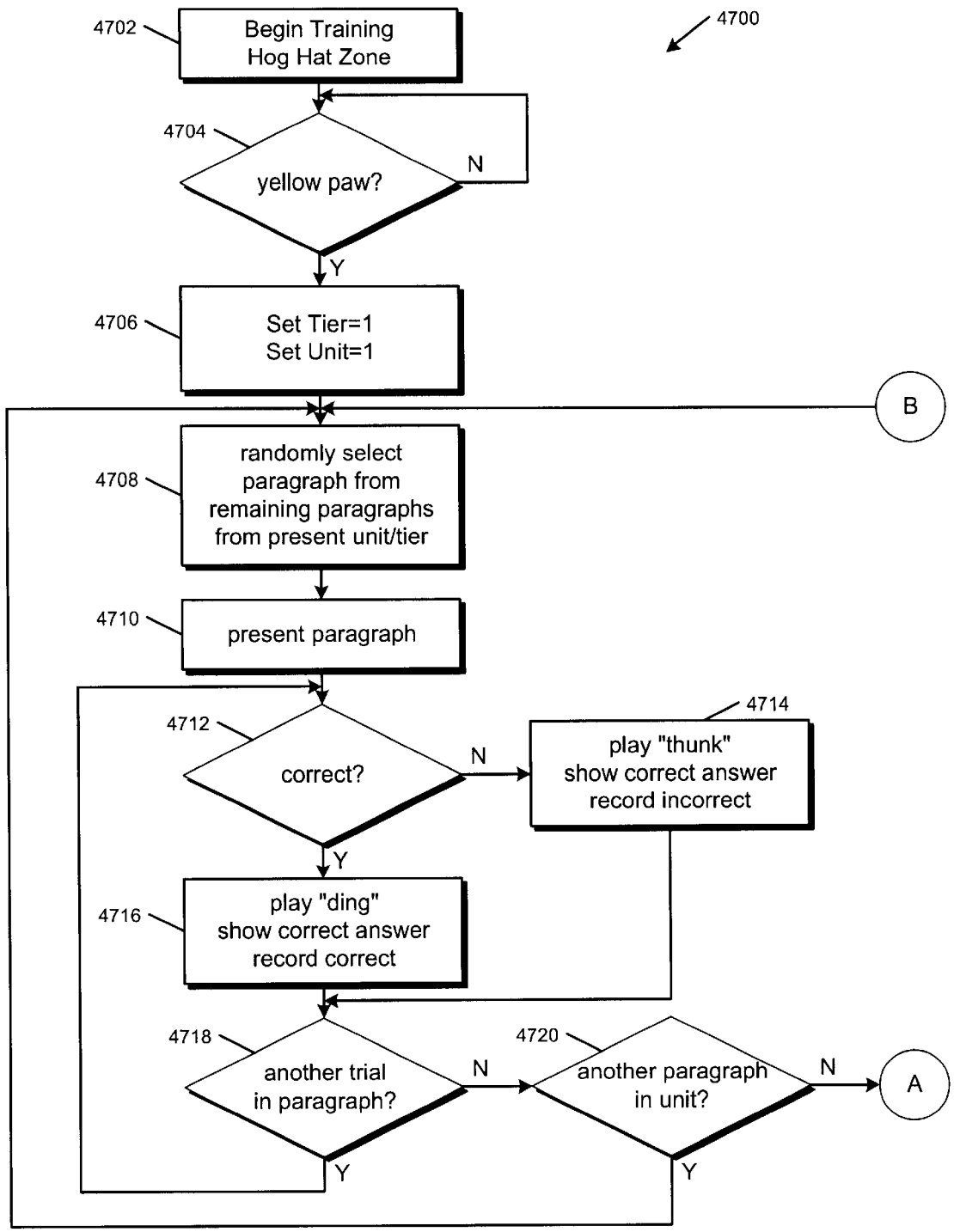

METHOD AND APPARATUS FOR AUTOMATED TRAINING OF LANGUAGE LEARNING SKILLS

CROSS REFERENCE TO RELATED APPLICATION

This application claims the benefit of provisional application No. 60/236,918, filed Sep. 28, 2000, and having common inventors. In addition, a compact disc Appendix of the preferred listing is attached, file named: Appendix For CD.PDX, having 528 K bytes, and the creation date is Aug. 27, 2003, the entire contents of which are incorporated herein by reference.

FIELD OF THE INVENTION

This invention relates in general to the field of language education, and more specifically to a computer program for training a human's language learning skills.

BACKGROUND OF THE INVENTION

Decades of research in the fields of education and cognitive psychology have shown that the following skills are critical to learning to read proficiently:

Phonemic awareness
Letter-word correspondence skills
Fluent word recognition
Vocabulary
Comprehension skills
Appreciation of literature Once students have developed good phonemic awareness skills, research strongly supports concurrent training of the other five reading skills (letter-word correspondences, word recognition, vocabulary, comprehension, and appreciation of literature) as the next step towards reading fluency. Students learn to read most proficiently and quickly when all these skills are taught at the same time rather than sequentially.

Phonemic awareness is part of a broader skill set called phonological awareness, which is the ability to recognize and use all sizes of sound units, such as words, syllables, and phonemes. An extremely successful set of programs have been developed by Scientific Learning Corporation. They are called Fast ForWord Language, Fast ForWord Middle and High School, and Fast ForWord Language to Reading, information for which may be found at www.scientificlearning.com. However, up to this time, there has not been a program that adequately teaches the other five skills mentioned above, once phonological awareness has been developed.

Neuroscientific research has also found that there is a potent combination of elements that lead to efficient learning of new tasks and concepts:

Frequency
Intensity
Cross-training
Adaptivity
Motivation and attention

What is needed is a program that incorporates the elements of frequency, intensity, cross-training, adaptivity, and motivation, while training students on foundational language skills such as letter-word correspondences, word recognition, vocabulary, comprehension, and appreciation of literature.

SUMMARY

The present invention provides a method for cross-training a student in decoding, spelling, sentence comprehension and paragraph comprehension so that s/he may become a better reader, and a better learner. More specifically, the method utilizes a computing device to train a student in semantic, syntactic, phonological and morphological categories, with the method adaptively presenting the training in an entertaining way according to the skill level of the student.

In one aspect, the present invention provides a method on a computing device for training a student to decode words into a plurality of categories. The method includes the steps of: a) providing a plurality of categories, each having a plurality of words associated with them; b) providing on the computer, a graphical setting onto which two or more of the categories are presented; c) graphically presenting one of the plurality of words, from one of the two or more of the presented categories to the student; d) requiring the student to categorize the presented one of the plurality of words into one of the two or more of the presented categories, by indicating a selection of one of the two or more of the presented categories; e) recording whether the student correctly categorized the presented one of the plurality of words into its associated category; and f) repeating steps c) through e).

In another aspect, the present invention provides a method on a computing device for cross-training a student to categorize a plurality of words into a plurality of categories, each of the plurality of categories associated within one of a plurality of category types. The method includes: a) selecting a first one of the plurality of category types for training; b) presenting on the computing device two or more of the plurality of categories associated with the first one of the plurality of category types, as possible selections; c) presenting on the computing device one of the plurality of words for categorization into one of the presented plurality of categories; d) recording which of the presented plurality of categories has been selected by the student as a category for the presented one of the plurality of words; e) repeating steps b) through d); and f) after the student has correctly categorized a predetermined percentage of the plurality of words, selecting a second one of the plurality of category types for continued training.

In yet another aspect, the present invention provides a method on a computing device for training a student to categorize words into a plurality of categories, where the plurality of categories include a plurality of category types such as semantic, syntactic, phonological, and morphological. The method includes the steps of: a) presenting an animated scene representative of a sorting process; b) within the animated scene, presenting two or more of the plurality of categories as possible selections for sorting words therein; c) visually presenting the words to the student, for categorization/sorting into the presented two or more of the plurality of categories; and d) after the student has correctly categorized a predetermined percentage of the words for a first category type, changing the category type for training to a second category type and repeating steps b) through c).

Other features of the present invention will become apparent upon study of the remaining portions of the specification and drawings.

BRIEF DESCRIPTION OF THE DRAWINGS

FIGS. 47a–b are a flow chart illustrating the training and advancement methodology within the game Hog Hat Zone.

DETAILED DESCRIPTION

The present invention is embodied in a computer program entitled Fast ForWord Reading developed by Scientific Learning Corporation. A comprehensive discussion of this program may be found in a text developed by Scientific Learning Corporation entitled "Fast ForWord Reading: Why It Works", and on its web site at www.scientificlearning.com related to Fast ForWord Reading, both of which are incorporated herein by reference for all purposes.

Fast ForWord Reading includes six exercises that train skills crucial to proficient reading. The exercises are: 1) Scrap Cat; 2) Canine Crew; 3) Chicken Dog; 4) Twisted Pictures; 5) Book Monkeys; and 6) Hog Hat Zone. Although each of these games incorporates aspects of the other games with respect to certain language skills, and thereby affects cross-training of language skills, they are also designed to aid in developing specific skills. A detailed description of each of these games now follows.

Figure 1:
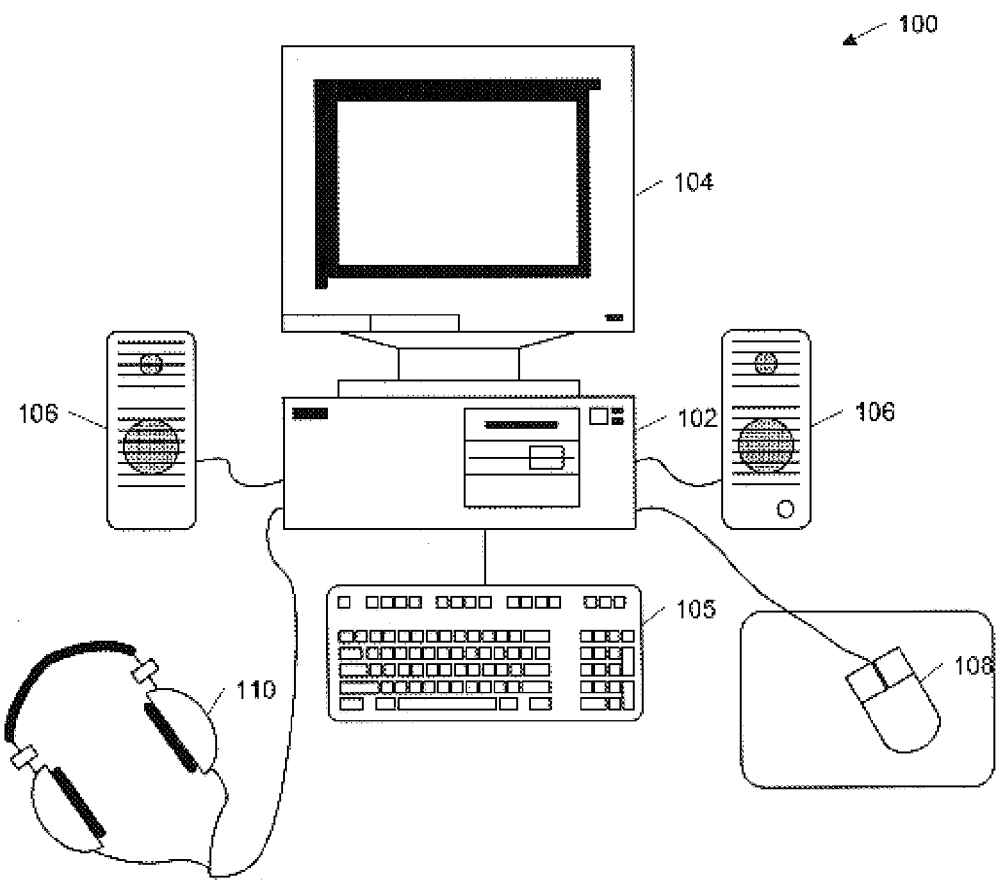
FIG. 1 is a block diagram illustrating a computer environment upon which the present invention can be utilized.

Referring to FIG. 1, a computer system 100 is shown for executing a computer program according to the present invention. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, and headphones 110. The speakers 106 and the headphones 110 provide auditory prompting and feedback to the subject during execution of the computer program. The mouse 108 allows the subject to navigate through the computer program according to the present invention, and to select particular responses after visual or auditory prompting by the computer program. The keyboard 105 allows an instructor to enter alpha numeric information about the subject into the computer 102. Although a number of different computer platforms are applicable to the present invention, embodiments of the present invention execute on either IBM compatible computers or Macintosh computers.

Figure 2:
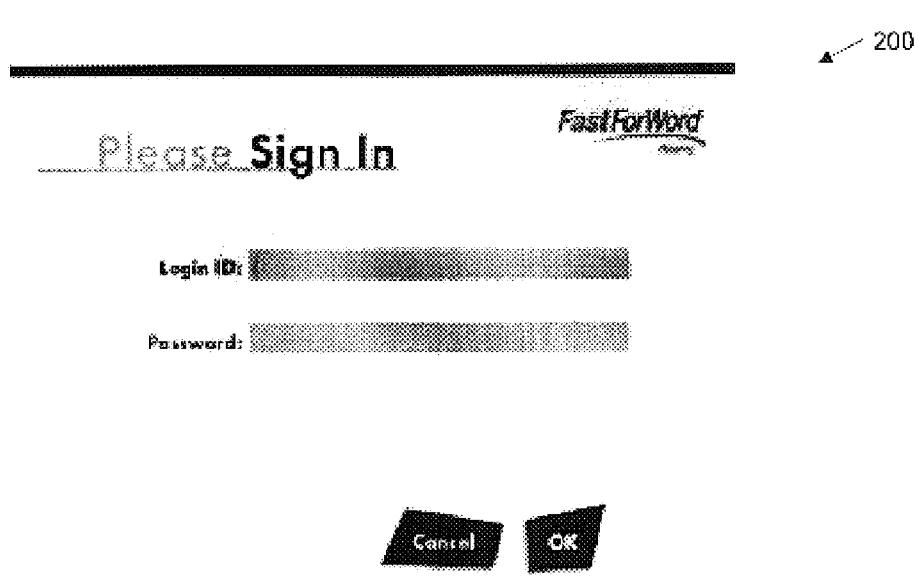
FIG. 2 is a block diagram of login screen for Fast ForWord Reading, according to the present invention.

Referring now to FIG. 2, a login screen 200 is shown allowing a user to enter into the Fast ForWord Reading program. A login such as this is important for several reasons. First, it insures that only licensed students obtain the training provided by the Reading games. Second, it allows the software to act as a client, in a client-server architecture, specifically to allow the client to communicate game progress for each student back to the server. This provides an important progress reporting function that is desirable to the student. In addition, it provides significant heuristic information relating to each trial, and the success of the training methodology of each game back to the developer, so that further advancements can be made.

Figure 3:
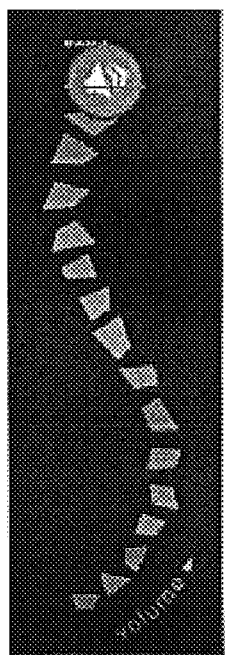
FIG. 3 is a screen shot of a game selection screen for Fast ForWord Reading, according to the present invention.

Once the student enters their username and password, they are taken to the main program selection screen 300 of FIG. 3 to which attention is now directed. Screen 300 shows six games that are to be played within Fast ForWord Reading: 1) Scrap Cat; 2) Canine Crew; 3) Chicken Dog; 4) Twisted Pictures; 5) Book Monkeys; and 6) Hog Hat Zone. The student begins training in one of the games by selecting the name of the game on the screen 300. One skilled in the art will appreciate that an alternative methodology would allow a trainer, or a supervisor, to particularly specify the games to be played, and the order in which they are to be played. By providing multiple games, each of which train on different aspects important in language learning and comprehension, a student will be cross trained in a number of areas important in becoming an efficient reader.

With this in mind, an overview of Decoding will now be provided, along with a detailed description of the games Scrap Cat and Canine Crew. This will be followed with an overview of Spelling and a detailed description of the game Chicken Dog. Sentence Comprehension will then be discussed, along with the game Twisted Pictures. Finally, Paragraph Comprehension will be discussed along with a detailed description of the games Book Monkeys and Hog Hat Zone.

Decoding

Decoding is the ability to decipher printed words by recovering the spoken word that a printed word represents. More specifically, decoding a word involves realizing that a printed word reproduces the spoken word as a written sequence of phonemes, recognizing the individual phonemes that the printed word represents, and then blending those phonemes to form the sound of the word. Decoding involves many skills, including: Conceptual relationships; semantics; syntax; phonological properties; and morphological properties.

Conceptual relationships—A student's ability to figure out and remember new words depends on that student's pre-existing knowledge of other words and concepts. Understanding the conceptual relationships between words helps the student associate a new word to a known concept, which strengthens the student's understanding and ability to remember not only the new word, but the previously known word as well. Moreover, as the student encounters more and more related words, the student's understanding of those words and the concepts behind them becomes more and more flexible; the student's understanding of the concept broadens to include many different aspects of that concept. This broader understanding also helps the student become aware of and understand relevant differences among the words and the concepts they represent. For instance, a student who knows the word "house" and then encounters "mansion" can then link the concepts behind these two words; they are synonymous in that both are dwellings. The student will also start to notice the differences between the two-size, for one-and narrow his or her understanding of what a house is: a dwelling that isn't enormous. When that student later comes across "cottage" for the first time, that student can cluster it with "house" and "mansion." The student will then have an even better concept of what a house is: a medium sized dwelling; not too big, not too small.

Semantics—The larger a student's vocabulary, the better that student's ability to understand and remember the meanings of new words. Vocabulary instruction helps increase the student's vocabulary by directly teaching new words as well as by enhancing that student's ability to learn new words. In addition, explicit vocabulary instruction increases reading comprehension not only of the words directly taught but also of words in general.

Syntax—To understand a sentence, the student must understand the relationships among the words. When students read a sentence, they hold the words and their meanings in memory until the grammatical function of the words-the syntax of the sentence-becomes clear. After the semantic and syntactic meanings of the sentence have been decoded, the student retains the general meaning of the sentence and quickly loses memory of the actual words and structure. Although it is not absolutely necessary for the student to know syntactic labels in order to understand the relationships among words, research shows that explicit training in grammar labels and rules helps students understand sentences better-and remember them better, as well.

Phonological Properties—Using the phonological properties of a word to decipher its meaning, is a decoding method used by all readers at all ages. Phonemic awareness is one of the first steps toward using this method; the student must be able to appreciate the fact that words are made up of the units of sounds referred to as phonemes before that student can recognize the letters that symbolize those sounds-and then go on to build letter-sound correspondence skills. Successful decoding depends on the development of phonemic awareness.

In addition to being aware of the phonemes themselves, readers must appreciate that the pronunciation of a letter depends on the letters that surround it. For example, e is pronounced very differently in bed, bead, and bite. Also consider digraphs, which are combinations of two letters, such as sh and ch; the digraphs and their individual letters have very different pronunciations (for example, the s in sip and ship). Pronunciation of a letter sometimes depends on the root word, prefix, or suffix: autumn contains a silent n, but the addition of the suffix -al causes the n in the resulting word, autumnal, to be pronounced. Different word families have different pronunciations (hoot and soon have a different vowel sound than look and brook). Different words can be spelled the same way (for instance, the two pronunciations of words like read and primer); words that sound the same can also be spelled differently, such as there and their. Many of these seeming irregularities are actually rule-governed, but the reader has to discover or be taught the rules and learn to categorize words accordingly.

Once the reader successfully links letters and letter sequences to their underlying phonological structures, word recognition becomes largely automatic and the student can comprehend familiar words without consciously analyzing their phonological properties. However, even very skilled readers will use phonological properties to decode a word they have never seen before. For example, how could you read the nonsense word atishnet if you didn't use the phonological properties of the word?

Morphological Properties—Understanding morphemes helps the student break an unfamiliar word into comprehensible pieces. A student who understands what hope means and what -ful means will be able to put two and two together when first confronted with the word hopeful. Morphemes can also help the student decide whether a word is verb, adjective, or noun and thus provide another type of clue to the word's meaning and function in the sentence.

In addition, the student's vocabulary in $3^{rd}$ grade and beyond is expanded primarily through adding morphemes to already known root words. As the student progresses, he or she relies more and more on analyzing morphological components in order to decode new words.

The first game in Fast Forward Reading is called Scrap Cat. Scrap Cat utilizes a combination of elements that lead to efficient learning, including: frequency, intensity, cross-training, adaptivity, and motivation. Cross training, adaptivity and motivation are directly incorporated into the game Scrap Cat. Frequency and intensity are a function of the training schedule.

More specifically, Scrap Cat focuses on helping the student improve decoding, vocabulary, and word recognition skills by training in: Conceptual relationships; Semantics; Syntax; Phonological properties; and morphological properties. For example, Scrap Cat trains in conceptual relationships by having the student sort several words into a few different categories, thereby increasing his/her understanding of how words relate to one another. In addition, Scrap Cat trains the student in semantics by having the student categorize words according to their meaning. Scrap Cat further trains the student in syntax by having the student categorize words according to the grammatical function of the word. Scrap Cat also trains the student's phonological properties by having the student categorize words according to the attributes of the different sounds within a word. Scrap Cat further trains the student's morphological properties by having the student categorize words according to morphemes.

Scrap Cat trains the student as above by having him/her progress through four category types: Semantic; Syntactic; phonological; and morphological. A complete listing of the categories are provided in Appendix A, attached hereto. More specifically, the Semantic categories require the student to sort words according to definition (such as animals and states). The Syntactic categories require the student to sort words into grammatical groups (such as nouns and verbs). The Phonological categories require the student to sort words according to vowel sounds, consonant sounds, and syllables (such as "has one consonant sound" and "has the same vowel sound as ate"). The Morphological categories require the student to sort words by morpheme (such as "has a suffix that means full of" and "is a plural").

Adaptivity—Scrap Cat adapts to the student's incoming skill level and, as the student continues to train, tracks the number of correct and incorrect answers and adjusts the training level when the student is ready to advance or needs to transition to different training material. This flexible approach ensures that the student is challenged but not frustrated, which in turn ensures that the student continues to pay attention to and enjoys training, as well as continues to learn and progress in the exercise.

Advancement in Scrap Cat is made by providing progressively larger numbers of words in progressively more categories. That is, when starting to train on a new category type, such as semantics, Scrap Cat presents two different categories (such as animals and thing to wear) from the first category group. The student then sorts six different words (such as salamander and mitten) into these categories. After all six words have been sorted, Scrap Cat evaluates that group of trials. If the student has sorted at least 90 percent of the words correctly, Scrap Cat presents more categories and more words to sort until the student is sorting 20 words into 4 different categories. After the student has completed 90 percent of each group of trials correctly for the current category group, Scrap Cat advances to the next category group. When the student has completed Scrap Cat, that student will have been exposed to 412 words and will have correctly categorized at least 370 words.

Table 1 below illustrates the category types in progression order.

TABLE 1

| Semantic | Syntactic | Phonological | Morphological |
|---|---|---|---|
| (1) 2 × 3 | (1) 2 × 3 | (1) 2 × 3 | (1) 2 × 3 |
| (1) 3 × 3 | (1) 3 × 3 | (1) 3 × 3 | (1) 3 × 3 |
| (1) 3 × 4 | (1) 3 × 4 | (1) 3 × 4 | (1) 3 × 4 |
| (1) 4 × 4 | (1) 4 × 4 | (1) 4 × 4 | (1) 4 × 4 |
| (5) 4 × 5 | (5) 4 × 5 | (5) 4 × 5 | (5) 4 × 5 |

Plateau-Based Transitions—Scrap Cat allows a student who is not progressing in one area to continue to advance in other areas. To accomplish this goal, Scrap Cat uses plateau-based transitions to allow the student to train on different material when the student becomes stuck in one category group or category type and is not able to progress immediately. If a student repeats a group of trials 3 times but does not achieve 90 percent correct, Scrap Cat presents a new category group from the same category type. For instance, if the student is training on phonology and is having trouble sorting words in the second category group (which includes categories such as "words that have the same vowel sound as mop"), Scrap Cat switches to presenting words from the third category group (which includes categories such as "words that have three consonants"). If the student repeats this new group of trials 3 times without sorting 90 percent of the words correctly, Scrap Cat transitions to the next category: morphology. Before the student completes the exercise-and after the student completes as much of the material in Scrap Cat as possible-Scrap Cat returns the student to the group (or groups) of trials that the student did not complete with 90 percent accuracy. Scrap Cat requires the student to train on this group (or groups) of trials until s/he achieves 90 percent accuracy. A complete flow chart illustrating this adaptivity in training is provided below in FIG. 15.

Figure 4:
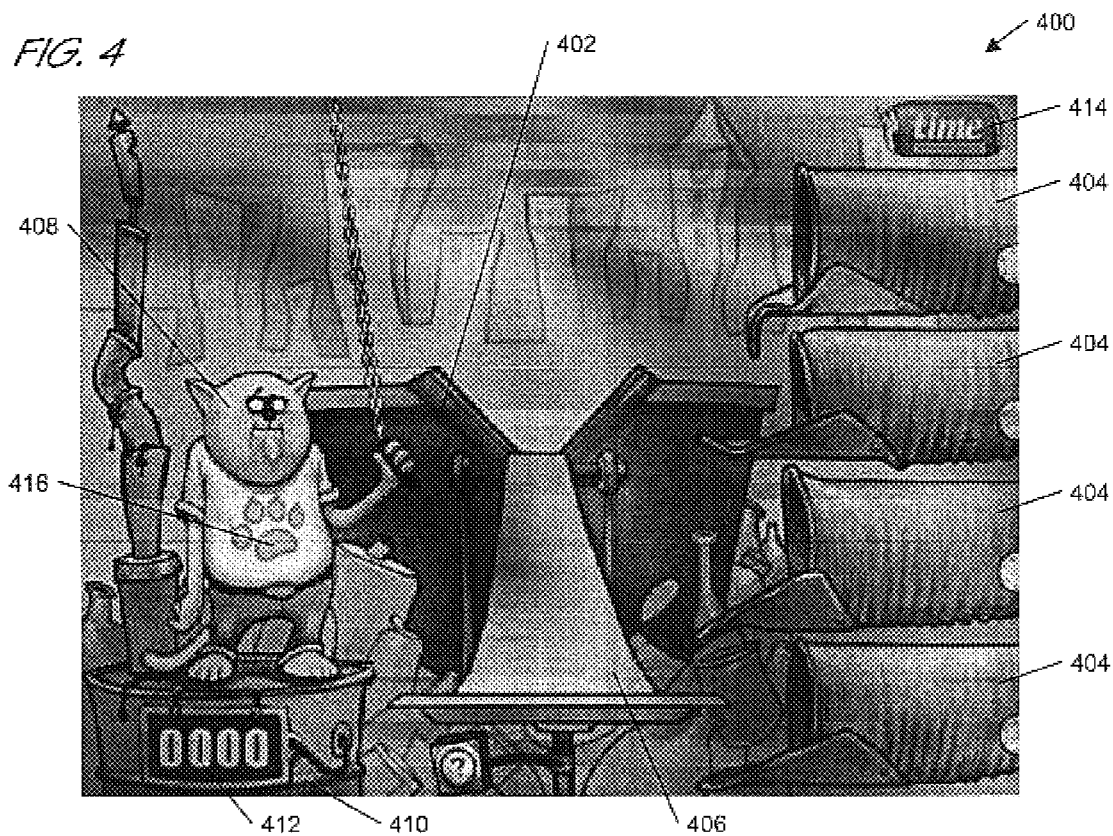
FIG. 4 is a screen shot of an opening scene in the game Scrap Cat.

With the above background on Scrap Cat, the reader's attention is now directed to FIG. 4 which provides a screen shot 400 illustrating an initial scene for the game. The setting for the game is a junkyard. When the game begins, the student is presented with an empty garbage bin 402, a number of recycling containers 404, a recycling chute 406, and a character 408 entitled "Scrap Cat". Scrap Cat 408 is standing on a barrel 410 that contains a counter 412. In the upper right hand corner of the scene 400 is a time indicator 414 that provides the student with a relative indication of the time remaining for training.

On Scrap Cat's 408 shirt is a paw 416. The student begins training by placing a cursor (moved by a computing input device such as a mouse) over the paw 416 and selecting the paw 416 (by clicking the mouse, for example). When the student has indicated selection of the paw 416, a bottle or can rolls down the recycling chute 406 and displays a word. The student must figure out which category the word fits into, and then select (by mouse click, for example) that category's recycling container 404.

Figure 5:
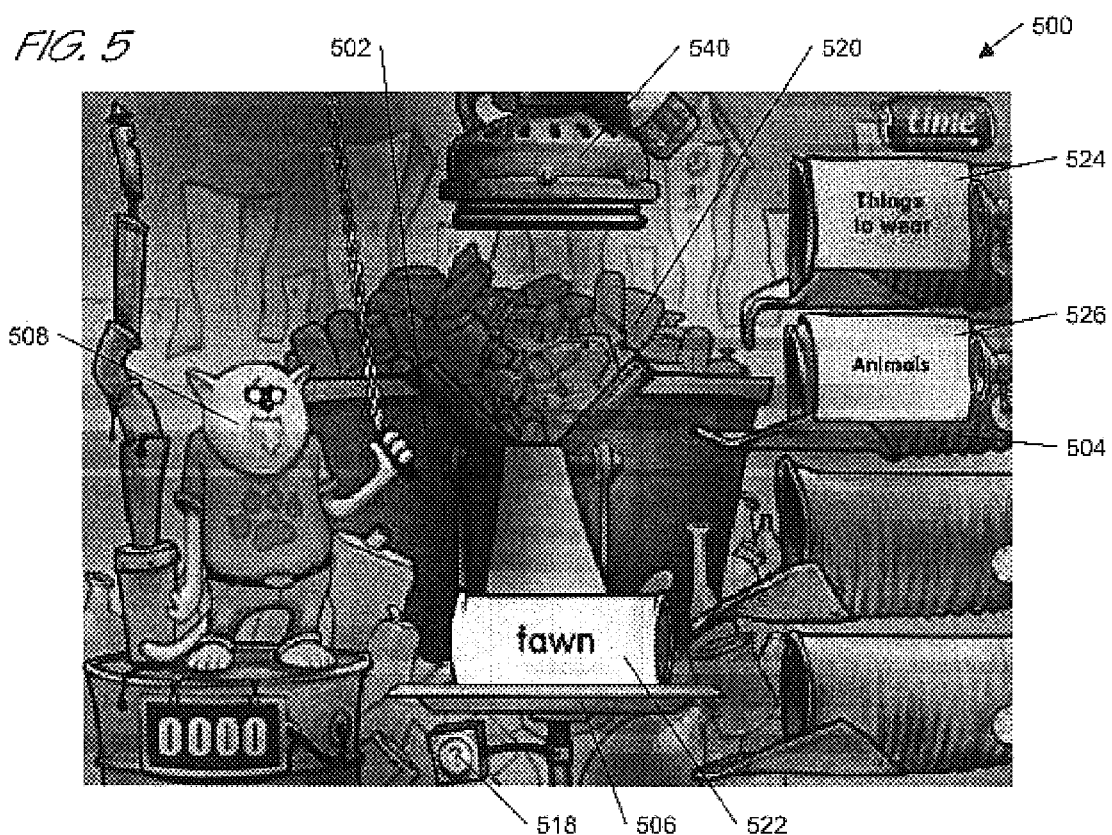
FIG. 5 is a screen shot of a beginning trial for the game Scrap Cat.

Referring now to FIG. 5, a screen shot 500 is shown, illustrating a first trial (presented after the student selected the paw 416). Like elements have like references, the hundreds digit being replaced by a "5". The garbage bin 502 is first filled with garbage 520, and then a first word 522 is presented on a rolling can or bottle at the bottom of the recycling chute 506. At first, the student is provided with just two categories into which the word 522 must be sorted. In this example, the word 522 fawn must be sorted into one of the categories: "things to wear" 524; or "Animals" 526. For the first trial, the correct category (e.g., Animals) is highlighted to indicate to the student that they are to select Animals. Upon successful selection of the category Animals, a crusher 540 crushes the word fawn 522 and sorts it into the recycling bin 504 associated with Animals.

Figure 6:
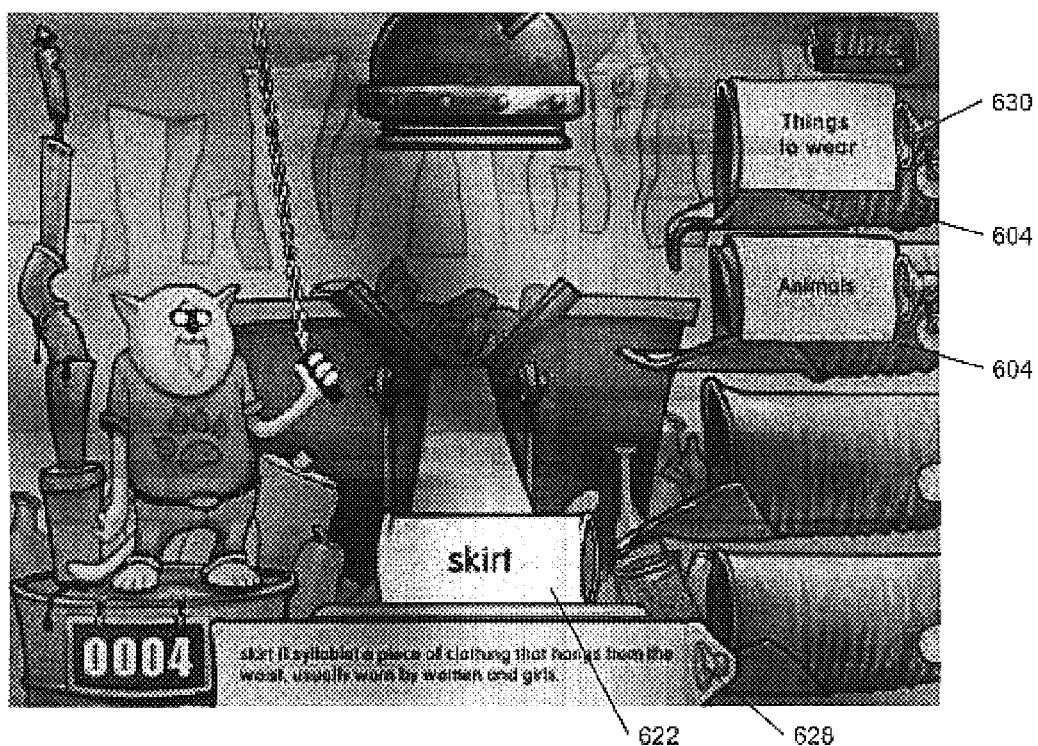
FIG. 6 is a screen shot showing a word definition box within the game Scrap Cat.

Referring now to FIG. 6, a screen shot 600 is provided illustrating presentation of a second word, skirt 622. This word is automatically presented after completion of the first trial. The student must correctly select the category associated with the recycling containers 604. If the student doesn't understand a word, the student can look up the definition by clicking the ? button 518 at the bottom of the recycling chute 506 (see FIG. 5). Scrap Cat 608 then presents the word and the number of syllables along with a short definition, as shown in box 628. If the student doesn't understand a category in one of the recycling containers 404, the student can click a speaker 630 next to each recycling container 604 to hear the category name read aloud.

Figure 7:
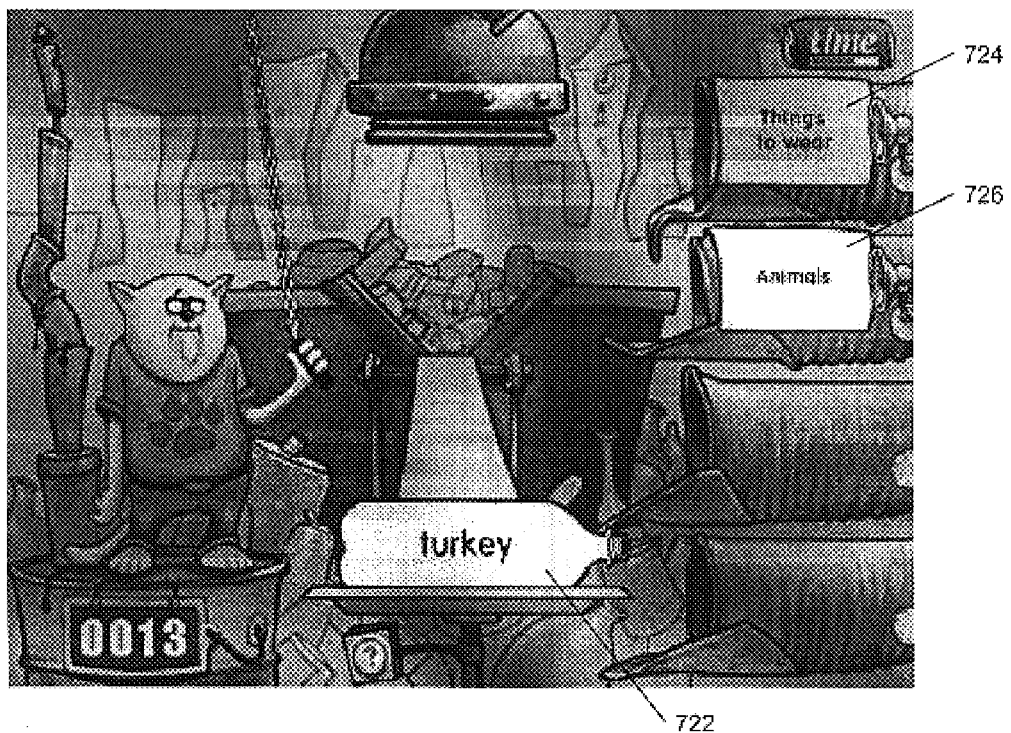
FIG. 7 is a screen shot showing categorization of a word within the game Scrap Cat.

Referring now to FIG. 7, a screen shot 700 is shown presenting a word "turkey" 722 for categorization. The student must correctly categorize the word 722 into one of two categories "things to wear" 724 or "Animals" 726. Upon correct selection of the category "Animals" 726, the category is highlighted to indicate correct selection, and the sound of a bell (e.g., "ding") is played to indicate correct selection. If the student makes an incorrect selection, a "thunk" is played, and the correct category is highlighted.

Figure 8:
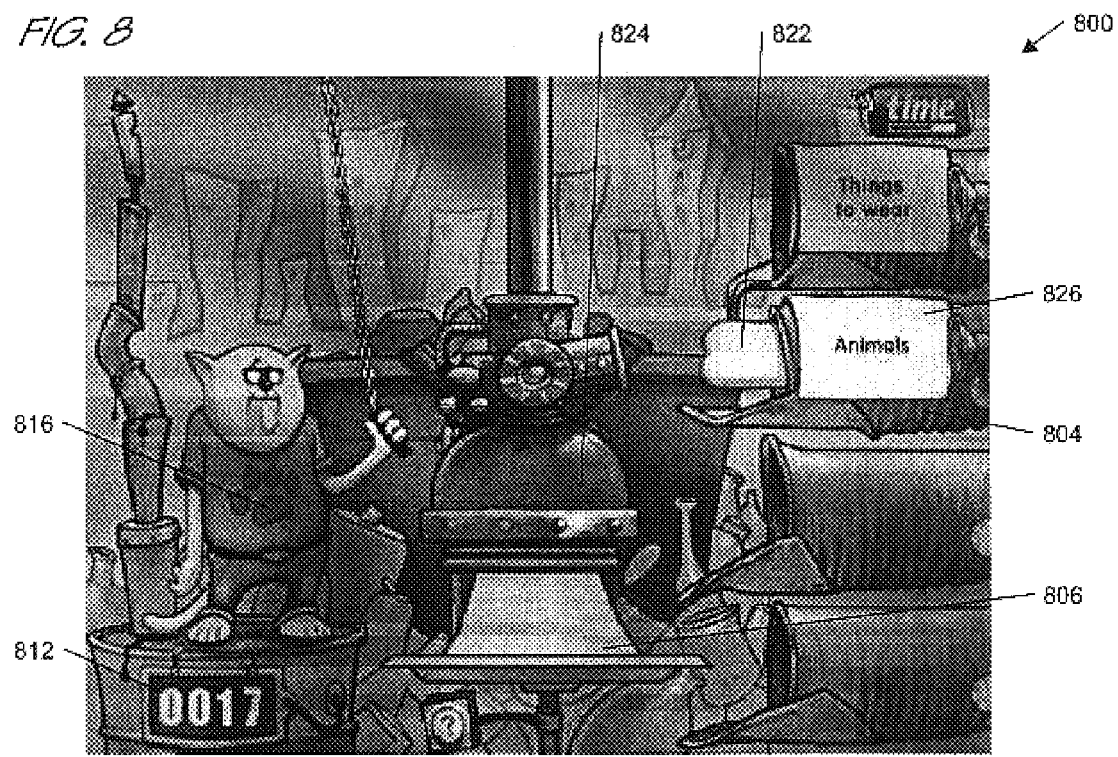
FIG. 8 is a screen shot showing an animation pertaining to a correct categorization within the game Scrap Cat.

Referring now to FIG. 8, a screen shot 800 is shown illustrating an animation occurring after correct categorization of a word. A crusher 840 drops down and crushes the word, and then shoots the crushed word 822 into the recycling bin 804 associated with the correct category 826. Alternatively, if the student selects an incorrect category for the word 822, after the "thunk" is played, the word simply drops off the recycling chute 806.

After several trials, the score counter 812 advances to indicate correct categorizations, and the student is required to select the paw 816 for more trials. The number of trials for each category level was provided above in Table 1.

Figure 9:
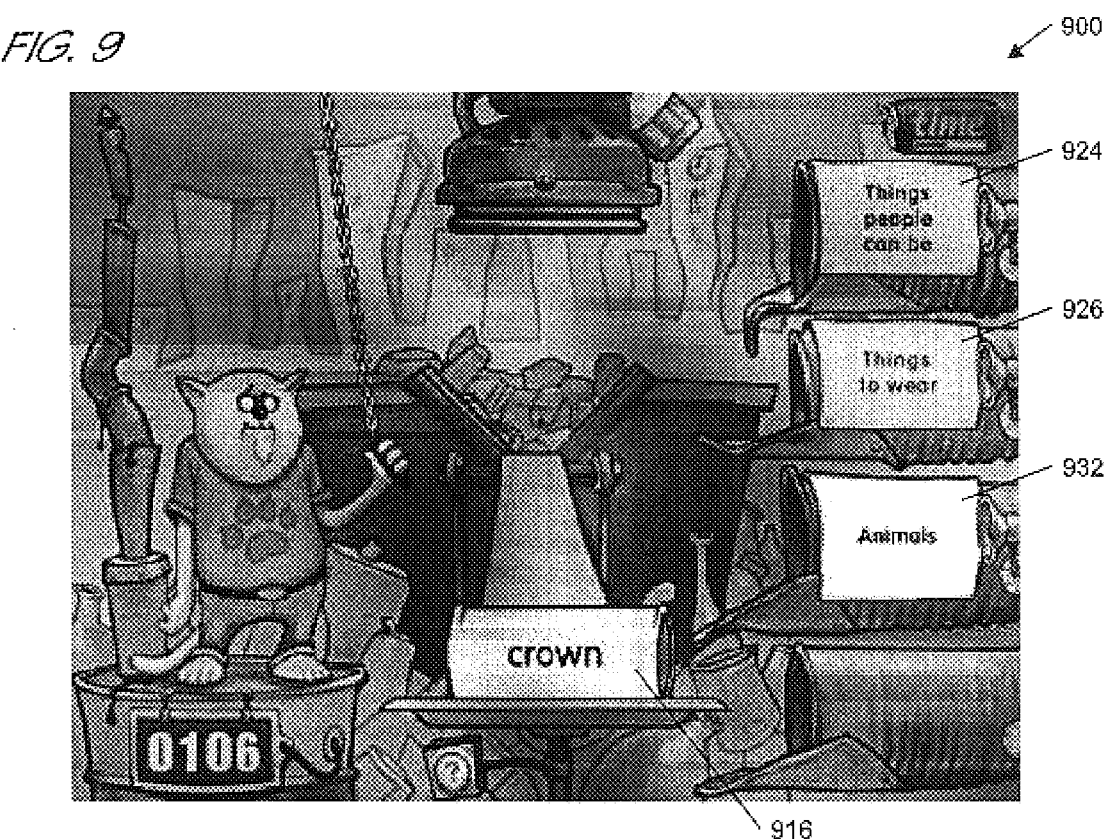
FIG. 9 is a screen shot showing categorization of a word within three categories within the game Scrap Cat.

Referring now to FIG. 9, a screen shot 900 is shown illustrating a word 916 that must be categorized into one of three categories 924, 926, or 932. In this screen shot, the student incorrectly selected the category "Animals" 932 to correspond to the word "crown" 916 (indicated by the highlighted box 932). A "thunk" is played, and the correct category "things to wear" 926 is subsequently highlighted.

Figure 10:
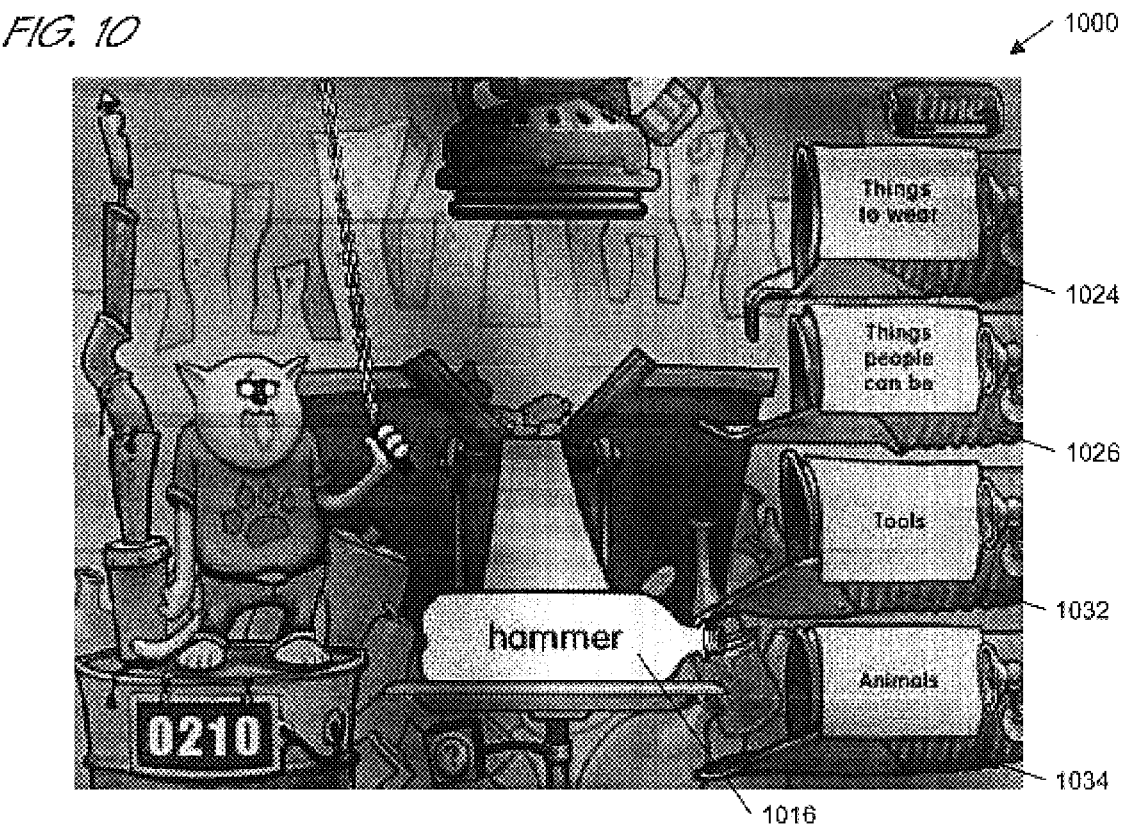
FIG. 10 is a screen shot showing categorization of a word within four categories within the game Scrap Cat.

Referring now to FIG. 10, a screen shot 1000 is shown illustrating a word "hammer" 1016 that must be categorized into one of four categories 1024, 1026, 1032, or 1034. The student has progressed to playing in four categories by correct categorization as described above with reference to Table 1.

Figure 11:
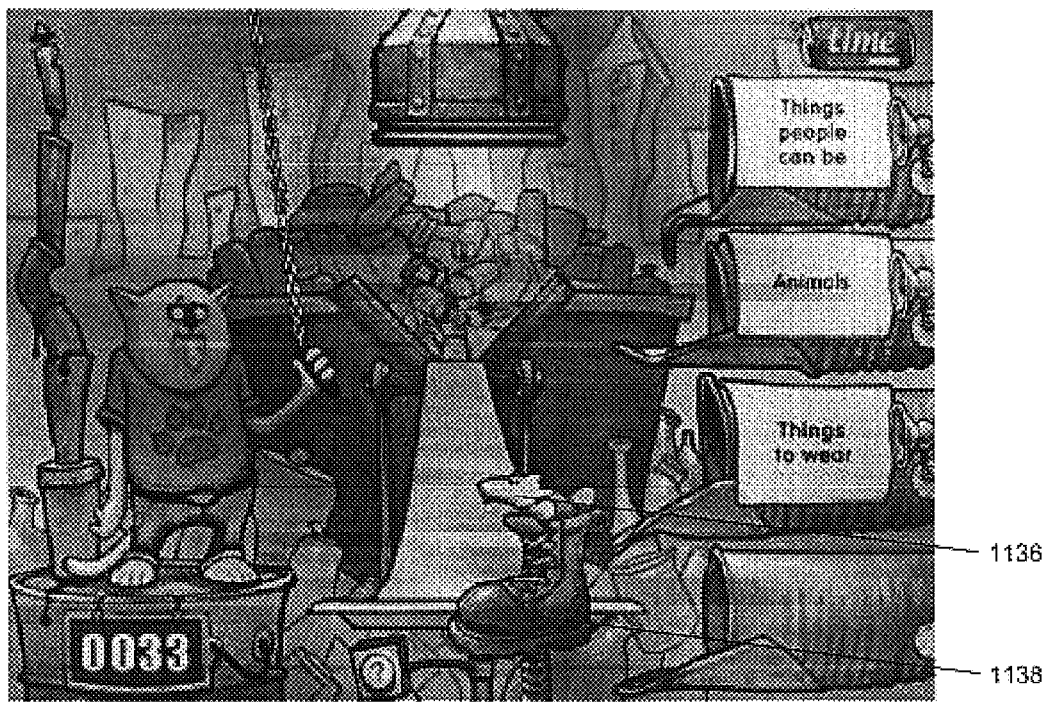
FIG. 11 is a screen shot of a reward animation within the game Scrap Cat.

Referring now to FIG. 11, a screen shot 1100 is shown illustrating a reward animation, in this case a mouse 1136 hopping across the screen in a jumping boot 1138. Reward animations similar to this are presented at regular intervals to entertain the student and keep them interested in continued training.

Figure 12:
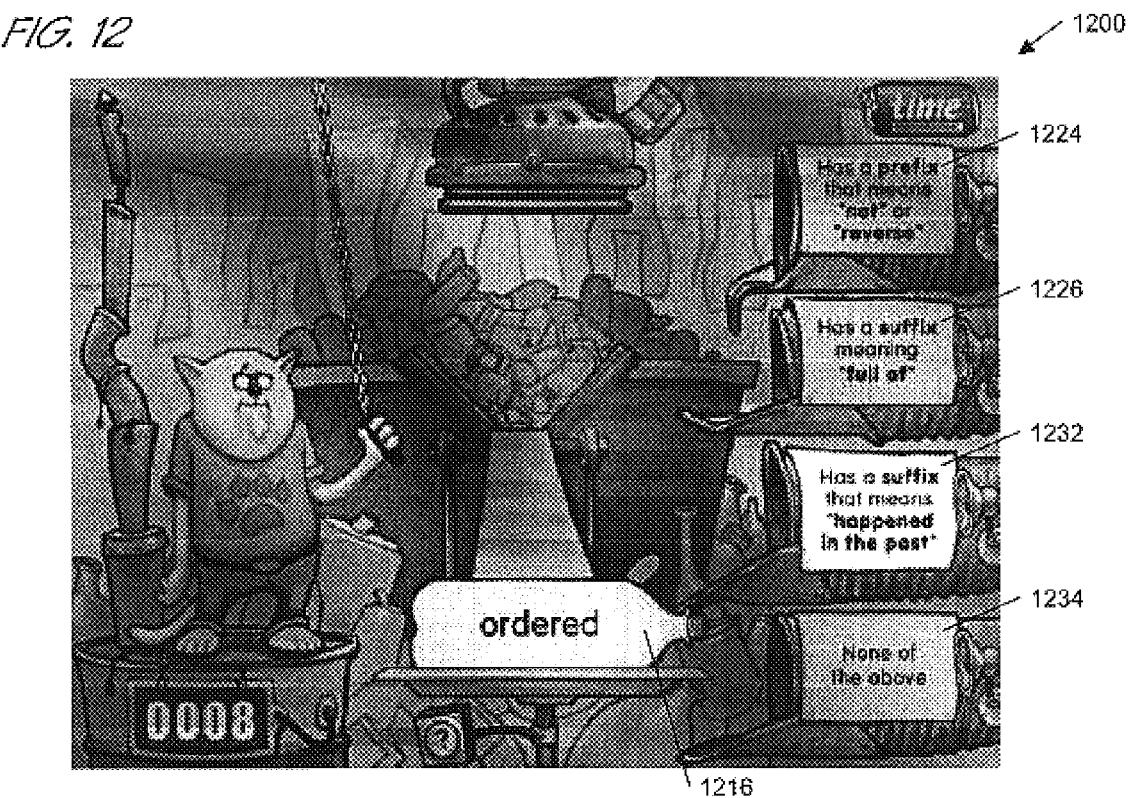
FIG. 12 is a screen shot of four morphological categories into which a word is to be categorized, within the game Scrap Cat.

Referring now to FIG. 12, a screen shot 1200 is shown illustrating a trial within one of the morphological categories. In this trial, the student is presented with a word "ordered" 1216 and is required to place the word into one of the four categories 1224, 1226, 1232, or 1234. In this instance, the student correctly selects the category 1232 "Has a suffix that means "happened in the past"" as indicated by the highlight.

Figure 13:
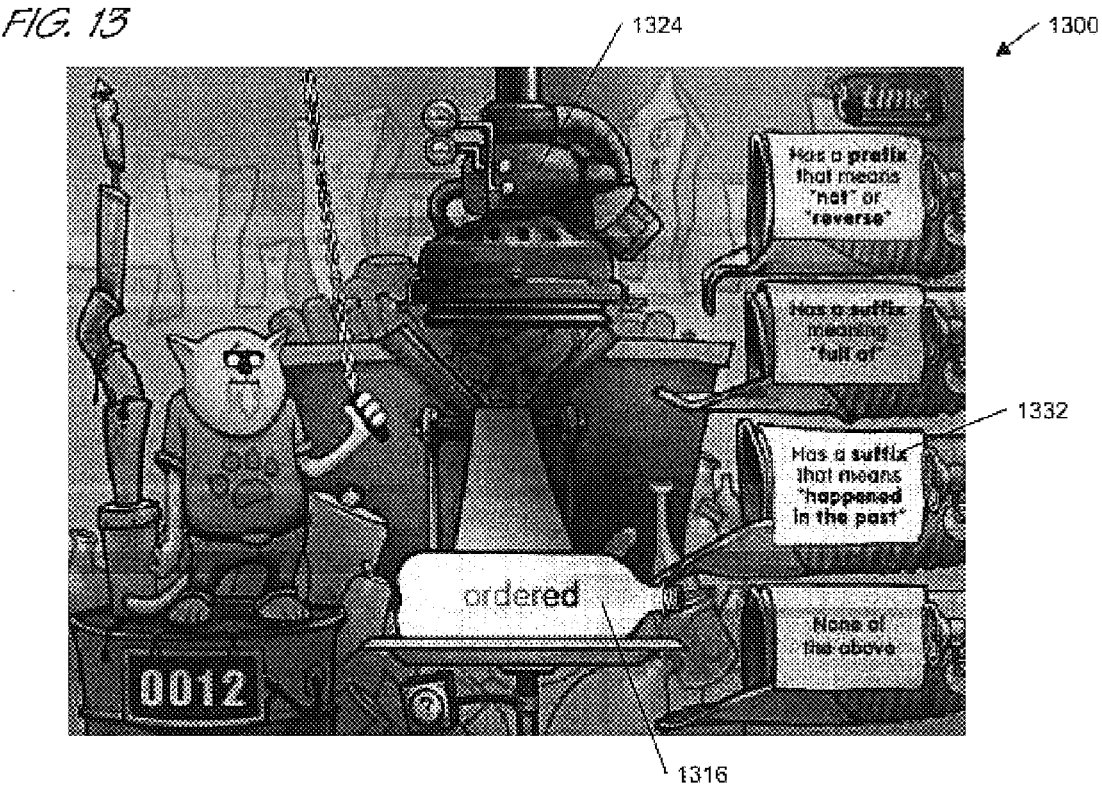
FIG. 13 is a screen shot indicating correct categorization of the word shown in FIG. 12 within the game Scrap Cat.

Referring now to FIG. 13, a screen shot 1300 is shown illustrating that after correct selection of the category 1332 for the word "ordered" 1316, before the word is crushed by the crusher 1324, the word particularly highlights the suffix "ed" for the correct categorization. One skilled in the art will appreciate that other suffixes/prefixes as applicable are highlighted before being disposed of in the proper recycle bin.

Figure 14:
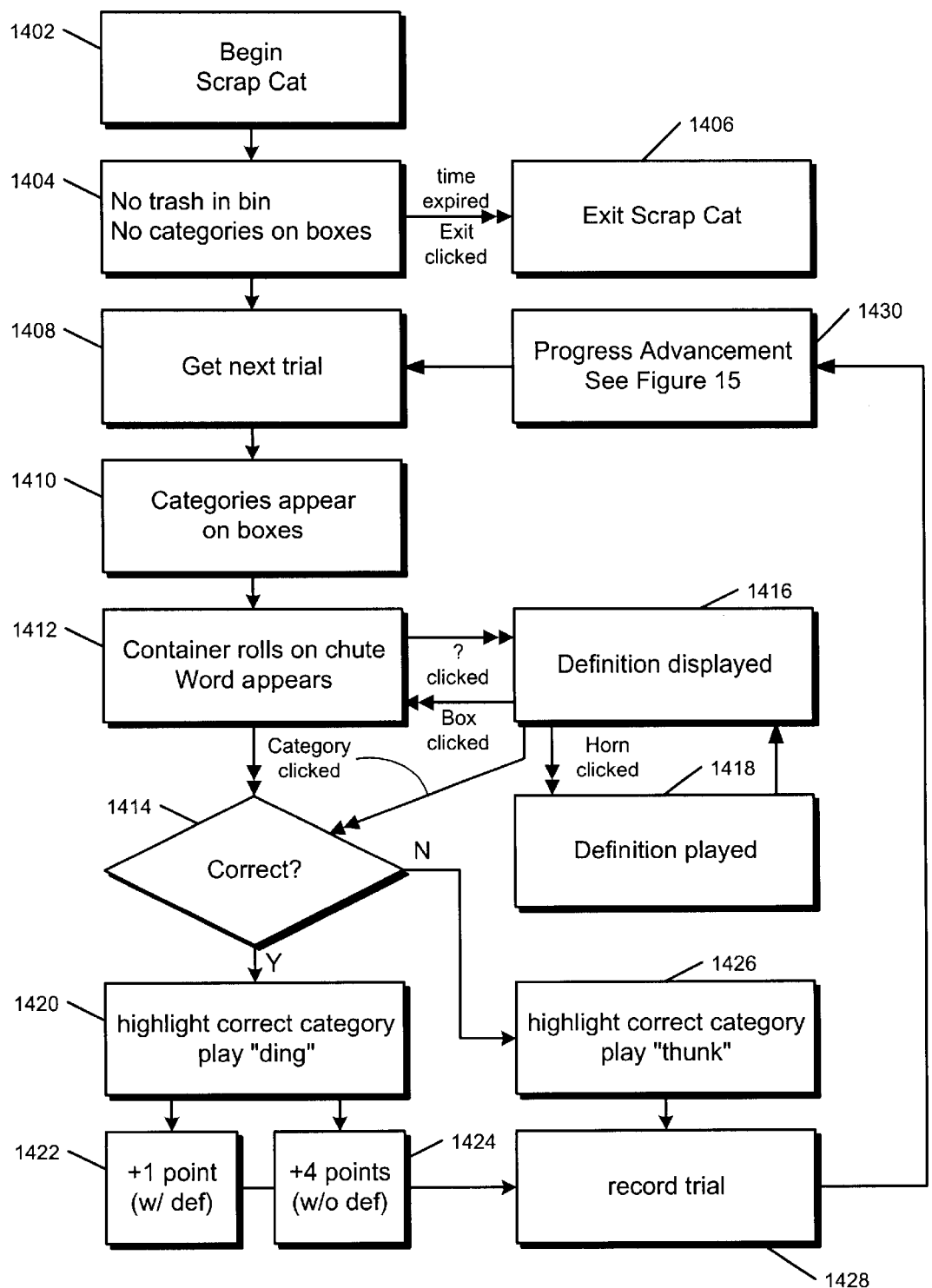
FIG. 14 is a flow chart illustrating game flow within the game Scrap Cat.

Referring now to FIG. 14, a flow chart 1400 is provided particularly illustrating the progress flow for the game Scrap Cat. When reference is required to the screen image for the game, reference will be made back to elements in FIG. 4. The game starts at block 1402 and proceeds to block 1404.

At block 1404 there is no trash in the bin 402 and no categories in the recycle bins 404. Flow proceeds to block 1408. If the student selects "Exit", or if a predefined time period for game play expires, flow proceeds to block 1406 where the game Scrap Cat ends, taking the student back to the main program screen as described above.

At block 1408, the next trial begins. The trial begins with the program selecting a category type (e.g., Semantic, Syntactic, Phonological, Morphological), two or more categories (e.g., Animals, Things to Wear), and a word from one of the selected categories (e.g., fawn) to be presented to the student. Flow then proceeds to block 1410.

At block 1410, the selected (two, three, or four) categories appear on the recycle bins 404 (in random placement). Flow then proceeds to block 1412.

At block 1412, a container rolls out of the garbage bin 402, down the chute 406, and the selected word appears on the container. At this point, the system waits for the student to indicate which of the categories the selected word should be placed in. If the student selects one of the provided categories (on the bins 404), flow proceeds to decision block 1414. If the student requires assistance with the selected word, s/he may click on the "?" box below the chute 406. If s/he does, then flow proceeds to block 1416.

At block 1416, a definition of the selected word appears below the chute 406, as illustrated in FIG. 6. At this point, the student may understand the word enough to attempt a categorization, and if s/he selects one of the provided categories, flow proceeds to decision block 1414. Alternatively, the student may wish to hear the selected word. If so, the student can click on the horn 628, in which case flow proceeds to block 1418.

At block 1418, the selected word is aurally presented by the computing system so that the student can hear the word that is to be categorized. Flow then returns back to block 1416.

Flow reaches decision block 1414 when one of the categories is clicked. A determination is made as to whether the correct category for the word has been selected. If so, flow proceeds to block 1420. If an incorrect categorization is made, flow proceeds to block 1426.

At block 1420, a "ding" is played, indicating to the student that a correct categorization has been made. In addition, the selected category is highlighted to further emphasize the correct selection. Flow then proceeds to blocks 1422/1424.

At blocks 1422/1424, points are added to the student's score. More specifically, if the student did not press the "?" box 518 to see a definition of the word, the student's score is incremented by four points. Alternatively, if the student did press the "?" box 518 to see a definition of the word, the student's score is incremented by one point. In either case, flow proceeds to block 1428.

At block 1428, the result of the instant trial is recorded. That is, the program records the categories being tested, the number of categories being tested, the word tested, whether the student required the word to be defined/played, and whether the student correctly or incorrectly categorized the word. Flow then proceeds to block 1430.

Flow to block 1426 indicates that the student incorrectly categorized the word. At this point, a "thunk" is played indicating to the student that s/he incorrectly categorized the word. In addition, the correct category is highlighted to emphasize to the student the correct categorization. Flow then proceeds to block 1428 where the result of the trial is recorded.

At block 1430, another trial is selected according to the advancement strategy further described with respect to FIG. 15 below.

Figure 15:
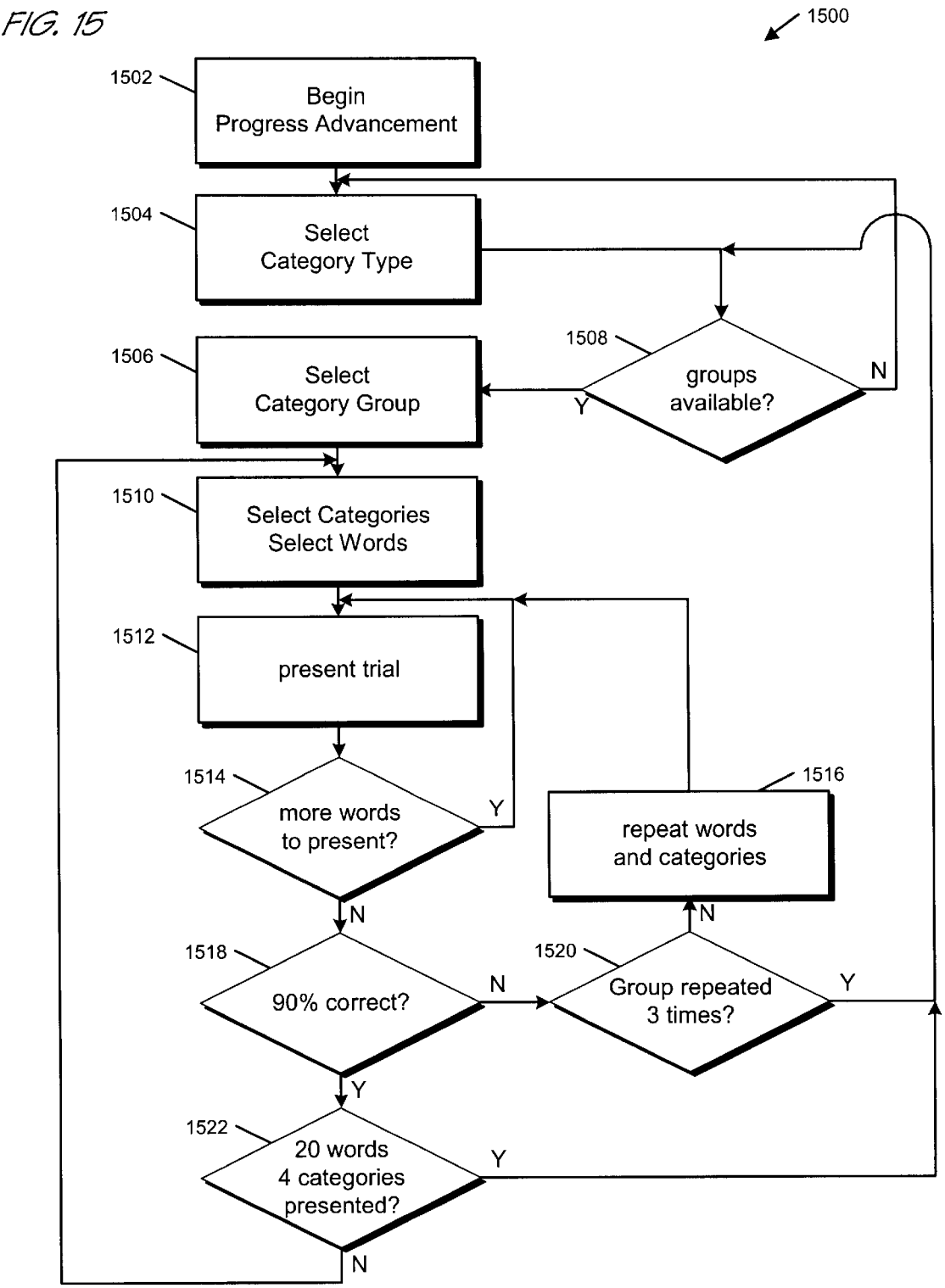
FIG. 15 is a flow chart illustrating progress advancement within the game Scrap Cat.

Referring now to FIG. 15, a flow chart 1500 is provided to particularly illustrate how trials are selected, and how a student advances play for the game Scrap Cat. Flow begins at block 1502 and proceeds to block 1504. As mentioned above, the student will ultimately progress through the four category types: Semantic; Syntactic; Phonological; and Morphological. More specifically, a student will advance through progressively larger numbers of words in progressively more categories (as shown in Table 1 above).

At block 1504, a category type is selected. If no testing has taken place, the first category type selected is Semantic. Flow then proceeds to decision block 1508.

At decision block 1508 a determination is made as to whether there are any groups are available within the selected category type. If not, flow proceeds back to block 1504 where another category type is selected (e.g., syntactic). If groups are available within the selected category type, flow proceeds to block 1506.

At block 1506, a category group is selected. Flow proceeds to block 1510.

At block 1510, a category is selected, then words for the selected category is selected. Flow then proceeds to block 1512.

At block 1512, the trial is presented. Flow then proceeds to decision block 1514.

At decision block 1514, a determination is made as to whether there are any more words to present for the selected category. If there are, flow proceeds back to block 1512 where the additional words are presented. Otherwise, flow proceeds to decision block 1518.

At decision block 1518, a determination is made as to whether the student has correctly categorized at least 90% of the trials within the selected groups. If ten or less words have been tested, the student is allowed to miss just one of the trials. If less than six words have been tested (for two categories), or if the student has correctly responded to 90% of the trials within a selected category group, flow proceeds to decision block 1522. Otherwise, flow proceeds to decision block 1520.

At decision block 1522, a determination is made as to whether the student has been tested in 20 words in all four categories of a category type. If so, flow proceeds back to decision block 1508. If not, flow proceeds back to block 1510 where categories/words are selected.

At decision block 1520, a determination is made as to whether the present group has been repeated 3 times. If so, the flow proceeds back to decision block 1508. Otherwise, flow proceeds to block 1516.

The student reaches decision block 1520 when they have not achieved 90 percent correct response within a given selection of category groups within a selected category type. A test is made to determine whether the student has three times repeated the present group selection, within the selected category type. If not, flow proceeds to block 1516 where testing in the present group continues. However, if the student has repeated the present group three times, the student is considered to have "plateaued". That is, the student has been unable to achieve 90% correct response to trials within a selected group within a selected category type. In this instance, the category group selection within the present category type is changed. Flow then proceeds to block 1508 for continued testing within alternative category groups within the present category type.

At block 1516, the words and categories are repeated for the present group. Flow proceeds to block 1512. The above discussion has described the methodology for the game Scrap Cat according to the present invention.

Figure 16:
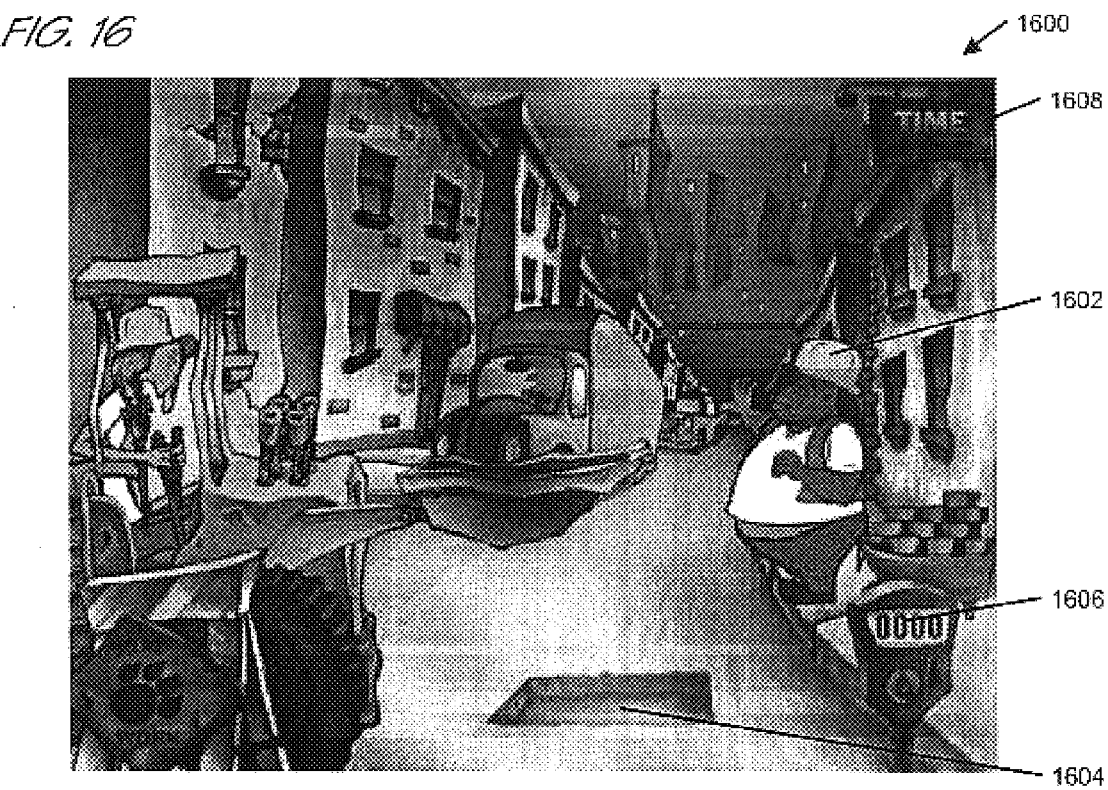
FIG. 16 is a screen shot of an opening scene within the game Canine Crew.

Attention is now directed to FIG. 16 where discussion begins for the game Canine Crew. Canine Crew trains students in decoding, vocabulary, and automatic word recognition. Canine Crew further improves students semantic and phonological skills through training students in rhymes, synonyms, antonyms, and homophones. More specifically, Canine Crew presents word pairs many times, which allows the student to not only cement knowledge of those words' meanings and sounds, but also helps the student develop automatic word recognition and understanding of conceptual relationships.

An animated scene 1600 is presented of a street whose traffic has been stopped by a hairy street worker 1602 that is repairing a pothole 1604. Students who play the game help the street worker 1602 to fill the pothole 1604 by matching similar words and filling the pothole with word bricks. Also shown in the scene 1600 is a score counter 1606 for accumulating a student's score and a timer 1608 indicating a relative amount of time remaining for game play.

Figure 17:
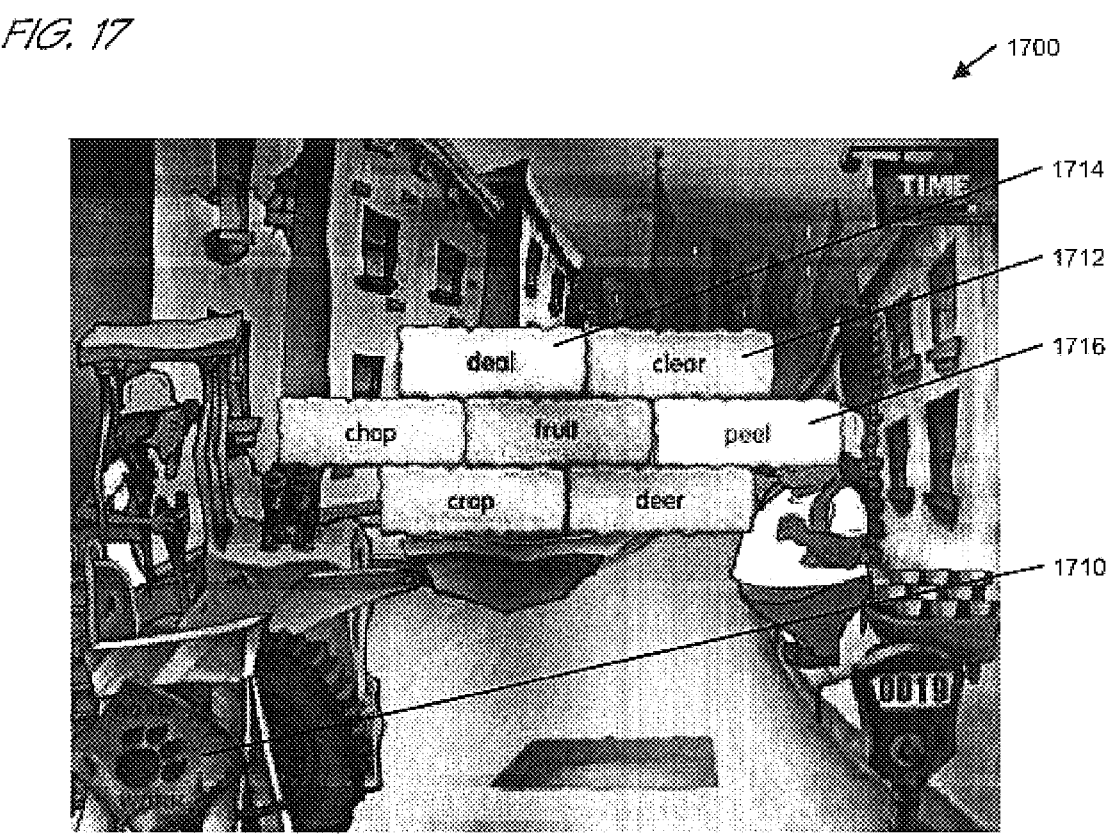
FIG. 17 is a screen shot of three matched pairs of rhyming words within the game Canine Crew.

Referring now to FIG. 17, a scene 1700 is shown for the game Canine Crew. When the student clicks on the yellow paw 1710, a steam shovel (not shown) drops a brickload of words 1712 above the pothole 1704. The student must pair the words according to the category that is being trained. In one embodiment, the first category being trained is rhyme. Initially, the student is provided with a brickload 1712 of seven words including three matching pairs, and one foil (the foil is provided to increase the difficulty of the task). When training in this category, the student clicks a first word, and then clicks a second word that rhymes with the first word. This is particularly illustrated in FIG. 17. That is, the student has first clicked the word "deal" 1714. The only word shown that rhymes with "deal" is the word "peel" 1716. When the student places a selection cursor (not shown) over the word "peel" 1716, the word is highlighted. When the student selects the word "peel" 1716, a "ding" is played by the computing device indicating to the student that s/he has correctly selected a rhyme for the word "deal". At this point, both words "deal" 1714 and "peel" 1716 fall into the pothole 1704, and are thus removed from the set of brickwords 1712. The student continues pairing the remaining words until the last pair has been matched, and the pothole 1704 is filled.

If the student selects a first word, and then incorrectly pairs it with a second word, the student is aurally presented with a "thunk" indicating an incorrect selection, and the first word is "un-highlighted", thereby allowing the student to re-select a first word for pairing. As the student progresses in his/her training, the number of words provided in the brickword load 1712 increases, as does the complexity of the vocabulary. In addition, as the student correctly progresses in pairing words, s/he is moved through four semantic and phonological categories, one by one as follows: 1) Rhymes; 2) Synonyms; 3) Antonyms; and 4) Homophones.

Figure 18:
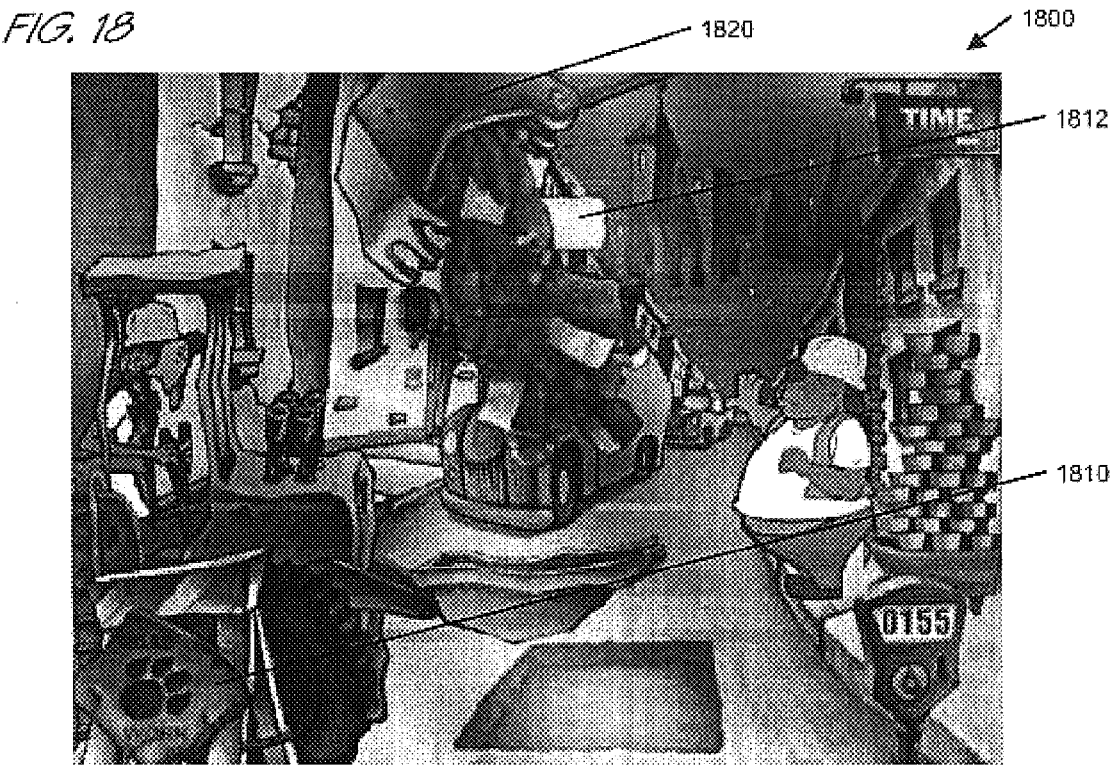
FIG. 18 is a screen shot illustrating a brickload of words being dropped, to begin a new trial within the game Canine Crew.

Referring now to FIG. 18, a screen shot 1800 is shown illustrating a steam shovel 1820 dropping another brickload of words 1812 for the next trial. In one embodiment, the brickload 1812 is dropped after the student completes a previous trial, and selects the yellow paw 1810.

Figure 19:
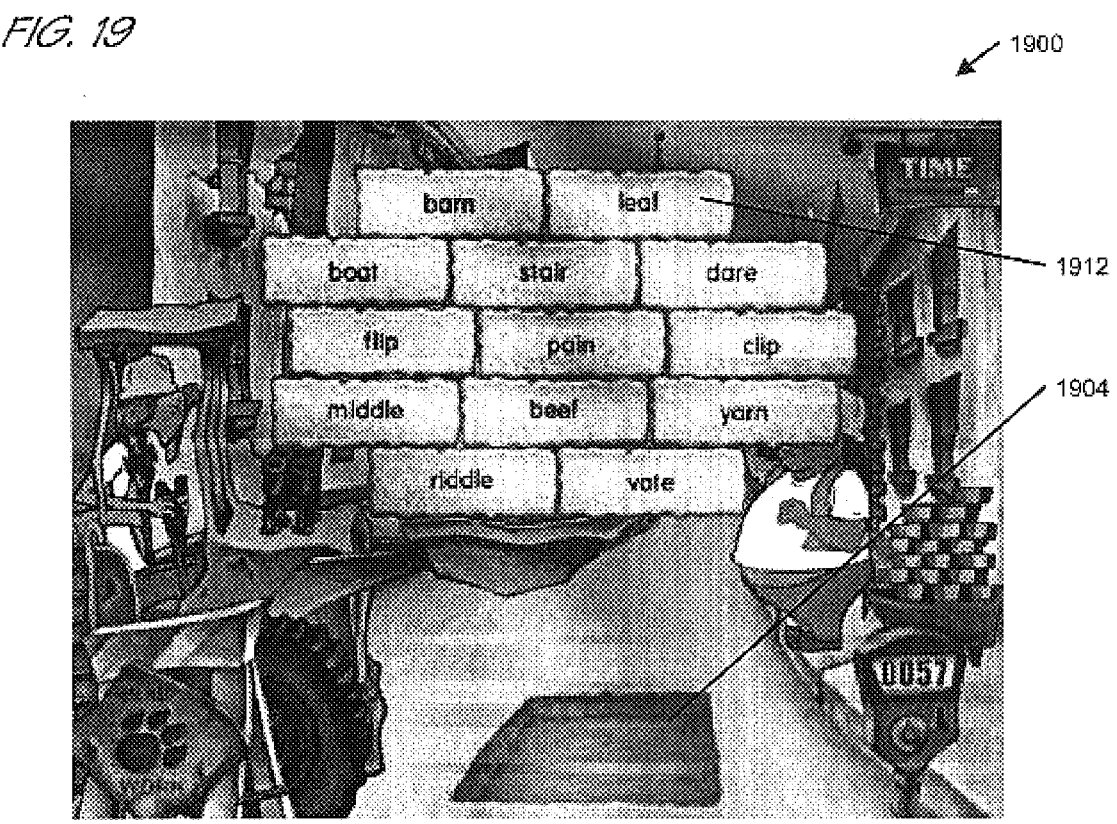
FIG. 19 is a screen shot illustrating six matched pairs of rhyming words within the game Canine Crew.

Referring now to FIG. 19, a screen shot 1900 is provided of another rhyming trial. In this instance, one skilled in the art will appreciate that the number of bricks 1912 that are presented in the trial has increased over the trial illustrated in FIG. 1700 (as has the size of the pothole 1904!) As in FIG. 1700, the student must pair the rhyming words to fill the pothole 1904.

Figure 20:
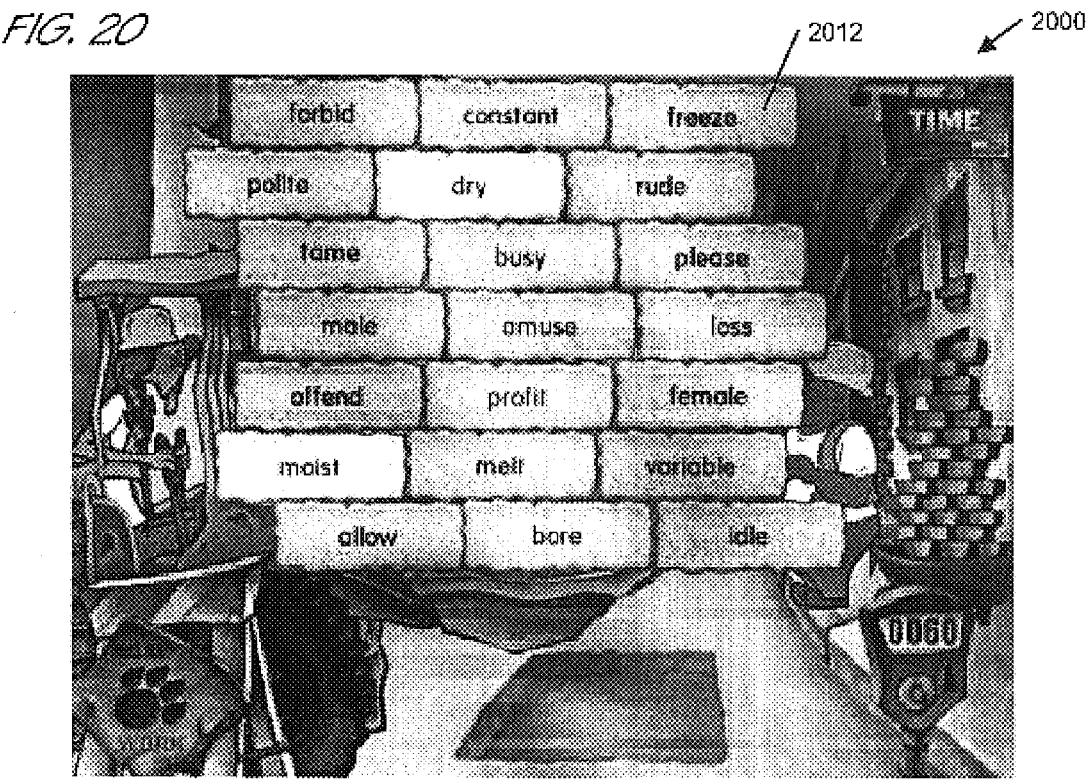
FIG. 20 is a screen shot illustrating 10 matched pairs of antonyms within the game Canine Crew.

Referring now to FIG. 20, a screen shot 2000 is shown illustrating a large number of brick words 2012 that must be paired. In this instance however, the words that must be paired are not rhymes of each other. Rather, they are antonyms (i.e., words that mean the opposite of each other).

Figure 21:
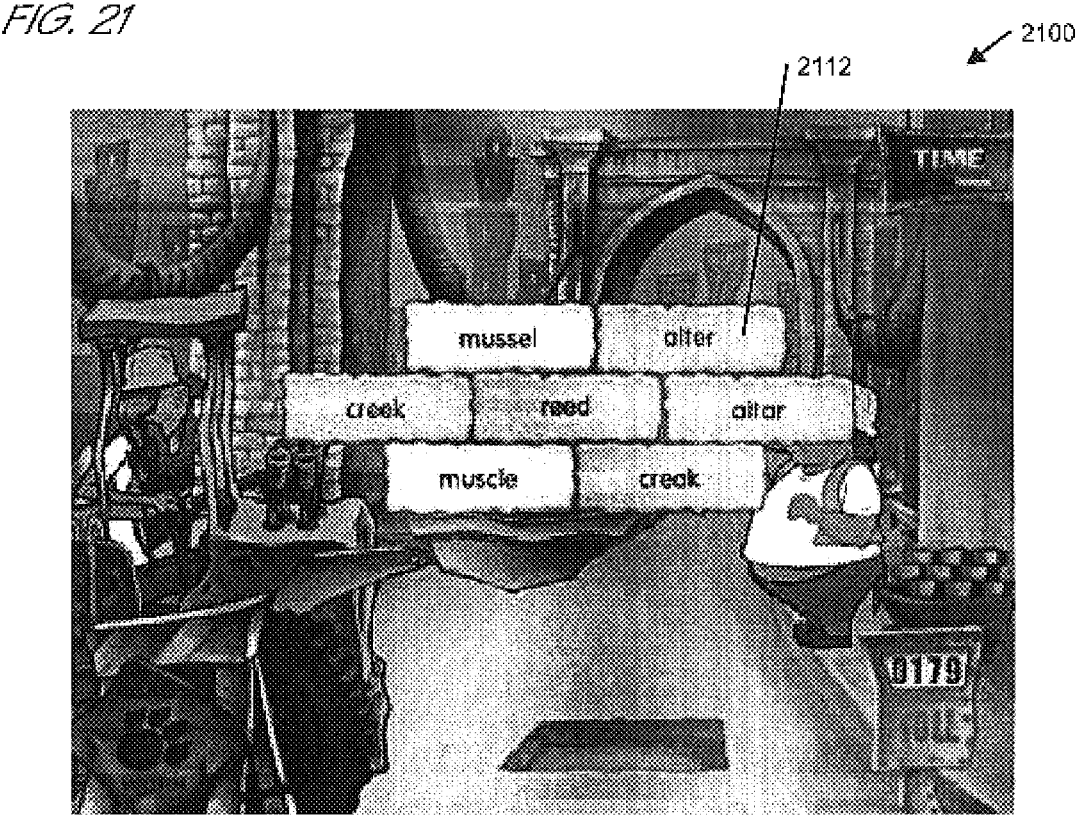
FIG. 21 is a screen shot illustrating three matched pairs of homophones within the game Canine Crew.

Referring now to FIG. 21, a screen shot 2100 is shown illustrating a number of brick words 2112 that must be paired. In this instance however, the words that must be paired are not antonyms of each other. Rather, they are homophones (i.e., words that sound alike though spelled differently).

Figure 22:
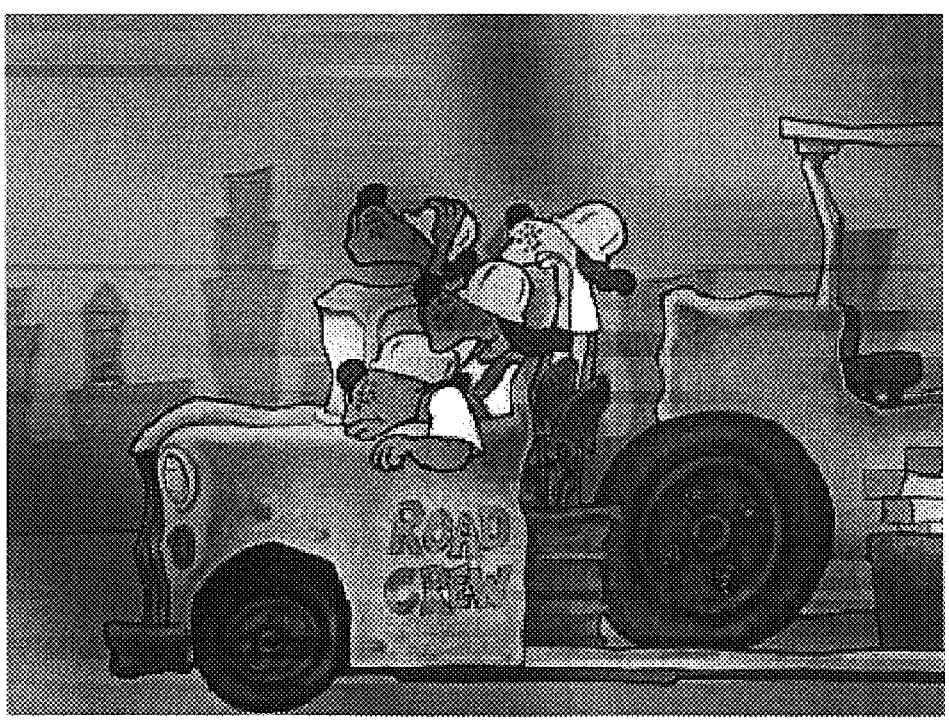
FIG. 22 is a screen shot illustrating a reward animation within the game Canine Crew.

Referring now to FIG. 22, a screen shot 2200 is shown illustrating a reward animation that is played for the student. A number of different reward animations are provided to the student at various times during training to entertain and hold the attention of the student.

Figure 23A:
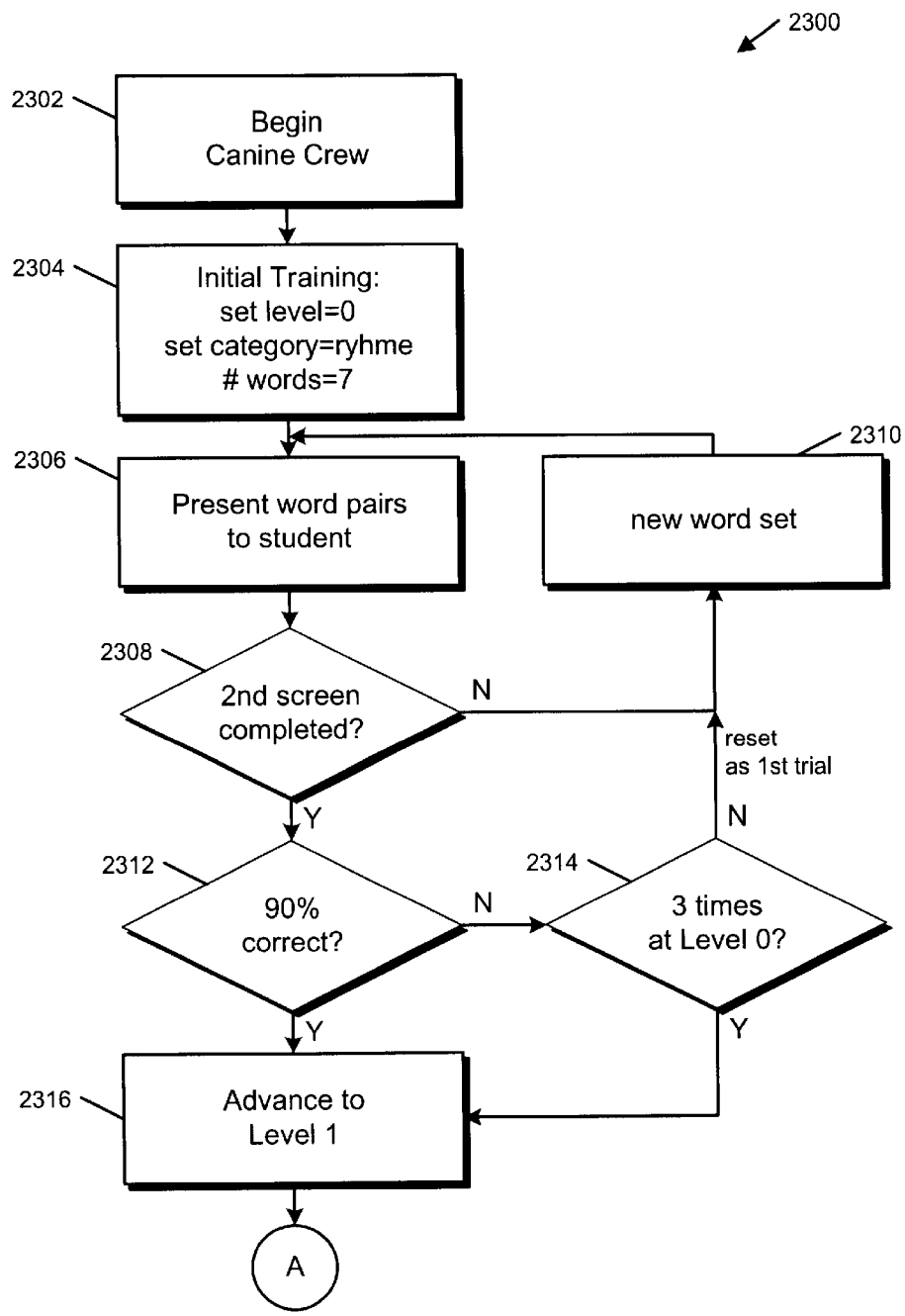
FIGS. 23a–c provide a flow chart illustrating advancement with the game Canine Crew.
Figure 23B:
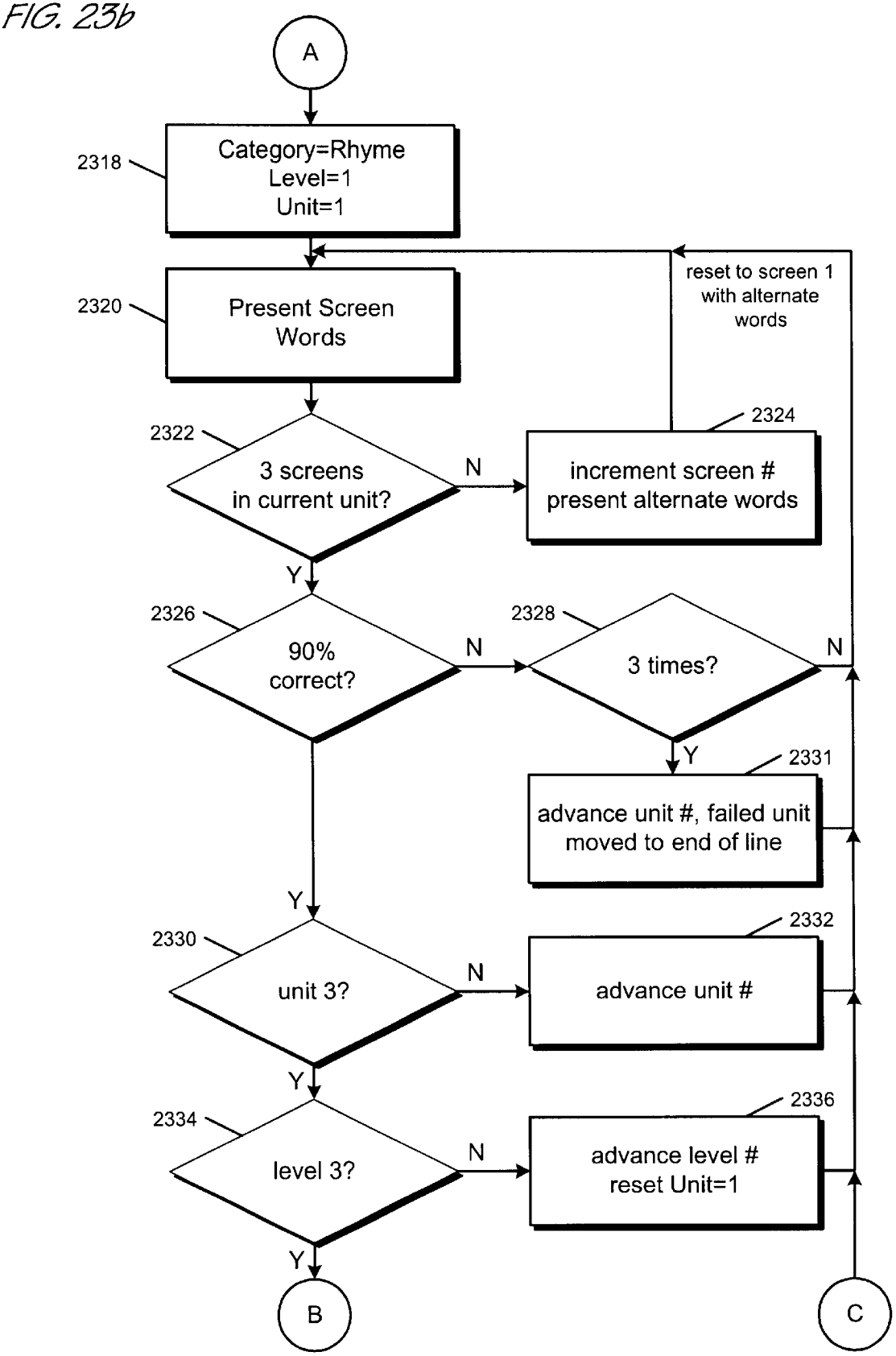
Figure 23C:
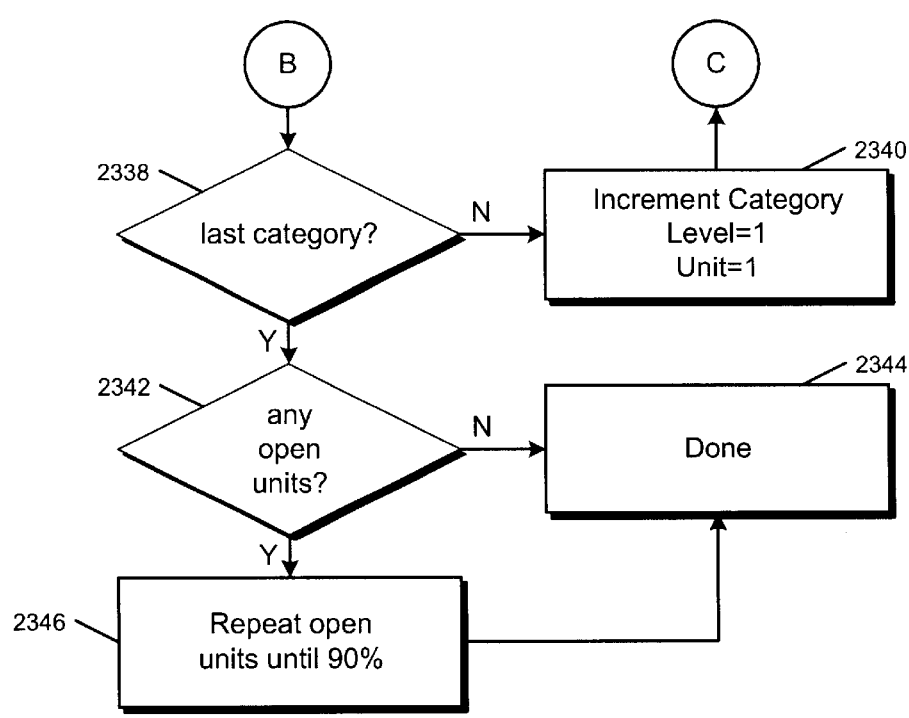

With the above discussion of the screen shots in mind for Canine Crew, attention is now directed at FIG. 23 where a flow chart 2300 is provided particularly illustrating how a student is trained in the game Canine Crew, as well as how the student advances through the four semantic and phonological categories. To better understand the terminology related to flow chart 2300, Table II is provided below to provide definitional assistance.

TABLE II

| Category: | A category refers to a type of match for a group of matching pairs including: rhymes, synonyms, antonyms, or homophones. |
|---|---|
| Level: | A level refers to the difficulty level of a group of matches. There are up to four levels per category. As the level increases so does the grade level of the vocabulary. |
| Set: | A set is a group of matching pairs in a certain category at a certain level. Generally the set consists of 30 matching pairs. |
| Unit: | A unit is the smallest group of trials to be evaluated for advancement. In Canine Crew there are four unit sizes: 6, 9, 18 and 30 matches. |

TABLE II-continued

| Screen: | A screen refers to the group of matches presented on screen after the yellow paw is clicked. There are 3 screens of 3 matches each in a unit of 9 matches. |
|---|---|

A complete listing of word pairs, for each level is provided in Appendix B attached hereto. Table III below provides an overview of level advancement for each of the categories trained on by Canine Crew. In general, a student must complete all units in a category at all levels before moving on to a new category. The Rhyme category progresses from level 0 through 3. Each of the other categories (Synonyms, Antonyms, and Homophones) progress from level 1 through 3.

TABLE III

| Level | Grade level | # of Screens, Words per Screen | Matches per Screen | Unit (Matches Evaluated) | Words per Unit |
|---|---|---|---|---|---|
| 0 | 2 | (2) 6 on screen 1, 7 on screen 2 | 3 | 6 | 12 |
| 1 | 2 | (3) 7 | 3 | 9 | 18 |
|   |   | (3) 13 | 6 | 18 | 36 |
|   |   | (3) 21 | 10 | 30 | 60 |
| 2 | 3 | (3) 7 | 3 | 9 | 18 |
|   |   | (3) 13 | 6 | 18 | 36 |
|   |   | (3) 21 | 10 | 30 | 60 |
| 3 | 4 | (3) 7 | 3 | 9 | 18 |
|   |   | (3) 13 | 6 | 18 | 36 |
|   |   | (3) 21 | 10 | 30 | 60 |
| Total |   |   |   | 177 |   |

Flow begins at block 2302 and proceeds to block 2304.

At block 2304 an initial training sequence is begun. The student begins training in Rhymes at Level 0. S/he will train by pairing 6 matches from three different word families. These matches are presented in two screens of 3 matches each (each screen has seven words). Level 0 is considered "training". This level differs from the others in that it has only one unit, and that unit has only two screens. Also, if the training is failed 3 times then the user progresses to the next unit and the training unit is not placed at the end of the list for further play. So, after Level 0 is set, flow proceeds to block 2306.

At block 2306, three word pairs (with seven words) are presented by displaying them as a brickload to the student (as shown in FIG. 17). As mentioned above, the student selects a first word, which is highlighted, and then selects a second word that rhymes with the first word. If the student correctly matches a pair of words, a "ding" is played, and the words are removed from the screen and dropped into the pothole. If the student incorrectly matches a pair of words, the words are un-highlighted, and the student continues selecting. When three pairs of words have been matched, and the brickload has been moved to the pothole, flow proceeds to decision block 2308.

At decision block 2308 a determination is made as to whether the student has completed two screens of trials. If not, flow proceeds to block 2310. Otherwise, flow proceeds to decision block 2312.

At block 2310, a new word set is selected from Level 0, and flow proceeds to block 2306 where the new words are presented to the student.

At decision block 2312, a determination is made as to whether the student has obtained a 90% correct selection across the two trials. If not, flow proceeds to decision block 2314. Otherwise, flow proceeds to block 2316. For example, a unit is successfully completed if:

numberOfPairsInUnit/numberOfTrialsTakenToCompleteUnit>= 90%

Here are the maximum number of trials the user can take to pass each unit

Unit 1 (9 pairs): 10 trials (9/10=90%)
Unit 2 (18 pairs): 20 trials (18/20=90%)
Unit 3 (30 pairs): 30 trials (30/33=91%)
Another way to look at it is:
Unit 1: User can pass with 1 incorrect trial
Unit 2: User can pass with 2 incorrect trials
Unit 3: User can pass with 3 incorrect trials At decision block 2314, a determination is made as to whether the student has trained at level 0 three times. If not, the student remains at level 0, and repeats the two screen trial again with flow proceeding back to block 2310. If the student has trained at level 0 three times, but has not accomplished a 90% success rate, flow still proceeds to block 2316.

At block 2316, the student advances to level 1 for the category Rhymes. Flow then proceeds to block 2318.

At block 2318, the Category is set to Rhyme, the Level is set to 1, and the Unit is set to 1 so that the first screen for Level 1 can be presented. Flow then proceeds to block 2320.

At block 2320 a screen is presented as a trial. The number of words presented is initially seven, at level 1 within the category Rhyme. However, the number of words presented, the level presented, and the category presented will vary as the student advances. For each screen that is presented, when the student has removed all of the words from the screen by matching pairs, flow proceeds to decision block 2322.

At decision block 2322, a determination is made as to whether the student has completed three screens at the current unit. For example, initially the unit is set to one, meaning that for each screen, seven words are presented. Alternatively, if the student is at level 2, thirteen words at presented for each screen. This is shown above in Table III. If the student has not completed three screens at the current unit number, flow proceeds to block 2324. Otherwise, flow proceeds to decision block 2326.

At block 2324, the screen number is incremented, alternate word pairs from the current level are selected, and flow proceeds to block 2320 where a new screen is presented for training.

At decision block 2326, a determination is made as to whether the student has obtained a 90% correct score for matching pairs of words on the three screens, at the present training level, for the present category. If not, flow proceeds to decision block 2328. Otherwise, flow proceeds to decision block 2330.

At decision block 2328, a determination is made as to whether the student has trained at the present level, in the present category, three times. If not, then the screen number for the present level is reset to one, and the words for the present level are reordered and presented again at block 2320. However, if the student has trained three times at the present unit number, at the present level, in the present category (and has not achieved a 90% success rate), flow proceeds to block 2331.

At block 2331, the unit # is advanced, and the failed unit is moved to the end of the land. That is, the present level is left "open" (meaning that ultimately the student will have to come back and complete the present unit number, at the present level before his/her training ends) and flow proceeds to block 2320. That is, a student is allowed three opportunities to achieve a 90% correct response before advancing to the next unit number, or if at unit 3, to the next level. If s/he is successful, then the unit/level is closed (i.e., not to be repeated again), and the student advances. If s/he is not successful, then the unit/level remains open, and the student advances.

At decision block 2330, a determination is made as to whether the student is currently in unit 3 (21 words) at the present level, in the present category. If not, flow proceeds to block 2332. Otherwise, flow proceeds to decision block 2334.

At block 2332, the unit number for the present level is incremented. For example, if the present unit number is 1 (7 words), then the unit number will be incremented to 2 (13 words). If the present unit number is 2 (13 words), the unit number will be incremented to 3 (21 words). Flow then proceeds back to block 2320 where the student will be presented with a screen at the new unit number, at the present level, in the present category.

At decision block 2334, a determination is made as to whether the student is currently at level 3 for the present category. If not, flow proceeds to block 2336. Otherwise, flow proceeds to decision block 2338.

At block 2336, the current training level is incremented, and the unit number is set to 1. For example, if the present training level is 2, and the present unit number is 3, the training level will be set to 3, and the unit number will be set to 1. Flow then proceeds to block 2320 where new words, at the new level are presented.

At decision block 2338, a determination is made as to whether all categories have been completed. If not, flow proceeds to block 2340. Otherwise, flow proceeds to decision block 2342.

At block 2340, the category number is incremented, and the level and unit numbers are reset to 1. For example, if the present category is 2 (Synonyms), then the category is incremented to 3 (Antonyms), and the level and unit numbers are reset to 1. Flow then proceeds back to block 2320 where training begins in the new category.

At decision block 2342, a determination is made as to whether any units remain open, at any level, for any category. If not, then the student has achieved a 90% success for all units, at all levels, for all categories. Training is therefore completed, with flow proceeding to block 2344. Otherwise, one or more units, at one or more levels, for one or more categories remain open. Flow thus proceeds to block 2346.

At block 2346, if the student arrives at this point, it is because s/he "plateaued" in a unit, being unable to achieve 90% correct after three tries at that level. As mentioned above with respect to decision block 2328, if the student is unable to obtain 90% correct after three trials in a unit, the student is advanced, but the unit remains open. In block 2346, all open units are repeated until the student obtains 90% correct. When s/he does, flow proceeds to block 2344 where training in Canine Crew ends.

The first two games in Fast ForWord Reading that have been described above have provided training, primarily utilizing Decoding exercises. In Scrap Cat, the student was trained to appreciate various properties of words including: Semantic, Syntax, Phonological, and Morphological. In Canine Crew, the student builds on their basic letter-sound correspondence skills and uses those to deal with more complex relationships between words: Rhymes, Synonyms, Antonyms, and Homophones.

The next game in the Fast ForWord Reading program is called Chicken Dog. This games builds on the other two games, but adds training in spelling and letter sound correspondence. Before Chicken Dog is discussed in detail, an overview of Spelling is considered applicable.

Chicken Dog trains a student in spelling by having the student associate the sound of a word with its spelling, and by having the student complete the written spelling of a spoken word. More specifically, Chicken Dog develops $1^{st}$ through $4^{th}$ grade spelling skills by training the student to recognize: 1) every syllable has a vowel letter; 2) many sounds are represented with letter combinations; 3) how we spell a sound depends on its position in a word; 4) only certain letters are doubled; and 5) meaningful word parts are often spelled consistently.

Chicken Dog Cross-Trains a student using a multiple-choice, closed task format to train:

Spelling—Words are presented that are missing a letter or letter combination. Chicken Dog varies the location of the missing letter(s) by beginning, middle, or end of the word. Chicken Dog also varies the linguistic properties of the missing letter(s) by consonant, short vowel, long vowel, or r-controlled vowel. Chicken Dog further varies the orthographic complexity of the missing letter (s) by a single letter, letter blend, digraph, diphthong, or special vowel spelling.

Sensitivity to letter-sound correspondence—The correct letter or letter combination is chosen from a group of letters and letter combinations that include not only the correct choice but also incorrect choices-foils-that are systematically selected to be either visually or phonetically similar to the correct choice.

Decoding Skills—To complete the spelling of a word, the student must successfully decode the part of the word that appears on the screen. Through practice in retrieving the appropriate letter-sound correspondences to complete the partially spelled word, the student further hones skills necessary for successful decoding.

Figure 24:
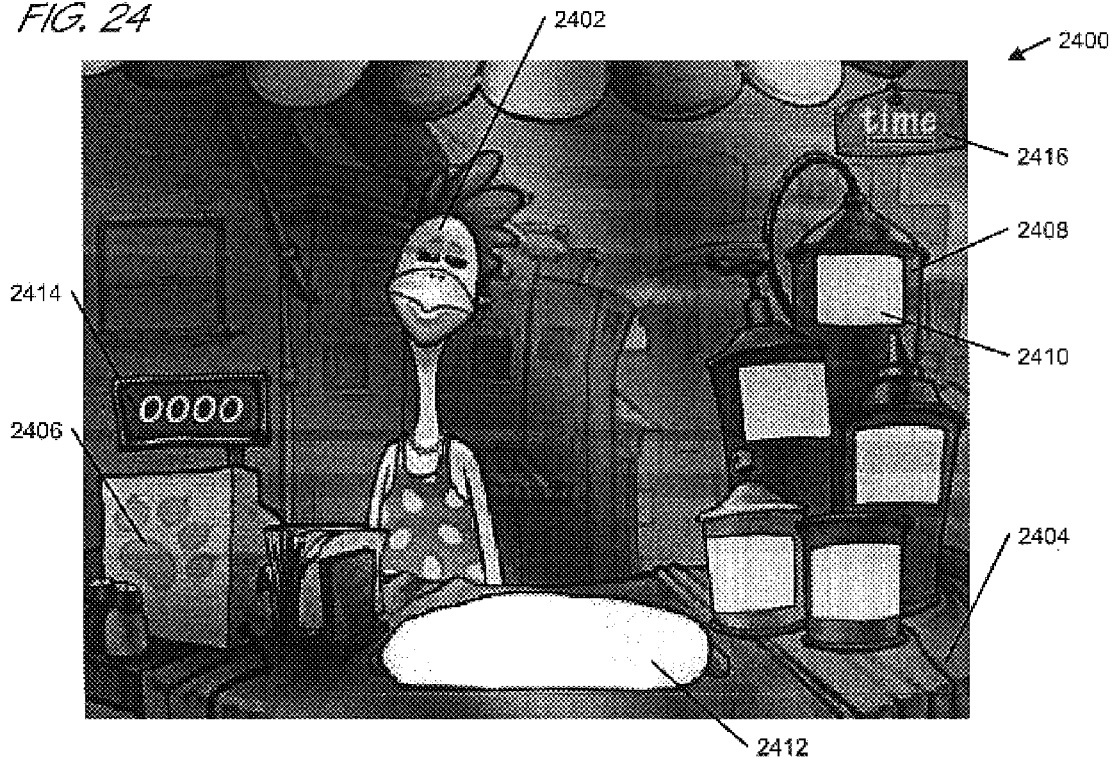
FIG. 24 is a screen shot of an opening scene in the game Chicken Dog.

Referring now to FIG. 24, a screen shot 2400 is shown for the game Chicken Dog. The animated scene 2400 depicts a chicken character 2402 working a hot dog stand 2404. On the left of the stand 2404 is a cash register having a yellow paw 2406. As in the other games above, a trial begins when a student clicks on the yellow paw 2406. On the right side of the screen are 5 condiment containers 2408, each having a display square 2410 onto which will be presented one or more letters. When a trial begins, Chicken Dog 2402 presents a hot dog 2412 on the stand 2404, onto which will be placed a word that is missing letters. The size of the hot dog 2412 will vary depending on the size of the word presented. As in the previous two games, a score counter 2414 is provided to indicate to the student a score, reflecting their performance, and a timer 2416 indicating a relative time remaining for game play.

Figure 25:
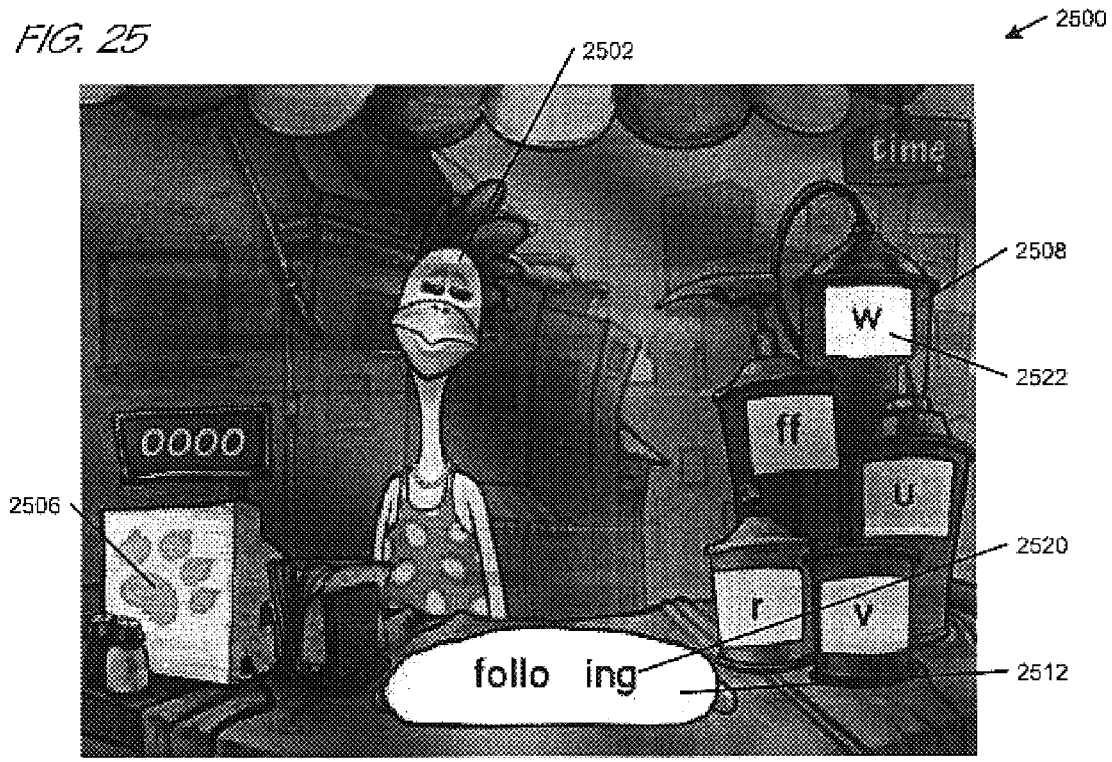
FIG. 25 is a screen shot of a trial within the game Chicken Dog requiring a student to complete the word "follo_ing" by selecting the consonant "w".

Referring now to FIG. 25, a screen shot 2500 is presented subsequent to the student selecting the yellow paw 2506. Like elements have like references, the hundreds digits being replaced with a 25. After the paw 2506 is selected, Chicken Dog 2502 presents a hot dog 2512 with a word 2520 on it. When the word 2520 is presented, it is also played aurally by the computing device on which the program is run so that the student being trained hears the entire word, in addition to seeing it. The word is missing a letter or letters which must be filled in by the student.

When the word 2520 is presented, five letters, or letter combinations, are inserted into the condiment containers 2508. In this scene, the word 2520 that is played is "following", and the word presented is "follo_ing". The student must select one of the five letters 2522 as a letter to complete the word 2520. For each trial, one correct answer and four incorrect (foil) answers are provided.

The first trial that is played by the student highlights the correct letter, in this case "w", to complete the word "follo_ ing". When the student selects the correct letter 2522, a "ding" is played indicating a correct selection, all the letters disappear from the condiment containers 2508, and the letter appears in the word 2520 as will be further illustrated below. If the student selects one of the foil letters, a "thunk" is played indicating an incorrect selection, and the correct letter is placed into the word 2520 to illustrate to the student the correct selection. If at any time during a trial the student wishes to have the word played aurally, s/he can again select the yellow paw 2506, and the word will be played.

Figure 26:
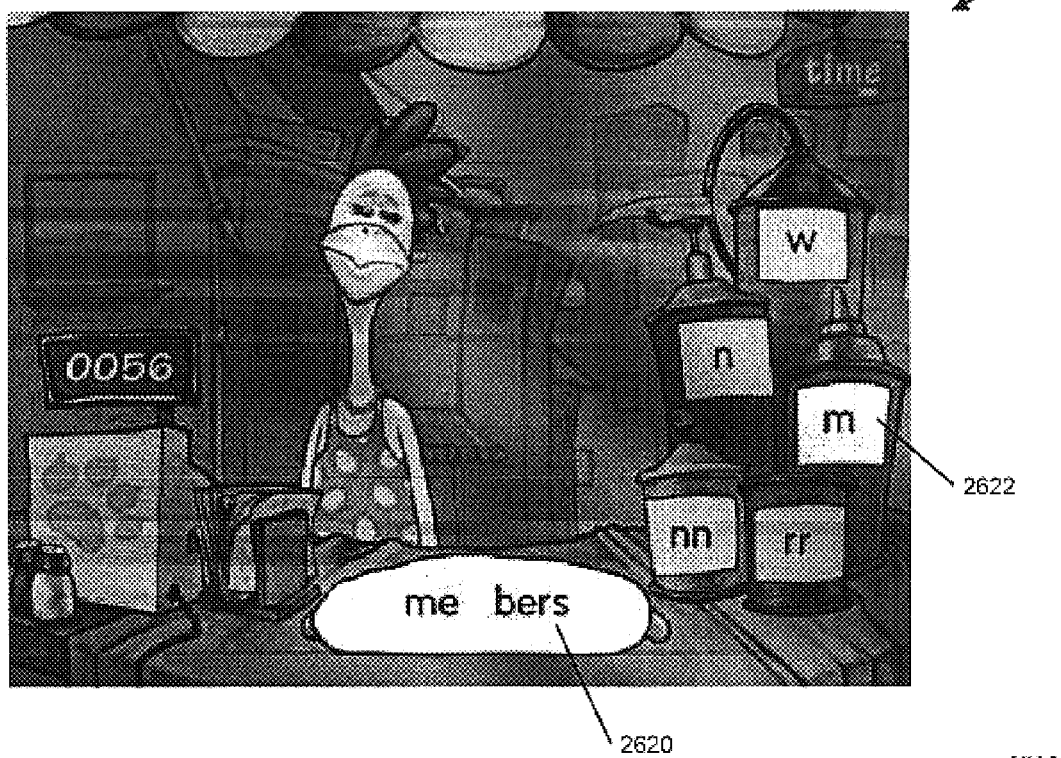
FIG. 26 is a screen shot of a trial within the game Chicken Dog requiring a student to complete the word "me_bers" with the letter "m".
Figure 27:
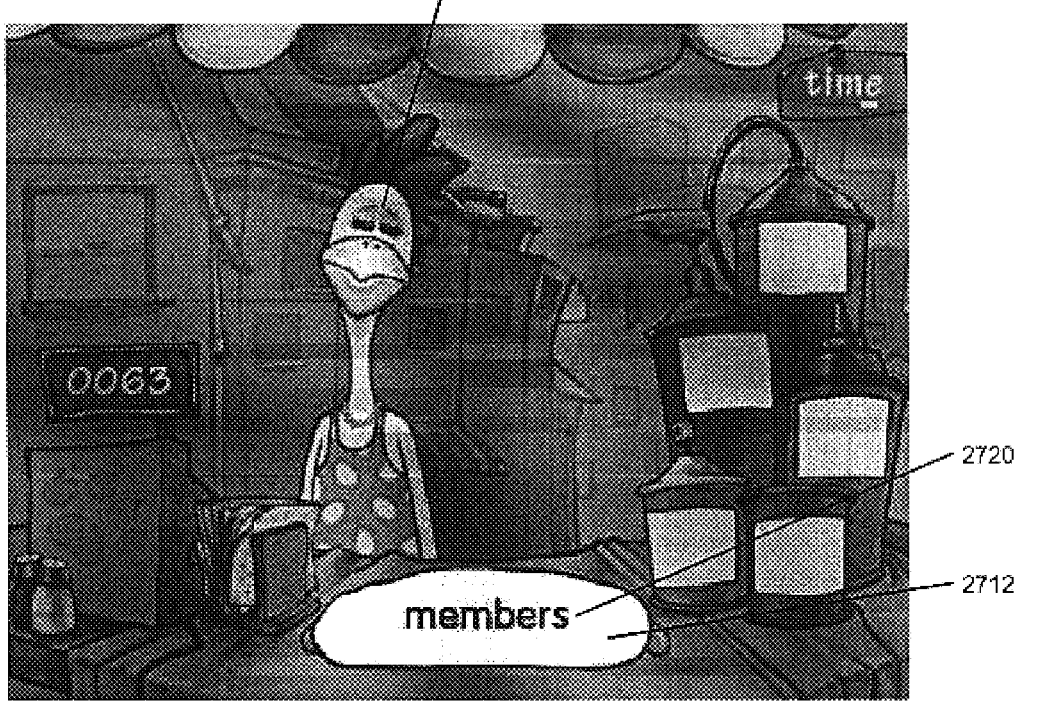
FIG. 27 is a screen shot illustrating correct completion of the word "members" within the game Chicken Dog.

Referring now to FIG. 26, a screen shot 2600 is shown illustrating a word 2620 "me_bers" that has been presented, visually and aurally to the student. The student indicates that the missing letter is "m" 2622 which is highlighted when the cursor is on top of the letter. After selecting "m" 2622 to complete the spelling of the word "members", the "m" drops down into the word 2620, as is shown in FIG. 27. Additionally, the program adds an entertaining animation (not shown) upon each correct selection wherein the condiment container associated with the correct letter is manipulated by Chicken Dog 2702 to squirt, pour, shake, etc., some ingredient onto the hot dog 2712. Furthermore, similar to the other games described above, after a number of trials, a reward animation (not shown) is played for the student to further enhance their enjoyment of the game.

Figure 28:
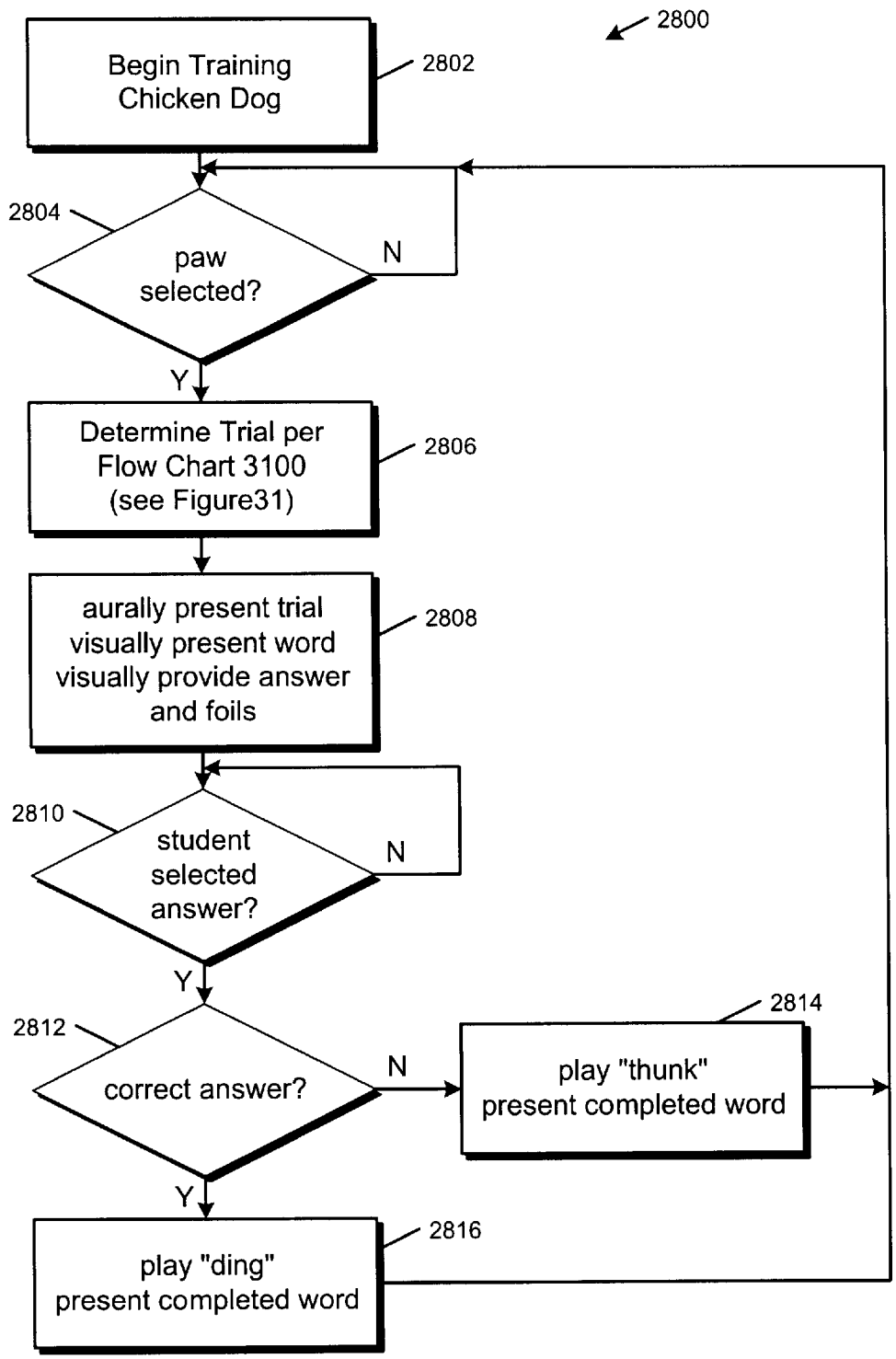
FIG. 28 is a flow chart illustrating game flow within the game Chicken Dog.

Referring now to FIG. 28, a flow chart 2800 is shown that provides an overview of the training steps for each trial in Chicken Dog. Flow begins at block 2802 and proceeds to decision block 2804.

At decision block 2804, a determination is made as to whether the yellow paw 2406 has been selected. If so, flow proceeds to block 2806. Otherwise, play remains at decision block 2804 until the student selects the paw 2406.

At block 2806, the correct trial to be presented is determined as is further illustrated below with respect to FIG. 31. Flow then proceeds to block 2808.

At block 2808, the particular trial selected in block 2806 is presented to the student. As described above, the word being tested is aurally presented to the student, a portion of the word is visually presented to the student, and the correct answer, along with a number of foils are presented to the student. Flow then proceeds to decision block 2810.

At decision block 2810, a determination is made as to whether the student has selected an answer. If not, flow remains at decision block 2810 until the student selects an answer. Otherwise, flow proceeds to decision block 2812. At decision block 2812, a determination is made as to whether the student correctly responded in the trial. If so, flow proceeds to block 2816. Otherwise, flow proceeds to block 2814.

At block 2814, the incorrect response is indicated by playing a "thunk", and then the correct completed word is presented. Flow then proceeds back to decision block 2804 awaiting instigation of another trial.

At block 2816, the correct response is indicated by playing a "ding", and then the correct completed word is presented. Flow then proceeds back to decision block 2804 awaiting instigation of another trial.

| Progress Advancement | |
|---|---|
| Terms: | |
| Category: | The category refers to the type of letter or letters missing. The categories include three consonant categories (beginning, ending and medial) and one vowel category. (see Appendix C for a complete description of the Categories and words used) |
| Level: | The level refers to the level of difficulty. Each category has from 1 to 5 levels of difficulty. |
| Unit: | A unit is always the smallest group of trials to be evaluated for advancement. IN Chicken Dog the unit is all the trials in a given category at a given level. |

A trial is evaluated as correct if the student clicks on the correct missing letter (or letters). A unit is all trials from a given category at a given level. Trials are presented randomly from all categories at the current level for each category. A trial from each category is presented before any category can be repeated. Once all the trials from a given category type at a given level have been presented, that category is evaluated for 90% correct. Table IV below provides detail regarding level/category advancement for Chicken Dog.

TABLE IV

| | Category 1 Beginning | Category 2 Ending | Category 3 Medial | Category 4 Vowel |
|---|---|---|---|---|
| Level 1 | Beginning Consanants: b, c, d, f, g, h, j, k, l, m, n, p, r, s, t, v, w, y, z | Ending Consanants: b, d, g, m, n, p, t, s:/s/ | Single Consonants: b, c, d, f, g, h, j, k, l, m, n, p, r, s, t, v, w, z | Short Vowels a, e, I, o, u |
| Level 2 | Beginning Blends: bl, cl, fl, gl, pl, sl, br, cr, dr, fr, gr, pr, tr, sc, sk, sm, sn, sp, st, sw | Ending Consonants: x, zz, ff, ll, ss s:/z/, s:/s/plural, s:/z/plural | Two Consonants: bl, cr, mp, nc, nd, nt, rm, rs, rt, st | Long Vowels with Final "e": a-e, e-e, i-e, o-e, u-e |
| Level 3 | Beginning Consonants: qu, c:cent, g:gent Beginning Blends: scr, spr, spl, str, squ, shr, thr | Ending Blends: mp, nd, ft, lt, nt, lf, st, nk, ng | Three Consonants: btr, bst, ctr, rtm, ldr, ncl, ncr, nds, ngr, ntr, rnm, rtr, spl, str, tst, xpl | Vowel Digraphs: ai, ay, oa, ea, ee |
| Level 4 | Digraphs: ch, sh, th, th(voiced), wh, ph Silent Letters: wr, kn | Silent Letters: ck, lk | Digraphs and Silent Letters in Vowel or Consonant Contexts: ch, ck, dg, gh, lk, sh, th, ph Double Consonants, One Phoneme: | Long Vowels: y: sky Vowel Digraphs: au, aw, oo:boot, eu, ew Diphthongs: ou, ow, oi, oy Long Vowels: y:happy Vowel Digraphs: oo:foot r-control: ar, er, ir, or, ur |
| Level 5 | | | | |
| | | | cc, dd, ff, gg, ll, mm, nn, pp, ss, tt | |

When a student begins trials in Chicken Dog, words are presented in random order without repeating from all four categories at level 1. A trial from each category is presented before any category can be repeated. Once all trials from a given category at a given level have been presented, that category is evaluated. If the student completes 90% of the words correctly then the trials/words from the next level of that category are used. Otherwise, the same trials/words are repeated. If all levels have been completed with 90% correct responses, then that category is dropped and the trials are chosen randomly from the remaining categories. If any unit (a level of a category) is repeated three times without achieving a 90% correct rate, that unit is temporarily dropped and the next level of the current category replaces it. If there are no more levels left in the current category, the unit is not dropped.

Number of Trials

The number of trials (words) in each category type at each level corresponds to a multiple of the number of letters or letter groups listed in the category description. This is shown below in Table V.

TABLE V

| Category | Level | Number of trials per letter or letter group | Number of letters or letter groups | Trials per category |
|---|---|---|---|---|
| Beginning | Level 1 Beginning Consonants | 3 | 19 | 57 |
| | Level 2 Beginning Blends | 3 | 20 | 60 |
| | Level 3 Beginning Consonants/ Blends | 3 | 10 | 30 |
| | Level 4 Beginning Digraphs/ Silent Letters | 5 | 8 | 40 |
| Ending | Level 1 Ending Consonants | 4 | 8 | 32 |
| | Level 2 Ending Consonants | 4 | 8 | 32 |
| | Level 3 Ending Blends | 4 | 9 | 36 |
| | Level 4 Ending Silent Letters | 3 | 2 | 6 |
| Medial | Level 1 Single Consonants | 3 | 18 | 54 |
| | Level 2 Two Consonants | 3 | 10 | 30 |
| | Level 3 Three Consonants | — | — | 18 |
| | Level 4 Medial Digraphs/ Silent Letters | 3 | 8 | 24 |
| | Level 5 Double Consonants to spell one phoneme | 3 | 10 | 30 |
| Vowel | Level 1 Short Vowels | 5 | 5 | 25 |
| | Level 2 | 5 | 5 | 25 |

TABLE V-continued

| Category | Level | Number of trials per letter or letter group | Number of letters or letter groups | Trials per category |
|---|---|---|---|---|
| | Long Vowels Level 3 | 5 | 5 | 25 |
| | Vowel Digraphs Level 4 | 5 | 10 | 50 |
| | Long Vowels/Vowel Digraphs/Diphthongs Level 5 | 5 | 7 | 35 |
| | Long Vowels/Vowel Digraphs/r-control | | | |
| | | | | 609 |

Figure 29:
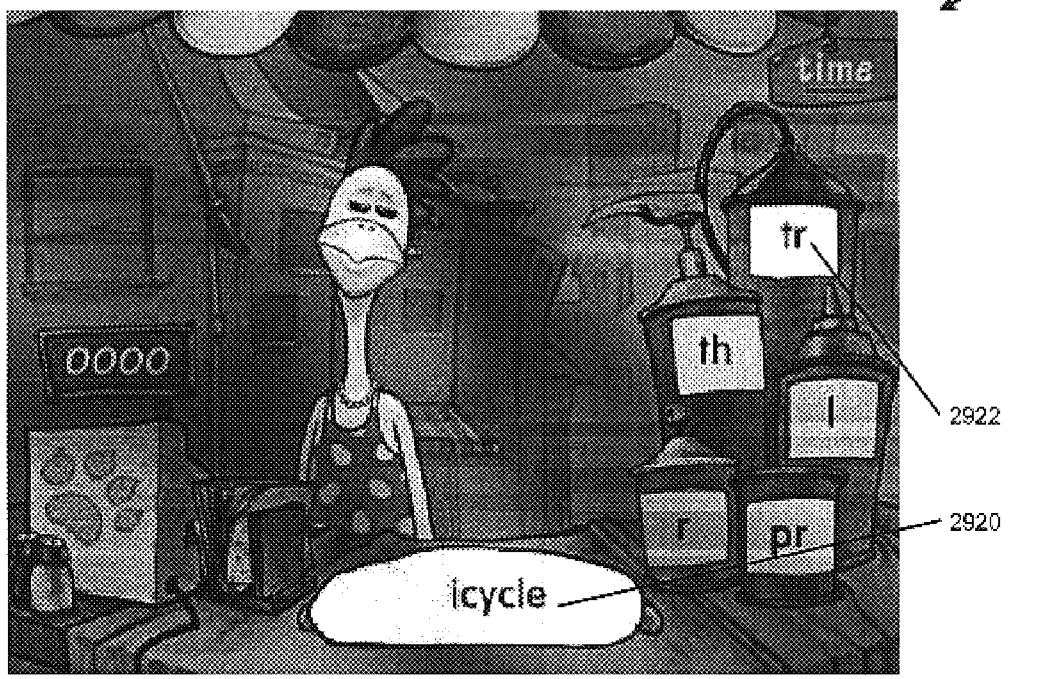
FIG. 29 is a screen shot of a trial within the game Chicken Dog requiring a student to complete the word "icycle" with the blend "tr".

Referring to FIG. 29, a screen shot 2900 is shown of play at level 2 for the beginning blend "tr". The word "icyle" 2920 is presented, and the word "tricyle" is played. The student must select the blend "tr" 2922 to correctly answer the trial.

Figure 30:
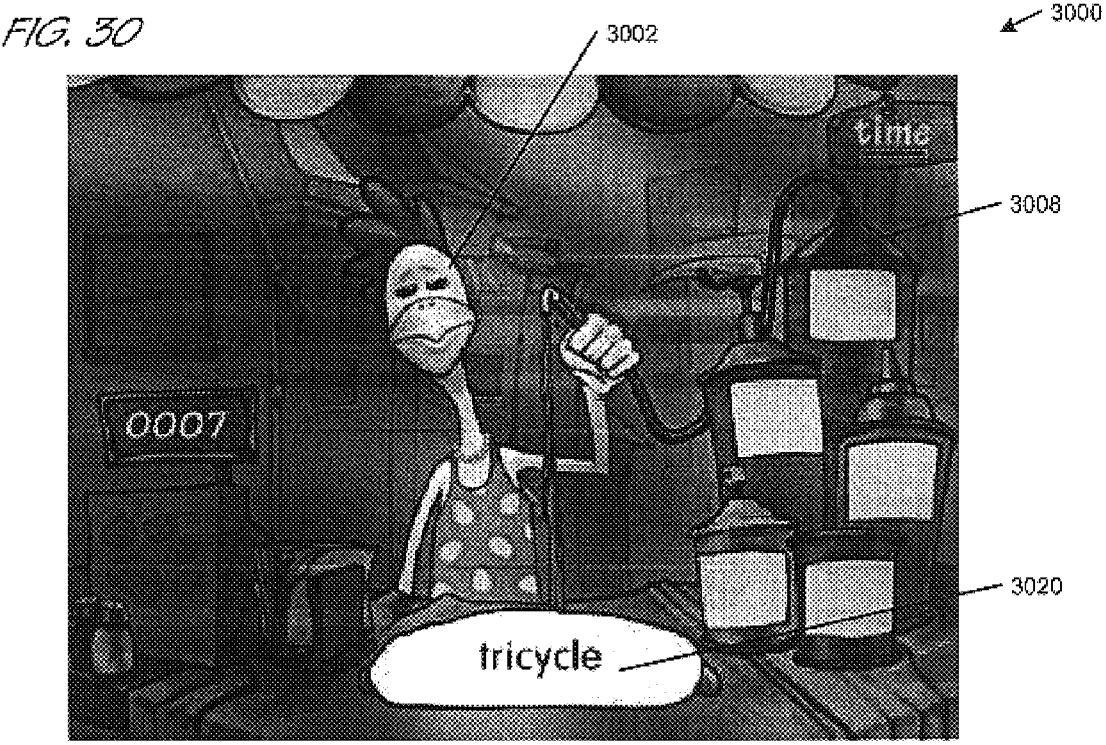
FIG. 30 is a screen shot illustrating correct completion of the word "tricycle" within the game Chicken Dog.

Referring to FIG. 30, a screen shot 3000 is shown illustrating the completed word tricyle 3020, and animating Chicken Dog 3002 providing condiments on the hot dog from the container 3008 that contained the blend "tr".

Figure 31:
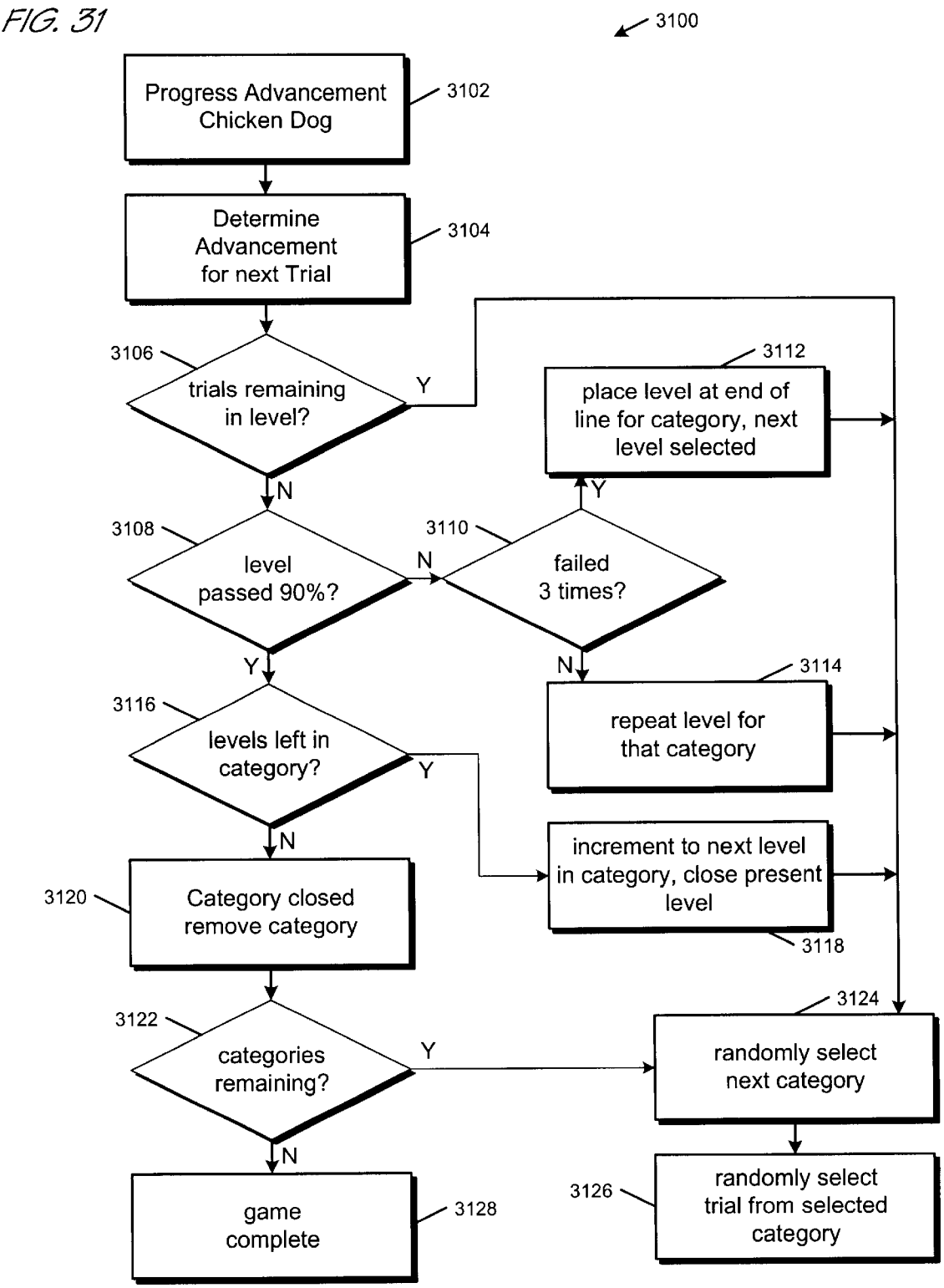
FIG. 31 is a flow chart illustrating progress advancement within the game Chicken Dog.

Referring now to FIG. 31, a flow chart 3100 is provided illustrating how a student advances through all the levels of all the categories in Chicken Dog. Flow begins at block 3102 and proceeds to block 3104 where determination of advancement for the next trial is begun. Flow then proceeds to decision block 3106.

At decision block 3106, a determination is made as to whether there are any trials remaining within the existing level (for the presently selected category). If not, then flow proceeds to decision block 3108. Otherwise, flow proceeds to block 3124.

At block 3124 the next category is randomly selected. For example, given four categories (A, B, C, and D), trials are presented randomly across all four categories, for each four instances. That is, if the first trial is presented in category A, the next trial will come randomly from categories B, C, D. If the next trial comes from category C, the trial after that will come randomly from categories B or D. After a trial is presented from each category, the process is repeated for the four categories. Thus, categories are randomly selected, while insuring that at least one trial from each category is presented every four trials. This continues until a category is closed (see block 3120). Flow then proceeds to block 3126.

At block 3126, a trial is randomly selected from the present level, for the presently selected category. At this point, the trial is selected, and game play continues as defined in FIG. 28.

At decision block 3106, if there are no more trials remaining within the present category, within the present level, flow proceeds to decision block 3108.

At decision block 3108 a determination is made as to whether the student has obtained a 90% correct status for that level. If s/he has, then flow proceeds to decision block 3116. Otherwise, flow proceeds to decision block 3110.

At decision block 3110, a determination is made as to whether the student has failed the present level, for the present category 3 times? If not, then flow proceeds to block 3114. Otherwise, flow proceeds to block 3112.

At block 3114, the level for the present category is left open, meaning that all trials for the present level, for the present category will be repeated. Flow then proceeds to block 3124 where the next category for trial is selected.

At block 3112, the present level, for the present category is placed at the end of the line for the category, and the next level is selected for the present category. That is, if the present category has 4 levels, level 1 has already been passed, and the present level is level 2, then the level selected for the present category is level 3, and level 2 is placed behind level 4, to be repeated later. Flow then proceeds to block 3124.

At decision block 3116, a determination is made as to whether any levels are left in the present category. If there are, flow proceeds to block 3118. Otherwise, flow proceeds to block 3120.

At block 3118, the present level for the present category is closed, and the level for the present category is incremented. Flow then proceeds to block 3124.

At block 3120, the present category is closed. That is, the student has reached block 3120 because s/he has obtained a 90% correct status across all trials, across all levels, for the present category. Thus, the present category is removed from the list of randomly selected categories (block 3124). Flow then proceeds to decision block 3122.

At decision block 3122, a determination is made as to whether any categories remain open. If there are, flow proceeds to block 3124 where the next open category is selected. Otherwise, flow proceeds to block 3128.

At block 3128, the game is complete. The student has arrived at this block by obtaining a 90% correct status across all trials, for each level, for each category.

The above has described how the game Chicken Dog, along with its adaptive training process, trains a student in Spelling and in Decoding. Attention is now directed at the next game in Fast ForWord Reading, a game called Twisted Pictures.

Sentence Comprehension

Twisted Pictures trains students to attend to the syntactic structure of a sentence by challenging the student to choose the sentence that best describes a picture. Twisted Pictures trains students in recovering the syntactic structures of sentences ranging from simple sentences in active voice, to sentences in passive voice, to complex sentences with different types of embedded clauses. As students become proficient, the exercise introduces longer sentences that encourage the student to extend their working memory abilities; the exercise also introduces words from a more advanced level of vocabulary.

Twisted Pictures presents sentences containing reversible nouns that cannot be understood by common sense alone (such as The monkey is paying the snake), which forces students to use text-driven logic to understand each sentence. Twisted Pictures also uses a common set of nouns and verbs in each set of sentences, which forces students to pay close attention to syntax and also helps students work on automatic word identification.

Twisted Pictures uses a multiple-choice format to train:

Sentence comprehension: The student must comprehend each presented sentence in order to choose the sentence that best describes the picture on the screen.

Syntax: Twisted Pictures presents 17 syntactic structures of varying complexity.

Working memory: The student must hold each word of the four presented sentences in mind to construct a gist for each sentence, and then must hold those gists in mind while choosing the correct sentence. As the exercise progresses, the sentences become longer, thus stretching working memory to its optimal capacity.

Logical reasoning: Because sentences use reversible nouns, similar vocabulary, and similar syntax, the student must use logic reasoning, and make inferences rather than relying only on common sense to comprehend each sentence and choose the correct sentence.

Vocabulary: As the student progresses, Twisted Pictures presents sentences that use more advanced vocabulary words.

Figure 32:
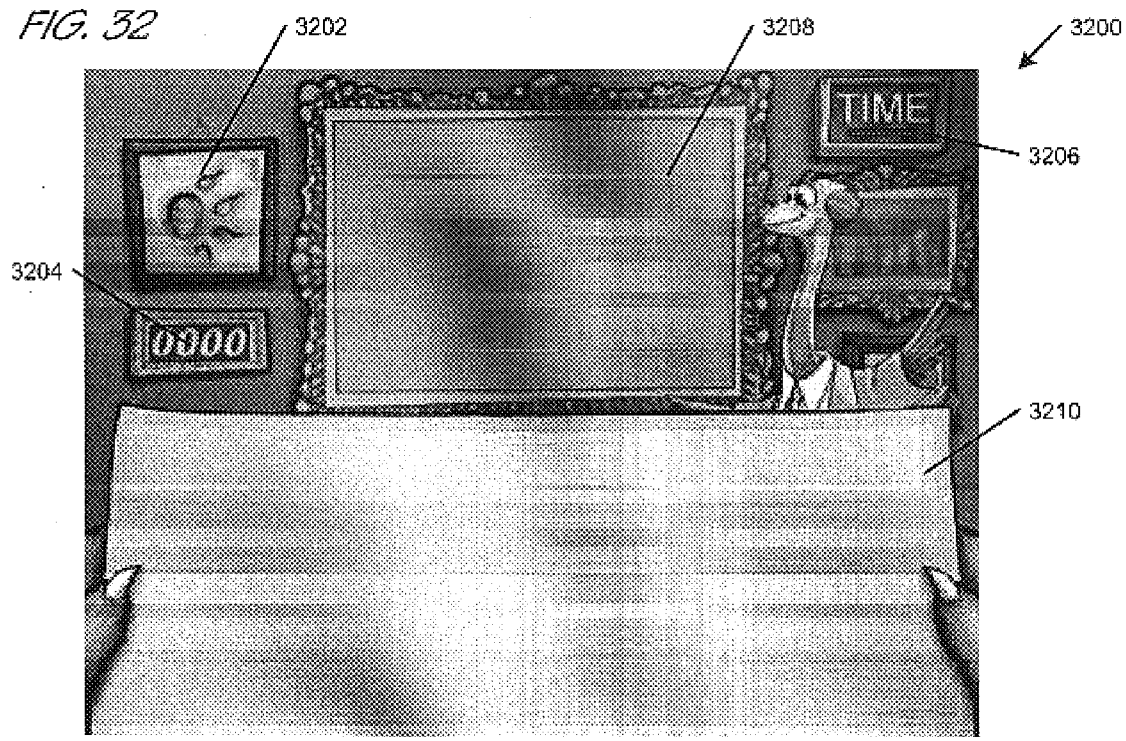
FIG. 32 is an initial screen shot for the game Twisted Pictures.

Referring now to FIG. 32, a screen shot 3200 is provided illustrating the opening scene for the game Twisted Pictures. The game screen 3200 is somewhat similar to the other games described above, having a yellow paw 3202 that must be selected by a student to start a trial, a counter 3204 for keeping track of the student's score, and a timer 3206 for indicating a relative time remaining for game play. In addition, there is a frame 3208 for holding a painting associated with each trial, and a parchment 3210 for holding four sentences, one that correctly describes the picture in the frame 3208, and three foils. The student must select the sentence that correctly describes the picture.

Figure 33:
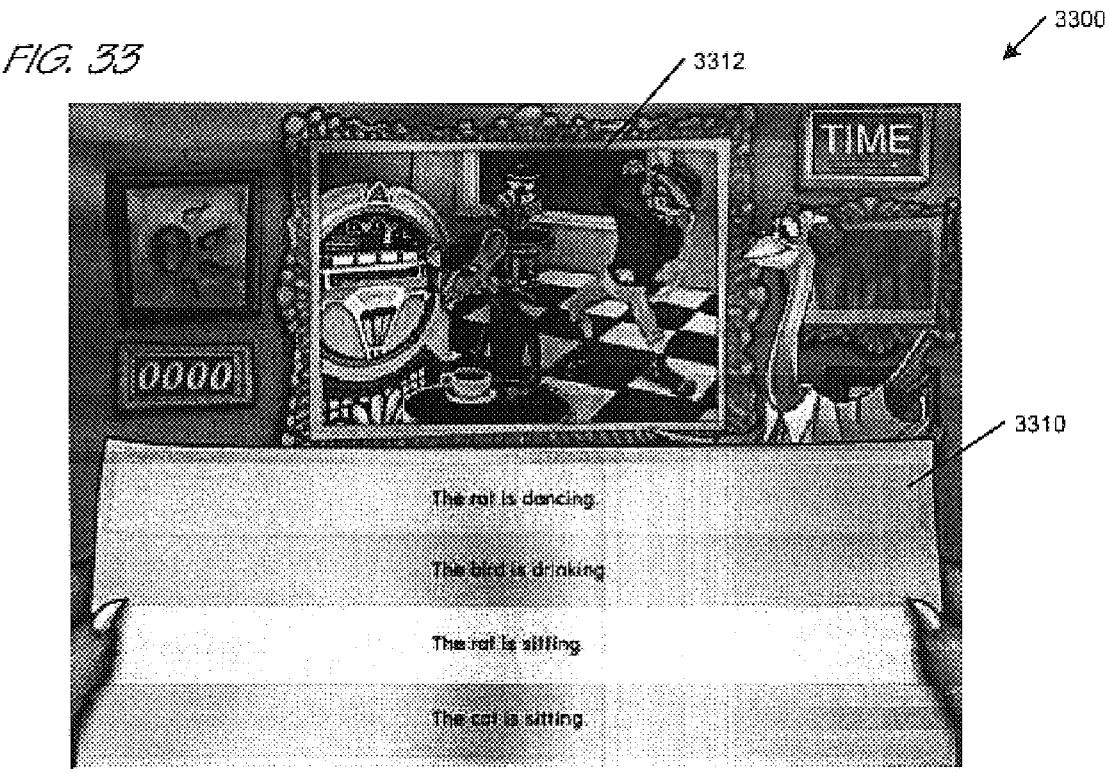
FIG. 33 is a first training screen within the game Twisted Pictures.

Referring now to FIG. 33, a screen shot 3300 is provided illustrating the first trial presented to the student. The screen 3300 contains a picture 3312 of a rat, and a cat in a café. The four sentences provided on the parchment 3310 for selection are: 1) The rat is dancing; 2) The bird is dancing; 3) The rat is sitting; and 4) The cat is sitting. The sentence that correctly describes the picture is "The rat is sitting." The first time the student plays Twisted Pictures, the correct sentence flashes to indicate the correct selection. When the student selects "The rat is sitting", a "ding" is played, indicating correct selection, and the screen removes the picture 3312 and sentences on the parchment 3310, leaving the screen like that shown in FIG. 32.

Figure 34:
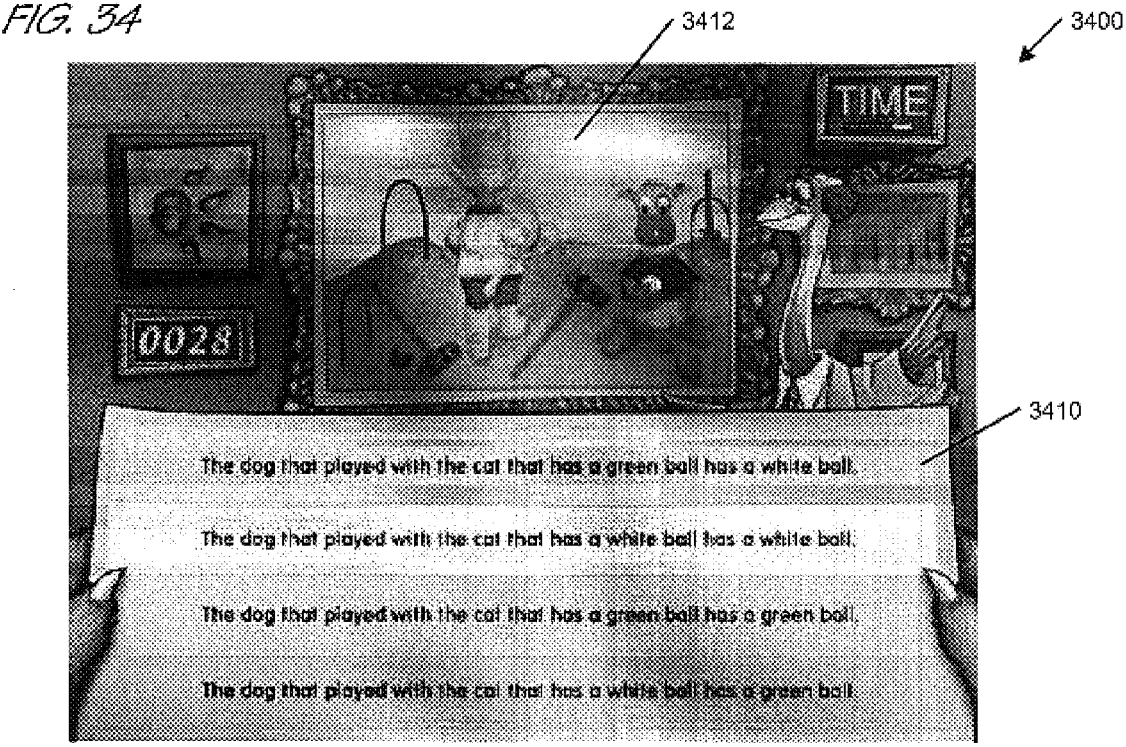
FIG. 34 is a second training screen within the game Twisted Pictures.

Referring now to FIG. 34, a screen shot 3400 is shown illustrating an incorrect selection. The screen shows a picture 3412 of a cat holding a green ball, and a dog holding a white ball. The four sentences provided on the parchment 3410 are: 1) The dog that played with the cat that has a green ball has a white ball (correct); 2) The dog that played with the cat that has a white ball has a white ball (incorrect); 3) The dog that played with the cat that has a green ball has a green ball (incorrect); and 4) The dog that played with the cat that has a white ball has a green ball (incorrect). When the student selects sentence 2, a "thunk" is played, indicating that the student incorrectly selected a sentence. In addition, the incorrect sentences are removed, and the correct sentence (in this case sentence 1) is highlighted to indicate to the student the correct sentence. The screen is then cleared back to the state shown in FIG. 32.

Figure 35:
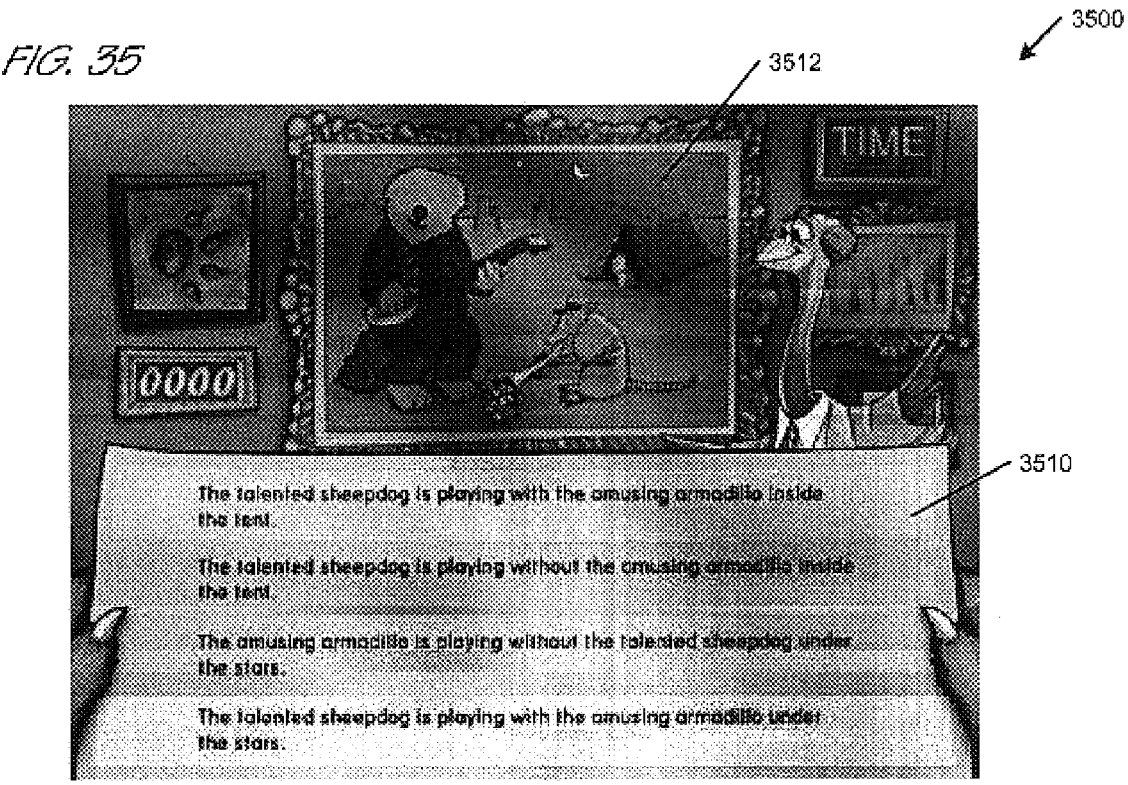
FIG. 35 is a third training screen within the game Twisted Pictures.

Referring now to FIG. 35, a screen shot 3500 is shown of a more complex sentence structure (provided at a more advanced training level in the program). The scene 3500 has a picture 3512 of a sheepdog and an armadillo playing music outside a tent. The four sentences provided on the parchment 3510 are: 1) The talented sheepdog is playing with the amusing armadillo inside the tent; 2) The talented sheepdog is playing without the amusing armadillo inside the tent; 3) The amazing armadillo is playing without the talented sheepdog under the stars; and 4) The talented sheepdog is playing with the amusing armadillo under the stars. The correct sentence, of course, is sentence 4.

Progressing Through Twisted Pictures

Twisted Pictures progresses through three levels of difficulty as follows:

Level 1: The student trains on sentences that contain, on average, 6 words. Words are at the $2^{nd}$ grade level at highest.

Level 2: The student trains on sentences that contain, on average, 8 words. Words are at the $3^{rd}$ grade level at highest.

Level 3: The student trains on sentences that contain, on average, 12 words. Words are at the $4^{th}$ grade level at highest.

At each level, Twisted Pictures presents 6 tiers of syntactic complexity. Each tier contains several different syntactic structures (called categories) that are all mastered at roughly the same age. A complete listing of the trials at the different levels is provided below in Appendix D.

Terms

Tier: The syntactic complexity tier refers to hierarchical groupings of syntactic categories in the "TwistedPicturesSampleStims.doc".

Category: The syntactic complexity category refers to a specific syntactic structure. There are 17 syntactic categories. There are four trials in each category in each level.

Unit: A unit is always the smallest group of trials to be evaluated for advancement. In Twisted Pictures the unit includes all the trials in a given level (68 trials).

TABLE VI

| Level | Number of trials per syntactic category | Sentence Length | Vocabulary (max grade level) |
| --- | --- | --- | --- |
| 1 | 4 | average 6, max 10 | $2^{nd}$ |
| 2 | 4 | average 8, max 12 | $3^{rd}$ |
| 3 | 4 | average 12, max 18 | $4^{th}$ |

Evaluation of Trial:

A trial is evaluated as correct if the participant clicks on the correct sentence for the current picture.

Evaluation of Unit:

A unit includes all trials from a given level (68 trials). All the trials from a level are presented before any trials are evaluated. At that point, the trials are evaluated for 90% correct.

Adaptivity:

Twisted Pictures adapts to the student's incoming skill level and, as the student continues to train, tracks the number of correct and incorrect answers and adjusts the training level when the student is ready to advance. Twisted Pictures trains all syntax at each level, therefore does not advance the student until s/he is prepared to train on syntax in longer sentences and with more difficult vocabulary words. This approach ensures that the student is challenged but not frustrated, which in turn ensures that the student continues to pay attention to and enjoy the training, as well as continues to learn and progress in the exercise.

Advancement:

Twisted Pictures presents syntactic structure categories in variable order to give the student exposure to all syntactic structures. This strategy simulates real-life situations in which the student is surrounded by people using a variety of syntactic structures in everyday conversation. It also prevents the student from advancing steadily and then suddenly getting stuck, becoming frustrated, and withdrawing attention from the training.

Initially, the student is presented with a trial from a first category, like Simple Negation, which is a $1^{st}$ tier of syntactical complexity. After the student chooses the most accurate sentence for the trial, Twisted Pictures presents three more trials from the Simple Negation category. When the student has completed all four Simple Negation trials, Twisted Pictures might present a trial from the Embedded Passives category, which is in the $6^{th}$ tier of syntactical complexity. After the student has completed all the trials in one level, Twisted Pictures evaluates all the trials for that level. If the student has chosen 90 percent of the sentences correctly, Twisted Pictures advances to the next level.

Figure 36:
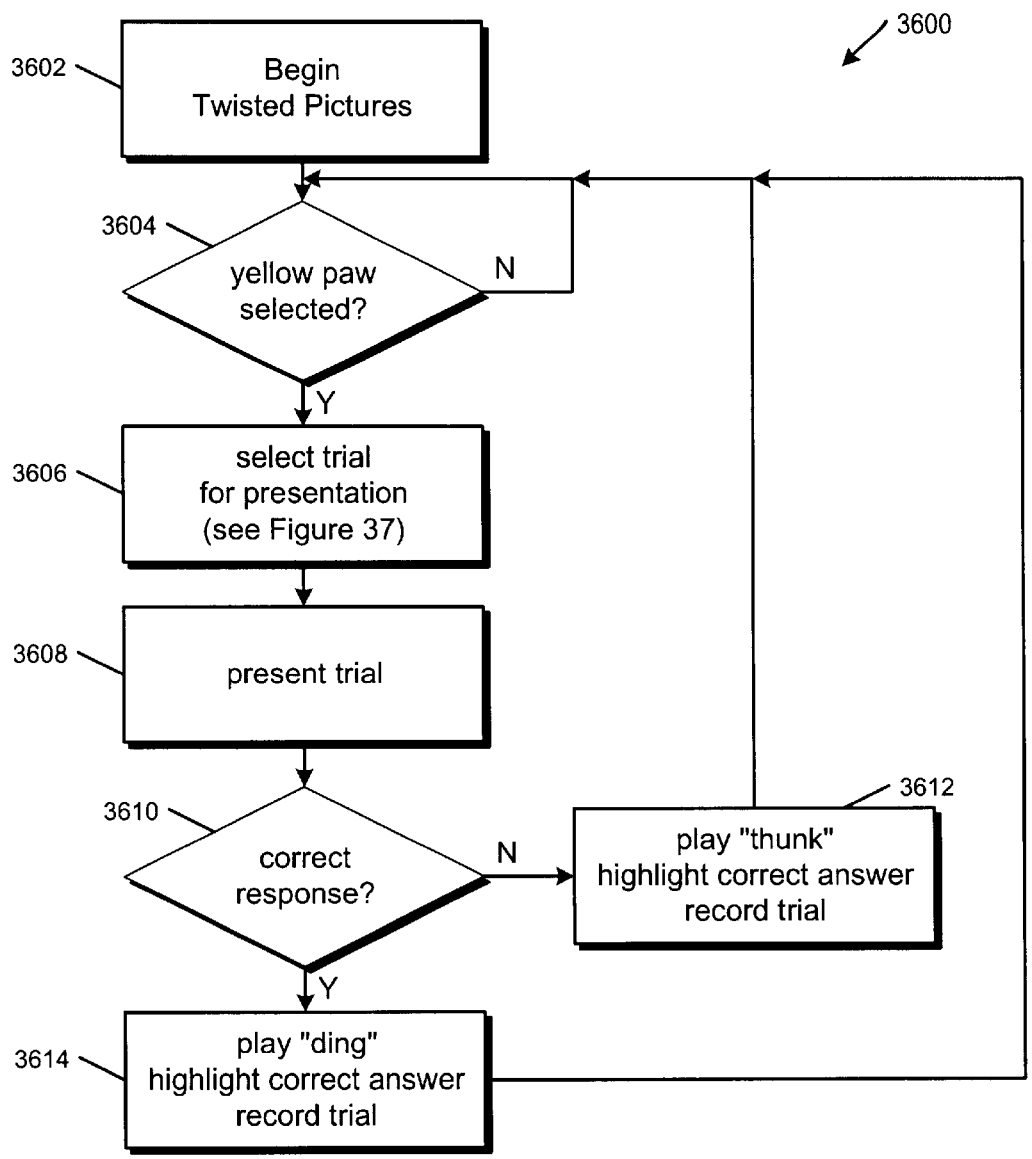
FIG. 36 is a flow chart illustrating the training methodology within the game Twisted Pictures.
Figure 37:
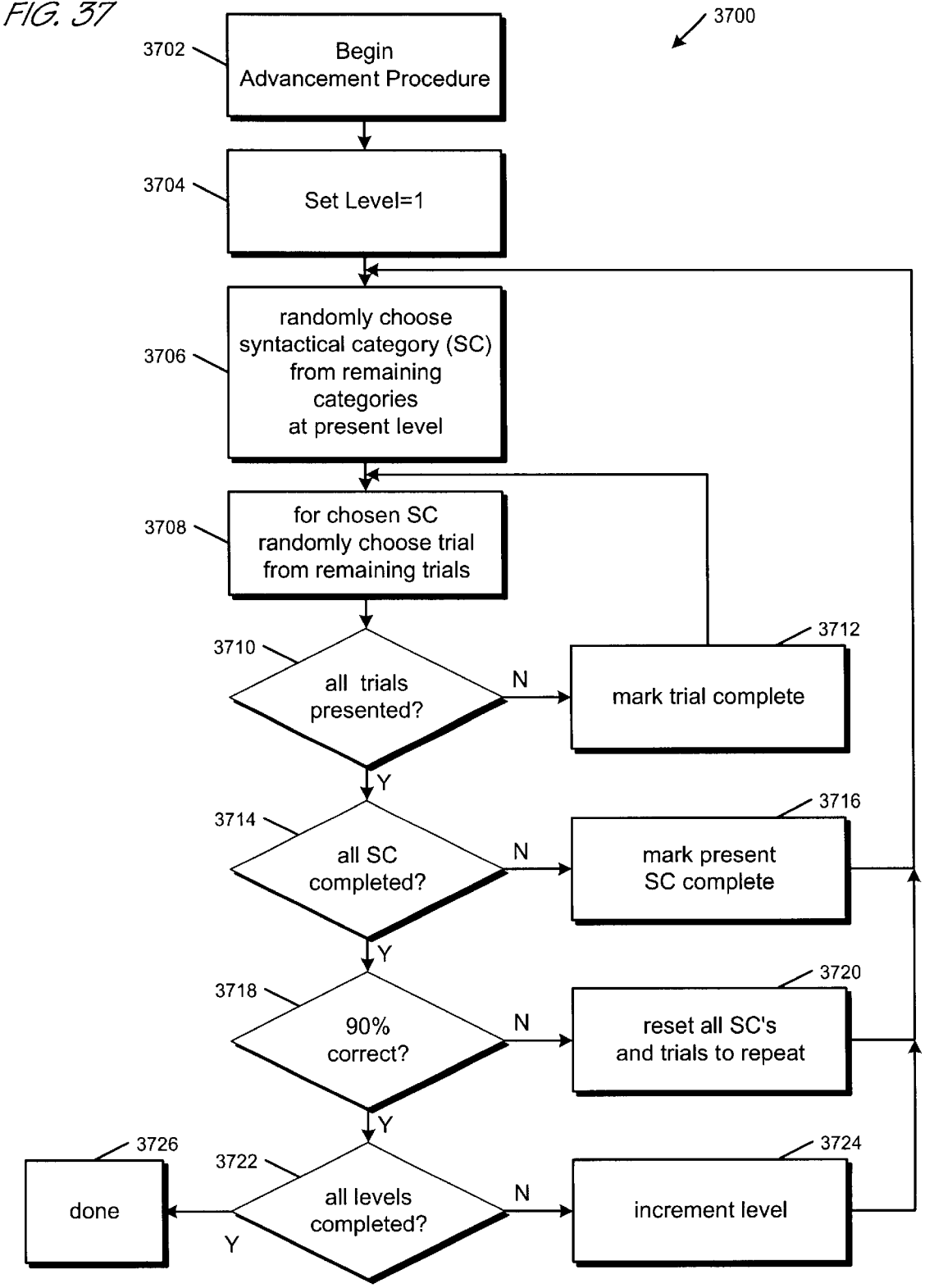
FIG. 37 is a flow chart illustrating the advancement methodology within the game Twisted Pictures.

Referring now to FIGS. 36 and 37, flow charts 3600 and 3700 are provided to particularly illustrate game play in Twisted Pictures, as well as the methodology for advancing a student in game play. Game play begins at block 3602 and proceeds to decision block 3604.

At block 3604, a decision is made as to whether the student has selected the yellow paw 3202. If not, flow continues at decision block 3604 until the paw 3202 is selected. When selected, flow proceeds to block 3606.

At block 3606, a trial is selected according to the methodology described below with reference to FIG. 37. Flow then proceeds to block 3608.

At block 3608, the selected trial is presented. Flow then proceeds to decision block 3610.

At decision block block 3610, a determination is made as to whether the student correctly or incorrectly responded to the trial. If correct, flow proceeds to block 3614. Otherwise flow proceeds to block 3612.

At block 3612, a "thunk" is played to indicate to the student that his/her response was incorrect. In addition, the correct answer is highlighted, and the trial is recorded. That is, the syntactical category, level, and sentence group, along with the outcome (correct or incorrect) are recorded. Flow then proceeds back to decision block 3604 to await initiation of another trial.

At block 3614, a "ding" is played to indicate to the student that his/her response was correct. In addition, the correct answer is highlighted, and the trial is recorded. That is, the syntactical category, level, and sentence group, along with the outcome (correct or incorrect) are recorded. Flow then proceeds back to decision block 3604 to await initiation of another trial.

Referring now to FIG. 37, a flow chart 3700 is provided illustrating the advancement methodology for the game Twisted Pictures. Flow begins at block 3702 and proceeds to block 3704.

At block 3704, the training level is set to Level 1. Flow then proceeds to block 3706.

At block 3706, the program randomly chooses a syntactical category for training from all of the remaining categories at the present level. Initially, all the syntactical categories at level 1 are available. However, as the student correctly responds to trials within a syntactical category, those categories will be marked completed (in block 3716). So, block 3706 is responsible for choosing a syntactical category, at the present level, from those categories that are not yet marked completed. Flow then proceeds to block 3708.

At block 3708, the program randomly chooses a trial from within the chosen syntactical category from the list of remaining trials within the chosen syntactical category. Initially, all of the trials within the chosen syntactical category are available. However, after a trial is presented, it is marked complete (at bock 3712). Thus, block 3708 is responsible for choosing a trial, within the chosen syntactical category, from those trials not yet marked completed. Flow then proceeds to decision block 3710.

At decision block 3710, a determination is made as to whether all the trials within the chosen syntactical category have been presented. In one embodiment, there are four trials within each syntactical category, at each level. If all the trials have not been presented, flow proceeds to block 3712. Otherwise flow proceeds to decision block 3714.

At block 3712, the present trial is marked complete. Flow then proceeds to block 3708 where another trial from the present syntactical category is chosen.

At decision block 3714, a determination is made as to whether all syntactical categories, at the present level, have been completed. If not, flow proceeds to block 3716. Otherwise, flow proceeds to decision block 3718.

At block 3716, the present syntactical category is marked complete. Flow then proceeds back to block 3706 where the program randomly chooses another syntactical category from the remaining categories.

At decision block 3718, a determination is made as to whether the student has responded correctly to at least 90% of the trials across all syntactical categories at the present level. If not, flow proceeds to block 3720. Otherwise, flow proceeds to decision block 3722.

At block 3720, all syntactical categories, and all trials within those syntactical categories, are reset, so that they may again be selected by block 3706/3708. That is, since the student has not correctly responded to 90% of the trials, s/he is required to repeat those trials, at the present level, albeit in random order. Flow then proceeds back to block 3706.

At decision block 3722, a determination is made as to whether all levels have been completed. If not, flow proceeds to block 3724. Otherwise, the student has correctly responded to at least 90% of the trials, for all syntactical categories, for all levels, so the training ends, at block 3726.

The next two games in the program Fast ForWord Reading (Book Monkeys and Hog Hat Zone) deal primarily with Paragraph Comprehension, although they require and build on aspects trained in the other games, including Decoding, Spelling and Sentence Comprehension.

Book Monkeys exercises the student to read a paragraph and then answers questions to demonstrate their comprehension of the paragraph. Some of the paragraphs are fiction and others nonfiction. There are six questions about each paragraph split into a number of question types (i.e. literal, inferential, and causative). There are four answer choices for each question. To reduce the memory load, the paragraph is presented again after the second question is answered and again after the fourth question is answered. If any questions are answered incorrectly, the paragraph is displayed again followed by the incorrectly answered questions. A complete list of the stimuli used in Book Monkeys may be found in Appendix E attached hereto.

Book Monkeys uses a question and answer, multiple choice format to train:

Literal comprehension: For each paragraph, Book Monkeys presents two questions (out of six total) that ask the student to recall facts from the paragraph, such as the main point.

Causative comprehension: For each paragraph, Book Monkeys presents two questions (out of six total) about the cause of the events within the paragraph.

Inferential comprehension: For each paragraph, Book Monkeys presents two questions (out of six total) that ask the student about various hypothesis s/he needed to form in order to understand the text.

Working memory: The student must hold in working memory the gist of the paragraph, as well as important details, to answer the questions correctly.

Vocabulary: As the student progresses, Book Monkeys presents longer paragraphs that use more advanced vocabulary words. In addition, Book Monkeys regularly asks students to use context to identify the meaning of a word that is from 1 to 3 grade levels above the vocabulary level of the paragraph.

By training students in literal, causal, and inferential comprehension, Book Monkeys trains students to extract the main point from a paragraph-the gist-which contributes to comprehension of longer passages. Understanding causal connections is important for comprehending the links between ideas and comprehending longer passages as well as for remembering text. The ability to make correct inferences, such as who a pronoun refers to and what the best title for the paragraph might be, is important for understanding the links between words, between sentences, and for forming a coherent gist of a written work. Developing working memory abilities helps the student not only keep the gist of the paragraph in mind but also read and comprehend longer, more complicated texts. Vocabulary skills contribute to automatic word recognition, an important factor in fluent reading. The questions used in Book Monkeys directly measure the student's ability to read for literal meaning, causal connection, and his or her ability to use working memory effectively not only to remember facts and connections but also to make inferences.

Table VII below lists the question types trained on in Book Monkeys.

TABLE VII

| Question Type | Question Description | Example |
|---|---|---|
| Literal | True or False | Which of the following is a true statement about the paragraph? |
| Causative | Cause and Effect | Mike got up early that morning because? |
| Inferential | Title | Which of the following would be the best title for this paragraph? |
| | Next | Which of the following is most likely to be the next line? |
| | Word | Which is the meaning of __(a word used in the paragraph)? These words could be multiple meaning words use in a certain sense in the paragraph. [These words should be from a higher vocabulary grade level than the paragraphs]. |
| | Pronoun | Who does he (the pronoun "he" in the paragraph) refer to? |

Figure 38:
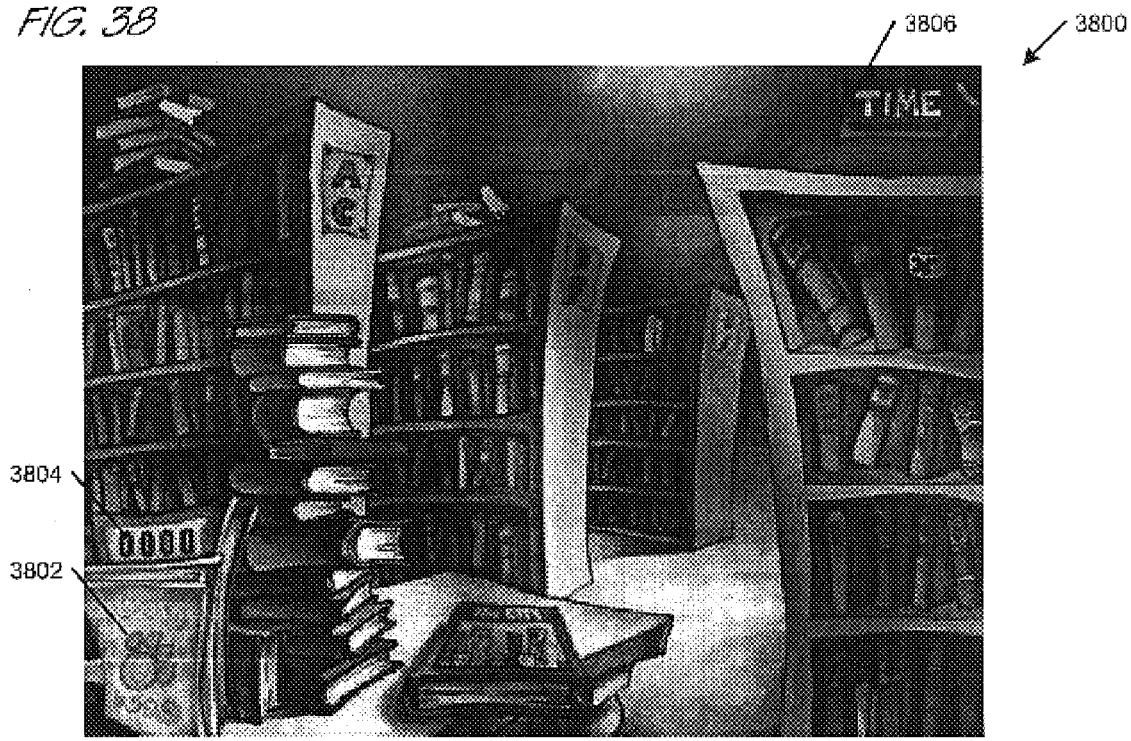
FIG. 38 is an initial screen shot for the game Book Monkeys.

Referring now to FIG. 38, a screen shot 3800 is shown of the opening scene in the game Book Monkeys. The setting is a library. As in the other games, a yellow paw 3802 is provided to allow a student to initiate a trial. A counter 3804 is provided to indicate the student's score, and a timer 3806 is provided to indicate a relative amount of time remaining for game play.

Figure 39:
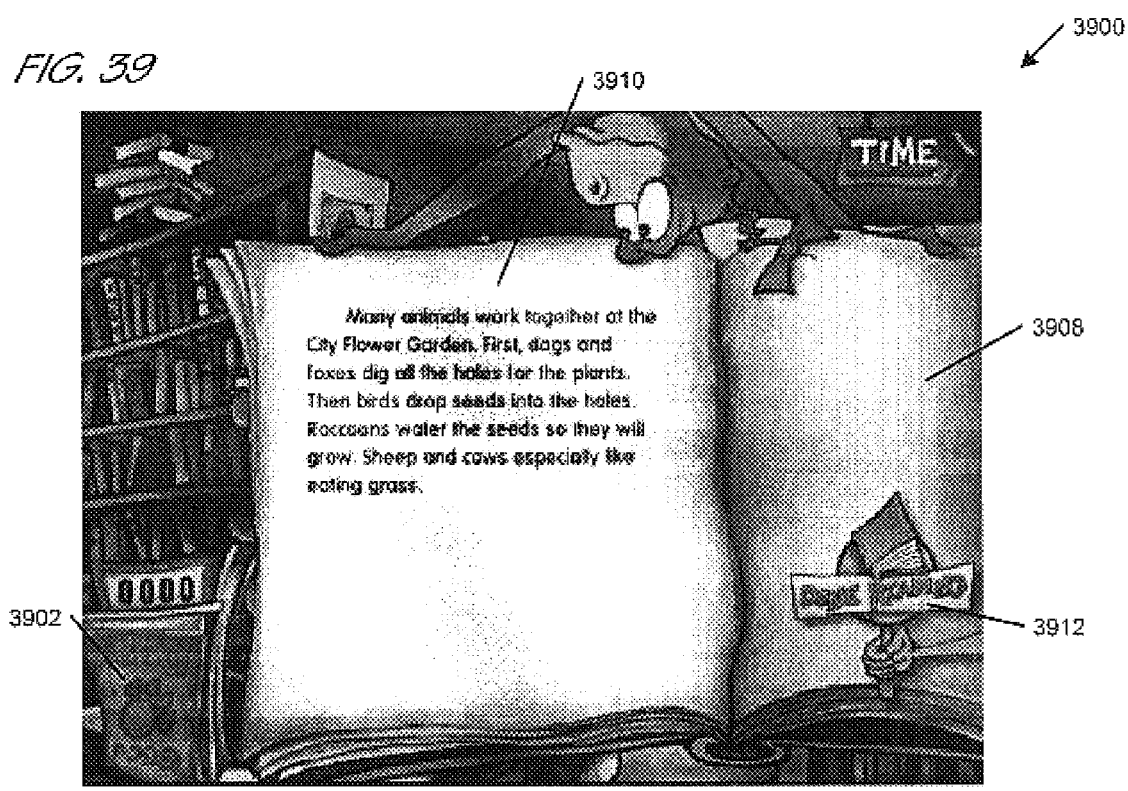
FIG. 39 is a screen shot showing a paragraph presented within the game Book Monkeys.

Referring now to FIG. 39, a screen shot 3900 is shown that is presented after a student selects the yellow paw 3902. A book 3908 appears containing a story 3910. The student is aurally told to read the story, and when finished, to click the sign "done reading" 3912. The first time the student plays Book Monkey's, the "done reading" sign 3912 flashes to indicate to the student what they are to select. When the student is finished reading the story 3910, s/he presses the "done reading" sign 3912, and is taken to the screen presented in FIG. 40, to which attention is now directed.

Figure 40:
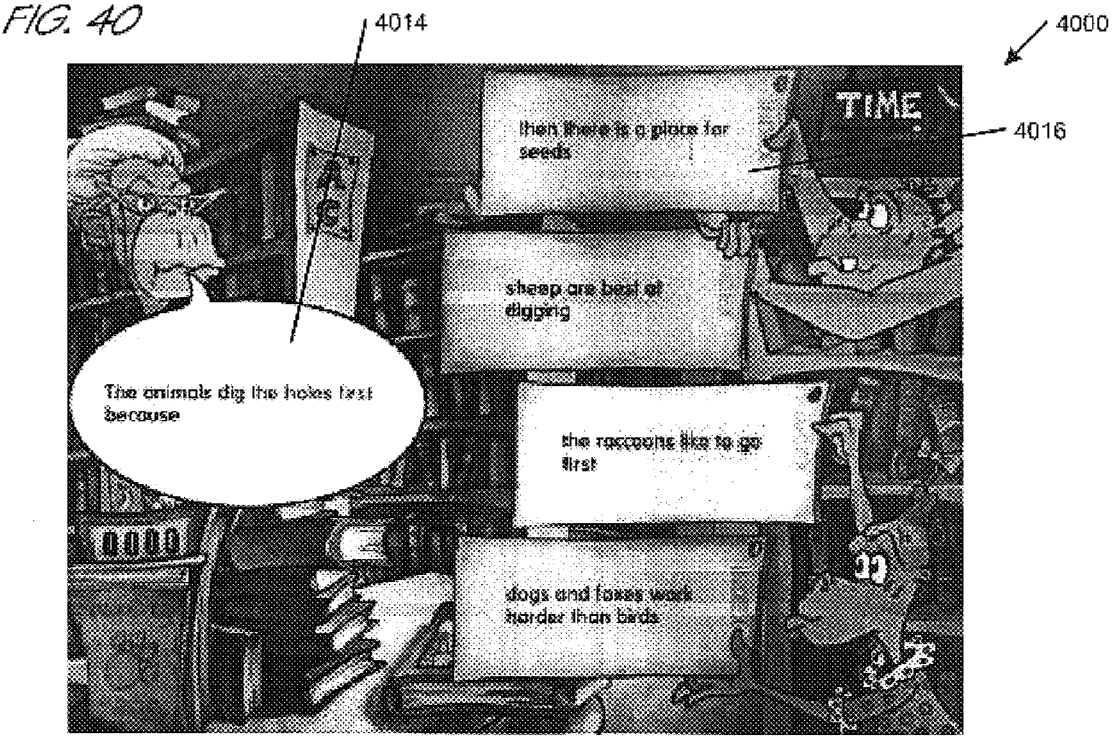
FIG. 40 is a screen shot showing a first question presented within the game Book Monkeys.
Figure 41:
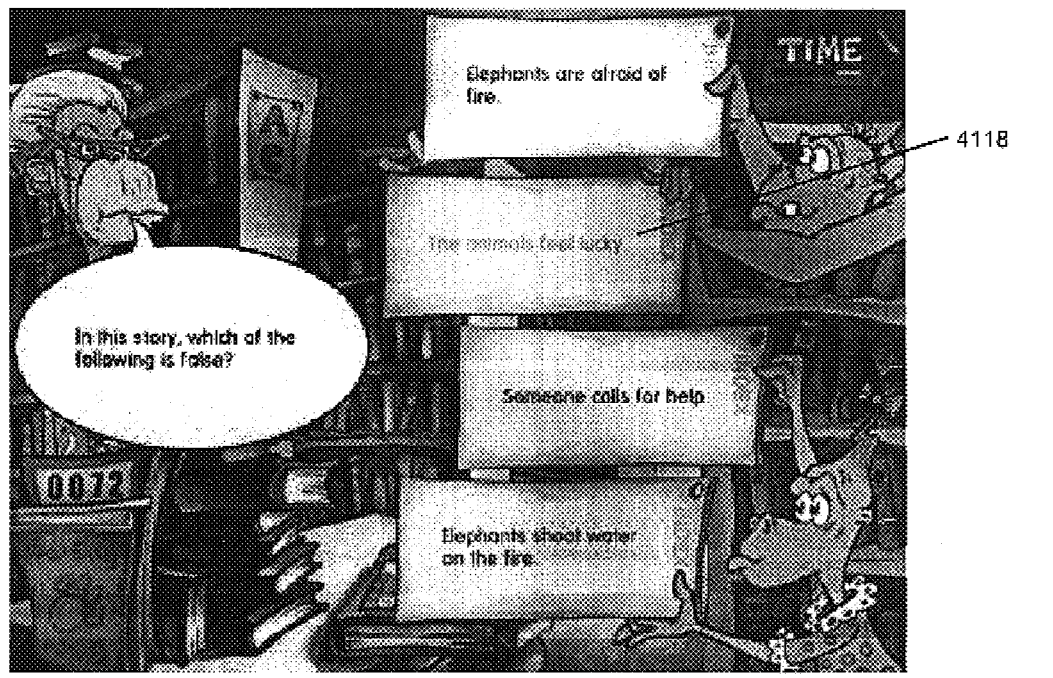
FIG. 41 is a screen shot showing a question that is being repeated after an incorrect response, within the game Book Monkeys.

In FIG. 40, a screen shot 4000 is shown presenting a question 4014, and four answers 4016. There is one correct answer, and three foils for each question 4014. The student is to read the question 4014, and select the answer that most nearly matches the question. If the student selects the correct answer 4016, a "ding" is played, indicating a correct selection, and the correct selection is highlighted. If the student selects an incorrect answer, a "thunk" is played, and the question and answers disappear. However, the next time the question is repeated, the incorrect answer that was selected is "grayed" out so that it is not available for selection. This is shown in FIG. 41, in the screen shot 4100, with the grayed out answer 4118.

Progression Through Book Monkeys

Book Monkeys progresses through two levels of difficulty as follows:

Level 1: The student trains on paragraphs of around 6 sentences; each sentence contains, on average, 10 words. Words are at the $2^{nd}$ grade level at highest.

Level 2: The student trains on paragraphs of around 7 sentences; each sentence contains on average 12 words. Words are at the $3^{rd}$ grade level at highest.

At each level, Book Monkeys presents four nonfiction paragraphs and six fiction paragraphs. After the student has read a paragraph, Book Monkeys asks the student:

Two literal questions of a true-false nature

Two causative questions regarding causes of events within the paragraph

Two inferential questions that require the student to formulate a hypothesis about certain components of the paragraph. The two inferential questions are chosen from four possible types:

The most appropriate title for the paragraph

What is most likely to happen next

The meaning of a particular word

Whom or what a particular pronoun refers to

Adaptivity

Book Monkey's adapts to the student's incoming skill level and, as the student continues to train, tracks the number of correct and incorrect answers and adjusts the training level when the student is ready to advance. However, Book Monkeys trains all categories of questions at each level, therefore does not advance the student to the second level until s/he is prepared to answer the same types of literal, causative, and inferential questions about longer paragraphs that contain longer sentences with more difficult vocabulary words. This approach ensures that the student is challenged but not frustrated, which in turn ensures that the student continues to pay attention to and enjoy the training, as well as continues to learn and progress in the exercise.

After Book Monkeys presents a paragraph and six questions about that paragraph, Book Monkeys evaluates the student's responses. If the student answered all six questions correctly, Book Monkeys activates the yellow paw and allows the student to go on to the next paragraph. If the student has not answered a question correctly, Book Monkeys gives the student two more tries at it.

During the student's second attempt to answer a question correctly, Book Monkeys displays the paragraph again and the librarian repeats the question. The monkeys give the student the same four choices, but Book Monkeys grays out and deactivates the incorrect answer the student chose the first time.

After the student responds, Book Monkeys displays another question that wasn't correctly answered (if there are any). After Book Monkeys cycles through all the questions that the student didn't answer correctly the first time around, Book Monkeys evaluates the student's responses.

If the student still has not answered a question correctly, Book Monkeys gives the student one last try. During the student's third attempt to answer a question correctly, Book Monkeys displays the paragraph again and the librarian repeats the question. The monkeys give the student the same four choices, and Book Monkeys grays out and deactivates both incorrect answers that the student chose the first two times. If the student answers correctly, Book Monkeys displays the next questions that has not yet been correctly answered (if any). If the student doesn't choose the correct answer on the third try, Book Monkeys highlights the correct answer.

Book Monkeys does not give the student a fourth try at questions that the student has not answered correctly; after the third round of attempts, Book Monkeys activates the yellow paw and allows the student to progress to the next paragraph.

After the student has completed all the trials in one level, Book Monkeys evaluates all the trials for that level. In evaluating trials for advancement, Book Monkeys only considers the student's first response to each question. If the student has chosen 95 percent of the answers correctly on the first try, Book Monkeys advances to the next level.

Figure 42A:
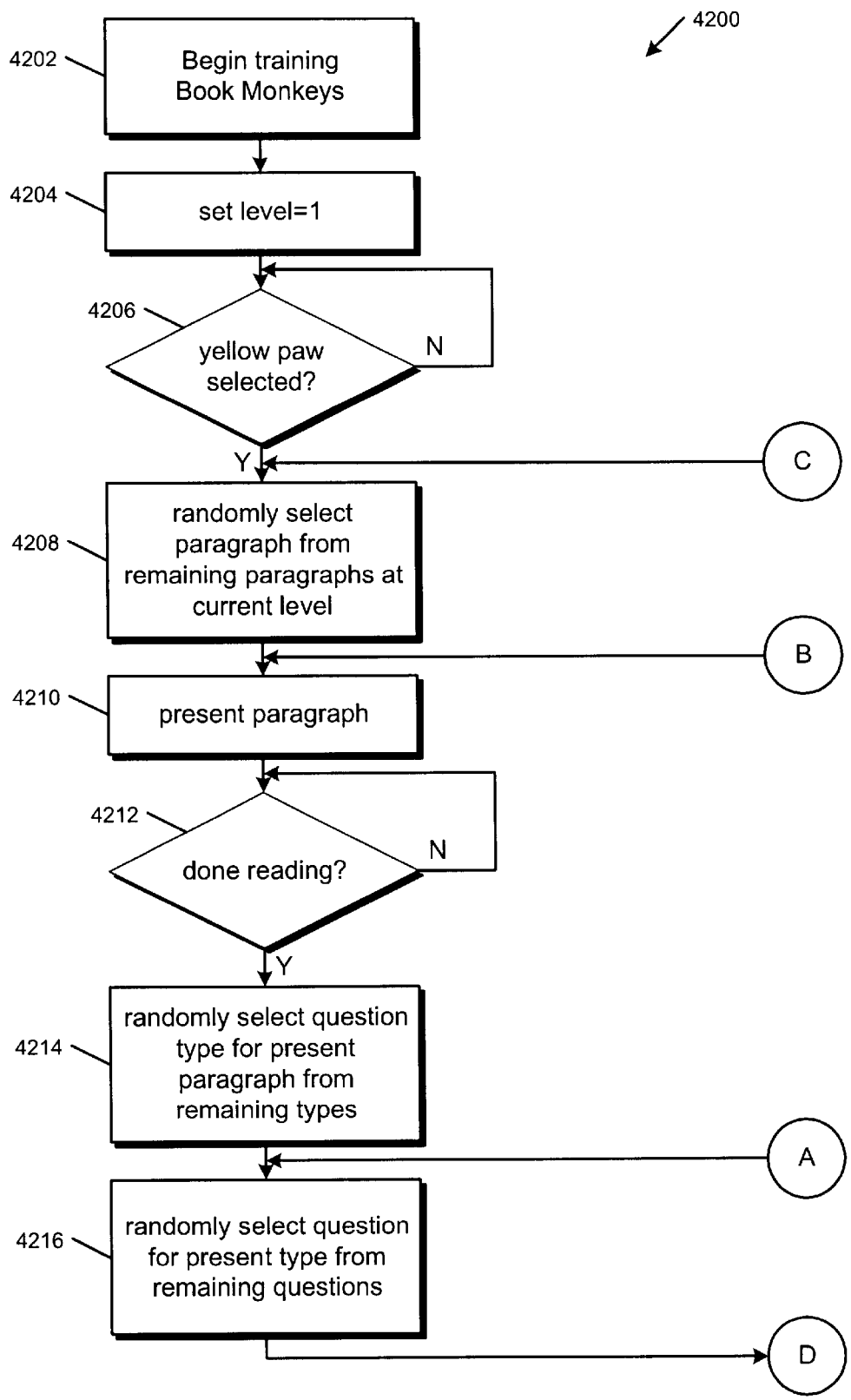
FIGS. 42a–c provide a flow chart illustrating the training and advancement methodology within the game Book Monkeys.
Figure 42B:
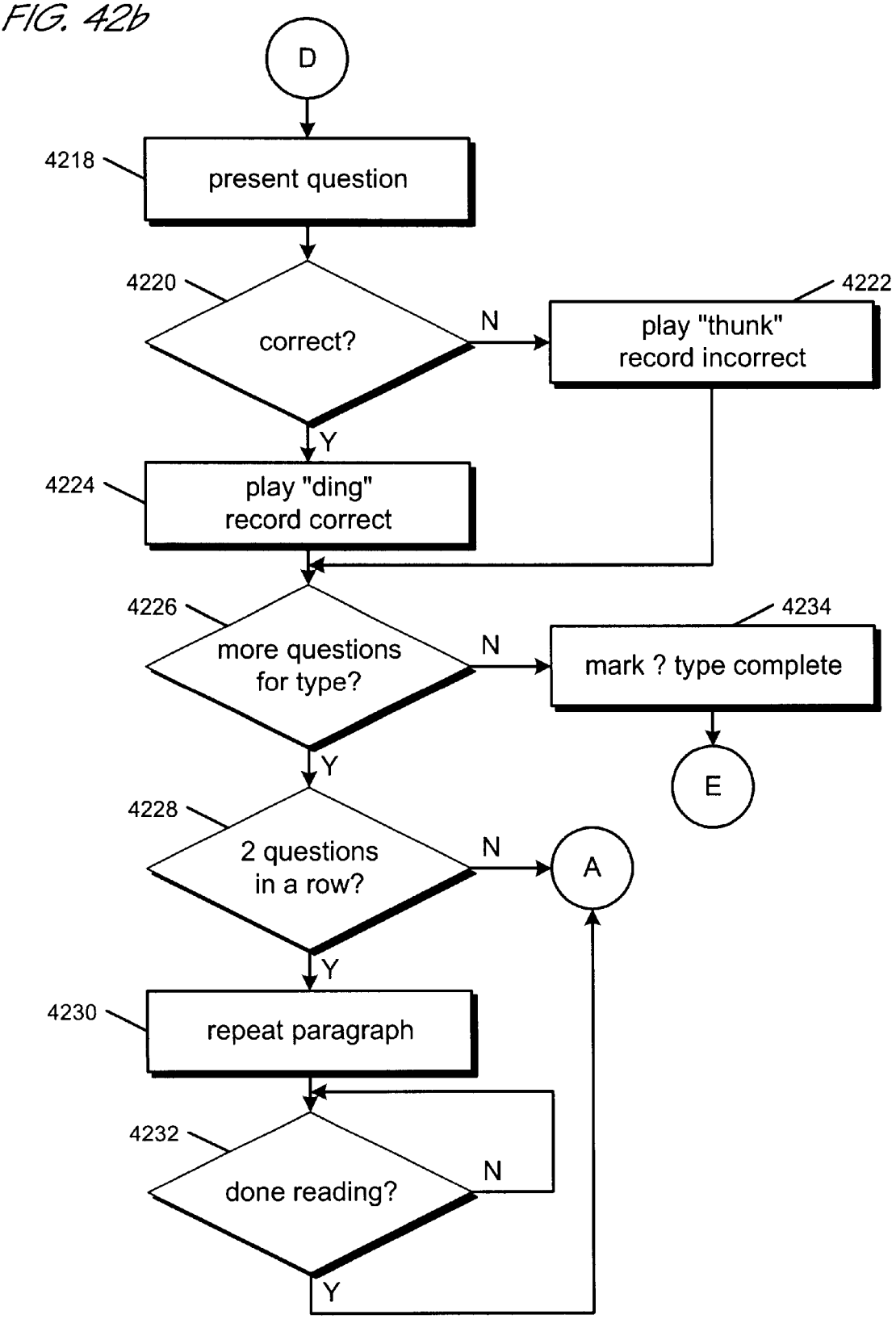
Figure 42C:
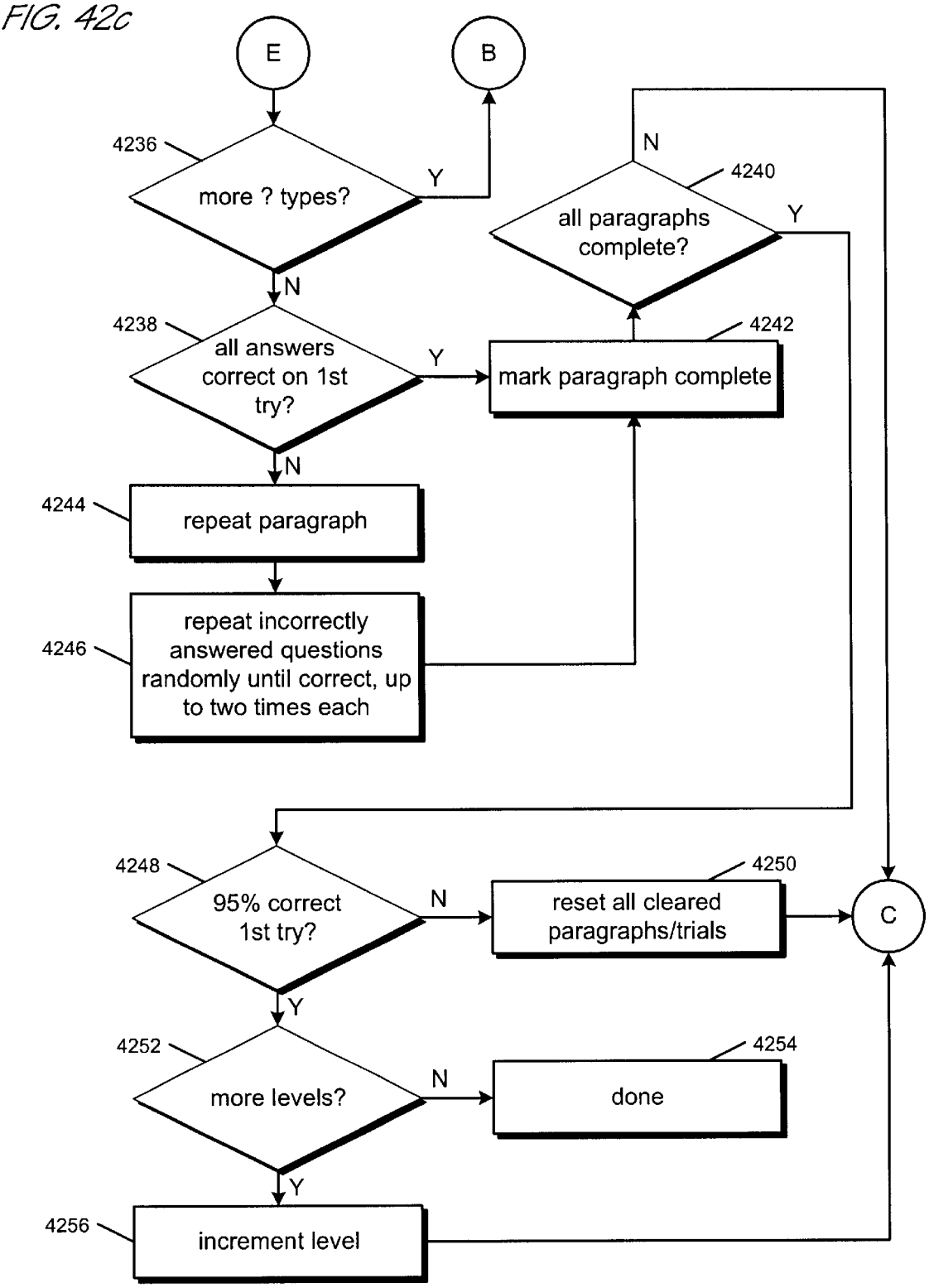

Referring now to FIGS. 42a–c, a flow chart 4200 is provided illustrating the training and advancement methodology within the game Book Monkeys. Flow begins at block 4202 and proceeds to block 4204.

At block 4204 the training level is set to Level 1. Flow then proceeds to decision block 4206.

At decision block 4206, a determination is made as to whether the student has selected the yellow paw, and thereby initiating a trial. Flow remains at decision block 4206 until the student selects the paw. Once selected, flow proceeds to block 4208.

At block 4208, a paragraph is randomly selected from the set of paragraphs provided at the current training level. Initially, the Level is 1, and all paragraphs are available for selection. However, as the student progresses through the paragraphs, the remaining paragraphs are randomly selected, until all paragraphs have been played. Once a paragraph is selected, flow proceeds to block 4210.

At block 4210, the paragraph is presented to the student as shown in FIG. 39. Flow then proceeds to decision block 4212.

Flow remains at decision block 4212 until the student selects the "done reading" icon on the screen (as shown in FIG. 39). Once selected, flow proceeds to block 4214.

At block 4214, a question type is randomly selected for the present paragraph from the remaining question types. Initially, all question types are available for the present paragraph. However, as the student advances through the question types, a selection is made from the remaining question types until all types have been presented. Flow then proceeds to block 4216.

At block 4216, a question is randomly selected from the remaining questions for the present question type. Initially, all questions for the present question type are available. However, as the student advances through the questions, a selection is made from the remaining questions until all questions have been presented. Flow then proceeds to block 4218.

At block 4218, the present question is presented to the student. Flow then proceeds to decision block 4220.

At block 4220, a determination is made as to whether the student correctly answered the presented question. If not, flow proceeds to block 4222. Otherwise, flow proceeds to block 4224.

At block 4222, a "thunk" is played indicating an incorrect answer. The answer is recorded as incorrect, and flow proceeds to decision block 4226.

At block 4224, a "ding" is played to indicate a correct answer. The answer is recorded as correct, and flow proceeds to decision block 4226.

At decision block 4226, a determination is made as to whether there are any more questions remaining for the present question type. If not, flow proceeds to block 4234. Otherwise, flow proceeds to decision block 4228.

At decision block 4228, a determination is made as to whether two questions in a row have been presented to the student. In one embodiment, Book Monkeys repeats the present paragraph after every two questions. Book Monkeys recognizes that a student's memory may need to be refreshed for following questions, and therefore provides them with access to the paragraph every two questions. If there have not been two questions in a row, flow proceeds back to block 4216 where another question for the present question type is selected. Otherwise, flow proceeds to block 4330.

At block 4330, the present paragraph is repeated. Flow then proceeds to decision block 4232.

Flow remains at decision block 4232 until the student selects the "done reading" icon. Flow then proceeds back to block 4216 where another question for the present question type is selected.

At block 4234, the present question type is marked complete. That is, there are no more questions remaining to be asked for the present question type. Flow then proceeds to decision block 4236.

At decision block 4236, a determination is made as to whether there are any more question types for the present paragraph. If so, then flow proceeds back to block 4210 where the paragraph is again presented, and the above described sequence continues until all questions for all question types, at the present level, for the present paragraph, have been presented. If there are no more question types for the present paragraph, flow proceeds to decision block 4238.

At decision block 4238, a determination is made as to whether the student correctly answered all the questions for all the question types for the present paragraph, on the first attempt. If not, flow proceeds to block 4244. Otherwise, flow proceeds to block 4242.

At block 4244, the present paragraph is again repeated. Flow then proceeds to block 4246.

At block 4246, all of the questions that were incorrectly answered on the $1^{st}$ attempt, for all of the question types, are repeated, one at a time, to allow the student to correctly answer the questions. The student is given two opportunities to answer each outstanding question correctly. As mentioned above, previous incorrect answers are grayed out and deactivated to give the student a better opportunity to answer correctly. Whether or not the student answers the outstanding questions correctly, after two attempt, flow proceeds to block 4242.

At block 4242, the present paragraph is marked complete. Flow then proceeds to decision block 4240.

At decision block 4240, a determination is made as to whether all of the paragraphs for the present level have been completed. If not, flow proceeds back to block 4208 where a new paragraph is selected for presentation. However, if all paragraphs at the present level have been completed, flow proceeds to decision block 4248.

At decision block 4248, a determination is made as to whether the student correctly answered at least 95% of the questions, for all question types, for all paragraphs, at the present level. If not, then flow proceeds to block 4250. Otherwise, flow proceeds to decision block 4252.

At block 4250, all questions, question types, and paragraphs are reset, and flow proceeds back to block 4208 to train again, as described above. The student will continue in this training process until s/he has achieved a 95% success rate across all paragraphs, on the $1^{st}$ attempt.

At decision block 4252, a determination is made as to whether there are any more levels for training. If not, flow proceeds to block 4254 where training on Book Monkeys ends. However, if there are more levels of training, flow proceeds to block 4256.

At block 4256, the training level is increased. For example, if the student correctly passes 95% of the questions for level 1, the training level is incremented to level 2. Flow then proceeds back to block 4208 where training begins with new paragraphs for the new training level.

Hog Hat Zone

The last game in the Fast ForWord Reading program is called Hog Hat Zone. This game focuses on helping the student improve paragraph comprehension skills and understanding of morphological complexity in the following ways:

Paragraph comprehension: Hog Hat zone presents paragraphs excerpted from classic children's literature that are missing morphologically important words—words that affect the meaning of the sentence. The missing words follow the progression of students' acquisition of pronouns, plural and possessive nouns, auxiliary verbs, third person singular and past tense verbs, derivational affixes (prefixes and suffixes that change a word's meaning or part of speech), and contractions. Understanding these morphologically important words and how they are spelled in English is crucial for understanding the links between words, the meaning of a sentence, and the relationships between sentences.

Morphological complexity: Hog Hat Zone displays four choices for each missing word: one choice is the correct word, and the other three choices are foils-incorrect choices closely related to the correct choice. The foils are systematically chosen to include words that are commonly confused with the correct word, and they are similar to the correct word either morphologically (through similar root words, affixes, or parts of speech) or orthographically (though similar spellings or spelling-sound correspondences).

Vocabulary: Hog Hat Zone trains students to recognize and correctly use morphological affixes-prefixes and suffixes. Because comprehension of morphological changes leads to vocabulary growth in $3^{rd}$ grade and beyond, Hog Hat Zone helps students increase their vocabulary skills.

Figure 43:
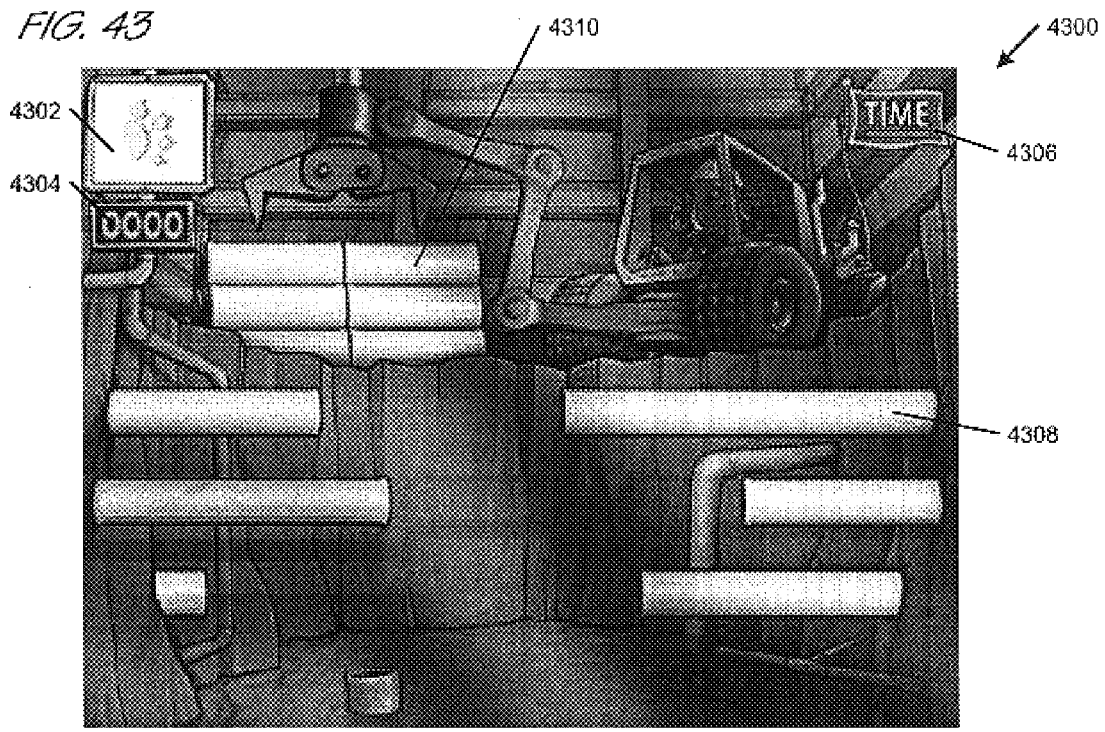
FIG. 43 is an initial screen shot within the game Hog Hat Zone.
Figure 44:
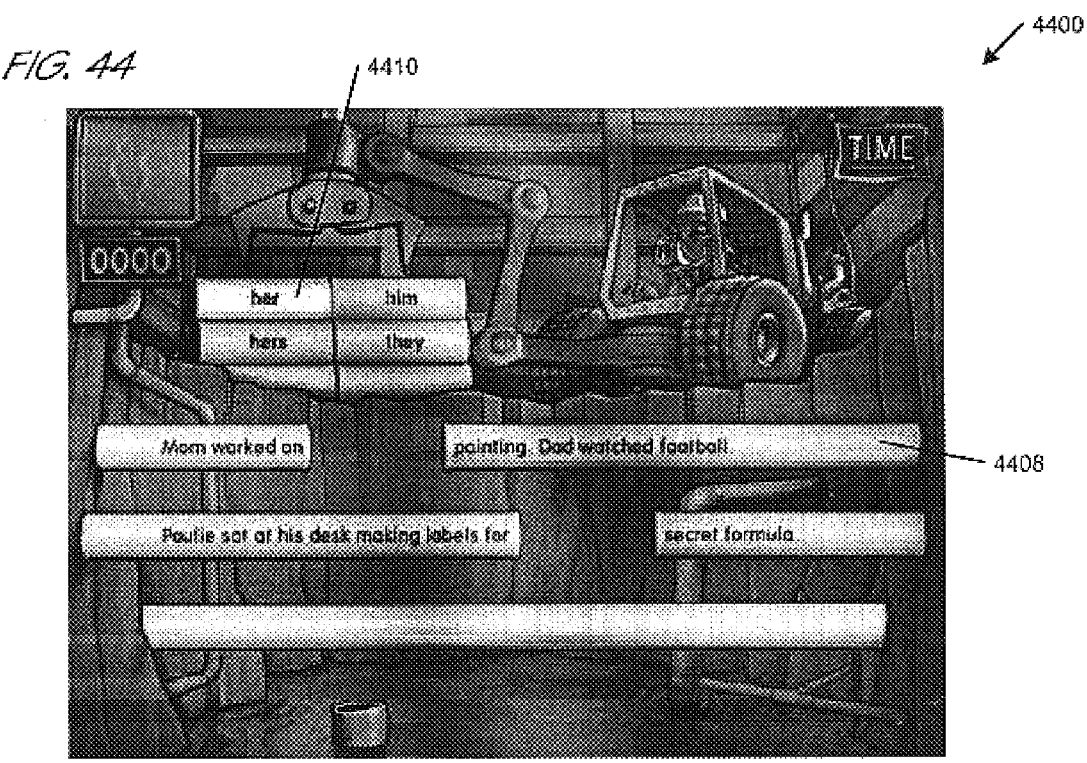
FIG. 44 is a screen shot illustrating a first trial within the game Hog Hat Zone.

Referring now to FIG. 43, an initial screen shot 4300 is shown for the game Hog Hat Zone. As in the other games described above, the screen contains a yellow paw 4302 for initiating a trial, a score counter 4304, and a timer 4306 to indicate a relative amount of remaining time. The setting for Hog Hat Zone is that of a construction site. Either steel pipes, or beams, are provided which are not connected to each other. Additional lengths of pipe 4310 are provided that are to be inserted on the pipes 4308 to complete the construction. When the student selects the yellow paw 4302, s/he is taken to the screen 4400 of FIG. 44, to which attention is now directed.

Figure 45:
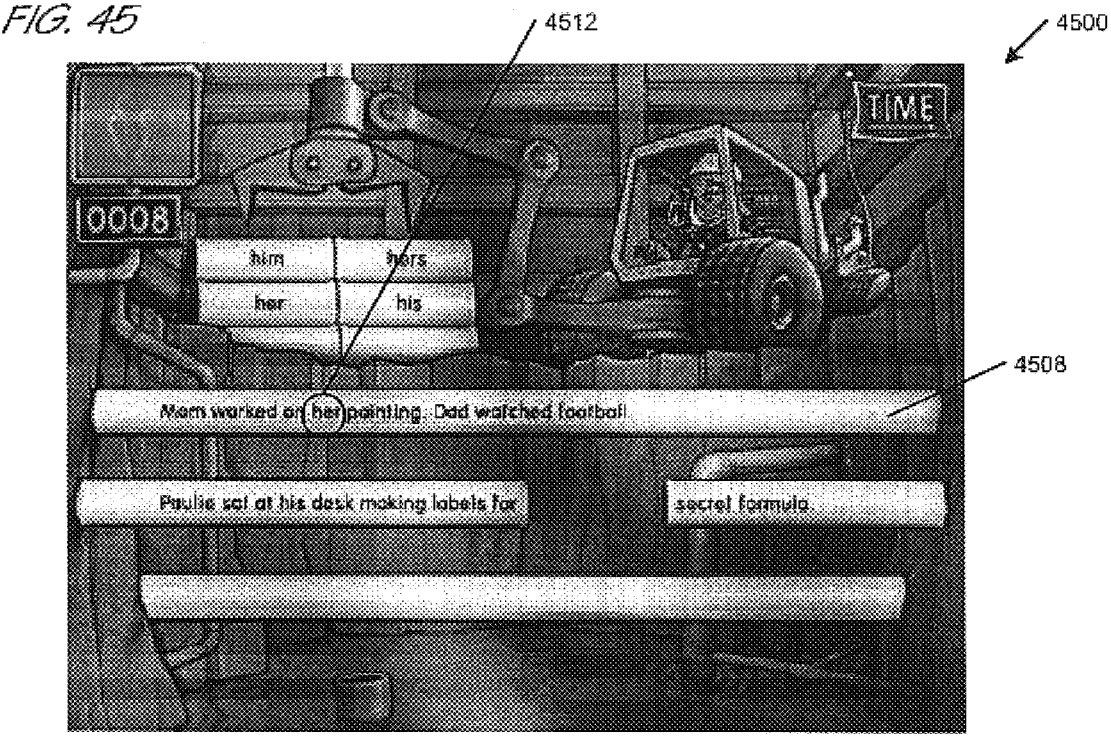
FIG. 45 is a screen shot illustrating a second trial within the game Hog Hat Zone.

On top of the pipes 4408 are placed a sentence or two that is missing a key word or words. The additional lengths of pipes 4410 are provided with four words which may be selected for insertion into the first break in the pipes 4408. One of these words is the correct word, and the other three are foils. If the student selects the correct word, in this case, the word "her", a "ding" is played to indicate the correct selection, and the student is presented with screen 4500 of FIG. 45, to which attention is now directed.

The first word "her" 4512 that was selected, has been inserted into the pipe 4508 to complete the pipe. Since there is still a break in another pipe, the student must select the next correct word. If the student selects an incorrect word, a "thunk" is played to indicate an incorrect selection, and the correct word is highlighted and placed on the pipe 4508.

Figure 46:
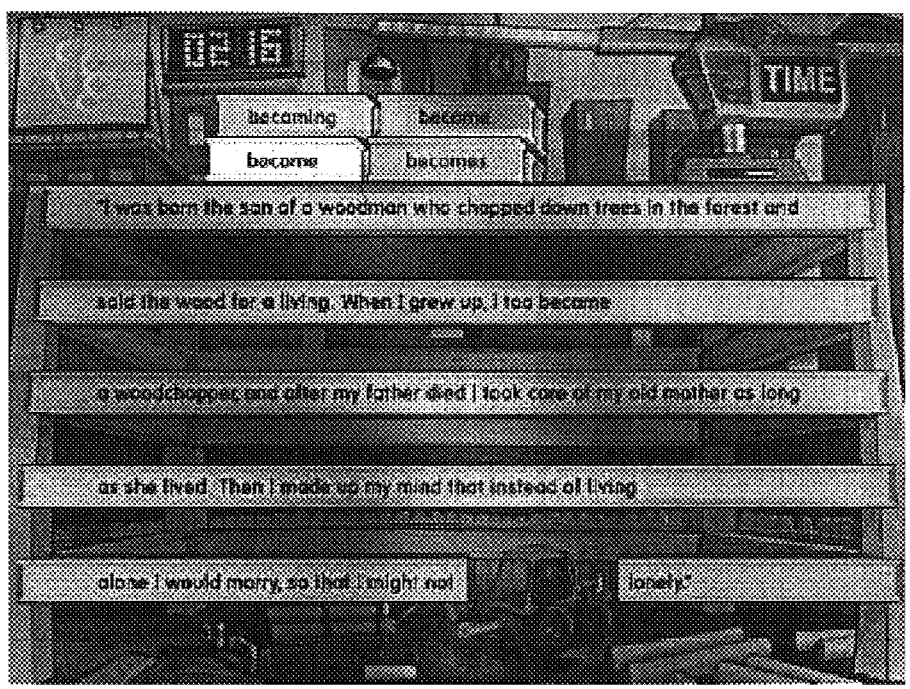
FIG. 46 is a screen shot illustrating a first trial within a second unit within the game Hog Hat Zone.

Referring now to FIG. 46, a screen shot 4600 is shown illustrating a slightly more advanced trial. The length of the reading, along with the complexity of the trial has increased. However, the method of Hog Hat Zone is still the same: the student must complete construction of the pipe by selecting the correct word.

Progression Through Hog Hat Zone

Hog Hat Zone progresses through four tiers of morphological complexity as follows:

Tier 1: Pronouns (such as she) and auxiliary verbs (such as will)

Tier 2: Inflectional suffixes, which are suffixes that add information about number, case, tense, or person, but do not change a word's part of speech. Inflectional suffixes can be added to nouns (such as the -s in cats) and verbs (such as worked and working).

Tier 3: Prefixes (such as the re- in reheat) and derivational suffixes, which are suffixes that change a word's meaning (such as the -less in useless) and often its part of speech (such as the th that changes heal to health)

Tier 4: Diectic pronouns, which are pronouns that point to something (such as here); possessives (such as Mike's); and contractions (such as they're). Many of these pronouns are challenging because they have highly confusable homophones (for instance, they're has two homophones: there and their).

Within each tier, Hog Hat Zone presents two units. The first unit presents paragraphs of 2 to 3 lines displayed on pipes, and the second unit presents paragraphs of 4 to 5 lines displayed on girders. After the student has completed the first unit (shorter paragraphs on pipes), Hog Hat Zone presents the second unit (longer paragraphs on girders).

Adaptivity and Advancement

Hog Hat Zone adapts to the student's incoming skill level and, as the student continues to train, tracks the number of correct and incorrect answers and adjusts the training level when the student is ready to advance or needs to transition to different training material. More specifically, Hog Hat Zone presents the categories within a tier in random order. The student trains on 10 different trials per category. After the student trains on all trials in a tier, Hog Hat Zone evaluates all the trials in that tier for advancement. If the student correctly completed 90 percent of the trials in the first unit (pipes and shorter paragraphs) and 90 percent of the trials in the second unit (girders and longer paragraphs), Hog Hat Zone advances to the next tier.

Hot Hat Zone allows a student who is not progressing in one area to continue to advance in other areas. To accomplish this goal, Hog Hat Zone uses plateau-based transitions to allow the student to train on different material when the student becomes stuck in a unit of a tier-or in a tier-and is not able to progress immediately. If the student did not correctly complete 90 percent of the trials in one unit or another-or both-Hog Hat Zone presents that unit (or both units) again. If the student repeats a unit 3 times but does not achieve 90 percent correct, Hog Hat Zone presents the next tier.

For example, if a student is training on pronouns and auxiliary verbs in tier 1 and is having trouble in both units with deictic pronouns, which are pronouns that point to something (These are the shoes I want), Hog Hat Zone presents the tier 1 paragraphs again. If the student completes the first unit (the shorter paragraphs on the pipes) with 90 percent accuracy, but is still having trouble with the second unit (longer paragraphs on girders), Hog Hat Zone presents the second unit of tier 1 paragraphs again. If the student is unable to complete the second unit with 90 percent accuracy after 3 tries, Hot Hat Zone transitions the student to tier 2, inflectional suffixes and verb tenses.

Before the student completes the exercise-and after the student completes as much of the material in Hog Hat Zone as possible-Hog Hat Zone returns the student to the units that the student did not complete with 90 percent accuracy. Hog Hat Zone requires the student to train on these units until s/he achieves 90 percent accuracy. A complete listing of all of the trials, within each tier, are provided in Appendix F which is attached hereto.

Figure 47B:
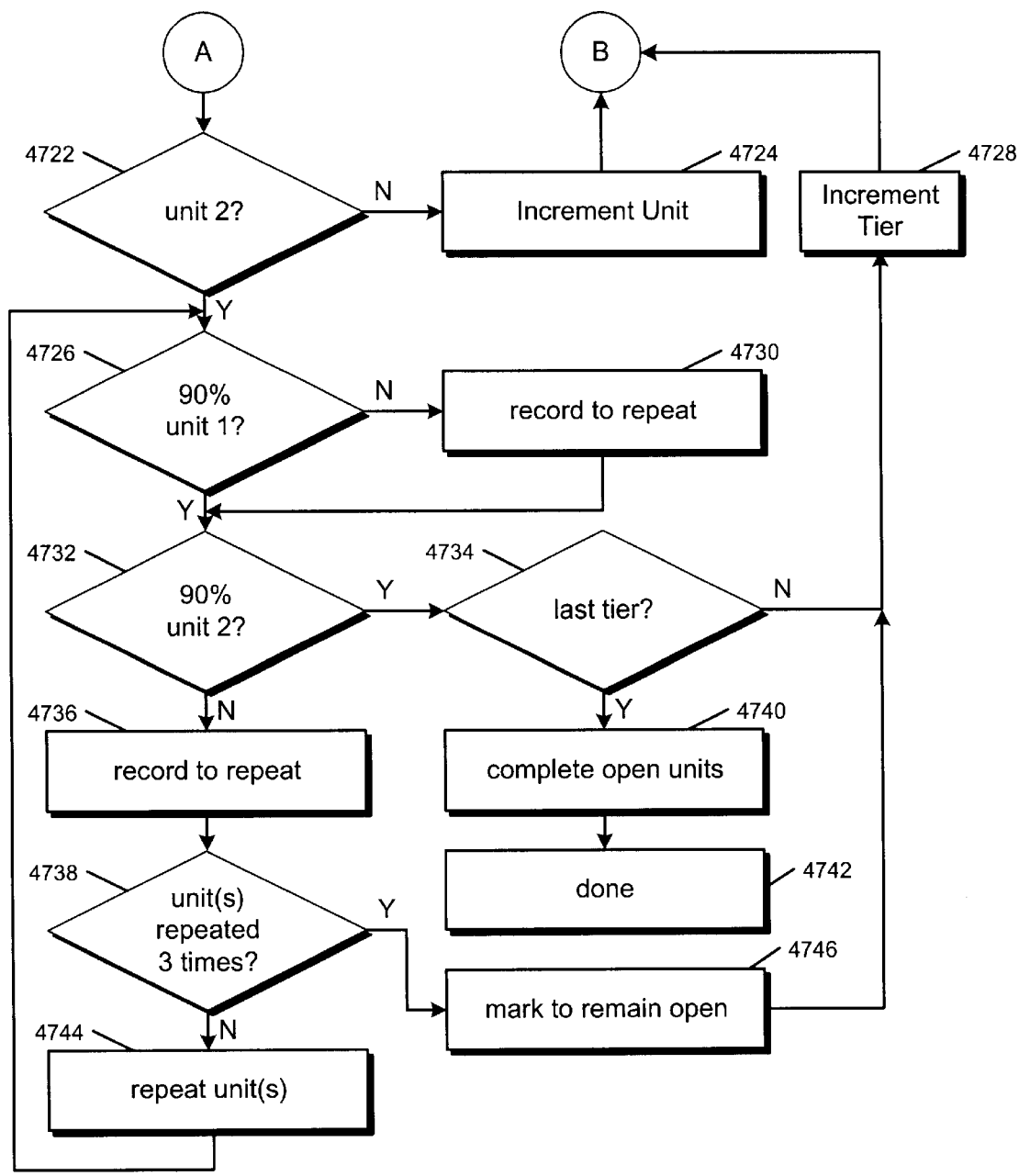

Referring now to FIGS. 47a–b, a flow chart 4700 is provided illustrating the training and advancement methodology for the game Hog Hat Zone. Flow begins at block 4702 and proceeds to decision block 4704.

Play remains at decision block 4704 until the student selects the yellow paw to initiate a trial. Once the student selects the yellow paw, flow proceeds to block 4706.

At block 4706, the Tier and Unit levels are set to 1. Flow then proceeds to block 4708.

At block 4708, the program randomly selects a paragraph from the remaining paragraphs within the present tier and present unit. Initially, the unit and tier are at level 1, and all paragraphs are available for selection. However, as the student progresses through the game, block 4708 chooses remaining paragraphs from the existing tier and unit levels. Flow then proceeds to block 4710.

At block 4710, the present (selected) paragraph is presented to the student as a trial. Flow then proceeds to decision block 4712.

At decision block 4712, a determination is made as to whether the student's selection was correct. If not, flow proceeds to block 4714. Otherwise, flow proceeds to block 4716.

At block 4714, a "thunk" is played to alert the student of the incorrect answer, the incorrect response is recorded, and the correct answer is inserted into the pipe (if unit 1) or girder (if unit 2). Flow then proceeds to decision block 4718.

At block 4716, a "ding" is played to alert the student of the correct answer, the correct response is recorded, and the correct answer is inserted into the pipe/girder. Flow then proceeds to decision block 4718.

At decision block 4718, a determination is made as to whether another trial is outstanding for the present paragraph. If not, flow proceeds to decision block 4720. However, if another trial is outstanding, flow proceeds back to decision block 4712 to evaluate the trial.

At decision block 4720, a determination is made as to whether there is another paragraph within the present unit. If so, flow proceeds back to block 4708 where another one of the remaining paragraphs is chosen for a trial. Otherwise, all paragraphs for the present unit have been completed, and flow proceeds to decision block 4722.

At decision block 4722, a determination is made as to whether the present unit is unit 2. That is, have all paragraphs for both units been presented? If not, then flow proceeds to block 4724. Otherwise, flow proceeds to decision block 4726.

At block 4724 the present unit is incremented. That is, unit 1 is incremented to unit 2. Flow then proceeds back to block 4708 where the program selects a paragraph from the present unit/tier.

At decision block 4726, a determination is made as to whether the student correctly responded to 90% of the trials in unit 1. If not, flow proceeds to block 4730. Otherwise, flow proceeds to decision block 4732.

At block 4730, the fact that the student did not achieve 90& correct responses in unit 1 is recorded. Flow then proceeds to decision block 4732.

At decision block 4732, a determination is made as to whether the student correctly responded to 90% of the trials in unit 2. If not, flow proceeds to block 4736. Otherwise, flow proceeds to decision block 4734.

At block 4736, the fact that the student did not achieve 90& correct responses in unit 2 is recorded. Flow then proceeds to decision block 4738.

At decision block 4738, a determination is made as to whether either/both of units 1 and 2 have been repeated 3 times. If not, flow proceeds to block 4744. Otherwise, flow proceeds to block 4746.

At block 4744, the units that have been recorded to be repeated (in blocks 4730/4736 are repeated per the sequence described above. That is, a student must achieve a 90% correct response in both units before they are allowed to proceed to the next tier. After the recorded units are repeated, flow proceeds back to decision block 4726 to determine if the student has obtained a 90% correct response. This process continues until either: 1) a 90% correct response is obtained in both units, at the present tier level; or 2) the student has repeated either or both the units 3 times. If the student repeats the unit 3 times, flow proceeds to block 4746 (as mentioned above).

At block 4746, the units that were repeated three times, but unsuccessfully, are marked to remain open. Flow then proceeds to block 4728.

At block 4728 the present tier is incremented. That is, if the present tier is 1, the tier is incremented to level 2. Flow then proceeds back to block 4708 where a new paragraph is selected, beginning at unit 1, for the new tier level.

When the program arrives at decision block 4734, it is because the student has obtained a 90% correct response for both units at the present tier level. A determination is then made as to whether the present tier level is the last tier. If it is, flow proceeds to block 4740. However, if it is not the last tier level, flow proceeds to block 4728 where the present tier level is incremented, and the training begins again as described above.

At block 4740, all open units are completed. That is, all of the units that were attempted three times, and not completed with a 90% correct response, were marked open in block 4746, and must be completed before the game ends. Game play continues on the open units until a 90% correct response is obtained. Flow then proceeds to block 4742 where training in Hog Hat Zone ends.

Although the present invention and its objects, features, and advantages have been described in detail, other embodiments are encompassed by the invention. For example, particular advancement/promotion methodology has been thoroughly illustrated and described for each game. The methodology for advancement of each game is based on studies indicating the need for frequency, intensity, motivation and cross-training. However, the number of skill/complexity levels provided for in each game, the number of trials for each level, and the percentage of correct responses required within the methodology are not static. Rather, they change, based on heuristic information, as more students utilize the Fast ForWord Reading training program. Thus, the cross-training benefit of multiple language development programs should not be restricted to the particular advancement methodology prescribed in the detailed description. In addition, one skilled in the art will appreciate that the stimuli used for training, as detailed in the Appendices, are merely a subset of stimuli that can be used within a training environment similar to Fast ForWord Reading. Furthermore, although the animal workers, and construction settings of the games are entertaining, and therefore motivational to a student, other storylines can be developed which would utilize the unique training methodologies described herein.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

Appendix A

Decoding I Scrap Cat Stimuli

1. Semantic Categories

Group One

| Animals | Things to wear | Things people can be | Tools |
|---|---|---|---|
| fawn | shirt | daughter | shovel |
| turkey | crown | queen | saw |
| goose | skirt | artist | hammer |
| turtle | mitten | scout | pliers |
| skunk | sweater | author | plow |
| horse | boot | soldier | ax |
| salamander | pants | scientist | screwdriver |

Group Two

| Things to eat | Things someone can be | Things to find in the house | Things to find outdoors |
|---|---|---|---|
| strawberry | clever | stove | hill |
| squash | hungry | blanket | garden |
| bread | practical | sink | surf |
| pear | smart | bathtub | cloud |
| cheese | curious | lamp | pool |
| soup | handsome | couch | iceberg |
| hamburger | brave | bookcase | raindrops |

Group Three

| Things with wheels | Parts of the body | Things to read | Things to do with your mouth |
|---|---|---|---|
| truck | cheek | magazine | lick |
| skateboard | forehead | newspaper | smile |
| tricycle | elbow | letter | burp |
| train | arm | label | talk |
| jeep | shoulder | sign | laugh |
| wagon | toenail | book | yell |
| scooter | hip | billboard | giggle |

Group Four

| Money | Fun | Family | Dangerous |
|---|---|---|---|
| coin | circus | father | poison |
| dime | birthday | sister | thorn |
| penny | present | grandfather | knife |
| nickel | party | mother | wreck |
| quarter | hobby | aunt | claw |
| dollar | games | brother | volcano |
| cash | laughter | cousin | criminal |

Group Five

| Months | Holidays | States | Countries |
|---|---|---|---|
| January | Christmas | California | France |
| April | Passover | Alabama | Germany |
| March | Kwanzaa | Delaware | China |
| August | Halloween | Texas | Australia |
| February | Thanksgiving | Mississippi | Italy |
| November | Easter | Idaho | Peru |
| July | Ramadan | Tennessee | Egypt |

Appendix A

2. Syntactic Categories

Group One

| Nouns | Verbs | Adjectives | Prepositions |
|---|---|---|---|
| glacier | argue | cloudy | around |
| avocados | caught | rude | over |
| colony | stared | important | beside |
| bulb | enjoy | merry | before |
| protection | thinks | silent | below |
| automobile | create | worthless | during |
| electricity | fainted | moist | across |

3. PHONOLOGICAL CATEGORIES

Group One

| Has two syllables | Has the same vowel sound as *ate* | Has the same vowel sound as *me* | Has the same vowel sound as *go* |
|---|---|---|---|
| merchant | plane | these | flow |
| rapid | quail | freeze | globe |
| better | sway | dream | clothes |
| panther | break | stream | rope |
| shower | strange | leave | road |
| myself | vein | weep | woe |
| twinkle | elevation | greenery | soap |

Group Two

| Has the same vowel sound as *mop* | Has the same vowel sound as *rope* | Has the same vowel sound as *rat* | Has the same vowel sound as *cut* |
|---|---|---|---|
| spot | goat | have | sponge |
| block | hoped | snap | from |
| falter | meadow | glass | some |
| closet | clover | crackle | crumb |
| operate | raincoat | black | cupcake |
| proper | tone | brat | hush |
| model | folk | drag | unto |

Group Three

| Has the "s" sound | Has three consonant sounds | Has three vowel sounds | Has one consonant sound |
|---|---|---|---|
| cell | tread | deliver | are |
| lace | pinch | porcupine | cue |
| tracing | plate | company | toy |
| proceed | brick | blueberry | bow |
| dressed | third | awfully | shoe |
| display | hired | oriole | obey |
| housework | prize | whatever | thy |

Appendix A

4. Morphological Categories

Group One

| Has a suffix that means *happened in the past* | Has a prefix that means *not* or *reverse* | Has a suffix meaning *full of* | None of the above (4) |
|---|---|---|---|
| appeared (-ed) | disappear (dis-) | thankful (-ful) | disease |
| placed (-ed) | displace (dis-) | grateful (-ful) | place |
| attached (-ed) | discontinue (dis-) | healthful (-ful) | attach |
| played (-ed) | dishonest (dis-) | playful (-ful) | speed |
| covered (-ed) | discover (dis-) | careful (-ful) | dishes |
| ordered (-ed) | disorder (dis-) | truthful (-ful) | dull |
| thanked (-ed) | disagree (dis-) | helpful (-ful) | read |

Group Two

| Is a plural noun | Has a prefix | Is a possessive | Is a compound word |
|---|---|---|---|
| monuments | untie (un-) | theirs | toothpaste |
| chimneys | react (re-) | hers | afternoon |
| oxen | preview (pre-) | our | footstep |
| witnesses | bicycle (bi-) | his | dragonfly |
| cherries | reset (re-) | your | turtleneck |
| elevators | unlimited (un-) | mine | skyrocket |
| knives | disabled (dis-) | my | scrapbook |

Group Three

| Has a prefix that means *again* | Has a suffix that makes it an adverb | Has a prefix that means *not* | None of the above (4) |
|---|---|---|---|
| replay (re-) | quickly (-ly) | uncover (un-) | jelly |
| retie (re-) | quietly (-ly) | unbend (un-) | realize |
| reinvent (re-) | properly (-ly) | uncommon (un-) | reach |
| reset (re-) | fully (-ly) | uncomfortable (un-) | reading |
| refill (re-) | probably (-ly) | undoes (un-) | underground |
| rebound (re-) | fortunately (-ly) | unfit (un-) | uncle |
| retake (re-) | silently (-ly) | unhook (un-) | uniform |

NOTE: The part of the word appearing in parenthesis is the part of the word that will be highlighted after the response. A number in parenthesis after a category indicates the position of that category (i.e. None of the Above (4) indicates that this category will always be in the bottom positions while the other positions are random).

Appendix A

Scrap Cat I Scrap Cat Stimuli Definitions

1. Semantic Categories

ANIMALS
fawn (1 syllable) a young deer; a mammal with brown fur, long legs, and a short tail.
turkey (2 syllables) a large North American bird with a featherless head and a fan-like tail.
goose (1 syllable) a large bird with webbed feet and a long neck.
turtle (2 syllables) a reptile that can pull its head, legs, and tail inside its protective shell.
skunk (1 syllable) a small mammal with black and white fur that can spray a bad-smelling liquid.
horse (1 syllable) a large mammal with hooves and a long mane and tail.
salamander (4 syllables) a pond-dwelling amphibian that looks like a small lizard.

THINGS TO WEAR
shirt (1 syllable) a piece of clothing with a collar and sleeves, worn on the upper part of the body.
crown (1 syllable) a decoration for the head of a king or queen, often made with gold and jewels.
skirt (1 syllable) a piece of clothing that hangs from the waist, usually worn by women and girls.
mitten (2 syllables) a covering for the hand, with one part for the fingers and another for the thumb.
sweater (2 syllables) a knitted piece of clothing worn on the upper part of the body.
boot (1 syllable) a heavy covering for the foot and lower leg.
pants (1 syllable) a piece of clothing for the lower part of the body that covers each leg separately.

THINGS PEOPLE CAN BE
daughter (2 syllables) a parent's female child.
queen (1 syllable) a woman from a royal family who rules a country or is married to a king.
artist (2 syllables) someone who works in the arts, such as a sculptor or musician.
scout (1 syllable) someone sent to explore an area, or a member of the Boy Scouts or the Girl Scouts.
author (2 syllables) a writer; someone who has created a story, poem, or article.
soldier (2 syllables) someone in an army.
scientist (3 syllables) someone who uses science to learn new things about the world.

TOOLS
shovel (2 syllables) a scoop with a long handle, used for digging or moving material.
saw (1 syllable) a large metal blade with sharp teeth, used for cutting hard materials.
hammer (2 syllables) a metal head attached to a handle, typically used for hitting nails.
pliers (2 syllables) metal jaws with two handles attached, used for gripping small objects.
plow (1 syllable) a large blade, used to turn over soil or move snow.
file (1 syllable) a steel bar covered with small points or ridges, used for grinding and smoothing.
screwdriver (3 syllables) a small rod with a handle and a special tip, used for turning screws.

THINGS TO EAT
strawberry (3 syllables) a small, juicy, red fruit, that grows on a low plant.
squash (1 syllable) a type of fleshy fruit that is cooked and eaten like a vegetable.
bread (1 syllable) a baked food that is made from grains such as wheat.
pear (1 syllable) a juicy, sweet fruit with a teardrop shape.
cheese (1 syllable) a food made from sour milk with most of the liquid removed.

iv

Appendix A soup (1 syllable) a food that is mostly broth or liquid, usually served hot.
hamburger (3 syllables) a sandwich made with a beef patty on a bun.

THINGS SOMEONE CAN BE
clever (2 syllables) smart or fast thinking.
hungry (2 syllables) wanting or needing to eat.
practical (3 syllables) sensible; realistic.
smart (1 syllable) intelligent; good at learning and understanding.
curious (3 syllables) wanting to find out about everything.
handsome (2 syllables) good looking; appealing.
brave (1 syllable) full of courage; willing to face danger.

THINGS TO FIND IN THE HOUSE
stove (1 syllable) a device for cooking or heating.
blanket (2 syllables) a large cloth used to keep warm; a cover for a bed.
sink (1 syllable) a basin for washing, with water faucets and a drain.
bathtub (2 syllables) a large basin that can be filled with water for washing the whole body.
lamp (1 syllable) a device that provides light.
bookcase (2 syllables) a piece of furniture with shelves for storing books or other objects.
couch (1 syllable) sofa; a soft seat, usually wide enough for two or three people.

THINGS TO FIND OUTDOORS
hill (1 syllable) an area of land that is raised, but not as high as a mountain.
garden (2 syllables) a place where vegetables or flowers are grown.
surf (1 syllable) waves in the sea as they break against the shore.
cloud (1 syllable) a white or gray mass, floating in the air, made of water droplets or ice crystals.
pool (1 syllable) a small body of water.
iceberg (2 syllables) a very large chunk of ice floating in the sea.
raindrops (2 syllables) small beads of water that fall from clouds.

THINGS WITH WHEELS
truck (1 syllable) a large car built for carrying big loads.
skateboard (2 syllables) a short board with four small wheels attached.
tricycle (3 syllables) a device with three wheels, handlebars, pedals, and a seat.
train (1 syllable) a line of railroad cars that ride on steel rails, pulled by an engine car.
jeep (1 syllable) a small car built for off-road driving.
wagon (2 syllables) a cart with four wheels that is pulled by horses; a small toy cart.
scooter (2 syllables) a low board with a wheel at each end and a handlebar in the front.

PARTS OF THE BODY
cheek (1 syllable) an area on the side of the face, next to the mouth and nose.
forehead (2 syllables) the area on the face that is above the eyebrows.
elbow (2 syllables) the joint in the middle of the arm.
arm (1 syllable) the part of the body that connects the hand to the shoulder.
shoulder (2 syllables) the joint between the upper body and the arm.
toenail (2 syllables) the hard cover at the end of a toe.

Appendix A hip (1 syllable) the side of the body between the waist and the leg.

THINGS TO READ magazine (3 syllables) a collection of writings, usually printed weekly or monthly.
newspaper (3 syllables) a collection of writings on current events, usually printed daily.
letter (2 syllables) a written message that may be sent by mail.
label (2 syllables) written information on a sticker or tag that is attached to an object.
sign (1 syllable) information that is placed where it is easy to see.
book (1 syllable) a long piece of writing, printed on pages that are bound together.
billboard (2 syllables) a large board displaying advertisements, usually placed near a road.

THINGS TO DO WITH YOUR MOUTH lick (1 syllable) to pass your tongue over something.
smile (1 syllable) turning the corners of the mouth up to show that you are happy.
burp (1 syllable) to belch; to let out stomach gas through the mouth.
talk (1 syllable) to speak; to make words by making sounds in the mouth and throat.
laugh (1 syllable) to make sounds showing that something is funny.
yell (1 syllable) to cry out; to shout, as when talking to someone far away.
giggle (2 syllables) to make a high-pitched or silly laugh.

MONEY coin (1 syllable) a small metal disk used as a form of money.
dime (1 syllable) a silver-colored coin worth ten cents (1/10th of a dollar).
penny (2 syllables) a copper-colored coin worth one cent (1/100th of a dollar).
nickel (2 syllables) a silver-colored coin worth five cents (1/20th of a dollar).
quarter (2 syllables) a silver-colored coin worth twenty-five cents (1/4th of a dollar).
dollar (2 syllables) the basic unit of money in the United States.
cash (1 syllable) money; coins or bills.

FUN circus (2 syllables) a travelling show, often with clowns, acrobats, and trained animals.
birthday (2 syllables) the day of the year when someone was born, often celebrated with a party.
present (2 syllables) a gift; something given to another out of friendship or thanks.
party (2 syllables) a celebration; a gathering for having a good time.
hobby (2 syllables) something you like to do in your spare time.
games (1 syllable) contests or sports; things you play for enjoyment.
laughter (2 syllables) making sounds that show you are happy or something is funny.

FAMILY father (2 syllables) a man who is a parent.
sister (2 syllables) a girl or woman whose parents have other children.
grandfather (3 syllables) a man who is the father of a parent.
mother (2 syllables) a woman who is a parent.
aunt (1 syllable) a woman who is the sister of a parent, or the wife of an uncle.
brother (2 syllables) a boy or man whose parents have other children.
cousin (2 syllables) the child of an aunt or uncle.

Appendix A

DANGEROUS
poison (2 syllables) something that can kill you or make you sick if you eat it.
thorn (1 syllable) a sharp point on the stem of a plant.
knife (1 syllable) a blade with a sharp edge, made for cutting.
wreck (1 syllable) a crash; a car, train, or airplane accident.
claw (1 syllable) the sharp toenails that lions and many other animals have.
volcano (3 syllables) an opening where melted rock is pushed out from deep underground.
criminal (3 syllables) someone who does things that are against the law.

MONTHS
January (4 syllables) the first month of the year.
April (2 syllables) the fourth month of the year.
March (1 syllable) the third month of the year.
August (2 syllables) the eighth month of the year.
February (4 syllables) the second month of the year.
November (3 syllables) the eleventh month of the year.
July (2 syllables) the seventh month of the year.

HOLIDAYS
Christmas (2 syllables) December 25th, when Christians celebrate the birth of Jesus Christ.
Passover (3 syllables) a Jewish holiday celebrating the freeing of the ancient Hebrews from slavery in Egypt.
Kwanzaa (2 syllables) an African American celebration, from December 26 to January 1, that focuses on family and community.
Halloween (3 syllables) October 31st; on this evening, many children dress up in costumes and receive treats.
Thanksgiving (3 syllables) the fourth Thursday in November, when people in the United States remember the Pilgrims.
Easter (2 syllables) a Sunday in early spring, when Christians celebrate the return of Christ from the grave.
Ramadan (3 syllables) the ninth month of the Muslim calendar, when Muslims go without eating during the day and spend much of their time in prayer.

STATES
California (4 syllables) the 31st state, on the Pacific coast of the United States.
Alabama (4 syllables) the 22nd state, in the southeast part of the United States.
Delaware (3 syllables) the 1st state, on the Atlantic coast of the United States.
Texas (2 syllables) the 28th state, in the south-central part of the United States.
Mississippi (4 syllables) the 20th state, in the southeast part of the United States.
Idaho (3 syllables) the 43rd state, in the northwest part of the United States.
Tennessee (3 syllables) the 16th state, in the central-east part of the United States.

COUNTRIES
France (1 syllable) a country in western Europe.
Germany (3 syllables) a country in northern Europe.
China (2 syllables) a country in eastern Asia.
Australia (3 syllables) a country southeast of Asia that lies between the Indian and Pacific oceans.
Italy (3 syllables) a country in southern Europe.

Appendix A

Peru (2 syllables) a country on the west coast of South America.
Egypt (2 syllables) a country in northern Africa.

2. Syntactic categories

NOUNS
glacier (2 syllables) a large mass of ice found in a mountain valley or polar area.
avocados (4 syllables) plural of *avocado*; pear-shaped fruits that are light green inside and have a tough green or brown skin outside.
colony (3 syllables) a place that is settled and controlled by people from another country.
bulb (1 syllable) the underground part of some plants such as onions and daffodils.
protection (3 syllables) a person or thing that protects; a way of keeping something safe.
automobile (4 syllables) a car, with four wheels and an engine, used for traveling.
electricity (5 syllables) a type of energy that travels along wires and involves the movement of positive and negative charges.

VERBS
argue (2 syllables) to speak in an angry way with someone because you disagree.
caught (1 syllable) past tense of *catch*; to have grabbed hold of something.
stared (1 syllable) past tense of *stare*; to have spent a long time looking at someone or something.
enjoy (2 syllables) to get joy or happiness from doing things.
thinks (1 syllable) uses his or her mind.
create (2 syllables) to make or design something new.
fainted (2 syllables) past tense of *faint*; became unconscious for a short period of time.

ADJECTIVES
cloudy (2 syllables) covered with clouds.
rude (1 syllable) not polite.
important (3 syllables) having great meaning and value.
merry (2 syllables) happy and cheerful.
silent (2 syllables) making no noise.
worthless (2 syllables) having no value; useless.
moist (1 syllable) somewhat wet or damp.

PREPOSITIONS
around (2 syllables) surrounding.
over (2 syllables) on top of.

beside (2 syllables) next to.

before (2 syllables) in front of, earlier than.

below (2 syllables) underneath, lower than.
during (2 syllables) within a certain time period.
across (2 syllables) from one side to the other.

Appendix A

3. Phonological Categories

HAS TWO SYLLABLES
merchant (2 syllables) someone who makes a profit by selling goods.
rapid (2 syllables) very quick.
better (2 syllables) preferable; improved.
panther (2 syllables) a large, black leopard.
shower (2 syllables) a short rainfall; to wash yourself under a spray of water.
myself (2 syllables) me; no one but me.
twinkle (2 syllables) to shine; to sparkle.

HAS THE SAME VOWEL SOUND AS *ATE*
plane (1 syllable) short for *airplane*; a flying machine with two wings.
quail (1 syllable) a small, plump, gray or brown bird.
sway (1 syllable) to move or swing back and forth.
break (1 syllable) to damage something or split it into pieces.
strange (1 syllable) weird or unusual.
vein (1 syllable) one of the vessels in the body that carries blood back to the heart.
elevation (4 syllables) a high place; distance above sea-level.

HAS THE SAME VOWEL SOUND AS *ME*
these (1 syllable) the plural of *this*; the persons or things being talked about or pointed to.
freeze (1 syllable) to turn into ice.
dream (1 syllable) a series of images and sounds appearing in your mind while you are sleeping.
leave (1 syllable) to go away.
weep (1 syllable) to cry.
greenery (3 syllables) green plants such as trees, leaves, and grass.
stream (1 syllable) a brook; a small body of running water.

HAS THE SAME VOWEL SOUND AS *GO*
flow (1 syllable) to run along smoothly.
globe (1 syllable) the earth; a round model of the earth.
clothes (1 syllable) things to wear; coverings for the body.
rope (1 syllable) a thick, strong cord or string that can be used to tie things together.
road (1 syllable) a street; a pathway for people to travel.
woe (1 syllable) sadness or grief.
soap (1 syllable) a substance used with water for washing and cleaning.

HAS THE SAME VOWEL SOUND AS *MOP*
spot (1 syllable) a stain or mark; a particular place.
block (1 syllable) to stop something from getting through.
falter (2 syllables) to trip or stumble; to hesitate.
closet (2 syllables) a small place for storing clothes.
operate (3 syllables) to run or to keep things working.
proper (2 syllables) right or suitable.

Appendix A model (2 syllables) a miniature; a copy of something.

HAS THE SAME VOWEL SOUND AS *ROPE* goat (1 syllable) a mammal with horns, hoofs, and a short tail.
hoped (1 syllable) past tense of *hope*; to have wished for something.
meadow (2 syllables) an open, grassy field.
clover (2 syllables) a low-growing plant, with leaves in three parts, and pink or white flowers.
raincoat (2 syllables) a coat or jacket that can keep you dry when it rains.
tone (1 syllable) a sound.
folk (1 syllable) people.

HAS THE SAME VOWEL SOUND AS *RAT* have (1 syllable) to own or get something.
snap (1 syllable) a cracking sound; to break with a cracking sound.
glass (1 syllable) a hard, see-through material used to make windows and bottles.
crackle (2 syllables) to make many cracking or snapping sounds.
black (1 syllable) opposite to white; the color of coal.
brat (1 syllable) a spoiled child.
drag (1 syllable) to pull in a slow and difficult way along the ground.

HAS THE SAME VOWEL SOUND AS *CUT* sponge (1 syllable) a kind of cleaning pad.
from (1 syllable) beginning at.
some (1 syllable) a number or an amount that you don't know exactly.
crumb (1 syllable) a small piece of bread or cake.
cupcake (2 syllables) a very small round cake.
hush (1 syllable) quiet; silence.
unto (2 syllables) an old-fashioned word for *to*.

HAS THE "S" SOUND cell (1 syllable) a basic, tiny part that makes up all animals and plants.
lace (1 syllable) a long, thin string used to tie shoes.
tracing (2 syllables) following or tracking.
proceed (2 syllables) to begin or to continue.
dressed (1 syllable) wearing clothes; has put on clothes.
display (2 syllables) to show or present something.
housework (2 syllables) work done at home including cleaning and cooking.

HAS THREE CONSONANT SOUNDS tread (1 syllable) a rough surface attached to a shoe or tire for better grip.
pinch (1 syllable) to squeeze something between your finger and thumb.
plate (1 syllable) a flat dish used to eat from.
brick (1 syllable) a block that is made of baked red clay, used for building walls.
third (1 syllable) to come after two others in a line; one of three equal portions.
hired (2 syllables) to have given someone a job for which they will be paid.
prize (1 syllable) an award; something given to the winner of a contest.

Appendix A

HAS THREE VOWEL SOUNDS deliver (3 syllables) to bring or hand over something.
porcupine (3 syllables) a small animal with a coat of sharp spines for protection.
company (3 syllables) a group of people who work together.
blueberry (3 syllables) a tiny fruit with thin, blue skin that grows on a bush.
awfully (3 syllables) very; in a bad way.
oriole (3 syllables) an orange and black songbird, native to America.
whatever (3 syllables) anything; no matter what.

HAS ONE CONSONANT SOUND are (1 syllable) *to be*, when talking about a group.
cue (1 syllable) a hint; a signal that it is time to start.
toy (1 syllable) something that a child plays with.
bow (1 syllable) to bend at the neck, waist, or hip as a way of showing respect for someone.
shoe (1 syllable) a protective covering for the foot.
obey (2 syllables) to do as you are told; to follow the rules.
thy (1 syllable) an old-fashioned word that means *your*.

4. Morphological categories

HAS A SUFFIX THAT MEANS *HAPPENED IN THE PAST* appeared (2 syllables) showed up.
placed (2 syllables) was put in a certain location.
attached (2 syllables) was connected or stuck together.
played (2 syllables) had taken part in a game or sport.
covered (2 syllables) had put one thing over another.
ordered (2 syllables) had told someone what to do.
thanked (1 syllable) had told someone that you liked what they did for you.

HAS A PREFIX THAT MEANS *NOT* OR *REVERSE* disappear (3 syllables) to become invisible or to go away.
displace (2 syllables) to move something from its normal place.
discontinue (4 syllables) to stop.
dishonest (3 syllables) to be someone who lies, cheats, or steals.
discover (3 syllables) to find out something that used to be unknown.
disorder (3 syllables) when things are mixed up or confused.
disagree (3 syllables) to have a different opinion or belief.

HAS A SUFFIX MEANING *FULL OF* thankful (2 syllables) to feel glad about what someone has done for you.
grateful (2 syllables) to feel glad about what someone has done for you.
healthful (2 syllables) when something is good for your health.
playful (2 syllables) to like playing and having fun.
careful (2 syllables) cautious; likely to take care when doing things.

xi

Appendix A truthful (2 syllables) honest.
helpful (2 syllables) useful; to be someone who helps others.

NONE OF THE ABOVE
disease (2 syllables) sickness or illness.
place (1 syllable) to put something in a certain location.
attach (2 syllables) to stick together or to connect things.
speed (1 syllable) how fast something is moving.
dishes (2 syllables) containers that food is eaten from.
dull (1 syllable) boring; not sharp; not shiny.
read (1 syllable) to look at a written message and get its meaning.

IS A PLURAL NOUN
monuments (3 syllables) statues or buildings that are put up in memory of a person or event.
chimneys (2 syllables) shafts that carry the smoke from fireplaces or stoves outside.
oxen (2 syllables) male cattle or yaks, sometimes used to pull wagons.
witnesses (3 syllables) people who have seen or heard an event.
cherries (2 syllables) small, red or yellow fruits that grow on trees and have a single large seed.
elevators (4 syllables) boxes that are raised and lowered by cables to move people or cargo.
knives (1 syllable) tools, used for cutting, that have a metal blade with a sharp edge.

HAS A PREFIX
untie (2 syllables) to loosen a knot.
react (2 syllables) to behave a certain way because of something that happened.
preview (2 syllables) to see something before you normally would.
bicycle (3 syllables) a device with a seat, handlebars, pedals, and two wheels, one in front of the other.
reset (2 syllables) to set something that was set before.
unlimited (4 syllables) without limit; endless.
disabled (3 syllables) having been made less able to move or work normally.

IS A POSSESSIVE
theirs (1 syllable) belongs to them.
hers (1 syllable) belongs to her.
our (1 syllable) belongs to us.
his (1 syllable) belongs to him.
your (1 syllable) belongs to you.
mine (1 syllable) belongs to me.
my (1 syllable) belongs to me.

IS A COMPOUND WORD
toothpaste (3 syllables) a paste that is put on a toothbrush to help clean the teeth.
afternoon (3 syllables) the time of day between noon and evening.
footstep (2 syllables) the sound of putting your foot on the ground when walking.
dragonfly (3 syllables) a large insect with a long, thin body and four long wings.
turtleneck (3 syllables) a shirt or sweater with a wide collar that covers the neck.
skyrocket (3 syllables) a firework made to explode high in the air.

Appendix A scrapbook (2 syllables) a book for saving mementos such as photos, letters, and awards.

HAS A PREFIX THAT MEANS *AGAIN*
replay (2 syllables) to show part of a game or movie that was already seen.
retie (2 syllables) to tie a knot that came undone.
reinvent (3 syllables) to invent something that someone has already invented.
reset (2 syllables) to set something that was set before.
refill (2 syllables) to fill something that was full before.
rebound (2 syllables) to return or bounce back after hitting something.
retake (2 syllables) to take something back.

HAS A SUFFIX THAT MAKES IT AN ADVERB
quickly (2 syllables) at high speed.
quietly (3 syllables) making very little noise.
properly (3 syllables) in the correct way.
fully (2 syllables) in a complete way.
probably (3 syllables) likely; there is little doubt it will happen.
fortunately (4 syllables) luckily; it was a good thing that it happened.
silently (3 syllables) without making any noise.

HAS A PREFIX THAT MEANS *NOT*
uncover (3 syllables) to take off a cover.
unbend (2 syllables) to straighten.
uncommon (3 syllables) to be rare or unusual.
uncomfortable (5 syllables) disagreeable or painful.
undoes (2 syllables) takes apart; reverses something that has been done.
unfit (2 syllables) not healthy or not able.
unhook (2 syllables) to detach something or remove it from a hook.

NONE OF THE ABOVE
jelly (2 syllables) a food usually made of thickened fruit juice and sugar.
realize (2 syllables) to understand something for the first time.
reach (1 syllable) to stretch your arm toward something.
reading (2 syllables) the act of looking at a written message and getting its meaning
underground (3 syllables) below the surface of the earth.
uncle (2 syllables) a man who is the brother of a parent, or the husband of an aunt.
uniform (3 syllables) all the same; a standard set of clothes.

xiii

Appendix A

Scrap Cat
*Category Aural Definitions*

When the participant clicks the "speaker" next to the category the category name will be heard along with the definitions below. The examples will be read to emphasize the critical part of the word. If a category does not have a definition, only the category name will be heard.

1. Semantic Categories

| Animals | Things to wear | Things people can be | Things to find outdoors |
|---|---|---|---|
| Like "dog". | Like "dress". | Like "doctor". | Like "sky". |

| Things to eat | Things someone can be | Things to find in the house | Tools |
|---|---|---|---|
| Like "pie". | Like "tall". | Like "chair". | Like "wrench". |

| Things with wheels | Parts of the body | Things to read | Things to do with your mouth |
|---|---|---|---|
| Like "tractor". | Like "leg". | Like "story". | Like "eat". |

| Money | Fun | Family | Dangerous |
|---|---|---|---|
| Like "cent". | Like "playground". | Like "uncle". | Like "fire". |

| Months | Holidays | States | Countries |
|---|---|---|---|
| Like "May". | Like "Labor Day". | Like "Florida". | Like "England". |

2. Syntactic Categories

| Nouns | Verbs | Adjectives | Prepositions |
|---|---|---|---|
| A noun refers to a person, place, or thing, like "girl", "city", and "idea". | A verb describes an action or state of being, like "is", "want", and "talk". | An adjective describes an aspect of noun, like "red", "hungry", and "small". | A preposition expresses something about time, space, direction, possession, or cause, like "of", "about", and "in". OR A preposition describes the relationship between a noun and another noun (or verb, adverb, or sentence), like "of", "about", and "in". |

3. PHONOLOGICAL CATEGORIES

| Has two syllables | Has the same vowel sound as *ate* | Has the same vowel sound as *me* | Has the same vowel sound as *go* |
|---|---|---|---|
| Like "jacket" and "wonder". | Like "main" and "late". | Like "tree" and "clean". | Like "load" and "sewing". | xiv

Appendix A

| Has the same vowel sound as *mop* | Has the same vowel sound as *rope* | Has the same vowel sound as *rat* | Has the same vowel sound as *cut* |
|---|---|---|---|
| Like "not" and "lock". | Like "note" and "groan". | Like "class" and "track". | Like "flood" and "under". |
| Has the "s" sound | Has three consonant sounds | Has three vowel sounds | Has one consonant sound |
| Like "say" and "race". | Like "bread" has the sounds "buh", "ruh", and "duh". | Like "strawberry" has the sounds "aw", "eh", and "ee". | Like "pie" has the sound "puh". |

4. MORPHOLOGICAL CATEGORIES

| Has a suffix that means *happened in the past* | Has a prefix that means *not* or *reverse* | Has a suffix meaning *full of* | None of the above |
|---|---|---|---|
| Like "started" and "walked". | Like the "dis-" in "dislike". | Like the "ful" in "hopeful". | |
| Is a plural noun | Has a prefix | Is a possessive | Is a compound word |
| Like "teachers" and "toes". | Like "un-" in "untrue" and "re-" in "return". | Like "hers" and "yours". | Like "football" and "newspaper" which are made up of two words. |
| **Has a prefix that means *again* | Has a suffix that makes it an adverb | Has a prefix that means *not* | None of the above** |
| Like the "re-" in "restart". | Like the "-ly" in "slowly". | Like the "un-" in "unhappy". | | xv

Appendix B
Word List for Canine Crew

| | | | |
|---|---|---|---|
| accomplished | bare | cheep | divide |
| acquire | barn | cheerful | double |
| acre | be | cheese | down |
| acres | beach | chews | dry |
| actor | bear | chief | due |
| additional | beat | chili | dull |
| adore | beautiful | chilly | earliest |
| advance | bee | choose | encourage |
| affection | beech | chop | endure |
| after | beef | churn | enjoy |
| agree | beet | clean | exist |
| agreement | before | clear | expensive |
| aim | behind | clip | explore |
| alive | benefit | coarse | eye |
| all | bent | come | fair |
| allow | berry | command | fare |
| allowed | big | common | fault |
| aloud | bitter | comparable | feat |
| also | blame | compare | feet |
| altar | blaze | completion | female |
| alter | bleak | conceal | fence |
| although | bless | constant | few |
| amount | blind | continue | fight |
| amuse | boat | contract | find |
| ancient | bodyguard | contrary | fined |
| and | bore | contribute | fire |
| angle | bored | correct | first |
| announced | boulevard | course | flag |
| appear | brag | covered | flawed |
| apply | brain | coward | flip |
| argue | brave | cowardly | flipper |
| ark | bread | creak | flour |
| around | break | create | flower |
| arrive | breakers | creek | for |
| article | bred | crop | forbid |
| ascend | brief | crowd | form |
| ash | broad | curse | formation |
| aside | broom | dare | forth |
| ask | bubble | day | foul |
| assemble | build | dead | four |
| assist | burn | deal | fourth |
| assure | bury | decide | fowl |
| astray | busy | deep | freeze |
| attend | but | deer | freight |
| attendance | by | depend | fright |
| attendants | bye | destroy | from |
| author | call | dew | front |
| awake | calm | did | fruit |
| aware | carnation | die | fume |
| back | cattle | different | furthermore |
| backpack | cease | disappear | fuse |
| bad | ceiling | discontinue | gain |
| bait | cent | discourage | general |
| baker | chain | discover | generous |
| bang | change | dish | get |
| banner | charitable | display | give |

Appendix B
Word List for Canine Crew

| | | | |
|---|---|---|---|
| gloomy | it's | mate | pain |
| go | its | meek | pair |
| gone | judgment | melt | pale |
| good | just | merely | panic |
| grab | keys | meter | park |
| grate | kind | middle | part |
| great | knapsack | mistake | particular |
| greater | knead | mix | pause |
| greatest | knew | modern | paws |
| greedy | knight | moist | peace |
| greyhound | knot | mole | peak |
| grind | know | more | pear |
| groan | knowledge | morning | peasant |
| group | labor | most | peek |
| grown | laid | mourning | peel |
| guessed | large | mule | peer |
| guest | last | mumble | people |
| hair | lawn | muscle | perfection |
| hall | leaf | mussel | pheasant |
| hare | least | mutter | pick |
| hate | lengthy | near | picket |
| haul | less | need | piece |
| have | lessen | new | pier |
| he | lesson | news | place |
| he'd | let | night | play |
| he'll | light | no | playground |
| heal | like | none | please |
| hear | liquid | not | polish |
| heard | litter | now | polite |
| heater | little | number | pop |
| heed | live | numerous | position |
| height | loan | oar | positive |
| herd | locate | obey | possess |
| here | lone | observe | possesses |
| hero | long | off | praise |
| hi | look | offend | pray |
| high | loose | often | prefer |
| higher | lose | oh | present |
| hire | loss | old | prevent |
| honor | lots | on | prey |
| hoot | loud | one | primary |
| hop | made | only | private |
| howl | magnificent | opinion | profit |
| humans | maid | or | promptly |
| I | mail | ore | provide |
| I'll | main | out | public |
| idle | maintain | outcome | quart |
| ignorance | make | outline | quiver |
| immediately | male | over | rage |
| in | mane | overseas | rail |
| increase | manner | oversees | rain |
| individual | many | owe | rap |
| individuals | marvelous | own | rapid |
| inn | massed | owns | rare |
| interrupt | mast | paid | read |
| invite | master | pail | reduce | ii

Appendix B
Word List for Canine Crew reed
reign
rein
remedy
renew
repair
request
retreat
reveal
review
riddle
right
river
rob
rode
roll
rude
rustle
rye
sad
sage
said
salt
same
scent
school
sea
sealing
secure
see
seize
seldom
sent
sentence
separate
separation
servant
several
sew
shallow
shame
she
shone
short
shower
shown
side
sighed
signed
silence
similar
single
skipper
slight
slow
sly small
smash
so
sole
solid
some
son
sort
sound
sprang
spread
squeak
stair
stake
stare
steak
steal
steel
stink
straight
strain
strength
student
stumble
stutter
style
sum
summon
sun
superior
surrounding
sweet
swish
sword
tacks
tail
take
tale
tame
tangle
tax
teacher
teen
telephone
tell
terrible
thank
that'll
their
then
there
thick
thicket
thin
thing
thistle threw
throne
through
thrown
tide
tied
tight
tingle
tiny
to
toad
tone
too
tractor
train
try
twinkle
two
ugly
under
understand
union
unused
unusually
up
use
useful
useless
vanish
variable
vast
very
virtuous
vote
waist
wander
warm
waste
watercress
way
weak
weakness
week
weigh
whence
whistle
who's
whole
whose
width
wild
wilderness
wink
with
without
won wood
work
would
wrap
wrinkle
write
yank
yarn
yes
yew
yonder
you Appendix B
Word List for Canine Crew

CANINE CREW STIMULI

Rhyme pairs
INSTRUCTIONS FOR RHYME PAIRS
Click on a word. Then, click on another word that rhymes with the first. Words that rhyme end with the same sounds.

TRAINING LEVEL

*Grid 1*

| | | |
|---|---|---|
| 1 | hop | pop |
| 2 | train | rain |
| 3 | light | fight |
| foil | clip | |

*Grid 2*

| | | |
|---|---|---|
| 1 | chop | crop |
| 2 | pain | gain |
| 3 | knight | fright |
| foil | flip | |

SECOND GRADE VOCABULARY (MAX)

| | | |
|---|---|---|
| 1 | chop | crop |
| 2 | actor | tractor |
| 3 | clip | flip |
| 4 | vote | boat |
| 5 | laid | paid |
| 6 | ark | park |
| 7 | wink | stink |
| 8 | meek | squeak |
| 9 | mole | roll |
| 10 | beef | leaf |
| 11 | toad | rode |
| 12 | teen | clean |
| 13 | clear | deer |
| 14 | deal | peel |
| 15 | pail | rail |
| 16 | pain | gain |
| 17 | thick | pick |
| 18 | lawn | gone |
| 19 | middle | riddle |
| 20 | quart | sort |
| 21 | meter | heater |
| 22 | spread | bread |
| 23 | knight | fright |
| 24 | stair | dare |
| 25 | yarn | barn |
| 26 | yank | thank |
| 27 | swish | dish |
| 28 | fruit | hoot |
| 29 | mule | school |
| 30 | crowd | loud |

THIRD GRADE VOCABULARY (MAX)

| | | |
|---|---|---|
| 1 | acre | baker |
| 2 | aim | blame |
| 3 | alive | arrive |
| 4 | angle | tangle |
| 5 | ash | smash |
| 6 | aside | decide |
| 7 | assure | secure |
| 8 | astray | display |
| 9 | attend | depend |
| 10 | greyhound | playground |
| 11 | awake | mistake |
| 12 | aware | compare |
| 13 | bait | straight |
| 14 | bang | sprang |
| 15 | banner | manner |
| 16 | bitter | litter |
| 17 | mussel | rustle |
| 18 | blind | signed |
| 19 | brag | flag |
| 20 | brain | chain |
| 21 | brief | chief |
| 22 | broad | flawed |
| 23 | burn | churn |
| 24 | style | I'll |
| 25 | cattle | that'll |
| 26 | cease | piece |
| 27 | cheese | keys |
| 28 | double | bubble |
| 29 | fault | salt |
| 30 | fume | broom |

FOURTH GRADE VOCABULARY (MAX)

| | | |
|---|---|---|
| 1 | sword | bored |
| 2 | adore | explore |
| 3 | conceal | reveal |
| 4 | affection | perfection |
| 5 | ascend | depend |
| 6 | bodyguard | boulevard |
| 7 | breakers | acres |
| 8 | carnation | formation |
| 9 | shower | flour |
| 10 | freeze | seize |
| 11 | fuse | news |
| 12 | freight | mate |
| 13 | quiver | river |
| 14 | knapsack | backpack |
| 15 | mumble | stumble |

Appendix B
Word List for Canine Crew

| | | |
|---|---|---|
| 16 | mutter | stutter |
| 17 | howl | foul |
| 18 | twinkle | wrinkle |
| 19 | peasant | pheasant |
| 20 | praise | blaze |
| 21 | sage | rage |
| 22 | thicket | picket |
| 23 | thistle | whistle |
| 24 | tingle | single |
| 25 | renew | review |
| 26 | whence | fence |
| 27 | yonder | wander |
| 28 | rye | sly |
| 29 | wilderness | watercress |
| 30 | flipper | skipper |

SYNONYM PAIRS

INSTRUCTIONS FOR SYNONYM PAIRS
Click on a word. Then, click on another word that is a synonym to the first. Synonyms are different words that mean the same thing.

SECOND GRADE VOCABULARY (MAX)

| | | |
|---|---|---|
| 1 | and | too |
| 2 | have | own |
| 3 | by | near |
| 4 | but | although |
| 5 | use | apply |
| 6 | many | lots |
| 7 | give | present |
| 8 | some | few |
| 9 | make | build |
| 10 | like | enjoy |
| 11 | look | see |
| 12 | more | greater |
| 13 | go | advance |
| 14 | most | greatest |
| 15 | number | amount |
| 16 | people | humans |
| 17 | first | earliest |
| 18 | call | telephone |
| 19 | after | behind |
| 20 | find | discover |
| 21 | thing | article |
| 22 | did | accomplished |
| 23 | come | arrive |
| 24 | little | tiny |
| 25 | good | positive |
| 26 | work | labor |
| 27 | take | rob |
| 28 | only | just |
| 29 | know | understand |
| 30 | place | position |

THIRD GRADE VOCABULARY (MAX)

| | | |
|---|---|---|
| 1 | also | furthermore |
| 2 | own | possess |
| 3 | said | announced |
| 4 | live | exist |
| 5 | increase | gain |
| 6 | contract | agreement |
| 7 | make | create |
| 8 | like | prefer |
| 9 | owns | possesses |
| 10 | look | observe |
| 11 | more | additional |
| 12 | write | author |
| 13 | disappear | vanish |
| 14 | around | surrounding |
| 15 | people | individuals |
| 16 | first | primary |
| 17 | call | invite |
| 18 | now | immediately |
| 19 | find | locate |
| 20 | long | lengthy |
| 21 | sad | gloomy |
| 22 | small | brief |
| 23 | part | separate |
| 24 | right | correct |
| 25 | new | unused |
| 26 | sound | tone |
| 27 | take | seize |
| 28 | only | merely |
| 29 | opinion | judgment |
| 30 | very | unusually |

FOURTH GRADE VOCABULARY (MAX)

| | | |
|---|---|---|
| 1 | many | numerous |
| 2 | kind | charitable |
| 3 | make | assemble |
| 4 | call | summon |
| 5 | immediately | promptly |
| 6 | gloomy | bleak |
| 7 | change | alter |
| 8 | get | acquire |
| 9 | part | divide |
| 10 | try | strain |
| 11 | take | grab |
| 12 | only | sole |
| 13 | work | grind |
| 14 | different | contrary |
| 15 | live | endure |
| 16 | give | contribute |
| 17 | most | superior |
| 18 | just | virtuous |
| 19 | sentence | judgment |

Appendix B
Word List for Canine Crew

| | | | | | |
|---|---|---|---|---|---|
| 20 | great | magnificent | 2 | strength | weakness |
| 21 | benefit | assist | 3 | alive | dead |
| 22 | correct | remedy | 4 | ancient | modern |
| 23 | same | constant | 5 | argue | agree |
| 24 | tell | reveal | 6 | bare | covered |
| 25 | form | outline | 7 | bent | straight |
| 26 | thin | slight | 8 | bitter | sweet |
| 27 | completion | outcome | 9 | steal | provide |
| | | | 10 | brief | long |
| 28 | large | vast | 11 | silence | sound |
| 29 | comparable | similar | 12 | cheap | expensive |
| | | | 13 | chilly | warm |
| 30 | ask | request | 14 | command | obey |
| | | | 15 | continue | interrupt |
| | | | 16 | curse | bless |

Antonym pairs
INSTRUCTIONS FOR ANTONYM PAIRS
Click on a word. Then, click on another word that is an antonym to the first. Antonyms are words that mean the opposite of each other.

| | | | | | |
|---|---|---|---|---|---|
| | | | 17 | destroy | create |
| | | | 18 | hire | fire |
| | | | 19 | individual | group |
| | | | 20 | let | prevent |
| | | | 21 | liquid | solid |
| | | | 22 | loose | tight |
| | | | 23 | mix | separate |

SECOND GRADE VOCABULARY (MAX)

| | | | | | |
|---|---|---|---|---|---|
| 1 | to | from | 24 | panic | calm |
| 2 | in | out | 25 | union | separation |
| 3 | he | she | 26 | private | public |
| 4 | on | off | 27 | student | teacher |
| 5 | with | without | 28 | reduce | increase |
| 6 | after | before | 29 | servant | master |
| 7 | one | several | 30 | shame | honor |
| 8 | all | none | | | |
| 9 | there | here | FOURTH GRADE VOCABULARY (MAX) | | |
| 10 | up | down | 1 | profit | loss |
| 11 | same | different | 2 | adore | hate |
| 12 | useful | useless | 3 | advance | retreat |
| 13 | good | bad | 4 | allow | forbid |
| 14 | more | less | 5 | amuse | bore |
| 15 | go | come | 6 | beautiful | ugly |
| 16 | no | yes | 7 | brave | cowardly |
| 17 | first | last | 8 | break | repair |
| 18 | now | then | 9 | busy | idle |
| 19 | find | lose | 10 | constant | variable |
| 20 | long | short | 11 | deep | shallow |
| 21 | day | night | 12 | rare | common |
| 22 | get | give | 13 | greedy | generous |
| 23 | part | whole | 14 | rapid | slow |
| 24 | over | under | 15 | gloomy | cheerful |
| 25 | new | old | 16 | polite | rude |
| 26 | little | big | 17 | height | width |
| 27 | work | play | 18 | hero | coward |
| 28 | live | die | 19 | discourage | encourage |
| 29 | back | front | 20 | tame | wild |
| 30 | most | least | 21 | knowledge | ignorance |

THIRD GRADE VOCABULARY (MAX)

| | | | | | |
|---|---|---|---|---|---|
| | | | 22 | maintain | discontinue |
| 1 | vanish | appear | 23 | male | female |

Appendix B
Word List for Canine Crew

| | | | | | | |
|---|---|---|---|---|---|---|
| 24 | marvelous | terrible | | 8 | choose | chews |
| 25 | melt | freeze | | 9 | scent | cent |
| 26 | moist | dry | | 10 | whose | who's |
| 27 | offend | please | | 11 | cheap | cheep |
| 28 | often | seldom | | 12 | fair | fare |
| 29 | particular | general | | 13 | flower | flour |
| 30 | polish | dull | | 14 | groan | grown |
| | | | | 15 | guest | guessed |
| | | | | 16 | hare | hair |

Homophones

INSTRUCTIONS FOR HOMOPHONE PAIRS
Click on a word. Then, click on another word that is a homophone to the first. Homophones are words that sound the same but mean different things.

| | | | | | | |
|---|---|---|---|---|---|---|
| | | | | 17 | find | fined |
| | | | | 18 | he'll | heal |
| | | | | 19 | fourth | forth |
| | | | | 20 | higher | hire |
| | | | | 21 | lessen | lesson |
| | | | | 22 | mane | main |
| | | | | 23 | throne | thrown |

SECOND GRADE VOCABULARY (MAX)

| | | | | | | |
|---|---|---|---|---|---|---|
| 1 | see | sea | | 24 | pail | pale |
| 2 | feet | feat | | 25 | pause | paws |
| 3 | too | two | | 26 | rap | wrap |
| 4 | you | yew | | 27 | side | sighed |
| 5 | for | four | | 28 | stare | stair |
| 6 | I | eye | | 29 | steal | steel |
| 7 | be | bee | | 30 | tale | tail |
| 8 | or | oar | | | | |

FOURTH GRADE VOCABULARY (MAX)

| | | | | | | |
|---|---|---|---|---|---|---|
| 9 | one | won | | 1 | in | inn |
| 10 | by | bye | | 2 | great | grate |
| 11 | sent | cent | | 3 | oar | ore |
| 12 | there | their | | 4 | not | knot |
| 13 | tied | tide | | 5 | read | reed |
| 14 | steak | stake | | 6 | need | knead |
| 15 | tacks | tax | | 7 | muscle | mussel |
| 16 | due | dew | | 8 | prey | pray |
| 17 | so | sew | | 9 | morning | mourning |
| 18 | some | sum | | 10 | beach | beech |
| 19 | wood | would | | 11 | coarse | course |
| 20 | way | weigh | | 12 | pear | pair |
| 21 | sun | son | | 13 | alter | altar |
| 22 | its | it's | | 14 | aloud | allowed |
| 23 | new | knew | | 15 | overseas | oversees |
| 24 | no | know | | 16 | beat | beet |
| 25 | peace | piece | | 17 | bread | bred |
| 26 | threw | through | | 18 | ceiling | sealing |
| 27 | right | write | | 19 | chili | chilly |
| 28 | hear | here | | 20 | creak | creek |
| 29 | heard | herd | | 21 | fowl | foul |
| 30 | hi | high | | 22 | reign | rein |
| | | | | 23 | hall | haul |

THIRD GRADE VOCABULARY (MAX)

| | | | | | | |
|---|---|---|---|---|---|---|
| 1 | made | maid | | 24 | waist | waste |
| 2 | bear | bare | | 25 | peek | peak |
| 3 | shown | shone | | 26 | pier | peer |
| 4 | oh | owe | | 27 | heed | he'd |
| 5 | week | weak | | 28 | loan | lone |
| 6 | attendants | attendance | | 29 | male | mail |
| 7 | berry | bury | | 30 | massed | mast |

Appendix C
List for Chicken Dog

| | | | |
|---|---|---|---|
| able | book | cry | freshwater |
| about | both | daughter | friendship |
| above | boy | days | frog |
| across | bragging | delete | from |
| action | branch | department | front |
| address | breakfast | destroy | fudge |
| again | bridge | different | full |
| against | broil | display | further |
| age | brought | does | future |
| ahead | bug | done | fuzz |
| all | bump | door | general |
| alone | business | down | genius |
| along | buzz | dragon | get |
| already | calendar | dress | gift |
| always | came | dropped | giraffe |
| am | camp | during | girl |
| amateur | can | early | given |
| among | cannot | economic | glad |
| amount | car | education | globe |
| amphibian | case | effect | gloves |
| and | center | either | going |
| annual | certain | electric | golf |
| anything | chalk | elephant | good |
| approached | change | elf | got |
| are | channel | enjoy | government |
| areas | check | entrance | grab |
| armadillo | child | every | great |
| around | children | example | grew |
| art | chin | excuse | group |
| asked | chipmunk | experience | had |
| autumn | church | explode | hands |
| away | citizen | extreme | handsome |
| awful | city | face | has |
| ax | clear | family | haul |
| back | cliff | far | having |
| balloon | clock | fault | head |
| bathtub | close | felt | heard |
| became | coin | feud | help |
| because | college | few | her |
| been | command | fiddle | here |
| before | community | figure | high |
| began | company | first | himself |
| behind | complain | five | his |
| believe | conclude | fix | history |
| best | control | fizz | home |
| better | cost | flag | honk |
| between | could | flight | horizon |
| bib | country | flower | house |
| big | course | flute | however |
| birthday | courtroom | fly | human |
| black | cracker | folksong | idea |
| blackberry | craft | following | if |
| blanket | crash | footstep | immediate |
| blazing | crawling | for | important |
| blue | creek | found | increase |
| board | crop | free | increased |

Appendix C
List for Chicken Dog

| | | | |
|---|---|---|---|
| individual | miss | point | should |
| information | missing | poison | show |
| ingredient | modern | political | shriek |
| interest | money | position | shrub |
| into | more | possible | shrug |
| itself | morning | power | since |
| jail | most | present | situation |
| jazz | mother | president | skateboard |
| job | much | probably | skeleton |
| join | mushroom | problem | skin |
| juice | music | process | sleep |
| jump | my | project | sleuth |
| just | nab | provide | slow |
| justice | name | public | sly |
| keep | national | pudding | small |
| kilometer | nature | puff | smoke |
| kind | near | punching | smooth |
| kitchen | necessary | put | snap |
| knee | nephew | queen | sneak |
| knife | neutral | question | snowstorm |
| knock | never | quite | soap |
| known | new | raccoon | soccer |
| knuckle | next | raincoat | socks |
| large | nothing | rather | some |
| last | now | real | somehow |
| later | number | really | something |
| law | occupy | reason | sometimes |
| lawn | off | relax | soon |
| least | office | reply | sound |
| leave | often | result | special |
| left | once | right | spin |
| less | only | roads | splash |
| life | open | room | splendid |
| like | opposite | royal | split |
| lines | other | rule | sponge |
| little | our | run | spray |
| lobster | outside | said | sprinkle |
| local | over | salt | spruce |
| lodging | overload | saw | square |
| longer | party | says | squeak |
| look | peaches | scare | squid |
| looked | people | scarecrow | stalk |
| mailbox | peppermint | scarlet | started |
| majesty | perfume | school | state |
| major | perhaps | scout | states |
| make | period | scramble | still |
| making | personal | scrap | stir |
| maneuver | pharmacy | screwdriver | stomp |
| many | pheasant | second | stood |
| matter | phone | seems | story |
| members | photo | seen | strawberry |
| might | physical | several | street |
| military | piecrust | shall | strong |
| million | place | she | struggle |
| mind | plan | shirt | students |
| minutes | play | short | study | ii

Appendix C
List for Chicken Dog

| | |
|---|---|
| stuff | upon |
| subtract | us |
| suggest | use |
| supper | usually |
| surface | value |
| swallow | various |
| sweets | very |
| swift | view |
| swim | voice |
| system | volume |
| table | walkway |
| taken | want |
| talking | watermelon |
| telephone | way |
| tell | weight |
| than | well |
| thank | were |
| the | west |
| their | what |
| them | white |
| theme | who |
| themselves | whole |
| therefore | why |
| these | wife |
| thick | wilt |
| thing | without |
| things | women |
| think | world |
| this | wreath |
| those | wrinkle |
| though | wrist |
| thought | written |
| three | wrong |
| thrill | years |
| through | yet |
| throughout | yolk |
| today | young |
| together | yours |
| too | zero |
| took | zipper |
| top | zone |
| total | |
| toward | |
| town | |
| toy | |
| tractor | |
| tricycle | |
| turn | |
| turned | |
| type | |
| umpire | |
| under | |
| united | |
| university | |
| until | |
| up | |

Appendix C
List for Chicken Dog

| 1_1 | Beginning Consonants: b, c, d, f, g, h, j, k, l, m, n, p, r, s, t, v, w, y, z |
|---|---|
| b, d, p, g, t, pl, br | |
| <u>b</u>een | |
| <u>b</u>elieve | |
| <u>b</u>oth | |
| c, b, e, t, gl, k, cl | |
| <u>c</u>ame | |
| <u>c</u>ost | |
| <u>c</u>ould | |
| d, b, p, c, t, th, bl | |
| <u>d</u>ays | |
| <u>d</u>one | |
| <u>d</u>oor | |
| f, h, l, th, v, sh, ph | |
| <u>f</u>ace | |
| <u>f</u>ound | |
| <u>f</u>uture | |
| g, p, y, d, qu, k, ch | |
| <u>g</u>et | |
| <u>g</u>iven | |
| <u>g</u>oing | |
| h, l, n, th, ph, y, wh | |
| <u>h</u>ands | |
| <u>h</u>eard | |
| <u>h</u>igh | |
| j, i, y, g, ch, d, sh | |
| <u>j</u>oin | |
| <u>j</u>uice | |
| <u>j</u>ustice | |
| k, d, h, g, ch, c, gr | |
| <u>k</u>ilometer | |
| <u>k</u>ind | |
| <u>k</u>itchen | |
| l, h, f, r, w, th, sh | |
| <u>l</u>eave | |
| <u>l</u>onger | |
| <u>l</u>arge | |
| m, w, u, n, b, mn, pn | |
| <u>m</u>odern | |
| <u>m</u>ost | |
| <u>m</u>ake | |
| n, w, u, m, b, mn, pn | |
| <u>n</u>ext | |
| <u>n</u>othing | |
| <u>n</u>ear | |
| p, b, d, g, k, pr, gr | |
| <u>p</u>osition | |
| <u>p</u>ut | |
| <u>p</u>eople | |
| r, n, t, l, z, br, fl | |
| <u>r</u>ather | |
| <u>r</u>eal | |
| <u>r</u>ight | |
| s, e, c, f, z, sl, sc | |
| <u>s</u>everal | |
| <u>s</u>ome | |
| <u>s</u>ystem | |
| t, f, r, g, d, ch, tr | |
| <u>t</u>oo | |
| <u>t</u>oward | |
| <u>t</u>urned | |
| v, h, u, w, ph, f, th | |
| <u>v</u>ery | |
| <u>v</u>iew | |
| <u>v</u>olume | |
| w, m, v, y, l, sw, th | |
| <u>w</u>ere | |
| <u>w</u>orld | |
| <u>w</u>omen | |
| y, v, j, r, l, w, fr | |
| <u>y</u>ears | |
| <u>y</u>oung | |
| <u>y</u>ours | |
| z, s, y, v, sh, ch, sl | |
| <u>z</u>ero | |
| <u>z</u>ipper | |
| <u>z</u>one | |
| 1_2 | Beginning Blends: bl, cl, fl, gl, pl, sl, br, cr, dr, fr, gr, pr, tr, sc, sk, sm, sn, sp, st, sw |
| bl, pl, br, gr, fl, g, b | |
| <u>bl</u>ue | |
| <u>bl</u>ack | |
| <u>bl</u>anket | |
| cl, el, d, bl, gl, cr, chl | |
| <u>cl</u>ock | |
| <u>cl</u>ear | |
| <u>cl</u>ose | |
| fl, bl, b, sl, v, s, f | |
| <u>fl</u>ight | |
| <u>fl</u>ower | |
| <u>fl</u>y | |
| gl, pl, p, bl, cl, ch, g | |
| <u>gl</u>ad | |
| <u>gl</u>oves | |
| <u>gl</u>obe | |

Appendix C
List for Chicken Dog

| pl, gl, g, gr, sl, cr, p | |
|---|---|
| place | |
| plan | |
| play | |

| sl, sh, st, f, sw, s, l | |
|---|---|
| sleep | |
| slow | |
| sly | |

| br, dr, pr, d, p, pl, r | |
|---|---|
| branch | |
| breakfast | |
| brought | |

| cr, er, cl, tr, gr, r, k | |
|---|---|
| crash | |
| creek | |
| crop | |

| dr, b, pr, br, w, r, d | |
|---|---|
| dragon | |
| dress | |
| dropped | |

| fr, t, tr, thr, v, ph, f | |
|---|---|
| free | |
| from | |
| front | |

| gr, pn, gn, dr, cr, chr, scr | |
|---|---|
| grab | |
| great | |
| group | |

| pr, br, g, gh, ph, r, f | |
|---|---|
| present | |
| problem | |
| provide | |

| tr, f, th, pr, dr, l, r | |
|---|---|
| tractor | |
| tricycle | |
| true | |

| sc, se, sr, st, sk, scr, sch | |
|---|---|
| scare | |
| scarlet | |
| scout | |

| sk, sh, s, t, sc, g, k | |
|---|---|
| skin | |
| skateboard | |
| skeleton | |

| sm, sw, sn, w, spr, spl, | |
|---|---|
| small | |
| smoke | |
| smooth | |

| sn, su, sh, sm, n, f, z | |
|---|---|
| snap | |
| sneak | |
| snowstorm | |

| sp, b, sc, c, ch, st, s | |
|---|---|
| special | |
| spin | |
| sponge | |

| st, sh, sl, sp, sc, sch, spr | |
|---|---|
| state | |
| still | |
| students | |

| sw, sm, sn, sl, w, z, y | |
|---|---|
| swallow | |
| sweets | |
| swim | |

| 1_3 | Beginning Consonants: qu, c:cent, g:gent Beginning Blends: scr, spr, spl, str, squ, shr, thr |
|---|---|

| qu, p, g, c, cw, cl, kw | |
|---|---|
| queen | |
| question | |
| quite | |

| c, e, s, ph, g, sc, th | |
|---|---|
| center | |
| certain | |
| city | |

| g, j, y, ch, d, c, qu | |
|---|---|
| general | |
| genius | |
| giraffe | |

| scr, ser, son, str, squ, sn, sk | |
|---|---|
| scramble | |
| scrap | |
| screwdriver | |

| spr, br, shr, str, fr, tr, pr | |
|---|---|
| spray | |
| sprinkle | |
| spruce | |

| spl, squ, spr, z, sl, shr, bl | |
|---|---|
| splash | |
| splendid | |
| split | |

| str, shr, scr, spl, sw, thr, st | |
|---|---|
| strawberry | |
| street | |
| strong | |

| squ, spu, spr, st, sc, spl, sw | |
|---|---|
| square | |
| squeak | |
| squid | |

| shr, chr, spr, tr, ch, thr, sh | |
|---|---|

Appendix C
List for Chicken Dog

| | | | | |
|---|---|---|---|---|
| shriek | | | wrong | |
| shrub | | | kn, h, kr, m, wr, l, n | |
| shrug | | | knock | |
| thr, chr, th, tr, sh, str, ph | | | knee | |
| three | | | knife | |
| thrill | | | known | |
| through | | | knuckle | |
| 1_4 | Digraphs: ch, sh, th, wh, ph Silent Letters: wr, kn | | 2_1 | Ending Consonants: b, d, g, m, n, p, t, s:/s/ |
| | | | b, d, p, g, t, m, st | |
| | | | bib | |
| | | | bathtub | |
| | | | job | |
| | | | nab | |
| ch, sh, cl, j, kn, th, g | | | d, b, p, t, g, th, ch | |
| change | | | asked | |
| check | | | had | |
| child | | | head | |
| chin | | | period | |
| church | | | g, d, p, t, dd, ck, gg | |
| sh, ch, sl, th, c, j, s | | | big | |
| shall | | | bug | |
| she | | | flag | |
| short | | | frog | |
| should | | | m, w, u, n, b, ll, nn | |
| show | | | am | |
| th, f, ch, ph, tr, z, v | | | from | |
| than | | | problem | |
| the | | | room | |
| their | | | n, u, w, m, r, nn, ng | |
| this | | | can | |
| though | | | situation | |
| th, tu, v, sh, wh, ph, w | | | human | |
| thing | | | upon | |
| think | | | p, b, d, t, ck, g, ff | |
| thought | | | group | |
| through | | | keep | |
| three | | | top | |
| wh, m, wr, r, sh, th, w | | | up | |
| what | | | s, e, c, th, sh, d, ce | |
| white | | | perhaps | |
| who | | | this | |
| whole | | | us | |
| why | | | various | |
| ph, pl, ch, th, kn, v, f | | | t, f, l, p, b, d, ch | |
| pharmacy | | | against | |
| pheasant | | | great | |
| phone | | | without | |
| photo | | | yet | |
| physical | | | 2_2 | Ending Consonants: |
| wr, m, wh, l, sl, fr, r | | | | |
| wrist | | | | |
| wreath | | | | |
| wrinkle | | | | |
| written | | | | |

Appendix C
List for Chicken Dog

| | x, zz, ff, ll, ss, s:/z/, s:/s/plural, s:/z/plural/ |
|---|---|
| x, k, y, ch, gs, zz, cks | |
| ax | |
| fix | |
| mailbox | |
| relax | |
| zz, ss, z, s, ff, ve, r | |
| buzz | |
| fizz | |
| fuzz | grade = ? |
| jazz | grade = ? |
| ff, ll, f, th, ss, ph, l | |
| cliff | |
| off | |
| puff | |
| stuff | |
| ll, ff, lt, th, ng, f, l | |
| all | |
| full | |
| small | |
| tell | |
| ss, zz, se, ve, z, x, s | |
| process | |
| business | |
| less | |
| miss | |
| s, e, z, es, ss, zz, ez | /z/ |
| always | |
| does | |
| his | |
| seems | |
| s, e, z, x, ss, es, zz | /s/ plural |
| minutes | |
| socks | |
| states | |
| students | |
| s, z, e, ve, es, ss, zz | /z/ plural |
| areas | |
| lines | |
| themselves | |
| things | |
| 2_3 | Ending Blends: mp, nd, ft, lt, nt, lf, st, nk, ng |
| mp, mb, nd, nk, p, n, b | |
| bump | |
| camp | |
| jump | |
| stomp | |

| nd, up, mb, nk, mp, b, n | |
|---|---|
| and | |
| around | |
| mind | |
| second | |
| ft, lf, ff, ck, lt, st, s | |
| craft | |
| gift | |
| left | |
| swift | |
| lt, lf, ft, t, r, nd, d | |
| felt | |
| result | |
| salt | |
| wilt | |
| nt, uf, rt, m, mp, nd, d | |
| government | |
| important | |
| point | |
| want | |
| lf, ff, lt, ve, ph, f, w | |
| elf | |
| golf | |
| himself | |
| itself | |
| st, ef, sh, lf, sp, ft, f | |
| first | |
| interest | |
| last | |
| west | |
| nk, ut, nt, rt, mp, ng, t | |
| honk | |
| thank | |
| think | |
| chipmunk | |
| ng, np, mp, m, un, g, n | |
| along | |
| among | |
| something | |
| following | |
| 2_4 | Silent Letters: ck, lk |
| ck, ch, sk, t, ct, lk, k | |
| back | |
| clock | |
| thick | |
| lk, lf, k, ut, ck, g, c | |
| yolk | |
| walk | |
| chalk | |
| 3_1 | Single Consonants: |

Appendix C
List for Chicken Dog

| | b, c, d, f, g, h, j, k, l, m, n, p, r, s, t, v, w, z |
|---|---|
| b, d, p, dd, v, m, ff | |
| a<u>b</u>out | |
| a<u>b</u>ove | |
| pro<u>b</u>ably | |
| c, e, s, lk, g, k, ck | |
| edu<u>c</u>ation | |
| be<u>c</u>ame | |
| lo<u>c</u>al | |
| d, b, p, g, tt, t, bb | |
| alrea<u>d</u>y | |
| i<u>d</u>ea | |
| presi<u>d</u>ent | |
| f, t, l, th, v, s, ph | |
| be<u>f</u>ore | |
| li<u>f</u>e | |
| there<u>f</u>ore | |
| g, p, j, d, dj, ck, gg | |
| a<u>g</u>e | |
| fi<u>g</u>ure | |
| to<u>g</u>ether | |
| h, n, b, th, w, f, ll | |
| a<u>h</u>ead | |
| be<u>h</u>ind | |
| some<u>h</u>ow | |
| j, g, y, sh, ch, z, dj | |
| ma<u>j</u>esty | |
| ma<u>j</u>or | |
| pro<u>j</u>ect | |
| k, h, f, ch, g, c, ck | |
| loo<u>k</u>ed | |
| ma<u>k</u>ing | |
| ta<u>k</u>en | |
| l, t, f, w, r, tt, ll | |
| mi<u>l</u>itary | |
| po<u>l</u>itical | |
| va<u>l</u>ue | |
| m, n, w, nn, v, b, rr | |
| me<u>m</u>bers | |
| fa<u>m</u>ily | |
| hu<u>m</u>an | |
| n, u, r, m, d, v, nn | |
| mo<u>n</u>ey | |
| natio<u>n</u>al | |
| u<u>n</u>ited | |
| p, d, b, c, dd, t, cc | |
| de<u>p</u>artment | |
| o<u>p</u>en | |
| ty<u>p</u>e | |
| r, n, f, nt, nn, m, rt | |

| | |
|---|---|
| diffe<u>r</u>ent | |
| expe<u>r</u>ience | |
| pe<u>r</u>iod | |
| s, c, z, th, j, ch, sh | |
| mu<u>s</u>ic | |
| po<u>s</u>ition | |
| rea<u>s</u>on | |
| t, f, l, pp, ch, d, dd | |
| to<u>t</u>al | |
| uni<u>t</u>ed | |
| some<u>t</u>imes | |
| v, u, y, th, b, f, ff | |
| ha<u>v</u>ing | |
| indi<u>v</u>idual | |
| ne<u>v</u>er | |
| w, m, u, v, ll, r, ff | |
| a<u>w</u>ay | |
| follo<u>w</u>ing | |
| po<u>w</u>er | |
| z, s, r, c, sh, j, zz | |
| bla<u>z</u>ing | |
| citi<u>z</u>en | |
| hori<u>z</u>on | |
| 3_2 | Two Consonants: bl, cr, mp, nc, nd, nt, rm, rs, rt, st |
| bl, pl, ph, d, l, mp, b | |
| possi<u>bl</u>e | |
| pro<u>bl</u>em | |
| ta<u>bl</u>e | |
| cr, sr, c, kw, cl, nc, chr | |
| a<u>cr</u>oss | |
| pie<u>cr</u>ust | |
| scare<u>cr</u>ow | |
| mp, nb, np, m, b, nd, p | |
| co<u>mp</u>any | |
| i<u>mp</u>ortant | |
| u<u>mp</u>ire | |
| nc, no, c, ns, sh, rs, s | |
| experie<u>nc</u>e | |
| o<u>nc</u>e | |
| si<u>nc</u>e | |
| nd, mp, nt, rd, t, rt, m | |
| cale<u>nd</u>ar | |
| indivi<u>d</u>ual | |
| u<u>nd</u>er | |
| nt, mt, rt, md, nd, nc, t | |
| i<u>nt</u>o | |
| u<u>nt</u>il | |
| ce<u>nt</u>er | |
| rm, rn, mm, r, w, rt, n | |

Appendix C
List for Chicken Dog

| | |
|---|---|
| armadillo<br>information<br>watermelon | |
| rs, sr, rc, rch, rth, rt, str | |
| course<br>personal<br>university | |
| rt, rf, tr, d, t, rm, rth | |
| certain<br>party<br>started | |
| st, ts, cr, sch, nt, z, tst | |
| history<br>question<br>system | |
| 3_3 | Three Consonants: btr, bst, ctr, rtm, ldr, ncl, ncr, nds, ngr, ntr, rnm, rtr, spl, str, tst, xpl |
| btr, dtr, bst, dr, pr, br, tr | |
| subtract | |
| bst, dst, btr, spt, pst, wsd, sd | |
| lobster | |
| ctr, chr, ckr, gr, ntr, dr, gr | |
| electric | |
| rtm, rtr, ntr, rd, rnm, dm, nd | |
| department | |
| ldr, lbr, ddr, rd, ntr, lt, dr | |
| children | |
| ncl, nch, ncr, ngr, ngl, ntr, ng | |
| conclude | |
| ncr, ner, nor, chr, gr, ngr, ng | |
| increase | |
| nds, mps, ngs, ns, nts, str, mb | |
| handsome | |
| ngr, npr, ncr, nc, ntr, ctr, ng | |
| ingredient | |
| ntr, nfr, rtr, ncr, ncl, mt, fr | |
| control<br>country<br>entrance | |
| rnm, rum, mm, mr, rtm, rtr, rm | |
| government | |

| | |
|---|---|
| rtr, rtm, ntr, nt, rd, str, dr | |
| courtroom | |
| spl, sph, sgl, zbl, str, tst, zl | |
| display | |
| str, shr, rst, tst, sdr, ctr, dr | |
| destroy | |
| tst, fst, tsh, bs, dst, str, zt | |
| footstep | |
| xpl, xbl, ksb, csb, sgl, csp, xp | |
| explode | |
| 3_4 | Digraphs and Silent Letters in Vowel or Consonant Contexts: ch, ck, dg, gh, lk, sh, th, ph |
| ch, sh, ck, g, tch, dg, x | |
| peaches<br>approached<br>punching | |
| ck, ek, ch, g, nk, lk, k | |
| blackberry<br>cracker<br>knuckle | |
| dg, gh, dj, g, j, tsh, tch | |
| bridge<br>fudge<br>lodging | |
| gh, ph, gl, dg, f, h, l | |
| throughout<br>weight<br>might | |
| lk, lf, lx, ck, uk, gh, k | |
| folksong<br>talking<br>walkway | |
| sh, sn, sl, c, ch, th, s | |
| freshwater<br>friendship<br>mushroom | |
| th, sh, tl, f, v, gh, d | |
| anything<br>either<br>further | |
| ph, gh, p, th, sh, v, f | |
| amphibian<br>elephant<br>telephone | |

Appendix C
List for Chicken Dog

| 3_5 | Double Consonants, One Phoneme: cc, dd, ff, gg, ll, mm, nn, pp, ss, tt |
|---|---|
| cc, oc, c, ck, g, gg, k | |
| o<u>cc</u>upy | |
| ra<u>cc</u>oon | |
| so<u>cc</u>er | |
| dd, pp, bb, p, gg, t, d | |
| a<u>dd</u>ress | |
| fi<u>dd</u>le | |
| pu<u>dd</u>ing | |
| ff, tt, f, th, ss, ph, v | |
| di<u>ff</u>erent | |
| e<u>ff</u>ect | |
| o<u>ff</u>ice | |
| gg, pp, g, bb, ck, cc, j | |
| bra<u>gg</u>ing | |
| stru<u>gg</u>le | |
| su<u>gg</u>est | |
| ll, lf, ff, w, wl, r, l | |
| mi<u>ll</u>ion | |
| rea<u>ll</u>y | |
| usua<u>ll</u>y | |
| mm, nn, nm, n, ng, mn, m | |
| co<u>mm</u>unity | |
| i<u>mm</u>ediate | |
| co<u>mm</u>and | |
| nn, m, mn, nm, mm, ng, n | |
| a<u>nn</u>ual | |
| ca<u>nn</u>ot | |
| cha<u>nn</u>el | |
| pp, bb, dd, t, tt, d, p | |
| o<u>pp</u>osite | |
| pe<u>pp</u>ermint | |
| su<u>pp</u>er | |
| ss, cc, rr, ff, th, f, s | |
| mi<u>ss</u>ing | |
| nece<u>ss</u>ary | |
| po<u>ss</u>ible | |
| tt, bb, t, pp, dd, d, p | |
| be<u>tt</u>er | |
| li<u>tt</u>le | |
| ma<u>tt</u>er | |
| 4_1 | Short Vowels: a, e, i, o, u |
| a, o, e, u, i, au, eu | |
| <u>a</u>ction | |
| beg<u>a</u>n | |
| ex<u>a</u>mple | |
| f<u>a</u>mily | |
| h<u>a</u>s | |
| e, o, a, u, i, au, eu | |
| b<u>e</u>st | |
| <u>e</u>conomic | |
| h<u>e</u>lp | |
| th<u>e</u>m | |
| w<u>e</u>ll | |
| i, I, t, e, a, u, oo | |
| h<u>i</u>story | |
| <u>i</u>f | |
| <u>i</u>mportant | |
| l<u>i</u>ttle | |
| publ<u>i</u>c | |
| o, a, e, i, u, aw, oo | |
| m<u>o</u>dern | |
| <u>o</u>ften | |
| c<u>o</u>llege | |
| g<u>o</u>t | |
| up<u>o</u>n | |
| u, n, a, a_e, u_e, o_e, oo | |
| j<u>u</u>st | |
| m<u>u</u>ch | |
| n<u>u</u>mber | |
| r<u>u</u>n | |
| st<u>u</u>dy | |
| 4_2 | Long Vowels with Final "e": a_e, e_e, i_e, o_e, u_e |
| a_e, e_e, o_e, ai, e, ei, a | |
| <u>able</u> | |
| c<u>ase</u> | |
| st<u>ate</u> | |
| n<u>ame</u> | |
| pl<u>ace</u> | |
| e_e, a_e, e_o, ai, e, ei, y | |
| del<u>ete</u> | |
| extr<u>eme</u> | |
| h<u>ere</u> | |
| th<u>eme</u> | |
| th<u>ese</u> | |
| i_e, h, i_o, a_e, e_e, i, a | |
| f<u>ive</u> | |
| l<u>ike</u> | |
| outs<u>ide</u> | |
| qu<u>ite</u> | |
| w<u>ife</u> | |
| o_e, o_c, e_e, e, eu, ow, o | |
| al<u>one</u> | |
| cl<u>ose</u> | |
| h<u>ome</u> | |

Appendix C
List for Chicken Dog

| | | | |
|---|---|---|---|
| those <br> whole | | y, u, uy, ie, ye, oi, i | |
| u_e, u_e, ue, ou, oo, ew, o | | cry <br> my <br> reply <br> type <br> why | |
| excuse <br> flute <br> perfume <br> rule <br> use | | au, ou, aw, ew, eu, a, o | |
| | | autumn <br> because <br> daughter <br> fault <br> haul | |
| 4_3 | Vowel Digraphs: ai, ay, oa, ea, ee | aw, au, ew, eu, ou, a, o | |
| ai, ei, ia, a_e, i_e, e_e, e | | awful <br> crawling <br> law <br> lawn <br> saw | |
| again <br> complain <br> certain <br> jail <br> said | | ew, ow, eu, oo, ou, u, y | |
| | | few <br> screwdriver <br> grew <br> new <br> nephew | |
| ay, ey, au, ai, y, e, a | | eu, ou, ew, oo, io, u, e | |
| always <br> play <br> says <br> today <br> way | | amateur <br> sleuth <br> feud <br> maneuver <br> neutral | grade=5 <br> grade=7 <br> grade=6 <br> grade=7 <br> grade=6 |
| oa, oe, ea, o_e, e_e, ow, eau | | oo, o, ou, eu, o_e, u_e, u | |
| board <br> raincoat <br> overload <br> roads <br> soap | | balloon <br> room <br> school <br> smooth <br> soon | |
| ea, ee, ae, a, eu, i, e | | ou, ow, on, aw, au, o, u | |
| early <br> great <br> increased <br> least <br> really | | amount <br> house <br> our <br> outside <br> sound | |
| ee, ea, oa, i, ay, y, e | | ow, ou, oy, aw, o, au, u | |
| between <br> queen <br> seen <br> street <br> three | | down <br> however <br> now <br> power <br> town | |
| 4_4 | Long Vowels: y:sky Vowel Digraphs: au, aw, oo:boot, eu, ew Diphthongs: ou, ow, oi, oy | oi, io, ei, ey, oy, eu, y | |
| | | broil <br> coin <br> point <br> poison <br> voice | |

Appendix C
List for Chicken Dog

| oy, ey, ow, ei, oi, oe, y | |
|---|---|
| b<u>oy</u><br>destr<u>oy</u><br>enj<u>oy</u><br>r<u>oy</u>al<br>t<u>oy</u> | |
| 4_5 | Long Vowels:<br>y:happy<br>Vowel Digraphs:<br>oo:foot<br>r control: ar, er, ir, or, ur |
| y, w, ey, eu, ee, ie, i | |
| an<u>y</u>thing<br>ever<u>y</u><br>man<u>y</u><br>onl<u>y</u><br>probabl<u>y</u> | |
| oo, o, oa, o_e, eu, u_e, u | |
| b<u>oo</u>k<br>g<u>oo</u>d<br>l<u>oo</u>k<br>st<u>oo</u>d<br>t<u>oo</u>k | |
| ar, or, er, ur, ir, aur, ear | |
| <u>ar</u>e<br><u>ar</u>t<br>c<u>ar</u><br>f<u>ar</u><br>p<u>ar</u>ty | |
| er, or, ar, ir, ur, ear, aur | |
| h<u>er</u><br>moth<u>er</u><br>oth<u>er</u><br>ov<u>er</u><br>lat<u>er</u> | |
| ir, ur, ri, ro, er, ar, oor | |
| b<u>ir</u>thday<br>f<u>ir</u>st<br>g<u>ir</u>l<br>sh<u>ir</u>t<br>st<u>ir</u> | |
| or, un, er, ar, ir, eur, oar | |
| f<u>or</u><br>imp<u>or</u>tant<br>m<u>or</u>e<br>m<u>or</u>ning<br>st<u>or</u>y | |
| ur, ar, un, ri, or, ir, oor | |
| nat<u>ur</u>e<br>d<u>ur</u>ing<br>f<u>ur</u>ther | |

| s<u>ur</u>face | |
|---|---|
| t<u>ur</u>n | | xii

Appendix C
List for Chicken Dog

Ending Consonant I s (regular) s (z sound)

KINDERGARTEN WORDS

| s (regular) | | s (z sound) | | |
|---|---|---|---|---|
| this | its | is | ours | days |
| us | | as | hers | things |
| likes | | was | says | eyes |
| makes | | his | always | loses |
| yes | | has | yours | |

FIRST GRADE WORDS

| s (regular) | | s (z sound) | | |
|---|---|---|---|---|
| circus | handcuffs | does | elves | themselves |
| it's | let's | news | finances | |
| gas | socks | downstairs | goes | |
| bus | tickets | clothes | freckles | |
| perhaps | sweets | families | here's | |

SECOND GRADE WORDS

| s (regular) | s (z sound) |
|---|---|
| cactus | checkers |
| basis | |
| famous | |
| fireworks | |
| raindrops | |

THIRD GRADE WORDS

| s (regular) | s (z sound) |
|---|---|
| curious | calories |
| hippopotamus | headquarters |
| rhinoceros | pliers |
| | upstairs |

FOURTH GRADE WORDS

| s (regular) | | | s (z sound) | |
|---|---|---|---|---|
| alas | narcissus | sassafras | backwoods | series |
| furious | nevertheless | serious | breakers | whereas |
| generous | numerous | various | goggles | |
| genius | papyrus | | mums | |
| marvelous | politics | | overseas | | xiii

Appendix C
List for Chicken Dog

*Prefixes*

Grade levels for root words are given in parentheses; new words formed by the base word plus a prefix have been moved to the next grade level. The meanings of items in italics may be more difficult because the base alone is not a familiar word. Sources: *The Reading Teacher's Book of Lists* (prefixes); *Children's Writer's Word Book* (prefixes and grade level).

FIRST GRADE

| un- | | re- | | others |
|---|---|---|---|---|
| unhappy | uncertain | return | redo (do:K) | |
| unfit | unzip | repay (pay:K) | | |
| unreal | until | rework | | |

SECOND GRADE

| un- | re- | | others | |
|---|---|---|---|---|
| unpaid | remove | rewrite | disagree | ashore |
| | *record* | relive (live:1) | enjoy | aboard |
| | *refrigerator* | | *community* | *afire* |

THIRD GRADE

| un- | re- | others | |
|---|---|---|---|
| unlimited | recall | disabled | *include* |
| unusual | reappear (appear:2) | mistreat | *connect* |
| uncomfortable (comfortable:2) | | misuse | *combine* |
| | | *atop* | *comfort* |
| | | *exit* | *perfect* |
| | | *explode* | |

FOURTH GRADE

| un- | re- | others | |
|---|---|---|---|
| unable (able:3) | review | discontinue | *exceed* |
| | reflect | enable | *explore* |
| | renew | enclose | *extend* |
| | | encounter | *perform* |
| | | income | *exhaust* |
| | | encourage | *expense* |
| | | *complain* | | xiv

Appendix C
List for Chicken Dog

*Read 3 | Spelling | Complete Word | Medial consonant spelling words*

| 1. Single consonant in medial position | | |
|---|---|---|
| *(could be any letter from level 1)* | | |
| divide | posi*t*ive | museum |
| po*l*ite | positive | periodic |
| harmony | lateral | secret |
| oriole | odor | label |
| notify | herald | present |
| | | |
| 2. Two letters that spell two consonants in medial position | | |
| *(could be compound words with initial and final letters from level 1 or letter sequences from levels 2 & level 3, cat 2)* | | |
| mul*t*iply | a*wk*ward | nuc*l*ear |
| cou*n*try | su*sp*ense | mag*n*etic |
| pic*n*ic | co*m*puter | fou*nt*ain |
| swee*t*heart *(could be a digraph)* | watermelon | virtue |
| principal | scientist | opportunity |
| | | |
| 3. Three letters that spell three consonants in medial position | | |
| *(could be sequences from level 3, category 1, or combinations of levels 1 and 2 in compound words)* | | |
| sub*t*ract | depar*t*ment | conc*l*ude |
| dis*pl*ay | cou*rtr*oom | lobs*t*er |
| astray | construct | contract |
| courtroom | electric | entrance |
| explode | footstep | handsome |
| | | |
| 4. Digraphs and silent letters in medial position | | |
| *(level 4)* | | |
| ki*tch*en | whe*th*er | chec*k*ers |
| pur*ch*ase | ta*lk*ing | package |
| arithmetic | fashion | jacket |
| neighbor | cracker | pitcher |
| lodging | peaches | waiting |
| | | |
| 5. Digraphs and silent letters in context of other consonants in medial position | | |
| *(level 4 combined with previous levels)* | | |
| qui*ck*ly | bla*ck*berry | frie*nd*ship |
| too*th*paste | wa*lk*way | knuckle |
| worthless | worship | whistle |
| punching | backbone | entrance |
| mushroom | freshwater | enthusiasm |
| | | |
| 6. Double consonants to spell one phoneme in medial position | | |
| *(relates to vowels, could be level 5)* | | |
| gori*ll*a | de*ss*ert/desert | su*pp*er/super |
| ru*nn*ing | co*mm*on | co*ll*ie |
| si*ll*y | la*dd*er | co*ff*ee |
| gi*gg*ling | vi*ll*age | success |
| a*tt*ack | o*pp*osite | jellybean |
| | | peppermint | xv

Appendix D
Stimuli for Twisted Pictures

Twisted Pictures
*Level 1 Stimuli*

1_2_1_1 SV Attributive/Stative
The zebra is sad.
The zebra is thin.
The cow is sad.
The cow is fat.

Draw: the zebra is sad and fat and the cow is happy and thin.

1_2_1_2
The chicken is eating.
The chicken is sitting.
The cat is eating.
The cat is standing.

Draw: the chicken is eating and standing and the cat is sitting and drinking.

1_2_1_3
The skunk is alone.
The skunk is clean.
The monkey is alone.
The monkey is dirty.

Draw: the dirty skunk by itself and clean monkey holding hands (or with one other creature).

1_2_1_4
The dog is brown.
The dog is small.
The snake is green.
The snake is big.

Draw: a big dog peeling an orange for a small snake. Put bananas (fruit basket) in the picture.

1_2_2_1 Active Voice: Subject-Verb-Object (SVO)
The pig rows the skunk.
The skunk rows the pig.
The pig rows the dog.
The skunk rows the dog.

Draw: the pig rowing the skunk and the dog in boat alone.

1_2_2_2
The monkey is paying the snake.
The snake is paying the monkey.
The monkey is paying the chicken.
The snake is paying the chicken.

Draw: the monkey paying snake for an ice cream cone at an ice cream cart (truck). Chicken stands (sits) nearby.

1_2_2_3
The cat is holding the box.
The box is holding the cat.
The ball is holding the chicken.
The chicken is holding the box.

Draw: the cat on a large medicine ball, while the chicken is on a box.

1_2_2_4
The cow sprays the zebra.
The zebra sprays the monkey.
The zebra sprays the cow.
The cow sprays the monkey.

Draw: the cow spraying zebra with a hose, while the monkey watches.

1_2_3_1 Simple Negation
The cat is not playing Frisbee.
The cat is playing Frisbee.
The monkey is not playing Frisbee.

Draw: the short cat watching a tall monkey catching a Frisbee. The cat is sitting.

i

Appendix D
Stimuli for Twisted Pictures

The monkey is short.

1_2_3_2
The dog is not jumping rope.
The dog is jumping rope.
The skunk is not jumping rope.
The skunk is fat.

Draw: the fat dog watching the thin skunk jump rope.

1_2_3_3
The pig is not picking the flowers.
The pig is picking the flowers.
The dog is not picking the flowers.
The dog is frowning.

Draw: the frowning pig watching the smiling dog picking flowers.

1_2_3_4
The cat is not playing hopscotch.
The cat is playing hopscotch.
The skunk is not playing hopscotch.
The skunk is well dressed.

Draw: a well-dressed cat sitting on a bench near a sportily dressed skunk playing hopscotch.

1_2_4_1 SV + Prepositional Phrases

The skateboard is under the bench.
The kite is on the bench.
The skateboard is under the picnic table.
The kite is under the picnic table.

Draw: the skateboard under bench and kite on the picnic table

1_2_4_2
The cat sits on the slide.
The cat stands behind the slide.
The dog sits next to the slide.
The dog stands under the slide.

Draw: the cat sitting at the top of the slide, ready to go down. The dog stands at the bottom of the slide.

1_2_4_3
The kite is hanging in a tree.
The kite is flying in the air.
The ball is hanging in a tree.
The ball is flying in the air.

Draw: a kite tangled in a tree with a ball on the ground.

1_2_4_4
The cow jumps rope with the zebra.
The cow is reading on the bench.
The cow jumps rope with the snake.
The chicken is reading on the bench.

Draw: the cow jumping rope with the zebra and the chicken. The snake sits nearby reading.

1_2_5_1 Conjunction of NP, VP, S using and, or, neither-nor
The cow and the chicken are hot.
The cow and the chicken are cold.
The snake and the chicken are hot.
The cow and the snake are hot.

Draw: the cow and the chicken are hot and the snake is cold.

1_2_5_2
Neither the dog nor the cat is playing tennis.

Draw: the smiling dog and cat sitting on a

Appendix D
Stimuli for Twisted Pictures

Neither the dog nor the cat is sitting on a blanket.
Neither the dog nor the cat is eating a picnic lunch.
Neither the dog nor the cat is happy.

blanket, eating a picnic, with a pair of tennis rackets laying on the grass beside them.

1_2_5_3
The snake and the chicken are asleep.
The snake and the chicken are awake.
The skunk and the chicken are asleep.
The snake and the skunk are asleep.

Draw: the snake and chicken asleep on the grass, and a skunk that is wide awake.

1_2_5_4
The cow and the zebra eat the cake.
The cow and the zebra don't eat the cake.
The cow and the zebra eat the sandwich.
The cow and the zebra eat the banana.

Draw: the cow and the zebra are eating birthday cake. A sandwich and a banana sits ignored beside them on the picnic blanket.

1_3_1_1 Subject Relativization: SV modifier (past and present)
The cat that is smiling is swinging.
The cat that is frowning is swinging.
The cat that is smiling is falling.
The cat that is frowning is standing.

Draw: a smiling, swinging cat and a frowning falling cat.

1_3_1_2
The balloon that escaped is purple.
The balloon that escaped is orange.
The balloon that escaped is yellow.
The balloon that escaped is blue.

Draw: a bunch of multi-colored balloons tied up with long strings. A purple balloon, with a short string, flies up in the sky.

1_3_1_3
The dog that is sliding is fat.
The dog that is spinning is thin.
The cat that is sliding is fat.
The chicken that is spinning is thin.

Draw: a fat dog on a slide, a thin cat at the top of the slide and a fat chicken spinning on a wheel-around.

1_3_1_4
The red picnic basket that broke was full.
The green bag that broke was full.
The red picnic basket that broke was empty.
The green bag that broke was empty.

Draw: an over-flowing, broken, red picnic basket beside a securely tied, green bag.

1_3_2_1 Subject Relativization SV reduced
The cat crawling is young.
The cat walking is old.
The dog crawling is old.
The dog walking is young.

Draw: a kitten crawling and an old hound walking.

1_3_2_2
The pig sweating is rowing.
The pig reading is fishing.
The chicken sweating is rowing.
The chicken reading is fishing.

Draw: the sweating pig rowing the sleeping chicken (with an open book across its chest) in a boat. A fishing line trails out behind the boat.

Appendix D
Stimuli for Twisted Pictures

1_3_2_3
The monkey frowning is struggling.
The monkey smiling is resting.
The dog smiling is struggling.
The dog frowning is resting.

Draw: a frowning monkey pushing a wagon, in which sits a smiling dog. A bicycle sits by the side of the path.

1_3_2_4
The zebra napping is old.
The zebra reading is young.
The cow napping is old.
The cow reading is young.

Draw: an old zebra and a young cow asleep on a bench with a pile of books beside them.

1_3_3_1 Subject Relativization: Negation
The monkey that is not talking is wet.
The monkey that is not talking is dry.
The zebra that is reading is wet.
The monkey that is talking is dry.

Draw: a silent, wet monkey and a silent, dry zebra.

1_3_3_2
The chicken that is not flying a kite is swinging.
The chicken that is not flying a kite is jumping.
The snake that is flying a kite is swinging.
The chicken that is flying a kite is jumping.

Draw: a chicken swinging and a jumping snake flying a kite.

1_3_3_3
The pig that is not sitting in the sun is smiling.
The pig that is not sitting in the sun is frowning.
The pig that is sitting in the sun is smiling.
The snake that is sitting in the sun is frowning.

Draw: the happy cool pig under a shady tree. The sun scorches flowers and plants outside of the tree's shade. A frowning snake in the shade.

1_3_3_4
The snake that is not reading is jumping.
The snake that is not reading is roller-skating.
The cat that is reading is jumping.
The snake that is reading is jumping.

Draw: the snake in roller skates jumping gleefully over a stack of books. A cat sits nearby on a bench reading.

1_3_4_1 Infinitival Complement to Verb
The cow wants to swim.
The cow wants to read.
The pig wants to climb.
The pig wants to swim.

Draw: the cow with bathing suit dipping toe in pond, and the pig on shore sitting at the base of a tree, pulling the book out of a bag

1_3_4_2
The cat wants to play.
The dog wants to play.
The cat wants to eat.
The dog wants to run.

Draw: cat looks out window at other animals playing; dog looks at pizza.

1_3_4_3
The tall monkey in the yellow jacket asked to fly the kite.
The short monkey in the yellow jacket asked to hold the balloon.
The short zebra in the blue jacket asked to fly the kite.

Draw: the tall monkey in a yellow jacket asking the short zebra in a blue jacket to fly the kite. A blue balloon is tied nearby iv Appendix D
Stimuli for Twisted Pictures The tall zebra in the blue jacket asked to hold the balloon.

1_3_4_4
The chicken tries to save the drowning dog.
The dog tries to save the drowning chicken.
The chicken tries to save the sinking boat.
The dog tries to save the sinking boat.

Draw: the chicken jumping into the pond as the dog flails and splashes in the water next to a floating boat.

1_4_1_1 Passive Voice: Subject-Verb-Object (SVO)
The chicken is pushed by the cat.
The cat is pushed by the chicken.
The chicken is pushed by the monkey.
The monkey is pushed by the cat.

Draw: the cat pushing a chicken in a baby carriage and the monkey pushing a cat in a baby carriage.

1_4_1_2
The ball was thrown by the cow in the red shirt.
The ball was thrown by the pig in the green hat.
The Frisbee was thrown by the cow in the red shirt.
The Frisbee was thrown by the pig in the yellow hat.

Draw: the cow in a red shirt throwing a ball to the pig in a green hat. A yellow Frisbee leans against a tree.

1_4_1_3
The skunk is tagged by the monkey.
The monkey is tagged by the skunk.
The skunk is tagged by the chicken.
The chicken is tagged by the monkey.

Draw: a skunk being tagged by a monkey, while the chicken hides behind a tree.

1_4_1_4
The small boat was guided by the skunk on shore.
The small boat was guided by the cat in the boat.
The large boat was guided by the skunk on shore.
The large boat was guided by the skunk in the boat.

Draw: the skunk steering a toy boat with a remote control device. It passes a normal sized rowboat in which sits a cat.

1_5_1_1 Subject Relativization: Subject-Verb-Object (SVO)
The zebra that chases the monkey is short.
The zebra that chases the monkey is tall.
The monkey that chases the zebra is short.
The monkey that chases the zebra is tall.

Draw: the short zebra chasing the tall monkey (playing tag in field).

1_5_1_2
The chicken that pulls the monkey is frowning.
The monkey that pulls the chicken is frowning.
The chicken that pulls the monkey is smiling.
The monkey that pulls the chicken is smiling.

Draw: the frowning chicken pulling on the smiling monkey.

1_5_1_3
The skunk that fed the dog is old.
The dog that fed the skunk is old.
The skunk that fed the dog is young.

Draw: an old skunk feeding a puppy in diapers.

v

Appendix D
Stimuli for Twisted Pictures

The dog that fed the skunk is young.

1_5_1_4
The chicken that addresses the cow is scared.
The chicken that addresses the cow is calm.
The cow that addresses the chicken is scared.
The cow that addresses the chicken is calm.

Draw: a frightened chicken talking to a calm cow.

1_5_2_1 Subject Relativization: SVO reduced
The pig rowing the chicken wears a hat.
The chicken rowing the pig wears a hat.
The pig rowing the chicken wears a backpack.
The chicken rowing the pig wears a backpack.

Draw: pig rowing the boat and wearing a hat; chicken sits in same boat (not rowing) and wears a backpack.

1_5_2_2
The cow teaching the zebra is smiling.
The zebra teaching the cow is smiling.
The cow teaching the zebra is frowning.
The zebra teaching the cow is frowning.

Draw: a smiling cow reading to a frowning zebra.

1_5_2_3
The dog watching the monkey is holding a kite.
The monkey watching the dog is holding a kite.
The dog watching the monkey is carrying a soda.
The monkey watching the dog is carrying a soda.

Draw: a monkey carrying a soda and watching a dog; the dog carries a kite and does not watch the monkey.

1_5_2_4
The snake trailing the skunk carries a pair of scissors.
The skunk trailing the snake carries a pair of scissors.
The snake trailing the skunk carries a small shovel.
The skunk trailing the snake carries a small shovel.

Draw: a snake following a skunk; the snake carries a pair of scissors; the skunk carries a small shovel.

1_5_3_1 Double Embedding
The cat that pushes the cow that has a blue hat has a yellow jacket.
The cat that pushes the cow that has a yellow hat has a blue jacket.
The cat that pushes the cow that has a blue hat has a blue jacket.
The cat that pushes the cow that has a yellow hat has a yellow jacket.

Draw: the cat on roller skates, in a yellow jacket pushing a cow with blue hat on roller skates.

1_5_3_2
The monkey that seeks the skunk that is hiding is fat.
The monkey that seeks the skunk that is hiding is thin.
The monkey that seeks the skunk that is climbing is tall.

Draw: a short, fat monkey looking for a tall, thin skunk that is hiding behind a tree (with a ladder to a tree house nailed to the tree trunk).

Appendix D
Stimuli for Twisted Pictures

The monkey that seeks the skunk that is climbing is short.

1_5_3_3
The dog that played with the cat that has a green ball has a white ball.
The dog that played with the cat that has a white ball has a white ball.
The dog that played with the cat that has a green ball has a green ball.
The dog that played with the cat that has a white ball has a green ball.

Draw: a dog with a white ball and tennis racket in his hand, waving goodbye to the cat on the tennis court with a tennis racket and green ball in his pocket.

1_5_3_4
The chicken that taps the snake that is flying the kite is smiling.
The chicken that taps the snake that is holding the balloons is smiling.
The chicken that taps the snake that is flying the kite is frowning.
The chicken that taps the snake that is holding the balloons is frowning.

Draw: a smiling chicken tapping a frowning snake on the shoulder. The snake is flying a kite. A bunch of balloons is tied up in the background.

1_6_1_1 Object Relativization: Subject-Verb (SV)
The skunk comforts a monkey that is crying.
The skunk comforts a monkey that is smiling.
The monkey comforts a skunk that is crying.
The monkey comforts a skunk that is smiling.

Draw: A skunk giving a flower to a crying monkey that fell off the jungle gym (or fell down). Monkey hangs from jungle gym smiling.

1_6_1_2
The zebra trips a cow that is snacking.
The cow trips a zebra that is snacking.
The zebra trips a cow that is reading.
The cow trips a zebra that is reading.

Draw: a reading zebra trips a cow that is eating an ice cream cone.

1_6_1_3
The cat follows the dog that is roller-skating.
The dog follows the cat that is roller-skating.
The cat follows the dog that is skateboarding.
The dog follows the cat that is skateboarding.

Draw: a cat on a skateboard following a dog on roller skates.

1_6_1_4
The cow that sprays the zebra is wet.
The zebra that sprays the cow is wet.
The cow that sprays the zebra is dry.
The zebra that sprays the cow is dry.

Draw: the wet cow holding dripping hose while the dry zebra stands under an umbrella smirking, holding a dripping hose.

1_6_2_1 Object Relativization: SVO
The pig rowed a skunk that dropped an umbrella.
The skunk rowed a pig that dropped an umbrella.
The pig rowed a skunk that ate a sandwich.
The skunk rowed a pig that ate a sandwich.

Draw: A pig rowing a skunk. The skunk reaches out for an umbrella that fell in the water. The pig has a partially eaten sandwich on a plate beside him and crumbs on his belly.

Appendix D
Stimuli for Twisted Pictures

1_6_2_2
The dog passes the snake that is eyeing an apple.
The snake passes the dog that is eyeing an apple.
The dog passes the snake that is wearing glasses.
The snake passes the dog that is wearing glasses.

Draw: a dog wearing glasses, jumping over a snake that is eyeing an apple.

1_6_2_3
The zebra kissed the monkey that is holding a flower.
The monkey kissed the zebra that is holding a flower.
The zebra kissed the monkey that is holding a watermelon.
The monkey kissed the zebra that is holding a watermelon.

Draw: a zebra holding a watermelon kissing a monkey holding a flower.

1_6_2_4
The chicken aids the cat that is wearing a blue hat.
The cat aids the chicken that is wearing a blue hat.
The chicken aids the cat that is wearing a red jacket.
The cat aids the chicken that is wearing a red jacket.

Draw: the chicken in a red jacket holding the rope (the other end of which is attached to a tree) for a cat in a blue hat.

1_7_2_1 Clefting
It's the snake that the monkey is poking.
It's the monkey that the snake is poking.
It's the cat that the monkey is poking.
It's the cat that the snake is poking.

Draw: a monkey poking a snake, and cat with hands in pockets.

1_7_2_2
It's the monkey that the snake is paying.
It's the snake that the monkey is paying.
It's the chicken that the monkey is paying.
It's the chicken that the snake is paying.

Draw: the monkey paying the snake, while the chicken watches.

1_7_2_3
It's the zebra that the cow is calling.
It's the cow that the zebra is calling.
It's the snake that the cow is calling.
It's the snake that the zebra is calling Draw: the cow standing next to the snake, calling to the zebra.

1_7_2_4
It's the cat that the dog is following.
It's the dog that the cat is following.
It's the skunk that the cat is following.
It's the skunk that the dog is following.

Draw: a cat on a skateboard followed by a dog on roller skates. Both pass a skunk sitting on a bench

1_7_5_1 Subject Infinitival Clause
To catch the ball is what the cat really likes to do.

Draw: the cat catching the ball, while the dog sits under tree reading with skateboard leaning Appendix D
Stimuli for Twisted Pictures To catch the ball is what the dog really likes to do. against tree.
To read is what the cat really likes to do.
To skateboard is what the dog really likes to do.

1_7_5_2
To eat cake is what the zebra really likes to do. Draw: the zebra eating a piece of cake. The
To eat cake is what the cow really likes to do. cow sits with his back to the cake and the
To eat a sandwich is what the zebra really likes to sandwich on the picnic blanket.
do.
To eat a sandwich is what the cow really likes to
do.

1_7_5_3
To swim is what the dog really likes to do. Draw: the dog dipping his toe into the water,
To swim is what the snake really likes to do. while chicken sleeps nearby. A snake sits near
To fish is what the dog really likes to do. a fishing line trailing in the water.
To fish is what the chicken really likes to do.

1_7_5_4
To sit in the shade is what the pig really likes Draw: the pig sitting in the shade with a
to do. watermelon beside him untouched and the dog
To sit in the shade is what the dog really likes to sunbathing.
do.
To eat watermelon is what the pig really likes to
do.
To eat watermelon is what the dog really likes to
do.

ix

Appendix D
Stimuli for Twisted Pictures

Twisted Pictures
*Level 2 Stimuli*

2_2_1_1 SV Attributive/Stative
The tall dog is singing.
The sitting dog is writing.
The sad skunk is writing.
The tall skunk is singing.

Draw: a tall, sad dog singing and a short, happy skunk writing on a bench.

2_2_1_2
The fat and smiling monkey is working hard.
The thin and frowning monkey is eating.
The fat and smiling cat is eating.
The thin and frowning cat is working hard.

Draw: a fat, happy monkey organizes prizes in the booth. A skinny, unhappy cat watches and licks an ice cream cone.

2_2_1_3
The lean cow is slipping.
The chubby cow is slipping.
The lean horse is sitting.
The short horse is slipping.

Draw: a tall, thin cow slips on a banana peel, while walking by the funhouse. Sitting near the door to the funhouse is a short, fat horse playing with marbles.

2_2_1_4
The scared dog is stepping softly.
The curious dog is stepping softly.
The scared snake is observing.
The curious snake is stepping softly.

Draw: setting: the house of mirrors. A watching snake is reflected in the mirrors. A scared dog is stepping softly by the mirrors.

2_2_2_1 Active Voice: Subject-Verb-Object (SVO)

The yellow giraffe seizes the brown hippopotamus.
The brown hippopotamus seizes the yellow giraffe.
The yellow giraffe seizes the yellow balloons.
The brown hippopotamus seizes the yellow balloons.

Draw: the giraffe grabs the hippo sitting on the bench. Yellow balloons are tied to the bench beside the hippo.

2_2_2_2
The brown bear bumps the red fox.
The red fox bumps the brown bear.
The brown bear bumps the green turtle.
The red fox bumps the green turtle.

Draw: a brown bear bumps into a red fox. A green turtle watches.

2_2_2_3
The helpful cat serves the contented dog.
The contented dog serves the helpful cat.
The helpful cat serves the playful fox.
The playful fox serves the contented dog.

Draw: A dog lies on the beach. The cat serves the dog a soda with an umbrella in it. The fox throws a Frisbee nearby (or does something else).

2_2_2_4
The smiling skunk purchases an ice cream.
The rude raccoon purchases an ice cream.
The smiling skunk feeds some seagulls.
The rude raccoon feeds some seagulls.

Draw: a smiling skunk buying an ice cream from a rude, grumpy raccoon. A cat sits nearby on a bench feeding some seagulls.

x

Appendix D
Stimuli for Twisted Pictures

2_2_3_1 Simple Negation

The smiling dog is not speeding.
The smiling dog is speeding.
The frowning monkey is not speeding.
The smiling monkey is speeding.

Draw: a smiling dog ambling along, as a frowning monkey runs by after some monkey children.

2_2_3_2
The giraffe is not copying the horse's movements.
The giraffe is copying the horse's movements.
The cow is copying the giraffe's movements.
The horse is copying the giraffe's movements.

Draw: a horse and a cow practice Tai Chi on the beach, while a giraffe watches from the boardwalk.

2_2_3_3
The alarmed pig is not lifting the bar.
The delighted pig is lifting the bar.
The delighted cow is not lifting the bar.
The alarmed horse is not lifting the bar.

Draw: a fearful pig unable to lift the bar to get in the car and get on the ride. An delighted horse and cow are lifting the bar of a neighboring car to get on the ride.

2_2_3_4
The blindfolded monkey is not aiming the ball correctly.
The blindfolded monkey is aiming the ball correctly.
The worried cat is aiming the ball correctly.
The frowning cat is not aiming the ball correctly.

Draw: a blindfolded, frowning monkey, unsuccessfully aiming a ball at a stack of cans. A worried cat watches.

2_2_4_1 SV + Prepositional Phrases

The calm dog is sitting over the water.
The nervous cat is sitting under the water.
The nervous dog is sitting beside the water.
The calm cat is sitting over the water.

Draw: a clear booth with water in it. The dog sits over the water, waiting for a passerby to throw a tennis ball at the target, at which point the dog would fall in the water. A nervous cat sits beside the booth taking money.

2_2_4_2
The balloon is secured to the bench with a red ribbon.
The balloon is secured to the bench with a blue ribbon.
The balloon is secured to the bicycle with a red ribbon.
The balloon is secured to the bicycle with a blue ribbon.

Draw: a blue balloon tied to a bench with a red ribbon. A bicycle is nearby.

2_2_4_3
The thankful pig's prize came from the skunk.
The ungrateful pig's prize came from the skunk.
The thankful dog's prize came from the skunk.
The thankful skunk's prize came from the dog.

Draw: a thankful pig accepting a prize from a skunk. A dog stands to the side smiling.

2_2_4_4

Appendix D
Stimuli for Twisted Pictures

The brave monkey crawls toward the concerned duck.
The brave monkey crawls away from the concerned duck.
The brave duck crawls toward the concerned monkey.
The concerned duck crawls away from the brave monkey.

Draw: a duck climbing a roller coaster towards a frightened chicken trapped on the ride.

2_2_5_1 Conjunction of NP, VP, S using and, or, neither-nor
The skunk is neither eating cotton candy nor eating an ice-cream cone.
The skunk is neither eating an ice-cream cone nor eating a hot dog.
The snake is neither eating cotton candy nor eating an ice-cream cone.
The snake is neither eating an ice-cream cone nor eating a hot dog.

Draw: a skunk eating a hot dog and a snake eating an ice cream cone.

2_2_5_2
The skinny hippo and the chubby giraffe are cheerful.
The skinny hippo and the chubby giraffe are gloomy.
The chubby hippo and the skinny horse are cheerful.
The chubby hippo and the chubby horse are gloomy.

Draw: a happy, skinny hippo, a pudgy giraffe, and a skinny, gloomy horse.

2_2_5_3
The zebra can choose the duck or the rabbit to get on the Ferris wheel.
The duck can choose the zebra or the rabbit to get on the Ferris wheel.
The rabbit can choose the zebra or the monkey to get on the Ferris wheel.
The zebra can choose the rabbit or the monkey to get on the Ferris wheel.

Draw: a zebra wearing a uniform holding up the bar of the seat of the Ferris wheel in front of the duck and rabbit. The car holds many people, but it is full except for one spot. A monkey assists the zebra at the Ferris wheel.

2_2_5_4
The cat and the dog are setting out their favorite food for lunch.
The cat and the chicken are eating the lunch.
The dog and the chicken are eating the lunch.
The chicken and the monkey are setting out their favorite food for lunch.

Draw: a cat and a dog laying food on a table, while the chicken and the monkey eat.

2_3_1_1 Subject Relativization: SV modifier (past and present)
The zebra that is searching is playing hide-and-seek.
The zebra that is searching is rowing a canoe.
The zebra that is hiding is playing hide-and-seek.
The zebra that is hiding is rowing a boat.

Draw: a zebra looking for someone, near the tunnel of love. A pair of eyes peeks out from a canoe that is moored near the entrance to the tunnel of love.

2_3_1_2
The brown cow that won is pleased and delighted.

Draw: a giant thermometer that is the strength meter. A happy, brown cow with a

Appendix D
Stimuli for Twisted Pictures

The brown cow that won is sad and upset.
The blue horse that won is pleased and delighted.
The yellow dog that won is sad and upset.

sledgehammer is being awarded a medal.
An unhappy, blue horse, with sledgehammer in hand, watches, as does a happy, yellow dog. The dog is a spectator.

2_3_1_3
The pig that is rushing honked his horn.
The pig that is lagging honked his horn.
The cat that is rushing honked his horn.
The duck that is rushing honked his horn.

Draw: a pig, dressed as a clown, who has just cut a swath through a group of animals. We see him from behind still honking his horn. On either side of his path lie the cat and the duck that have been knocked over by his hurrying.

2_3_1_4
The strong skunk that won is beaming.
The tall skunk that lost is pouting.
The thin chicken that won is beaming.
The short chicken that lost is pouting.

Draw: a happy, strong, and tall skunk with a large pile of prizes at his feet. A short, fat chicken applauds and smiles.

2_3_2_1 Subject Relativization SV reduced

The grinning dog announcing is fat.
The frowning dog announcing is thin.
The grinning cat announcing is thin.
The frowning pig announcing is thin.

Draw: a fat, smiling dog calling people into the sideshow and a fat smiling pig and smiling cat assisting him (holding open curtain, taking money, etc.)

2_3_2_2
The duck winning is an excellent pitcher.
The duck losing is a terrible pitcher.
The skunk winning is a terrible pitcher.
The skunk winning is an excellent pitcher.

Draw: a duck, with a large pile of prizes beside him, pitching balls at the moving target. In the neighboring booth is a skunk with no prizes at his feet.

2_3_2_3
The friendly dog waving is wearing plaid pants.
The friendly dog waving is wearing striped pants.
The unfriendly cat waving is wearing plaid pants.
The friendly cat waving is wearing striped pants.

Draw: a friendly dog wearing plaid pants and waving at a cat. The cat is aloof and wearing striped pants.

2_3_2_4
The cow signaling is wearing a hat.
The cow racing is wearing a bathing suit.
The zebra signaling is wearing a bathing suit.
The pig racing is wearing a hat.

Draw: a cow, wearing a hat and standing on the beach, waves a flag to signal a foot race. A zebra and a pig, wearing bathing suits, jump from the starting line.

2_3_3_1 Subject Relativization: Negation

The pig that is not eating is feeling sick.
The pig that is eating is smiling.
The pig that is eating is feeling sick.
The monkey that is not eating is smiling.

Draw: a pig, next to a cotton candy cart, holding his stomach in pain. A monkey stands nearby eating an apple contentedly.

2_3_3_2

Appendix D
Stimuli for Twisted Pictures

The cow that is not joking with her friend is aiming the dart correctly.
The cow that is joking with her friend is aiming the dart correctly.
The pig that is not joking with her friend is not aiming the dart correctly.
The pig that is joking with her friend is aiming the dart correctly.

Draw: a pig, joking with her friend, next to a cow that is concentrating on hitting the moving target.

2_3_3_3
The well-dressed skunk that is not preening is holding a fan.
The well-dressed skunk that is preening is holding a fan.
The well-dressed zebra that is not preening is holding a comb.
The well-dressed zebra that is preening is holding an umbrella.

Draw: a skunk in an old-fashioned costume sitting behind a cardboard cutout and holding a fan, next to a zebra that is preening and holding a brush or comb.

2_3_3_4
The scary monkey that is not popping up is excited.
The scary monkey that is popping up is excited.
The scary dog that is popping up is bored.
The scary monkey that is popping up is bored.

Draw: a excited monkey hiding behind a gravestone. He's waiting for a cat and dog to pass by so he can scare them. The dog and the cat are nervous.

2_3_4_1 Infinitival Complement to Verb

The cow wants to cheer up his cross friend.
The cow wants to pester his delighted friend.
The pig wants to cheer up his cross friend.
The horse wants to pester his cross friend.

Draw: a cow trying to cheer up a cross horse that is being pestered by a pig.

2_3_4_2
The pig likes to construct sandcastles by the ocean.
The pig likes to swim in the aquarium
The duck likes to construct sandcastles by the ocean.
The duck likes to swim in the aquarium.

Draw: a pig building a sandcastle near the water's edge. A duck swims in the ocean nearby. The aquarium can be seen in the background

2_3_4_3
The stylish snake wants to charm the silly salmon.
The stylish snake wants to dance on the stage.
The silly salamander wants to charm the stylish salmon.
The stylish salmon wants to dance on the stage.

Draw: The snake, wearing a turban and other stylish fashion, is playing a flute on stage with a basket. A salmon is peaking out of the basket wearing Groucho Marx glasses. A stylish salamander belly dances in the background, not on the stage.

2_3_4_4
The excited pig likes to drag his little sister to all the rides.
The excited pig likes to take tickets for the stage show.

Draw: a pig dragging a little girl pig to the roller coaster. Behind them, a gloomy dog takes tickets at the entrance of the stage.

Appendix D
Stimuli for Twisted Pictures

The gloomy dog likes to drag his little sister to all the rides.
The excited dog likes to take tickets for the stage show.

2_4_1_1 Passive Voice: Subject-Verb-Object (SVO)

The lost pig was located by the clever duck.
The lost duck was located by the clever pig.
The lost monkey was located by the clever pig.
The lost duck was located by the clever monkey.

Draw: a lost, crying little pig holding the hand of a duck with a magnifying glass and clever expression. The duck is accompanied by his assistant the monkey. They are walking through an arcade.

2_4_1_2
The pretty zebra was lifted by the mysterious cow.
The mysterious cow was lifted by the pretty zebra.
The pretty snake was lifted by the mysterious zebra.
The pretty cow was lifted by the mysterious snake.

Draw: a magician cow is levitating a pretty zebra. The snake watches mesmerized.

2_4_1_3
The hungry cat is approached by the candy-apple seller.
The candy-apple seller is approached by the hungry cat.
The candy-apple seller is approached by the ticket-taker.
The hungry cat is approached by the ticket-taker.

Draw: a dog selling candy apples approaches a stationary, hungry cat. A chicken sells tickets in a booth nearby.

2_4_1_4
The well-dressed monkey was sprayed by the bratty cat.
The bratty cat was sprayed by the well-dressed monkey.
The well-dressed skunk was sprayed by the bratty cat.
The well-dressed monkey was sprayed by the bratty skunk.

Draw: a laughing cat sits on a ride over the boardwalk with a squirt gun next to him and in hand. A bemused, wet monkey in a suit stands in a puddle below the ride. A skunk looks on from the nearest car.

2_5_1_1 Subject Relativization: Subject-Verb-Object (SVO)
The orange duck that passed the dog is cheering.
The spotted duck that passed the dog is crying.
The orange dog that passed the duck is cheering.
The spotted dog that passed the duck is crying.

Draw: a cheering, orange duck with its hands in the air is on a ride flying past a despondent, spotted dog.

2_5_1_2
The bratty monkey that pesters the chicken is fat.
The clever monkey that pesters the chicken is thin.
The bratty chicken that pesters the monkey is fat.
The clever chicken that pesters the monkey is thin.

Draw: a fat, bratty monkey teasing a thin, clever chicken (e.g., solving equations, working on a jigsaw puzzle?).

2_5_1_3

Appendix D
Stimuli for Twisted Pictures

The dog that pushes aside the turtle scatters popcorn everywhere.
The dog that pushes aside the turtle spills soda on herself.
The turtle that pushes aside the dog scatters popcorn everywhere.
The turtle that pushes aside the dog spills soda on herself.

Draw: a dog and a turtle at the head of a line to go into a show (or get on a ride). The sad dog (turtle?) holds an empty carton and popcorn is scattered all over the ground. The dog drinks calmly from her soda. (changed to present tense for clarity)

2_5_1_4
The horse that chooses the cow and the pig collects the money.
The horse that chooses the cow and the zebra opens the gate.
The cow and the pig that choose the horse collect the money.
The zebra that chooses the cow and the pig collects the money.

Draw: a horse pointing to the cow and the pig with one hoof and holding money in the other hoof. He stands at a closed gate. A zebra opens the gate.

2_5_2_1 Subject Relativization: SVO reduced

The little pig needing her older sister holds a lollipop.
The big pig needing her younger sister holds a candy apple.
The little pig needing her older sister holds a candy apple.
The big pig needing her younger sister holds a lollipop.

Draw: a little pig, holding a lollipop, being lifted into the ride by her giant sister. The little pig is an exact replica of the big pig. The big pig holds a candy apple.

2_5_2_2
The well-dressed monkey exiting the funhouse is trembling.
The sloppy monkey exiting the funhouse is grinning.
The sloppy zebra exiting the funhouse is trembling.
The well-dressed zebra exiting the funhouse is grinning.

Draw: a frightened, well-dressed monkey exiting the funhouse with a frightened well-dressed zebra.

2_5_2_3
The little pig losing the group wants the dolls.
The little pig losing the group wants the peanuts.
The little dog losing the group wants the peanuts.
The little dog losing the group wants the dolls.

Draw: a little pig standing at a booth mesmerized by all the dolls. Around the corner, out of eyesight, is a little dog in a group.

2_5_2_4
The cow waving the flag watches the boats.
The cow waving good-bye watches the passers-by.
The zebra waving good-bye watches the boats.
The zebra waving the flag watches the passers-by.

Draw: a cow facing out toward the sea, watching boats and waving a flag, while a zebra waves good-bye to some passers-by.

2_5_3_1 Double Embedding xvi

Appendix D
Stimuli for Twisted Pictures

The mouse that dances on the spool that is large is small.
The mouse that dances on the spool that is small is large.
The mouse that dances on the spool that is small is small.
The mouse that dances on the spool that is large is large.

Draw : a small mouse dancing on a large spool.

2_5_3_2
The beach balls that hang in a bunch near the table that is blue are striped.
The beach balls that hang in a bunch near the table that is yellow are striped.
The beach balls that hang in a bunch near the table that is blue are spotted.
The beach balls that hang in a bunch near the table that is yellow are spotted.

Draw: a bunch of striped beach balls hanging in a net near a spotted, blue table.

2_5_3_3
The rabbit that skirted the crowd that is booing is crawling.
The rabbit that skirted the crowd that is booing is running.
The rabbit that skirted the crowd that is cheering is crawling.
The rabbit that skirted the crowd that is cheering is running.

Draw: a zebra magician on stage opens the disappearing cabinet, which is empty. The audience boos and throws tomatoes. The rabbit that was supposed to be in the cabinet crawls far away from the crowd.

2_5_3_4
The horse that is stacking the prizes that are big is tall.
The horse that is stacking the prizes that are small is tall.
The horse that is stacking the prizes that are big is short.
The horse that is stacking the prizes that are small is short.

Draw: a tall horse stacking big prizes on shelves. A bucket full of small balls is in the corner.

2_6_1_1 Object Relativization: Subject-Verb (SV)
The horse chooses the skunk that is hiding behind a pole.
The skunk chooses the horse that is waving and leaping.
The horse chooses the skunk that is waving and leaping.
The skunk chooses the horse that is hiding behind a pole.

Draw: a horse choosing a skunk that is scared and hiding behind a pole. Another skunk is raising his hand high in the air to get on the ride.

2_6_1_2
The zebra helps the bewildered duck that is searching for the exit.
The duck helps the bewildered zebra that is searching for the exit.

Draw: a zebra assisting a confused duck looking for the exit. Another zebra is heading for a bathroom.

Appendix D
Stimuli for Twisted Pictures

The duck helps the bewildered zebra that is searching for the restroom.
The zebra helps the bewildered duck that is searching for the restroom.

2_6_1_3
The observant cat recognizes the pig that is speaking.
The observant pig recognizes the cat that is speaking.
The observant cat recognizes the pig that is listening.
The observant pig recognizes the cat that is listening.

Draw: a cat recognizing the pig that is the leader of the tour group. The pig is lecturing to the tour group. Amongst the tour group is a listening pig.

2_6_1_4
The cow avoided the snake that was calling loudly outside the show.
The snake avoided the cow that was calling loudly outside the show.
The cow avoided the snake that was sleeping behind the tent.
The snake avoided the cow that was sleeping behind the tent.

Draw: a snake calling the crowd into the freak show in the background. In the foreground the cow walks away with his back to the snake. Another animal is sleeping behind the tent.

2_6_2_1 Object Relativization: SVO

The dog alarms the cat that buries the map under the boardwalk.
The cat alarms the dog that buries the map under the boardwalk.
The dog alarms the cat that hides some sunflowers behind her back.
The cat alarms the dog that hides some sunflowers behind her back.

Draw: a dog sneaking up on a cat burying the map under the boardwalk. The dog is holding some sunflowers behind her (own) back.

2_6_2_2
The rabbit commands the monkey that secures the poster to the pole.
The monkey commands the rabbit that secures the poster to the pole.
The rabbit commands the monkey that secures the balloons to the cart.
The monkey commands the rabbit that secures the balloons to the cart.

Draw: a snake commanding a monkey to tie a rope around a pole. Near the snake is a cart with balloons attached to it.

2_6_2_3
The pig cheered the cow that upset every bottle in the row.
The cow cheered the pig that upset every bottle in the row.
The pig cheered the cow that ate all the blueberry pies.
The cow cheered the pig that ate all the blueberry pies.

Draw: a pleased cow at a ball-tossing booth. Bottles lie everywhere. The pig has blueberry pie filling on his face and is holding a piece of pie.

Appendix D
Stimuli for Twisted Pictures

2_6_2_4
The duck hushes the horse that plays his boom box too loudly.
The horse hushes the duck that plays his boom box too loudly.
The duck hushes the horse that plays his horn during the magic trick.
The horse hushes the duck that plays his horn during the magic trick.

Draw: a horse listening to a boom box, playing tapes at full volume while sitting in the audience of a magic show. The duck taps the horse on the shoulder and places his finger over his mouth. There is a horn (bugle, trumpet) near the duck.

2_7_2_1 Clefting

It's the young skunk that the busybody cow is telephoning.
It's the young cow that the busybody skunk is telephoning.
It's the young snake that the busybody cow is telephoning.
It's the young skunk that the busybody snake is telephoning.

Draw: two open windows. In one a cow is on the telephone. In the other a young skunk is about to pick up a ringing telephone. Below the windows a snake walks by.

2_7_2_2
It's the bewildered horse that the honest pig is tapping.
It's the bewildered pig that the honest horse is tapping.
It's the bewildered dog that the honest pig is tapping.
It's the honest dog that the bewildered pig is tapping.

Draw: an oblivious horse being tapped on the shoulder by a pig with money in his hand. A dog looks on menacingly.

2_7_2_3
It's the talented cat that the masked dog is helping.
It's the talented dog that the masked cat is helping.
It's the talented monkey that the masked dog is helping.
It's the talented cat that the masked monkey is helping.

Draw: a magician cat being assisted by masked dog. A monkey hides behind a curtain.

2_7_2_4
It's the popular pig that the merry zebra is finding.
It's the popular zebra that the merry pig is finding.
It's the popular bird that the merry zebra is finding.
It's the popular pig that the merry cow is finding.

Draw: a pig surrounded by two or three friends, one of which is a cow, being approached by a smiling zebra.

2_7_5_1 Subject Infinitival Clause

To capture the crawfish is what the dog really wants to do.
To capture the crawfish is what the cat really wants to do.
To jump in the ocean is what the dog really wants to do.

Draw: a dog chasing a crawfish, a fishing pole lying on the beach and a cat jumping in the ocean.

xix

Appendix D
Stimuli for Twisted Pictures

To fish is what the cat really wants to do.

2_7_5_2
To satisfy his thirst is what the skunk really likes to do.
To satisfy his hunger is what the skunk really likes to do.
To satisfy his thirst is what the monkey really likes to do.
To satisfy his curiosity is what the skunk really likes to do.

Draw: a skunk guzzling a giant lemonade and a monkey eating a hot dog (next to a lemonade stand and a hotdog stand). Nearby is a booth that has a wooden magician in it. The words "Secrets of the Universe" are written on top.

2_7_5_3
To catch the cloth is what the skillful zebra really likes to do.
To catch the Frisbee is what the skillful zebra really likes to do.
To catch the cloth is what the skillful pig really likes to do.
To catch the ball is what the skillful pig really likes to do.

Draw: A zebra jumping for a flag. (Nearby is a large pile of flags (cloths) and a large pile of balls.) A pig watches holding onto a Frisbee.

2_7_5_4
To delight the crowd is what the dancing cow really likes to do.
To delight the crowd is what the dancing horse likes to do.
To pester the crowd is what the dancing cow really likes to do.
To pester the crowd is what the dancing horse really likes to do.

Draw: a dancing cow impressing the crowd. An applauding horse is in the front of the crowd Appendix D
Stimuli for Twisted Pictures

Twisted Pictures
*Level 3 Stimuli*

3_2_1_1 SV Attributive/Stative
The wide-awake duck is performing brilliantly.
The exhausted duck is performing poorly.
The wide-awake cat is performing poorly.
The exhausted cat is performing brilliantly.

Draw: a wide-awake duck playing his guitar brilliantly, while an exhausted cat beside him drops his horn.

3_2_1_2
The magnificent, shiny horn is leaning dangerously.
The magnificent, shiny horn is lying safely.
The beautiful, wooden guitar is leaning dangerously.
The beautiful, wooden piano is leaning dangerously.

Draw: a horn leaning precariously against a wall. Beside it, a guitar lies safely in an open case. A stable piano is in the background.

3_2_1_3
The clean and tall horse is listening attentively.
The clean and tall horse is staring blankly.
The short and dirty cow is listening attentively.
The clean and tall cow is staring blankly.

Draw: a clean and tall horse listening to a flutist in the subway. A short and dirty cow passes by staring blankly.

3_2_1_4
The late chicken is messy and wrinkled.
The late chicken is tidy and organized.
The early skunk is messy and wrinkled.
The late skunk is tidy and organized.

Draw: a sleepy, wrinkled chicken showing up late to band practice. A seated skunk is neat and organized.

3_2_2_1 Active Voice: Subject-Verb-Object (SVO)
The stern conductor leads the disorderly band.
The disorderly band leads the stern conductor.
The stern conductor leads the bored audience.
The bored audience leads the disorderly band.

Draw: a stern conductor tapping on his stand to get the orchestra to settle down. The audience sits looking bored.

3_2_2_2
The young, poorly dressed violin player copies the old, well-dressed violin player.
The old, well-dressed violin player copies the young, poorly dressed violin player.
The old, poorly dressed violin player copies the young, poorly dressed violin player.
The old, well-dressed violin player copies the young, well-dressed violin player.

Draw: a young, poorly dressed violinist watching and mimicking an old, well-dressed violinist.

3_2_2_3
The stout horn player follows the slender violin player.
The slender violin player follows the stout horn player.
The stout violin player follows the slender horn player.
The slender horn player follows the stout violin player.

Draw: A slender violin player walks across the stage to his seat, followed by a stout horn player.

3_2_2_4
The fearful goat is clutching the light-hearted goose.
The light-hearted goose is clutching the fearful goat.
The fearful goat is clutching the guitar.

Draw: A goat and a goose are in a band on stage; the goat has stage-fright and clutches the smiling, relaxed goose that is holding a guitar.

xxi

Appendix D
Stimuli for Twisted Pictures

The light-hearted goat is clutching the guitar.

3_2_3_1 Simple Negation
The sorrowful bear is not playing a brass instrument.
The sorrowful bear is playing a brass instrument.
The jolly wolf is playing a worn guitar.
The jolly wolf is not playing a brass instrument.

Draw: a sorrowful bear in tattered clothing strumming an old guitar. Beside him, a jolly wolf plays a brass instrument (e.g., bugle).

3_2_3_2
The curious raccoon is not clanging the metal bell.
The mischievous monkey is not clanging the metal bell.
The curious raccoon is clanging the metal bell.
The curious raccoon is not carrying a telescope.

Draw: in a bell tower, a mischievous monkey clangs the bell, while nearby a curious raccoon enjoys the view through the telescope s/he is carrying.

3_2_3_3
The chubby duck is not playing a soft and pretty melody.
The chubby duck is playing a soft and pretty melody.
The skinny dog is not playing a soft and pretty melody.
The skinny dog is sitting in a short chair.

Draw: A skinny dog plays a pretty melody on his flute. A chubby duck sitting in a short chair listens contentedly.

3_2_3_4
The piano player is not wearing torn blue jeans.
The piano player is wearing torn blue jeans.
The singer is wearing a fancy ball gown.
The singer is playing the grand piano.

Draw: a piano player in a fancy ball is playing for a singer in torn blue jeans.

3_2_4_1 SV + Prepositional Phrases
The concerned violin player is looking down at his violin.
The calm horn player is looking out at the crowd.
The calm violin player is looking up at the ceiling.
The concerned violin player is looking up at the conductor.

Draw: a nervous violin player looking down on his violin. A calm horn player looks up at the conductor. Other musicians look out at the audience.

3_2_4_2
The glaring conductor points directly toward the beaming tuba player.
The glaring conductor points away from the beaming tuba player.
The glaring conductor points directly toward the uncertain piano player.
The beaming tuba player points away from the glaring conductor.

Draw: a frowning conductor using his baton to indicate that it is the smiling (beaming) tuba player's turn to play. Beside the tuba player sits a nervous (uncertain) piano player.

3_2_4_3
The poodles in clever costumes are dancing toward each other on the stage.
The poodles in clever costumes are dancing away from each other on the stage.
The poodles in clever costumes are dancing toward each other in front of the stage.
The poodles in clever costumes are dancing away from each other in front of the stage.

Draw: Poodles (in 50's clothing—poodle skirts—with numbers on their back) dancing with each other on a stage. In front of the stage sit watchers at tables.

3_2_4_4 xxii

Appendix D
Stimuli for Twisted Pictures

The talented sheepdog is playing with the amusing armadillo under the stars.
The talented sheepdog is playing with the amusing armadillo inside the tent.
The amusing armadillo is playing without the talented sheepdog under the stars.
The talented sheepdog is playing without the amusing armadillo inside the tent.

Draw: a banjo-playing sheepdog and a trumpet-playing, joking armadillo are playing together under the stars next to a tent. An animal sits under the tent.

3_2_5_1 Conjunction of NP, VP, S using and, or, neither-nor
The short, handsome dog and the tall, slender cat are singing joyfully and loudly.
The tall, slender dog and the short, pretty cat are singing sadly and quietly.
The short, pretty skunk and the short, handsome dog are singing joyfully and loudly.
The tall, slender cat and the short, pretty skunk are singing sadly and quietly.

Draw: a short, handsome dog and a tall, slender cat singing joyfully and loudly to a short, pretty skunk. The skunk is not singing.

3_2_5_2
Neither the spotted cow nor the sleek stallion is tuning a guitar.
Neither the spotted cow nor the sleek stallion is tuning a violin.
Neither the sleek stallion nor the grizzly bear is tuning a violin.
Neither the spotted cow nor the grizzly bear is tuning a guitar.

Draw: a grizzly bear, a spotted cow, and a horse sitting beside each other in the orchestra. The bear is tuning a guitar, the horse is tuning a violin, and the cow is warming up on the flute.

3_2_5_3
The pig is sitting and carefully taking apart his brass horn.
The pig is sitting and playing his bagpipe mournfully.
The cat is sitting and playing her bagpipe mournfully.
The cat is standing and carefully taking apart her brass horn.

Draw: a pig sitting and cleaning a brass horn (e.g., French horn), which is in pieces all around him. A cat stands nearby playing the bagpipe.

3_2_5_4
The guilty monkey is returning the valuable music book and the polished violin.
The guilty monkey is returning the valuable music book and the worn guitar.
The guilty monkey is returning the worn guitar and the polished violin.
The pleased raccoon is returning the valuable music book and the polished violin.

Draw: a sheepish-looking monkey is handing over a gilt-edged music book and a polished violin to a pleased raccoon.

3_3_1_1 Subject Relativization: SV modifier (past and present)
The country cat that is playing quickly is jolly.
The city cat that is fiddling slowly is serious.
The country mouse that is fiddling quickly is serious.
The city mouse that is playing slowly is jolly.

Draw: a jolly country cat quickly picking a banjo and sweating, and a serious city mouse playing the violin. The cat wears overalls and a straw hat and the mouse wears baggy jeans and a baseball cap turned backward.

3_3_1_2

Appendix D
Stimuli for Twisted Pictures

The longhaired, laughing dog that is drumming is wild.
The shorthaired, frowning dog that is dancing is tame.
The longhaired, laughing monkey that is drumming is tame.
The shorthaired, frowning monkey that is drumming is wild.

Draw: a longhaired, laughing dog pounding on the drums wildly, while a shorthaired, laughing monkey dances wildly nearby. pounding is a transitive verb in this usage 3_3_1_3
The chubby, horn-playing cow that is running is humorous.
The skinny, violin-playing cow that is standing is earnest.
The chubby, horn-playing horse that is standing is earnest.
The skinny, violin-playing horse that is running is humorous.

Draw: a chubby cow running across the stage holding his horn while the audience laughs. A skinny horse with a violin stands with a serious, earnest expression on his face.

3_3_1_4
The well-dressed skunk that is browsing is delighted.
The skunk in the uniform that is purchasing is sad.
The well-dressed pig that is browsing is sad.
The pig in the uniform that is purchasing is delighted.

Draw: a well-dressed skunk smiling shopping in a music store. A friendly, uniformed pig employee stands behind a counter and assists a second skunk customer who is buying something.

3_3_2_1 Subject Relativization SV reduced

The capable alligator instructing is patient with his student.
The confused alligator playing is worried about his progress.
The capable crane instructing is patient with her student.
The confused crane instructing is worried about her progress.

Draw: a capable alligator music professor patiently instructing a confused and worried crane student.

3_3_2_2
The short, lazy drummer snoozing during the concert is under the stage.
The short, hard-working guitarist playing in the band is singing a song.
The tall, lazy guitarist playing in the band is under the stage.
The short, hard-working drummer playing in the band is singing a song.

Draw: a short drummer sleeping under the stage with drumsticks in his hand. A tall guitarist is singing and playing on the stage.

3_3_2_3
The chubby, well-dressed pig boasting loudly is selling tickets.
The chubby, well-dressed pig hiding meekly is selling pretzels.
The lean, poorly dressed cow hiding meekly is selling tickets.

Draw: a chubby, well-dressed nightclub-owning pig boasting while selling tickets to a beaming well-dressed cow. A lean, poorly dressed cow sells pretzels nearby. A third character is hiding meekly.

xxiv

Appendix D
Stimuli for Twisted Pictures

The lean, poorly dressed cow boasting loudly is selling pretzels.

3_3_2_4
The chubby duck quacking off-key is ashamed.
The skinny duck playing in tune is proud.
The chubby skunk singing off-key is ashamed.
The skinny skunk playing in tune is proud.

Draw: a chubby duck attempting to sing and being embarrassed when unable to do so. A chubby skunk accompanies the duck on piano, smiling proudly.

3_3_3_1 Subject Relativization: Negation

The rat in the black cap that is not dancing is listening to the jukebox.
The rat in the black cap that is dancing is listening to the jukebox.
The cat in the dark sunglasses that is not dancing is listening to the radio.
The rat in the dark sunglasses that is not dancing is listening to the radio.

Draw: a rat wearing a black beret is standing still, with her hand to her ear, listening intently to a jukebox, while a cat in dark sunglasses dances nearby.

3_3_3_2
The serious zebra that is not blowing her horn is reading.
The stout cow that is not blowing her horn is nibbling.
The serious zebra that is blowing her horn is reading.
The slender monkey that is not blowing her horn is not reading.

Draw: a serious zebra reading with a horn resting beside her. A slender monkey plays a recorder and a stout cow plays the horn nearby.

3_3_3_3
The dog that is not composing music is reading a book of poems.
The skunk that is not composing music is reading a book of poems.
The dog that is composing music is reading a book of poems.
The skunk that is composing music is reading a book of poems.

Draw: a skunk composing music (e.g., at a grand piano with composition notes strewn across the top of it. A dog sits against one of the legs of the piano reading a book of poetry.

3_3_3_4
The monkey in the pretty frock that is not trying out for the band is bashful.
The monkey in the pretty frock that is trying out for the band is bashful.
The tiger cub with an electric guitar that is not trying out for the band is not daring.
The monkey with an electric guitar that is not trying out for the band is daring.

Draw: a bashful monkey wearing a pretty dress and watching a daring tiger cub audition to be the guitarist for a rock band.

3_3_4_1 Infinitival Complement to Verb

The energetic chicken loves to play the white piano.
The lazy chicken loves to bang on the large drums.

Draw: an energetic chicken playing a white piano, and an energetic duck banging on the xxv Appendix D
Stimuli for Twisted Pictures The energetic duck loves to watch the talented musicians.
The lazy dog loves to play the white piano.

large drums. A dog watches them play.

3_3_4_2
The tall giraffe in the blue hat asked to test the long-necked guitar.
The short giraffe in the green hat asked to test the precious violin.
The short cow in the green hat asked to test the long-necked guitar.
The tall cow in the blue hat asked to test the precious violin.

Draw: a tall horse in a blue hat holding a long-necked guitar, and a short cow in a green hat pointing to a fancy violin hanging on the wall.

3_3_4_3
The busy dog wants to go to the music concert.
The busy dog wants to go to the action movie.
The daydreaming cat wants to go to the clothing store.
The daydreaming cat wants to go to the action movie.

Draw: a dog is buying tickets to a music concert and a cat is standing nearby daydreaming. On each side of the concert hall show a clothing store and a movie theater.

3_3_4_4
The chubby chicken knows to tune the violin before playing.
The chubby chicken knows to tune the horn before playing.
The skinny duck knows to tune the violin before playing.
The skinny duck knows to open the music book before playing.

Draw: a chubby chicken tuning her violin as the conductor taps on the podium. A skinny duck sticks a brush down his horn. Closed music books sit in front of both the chicken and the duck.

3_4_1_1 Passive Vvoice: Subject-Verb-Object (SVO)

The seated violin player is accompanied by the standing horn player.
The seated horn player is accompanied by the standing violin player.
The seated horn player is accompanied by the seated piano player.
The standing piano player is accompanied by the seated violin player.

DRAW: A FORCEFUL VIOLINIST AND GENTLE HORN PLAYER PLAYING TOGETHER. THE PIANIST SITS WITH HIS HANDS AT HIS SIDE.

3_4_1_2
The famous music contest was won by the spotted horse in the formal black suit.

Draw: A splendid pig in a stunning blue ball gown presents a prize check and medal to a Appendix D
Stimuli for Twisted Pictures The famous music contest was won by the spotted cow in the blue ball gown.
The prize money was won by the splendid pig in the formal black suit.
The prize money was won by the spotted cow in the brown suit.

spotted horse in a formal tuxedo. A spotted cow in a rumpled brown suit watches and applauds.

3_4_1_3
The laughing horn players are greeted by the handsome fiddle player outside the dance hall.
The handsome fiddle player is greeted by the laughing horn players outside the dance hall.
The grimacing horn players are greeted by the bagpipe player at the train station.
The handsome fiddle player is greeted by the bagpipe player outside the dance hall.

Draw: some laughing horn players are being greeted by an elegant and handsome fiddle player outside of a dance hall. Beyond the dance hall is a subway entrance, from which a bagpipe player is emerging.

3_4_1_4
The woeful, poorly dressed violin player is embraced by the comforting, well-dressed horn player.
The woeful, poorly dressed horn player is embraced by the comforting, well-dressed violin player.
The woeful, poorly dressed violin player is embraced by the comforting, well-dressed doorman.
The comforting, poorly dressed violin player is embraced by the woeful, well-dressed horn player.

Draw: a well-dressed horn player hugging a sad, raggedy violin player outside a nightclub. A cold doorman watches.

3_5_1_1 Subject Relativization: Subject-Verb-Object (SVO)
The frowning conductor that instructs the pretty chicken violin player is stout.
The smiling chicken violin player that instructs the plain conductor is slender.
The smiling conductor that instructs the plain chicken violin player is slender.
The pretty chicken violin player that instructs the frowning conductor is stout.

Draw: a pretty, slender chicken violinist and a stout, frowning conductor yells in a music classroom setting.

3_5_1_2
The anxious bandleader that hired the peaceful horn player is thin and hard-working.
The peaceful horn player that hired the anxious bandleader is thin and hard-working.
The anxious bandleader that hired the peaceful horn player is fat and lazy.
The peaceful horn player that hired the anxious bandleader is fat and hard-working.

Draw: a thin, nervous bandleader pulling a calm horn player onto a bus. The bus is plastered with stickers from all the places the band has played.

3_5_1_3
The fresh-faced, young zebra that contacts the wealthy music producer is excited.
The fresh-faced young music producer that contacts the wealthy zebra is calm.

Draw: a young zebra with his band behind him telephoning from a pay phone. He holds a top-40 song-list. The phone rings in the wealthy music producer's office. The calm Appendix D
Stimuli for Twisted Pictures The fresh-faced, young zebra that contacts the wealthy music producer is calm.
The wealthy music producer that contacts the fresh-faced, young zebra is excited.

producer wears jewelry and has a briefcase full of money on his desk.

3_5_1_4
The handsome cat that manages the costumed singing trio is winking.
The costumed singing trio that manages the handsome cat is winking.
The handsome cat that manages the costumed singing trio is sitting.
The costumed singing trio that manages the handsome cat is standing.

Draw: a handsome cat propositioning a dim-witted club owner with a monkey trio behind him.

3_5_2_1 Subject Relativization: SVO reduced
The old dog tuning the white grand piano observes a tiny tuning fork.
The young dog playing the black grand piano observes an enormous music book.
The young cat playing the white grand piano observes an enormous tuning fork.
The old cat tuning the black upright piano observes a tiny music book.

Draw: an old dog listening to and tuning a white grand piano and holding a tiny tuning fork. A young cat pianist sits at the piano bench reading a giant music book open in front of him.

3_5_2_2
The feathered cow striking the silver and gold bells holds a long stick.
The painted horse striking the silver and gold bells holds a long stick.

The painted horse striking the black and brown drums holds a short stick.
The painted cow striking the black and brown drums holds a short stick.

Draw: a feathered cow and a painted horse. The cow strikes silver and gold bells with a large stick and the horse strikes the black and brown drums with a large stick. A short stick lies on the ground.

3_5_2_3
The duck wearing headphones records the singer's harmonies and the guitar player's melody.
The duck wearing headphones records the drummer's beats and the guitar player's melody.
The skunk wearing headphones records the drummer's beats and the guitar player's melody.
The skunk wearing headphones records the singer's harmonies and the guitar player's melody.

Draw: a duck recording a skunk singer and a dog guitar player. A cat holding drumsticks sits on a couch behind the recording engineer in the booth.

3_5_2_4
The capable horse erecting the background scene balances gracefully on the leaning ladder.
The capable horse painting the background scene hangs dangerously from the leaning ladder.
The creative cat erecting the background scene balances gracefully on the leaning ladder.
The creative cat painting the background scene balances gracefully on the leaning ladder.

Draw: a horse balances on a ladder while hammering a nail into a theater backdrop. A cat paints the backdrop. Tools hang precariously from the backdrop.

Appendix D
Stimuli for Twisted Pictures

3_5_3_1 Double Embedding

The dog that whirls beside the raccoon that is playing a horn wears a blue, flowered dress.
The dog that whirls beside the raccoon that is playing a horn wears a blue, pinstriped suit.
The dog that whirls beside the raccoon that is playing the drums wears a blue, flowered dress.
The dog that whirls beside the raccoon that is playing the drums wears a blue, pinstriped suit.

Draw: a dog, wearing a blue, flowered dress spinning beside a horn-playing raccoon that is wearing a blue, pinstriped suit. A cow plays the drums nearby.

3_5_3_2
The singing horse that entertains the crowd that is disorderly bows and gestures to the bandleader pig.
The singing horse that entertains the crowd that is disorderly throws the tomatoes.
The singing horse that entertains the crowd that is slumbering bows and gestures to the bandleader pig.
The singing horse that entertains the crowd that is slumbering throws the tomatoes.

Draw: A horse on stage sings, bows, and points to the bandleader pig, while the disorderly audience throws tomatoes at the stage.

3_5_3_3
The duck that thanks the contest official that clutches a prize weeps for joy.
The duck that thanks the contest official that clutches a violin weeps for joy.
The duck that thanks the contest official that clutches a violin glares bitterly.
The duck that thanks the contest official that clutches a prize glares bitterly.

Draw: a line of tuxedoed contestants (glaring bitterly) behind a tuxedoed, violin playing duck. The duck clasps a violin to his chest and weeps while smiling. He thanks the contest official, who is holding a prize.

3_5_3_4
The musical street performers that captivate the crowd that is gathered on the dirty train platform are clasping brass instruments.
The musical street performers that captivate the crowd that is consulting a posted map are clutching money.
The tired workers that watch the musical street performers that are clutching money are clasping brass instruments.
The tired workers that watch the musical street performers that are consulting maps are clasping brass instruments.

Draw: a crowded subway platform filled with tired workers. A giant clock above everyone, being cleaned by a worker, reads 5:15 PM. A trio of musicians performs on their brass instruments. Members of the crowd hold dollar bills to tip the musicians. One tired worker consults a map posted in the station.

3_6_1_1 Object Relativization: Subject-Verb (SV)
The tall, well-dressed conductor praises the pretty, but messy-haired, piano player that bows deeply.
The tall, well-dressed piano player praises the pretty, but messy-haired, conductor that nods gently.
The tall, well-dressed conductor praises the pretty, but messy-haired, piano player that nods gently.
The pretty, but messy-haired, piano player praises the tall, well-dressed conductor that bows deeply.

Draw: a tall, well-dressed horse conductor praising and nodding at a pretty, messy-haired piano-playing chicken that is bowing deeply.

Appendix D
Stimuli for Twisted Pictures

3_6_1_2
The poor songwriter approaches the well-dressed singer who exits at the theater's back entrance.
The poor singer approaches the well-dressed songwriter who exits at the theater's front entrance.
The well-dressed songwriter approaches the well-dressed singer who exits at the theater's front entrance.
The well-dressed songwriter approaches the poor singer who exits at the theater's back entrance.

Draw: at the back entrance of a theater, a poorly dressed songwriting dog approaching an elegantly dressed cat. The dog has sheet music coming out of his back pocket. The door can be identified with a sign that says "back door" if it is unclear.

3_6_1_3
The singing mother cat calms the tired kitten that had been playing all day.
The tired kitten calms the singing mother cat that had been sleeping all day.
The tired mother cat calms the singing kitten that had been sleeping all day.
The singing mother calms the singing kitten that had been playing all day.

Draw: a mother cat singing a lullaby to a sleeping kitten in a crib. Toys are strewn all around the room. The kitten has a block in his hand. A half-built house of blocks is nearby.

3_6_1_4
The thin, concert-organizing chicken telephones the fat, opera-singing dog that eats constantly.
The thin, opera singing dog telephones the concert organizing chicken that eats at mealtime.
The fat, concert organizing chicken telephones the thin, opera singing dog that eats at mealtime.
The thin, opera singing dog telephones the thin, concert organizing chicken that eats constantly.

Draw: a thin, concert-organizing chicken making a telephone call. The fat, opera singing dog sits at a table full of food, in a room full of food, when the telephone rings. A clock above the dog reads 3:00 o'clock.

3_6_2_1 Object Relativization: SVO
The lively zebra tunes the polished piano that occupies the center of the stage.
The weary cow tunes the polished piano that occupies the center of the stage.
The lively cow tunes the polished piano that occupies the center of the stage.
The weary zebra tunes the polished piano that occupies the center of the stage.

Draw: a lively, wide-eyed zebra tuning a polished grand piano in the center of a concert stage. A cow sleeps at the keyboard.

3_6_2_2
The laughing monkey cheers the dancing duck that plays the violin.
The dancing duck cheers the laughing monkey that plays the violin.
The laughing monkey cheers the dancing duck that wears a green jacket.
The dancing duck cheers the laughing monkey that wears a green jacket.

Draw: an old, laughing monkey wearing a green jacket auditioning a dancing, violin playing duck in a theater. A group of young musicians practices off stage.

3_6_2_3
The pushy raccoon urges the hesitant skunk that is studying music.

Draw: a raccoon wearing glasses pushing a skunk, with sheet music spilling out of her xxx Appendix D
Stimuli for Twisted Pictures The pushy skunk urges the hesitant raccoon that is studying dance.
The pushy raccoon urges the hesitant skunk that is studying dance.
The pushy skunk urges the hesitant raccoon that is studying music.

3_6_2_4
The dog bothers the snake that likes hearing music with headphones.
The snake bothers the dog that likes hearing music with headphones.
The dog bothers the snake that studies history with a giant book.
The snake bothers the dog that studies history with a giant book.

3_7_2_1 Clefting

It's the resistant chicken with the concert tickets that the duck is trying to convince.
It's the resistant duck with the concert tickets that the chicken is trying to convince.
It's the resistant skunk with the concert tickets that the duck is trying to convince.
It's the resistant chicken with the concert tickets that the skunk is trying to convince.

3_7_2_2
It's the horse's tail hair that the thoughtless dog is plucking and stringing.
It's the dog's tail hair that the thoughtless horse is plucking and stringing.
It's the zebra's tail hair that the thoughtless dog is plucking and stringing.
It's the horse's tail hair that the thoughtless zebra is plucking and stringing.

3_7_2_3
It's the hard-working cow with the tuba that the friendly pig with the pushcart is assisting.
It's the friendly pig with the pushcart that the hard-working cow with the tuba is assisting.
It's the hard-working dog with the tuba that the friendly pig with the pushcart is assisting.
It's the hard-working cow with the tuba that the friendly dog with the pushcart is assisting.

3_7_2_4
It's the hidden cat that the curious monkey glimpses.
It's the hidden monkey that the curious cat glimpses.
It's the hidden snake that the disinterested cat glimpses.

--- backpack, into a music classroom. Across the hall, dancers practice in another room.

Draw: a dog, with history books in front of him taps a snake on the shoulder in a library. The snake is listening to music with headphones. Large books are scattered on the table.

Draw: a chicken holding concert tickets and a duck in front of a theater and a concert hall. The duck is pulling the resistant chicken into the movie theater. A skunk, watching the proceedings with curiosity, walks by in the background.

Draw: a dog plucking a hair out of the horse's tail with one hand and holding a violin with the other. The zebra watches and winces.

Draw: a smiling pig holding a pushcart while the sweating cow puts the tuba on top of it. A dog walks by in the background.

Draw: a cat hidden, with just its paws sticking out from under a chair. A curious usher monkey discovers the paws. A snake is sitting on top of the chair.

Appendix D
Stimuli for Twisted Pictures

It's the hidden cat that the disinterested snake glimpses.

3_7_5_1 Subject Infinitival Clause

To startle the drummer is what the sneaky chicken holding the gong is hoping to do.
To relax with a soda is what the sneaky chicken holding the gong is hoping to do.
To startle the sneaky chicken is what the drummer holding a soda is hoping to do.
To calm the sneaky chicken is what the drummer holding the gong is hoping to do.

Draw: a chicken holding a gong, sneaking up on a relaxed drum player. A soda sits on a table.

3_7_5_2

To organize the relaxed musicians is what the angry cat really wants to do.
To play his guitar is what the happy pig really wants to do.
To organize the relaxed musicians is what the angry skunk really wants to do.
To sit on the couch is what the angry cat really wants to do.

Draw: a musician's dressing room with a relaxed pig and skunk sitting on the couch. A guitar lies on the floor. A frustrated cat stands in the doorway pointing to a clock that reads 7:55 PM. The cat is pulling out his hair. On the wall is a poster announcing the performance of the pig and the skunk at 8:00 PM.

3_7_5_3

To repeat her prize-winning performance is what the raccoon wants to do.
To repeat his prize-winning performance is what the pig really wants to do.
To put up a banner is what the pig really wants to do.
To scrap her violin is what the raccoon really wants to do.

Draw: a raccoon, holding a violin, admiring his trophy. The trophy has the word raccoon on it to indicate who won it. At the same time, a pig, holding a violin, eyes the trophy jealously. A banner above the two indicates that a competition is going on.

3_7_5_4

To combine the sounds of different musical instruments is what the creative raccoon really likes to do.
To combine the sounds of different musical instruments is what the creative skunk really likes to do.
To enjoy the performance of the street musician is what the pleased raccoon really likes to do.
To play a dirty old fiddle is what the creative skunk really likes to do.

Draw: a raccoon playing multiple instruments (e.g., accordion, harmonica, and knee tambourine) in the street. The skunk watches. A dirty old fiddle lies on the ground.

Appendix E
Stimuli for Book Monkeys

Book Monkeys Stimuli
*Level 0*

0_1

Today I'm going to the big soccer game. The Daring Donkeys are playing     Fiction
the Great Goats. Both teams run very fast. The donkeys are very good at kicking
with their back feet. The goats are great at using their heads to send the ball
flying. Whoever wins today will be the city champions!

0_1_1 (literal/true or false)                                                1
Which sentence is false?
The Great Goats play baseball.
The goats are great at using their heads.
The game today is important.
The donkeys are very good at kicking.

0_1_2 (literal/true or false)                                                2
It is true that
both teams run very fast
the Daring Donkeys will win
the Great Goats are slow
today's game is not important 0_2_1 (causative/cause and effect)                                           3
The donkeys are special because they
kick with their back feet
are good runners
move the ball with their heads
are bigger than goats 0_2_2 (causative/cause and effect)                                           4
The goats are special because they
hit the ball with their heads
chase the donkeys
always win every game
kick with their back feet 0_3_1 (inferential/title)                                                    5
The best title for this story is
A Big Soccer Game
The Great Goats
The Daring Donkeys
I Love Soccer 0_3_2 (inferential/word)                                                     6
The story says, "Whoever wins today will be the city champions!" The     NOTE: "champion" is Grade 4
word "champions" most likely means
Winners
Losers
Players
Goats

0_2

The Animal City swimming pool is a popular place. Everyone is welcome as     Fiction
long as they act nicely. In hot weather you might see dogs, ducks, alligators, and i Appendix E
Stimuli for Book Monkeys even a hippopotamus swimming together. In the winter the pool is full of polar bears, seals, and penguins. Hot or cold, you won't see lions, panthers, or house cats. Most cats don't like getting wet!

0_1_3 (literal/true or false) 1
Which sentence is false?
Ducks won't swim with dogs.
The swimming pool is popular.
Alligators swim in hot weather.
Polar bears swim in cold weather.

0_1_4 (literal/true or false) 2
It is true that
alligators enjoy swimming
all dogs love cold water
panthers swim in the summer
ducks aren't welcome 0_2_3 (causative/cause and effect) 3
You might see polar bears in winter because they
like to swim in cold weather
like hot weather
need a lot of room
won't swim with cats 0_2_4 (causative/cause and effect) 4
You won't see cats swimming because they
don't like getting wet
are afraid of other animals
aren't welcome at the pool
don't know how to swim 0_3_3 (inferential/main idea) 5
This story is mostly about
the Animal City swimming pool
swimming in cold water
dogs and ducks
why lions swim 0_3_4 (inferential/word) 6
The story says, "The Animal City swimming pool is a popular place." The NOTE: "popular" is Grade 3
word "popular" most likely means
well-liked
empty
not liked
small

0_3
   Most big cities are busy by day and much quieter at night. Animal City is Fiction
very active at night. That's because many animals come out only at night. These
nighttime animals sleep all day. Once it gets dark, bats, owls, hamsters, and
many others wake up. They will stay awake until the sun comes up again.

0_1_5 (literal/true or false) 1
It is true that ii

Appendix E
Stimuli for Book Monkeys nighttime animals sleep during the day
most cities are busy at night
nighttime animals don't need sleep
owls are afraid of the dark 0_1_6 (literal/true or false)     2
Which sentence is false?
Animal City is quiet at night.
Owls come out at night.
Hamsters sleep during the day.
Most cities are busy by day.

0_2_5 (causative/cause and effect)     3
Bats sleep during the day because they
are up all night
don't like noise
like bright light
are lazy 0_2_6 (causative/cause and effect)     4
Animal City is different from other cities because it is
busy both night and day
busy during the day
only busy at night
quiet at night 0_3_5 (inferential/next)     5
Which sentence would most likely come next in the story?
Then they will head off to bed.
They enjoy working by day.
Hamsters enjoy the sunshine.
Now the city is quiet.

0_3_6 (inferential/word)     6
The story says, "Animal City is very active at night." The word "active"     NOTE: "active" is Grade 3
most likely means
busy
slow
fun
scary

0_4
    My friend Roger is a fennec fox. He comes from the desert in Africa and has     Fiction
huge ears. His big ears help him hear very, very well. He can hear tiny bugs
moving under the sand. Roger has a very special job in Animal City. He goes
from house to school to music hall tuning pianos.

0_1_7 (literal/true or false)     1
You would find a fox like Roger
in Africa
under the sand
inside trees
on a farm 0_1_8 (literal/true or false)     2

Appendix E
Stimuli for Book Monkeys

Which sentence is false?
Roger doesn't hear well.
Roger has a special job.
Roger has huge ears.
Roger is a fox.

0_2_7 (causative/cause and effect)     3
Roger has big ears because
they help him hear better
he is a fox
he is from Africa
he is afraid of noise 0_2_8 (causative/cause and effect)     4
Roger can find tiny bugs because he
can hear them moving
can smell them hiding
digs into the sand
can see through the sand 0_3_7 (inferential/title)     5
The best title for this story would be
Roger the Special Fox
How to Find Bugs
Stop the Noise!
Life in Africa 0_3_8 (inferential/next)     6
Which sentence would most likely come next?
Because of Roger, the music sounds better.
He can't tune a fish, though.
People shout and yell at him.
Roger wishes his ears were smaller.

0_5
    We just saw a show called "Mice on Ice." We joined the crowd at the     Fiction
ice-skating rink. On the ice were hundreds of mice in beautiful costumes. They
wore tiny ice skates and did spins and jumps to music. At the end, they formed a
long line holding each other's tails. As they raced across the ice, the crowd
clapped and clapped.

0_1_9 (literal/true or false)     1
It is true that
the mice wore tiny ice skates
mice don't have tails
the show is called "Iced Mice"
not many people came 0_1_10 (literal/true or false)     2
Which sentence is false?
The mice didn't skate very well.
A crowd watched the show.
The mice did spins to music.
The show was at a skating rink.

Appendix E
Stimuli for Book Monkeys

0_2_9 (causative/cause and effect) 3
The mice wore tiny ice skates because
mice have tiny feet
they held each other's tails
they jumped to the music
the crowd told them to 0_2_10 (causative/cause and effect) 4

THE CROWD CLAPPED BECAUSE the show was ending
they were afraid of mice
they were very cold
the show was starting 0_3_9 (inferential/title) 5
The best title for this story would be

*Mice on Skates*

Mice Can't Skate
A Terrible Night
Learning to Jump

0_3_10 (inferential/word) 6
The story says, "On the ice were hundreds of mice in beautiful costumes." NOTE: "costumes" is Grade 4
The word "costume" most likely means
special clothing
ice skates
music
large crowds

0_6
    Let's visit the Farm-Animal Food Market. There is a large department with Fiction
seeds for chickens, ducks, and geese. There is a room full of dried oats for the
horses. There are piles of different grasses for the cows and sheep. Most farm
animals like the fruit and vegetable department. Because pigs will eat rotten
food, there is a smelly room just for them.

0_1_11 (literal/true or false) 1
Which sentence is false?
There are cakes for sale.
The market has many different foods.
The store is especially for farm animals.
Birds shop at the market.

0_1_12 (literal/true or false) 2
It is true that
pigs will eat rotten food
not many animals like fruit
cows don't eat grass
all animals eat the same food v Appendix E
Stimuli for Book Monkeys 0_2_11 (causative/cause and effect)     3
**The store has many departments because
different animals like different foods**
all animals enjoy eating the same thing
most farm animals like fruits
the big animals hurt the small animals 0_2_12 (causative/cause and effect)     4
**Pigs have a special room because
their food is smelly**
pigs don't get along with horses or sheep
they only like eating seeds
pigs never eat fruit or vegetables 0_3_11 (inferential/main idea)     5
**This story is mostly about
one store where animals shop**
many places animals like to visit
why cows eat grass
a good place to take your dog or cat 0_3_12 (inferential/next)     6
**Which sentence would most likely come next?
I'd rather not go in there!**
They share it with the horses.
Pigs eat only fresh food.
Most sheep don't like to shop.

0_7
   Spring is a special time in Animal City. That's because so many animals     Fiction
have their babies in spring. You can see new lambs playing in flocks of sheep.
In the parks, you can watch calves following their mother cows. You can hear
baby birds chirping from nests high in the trees. I especially like watching foals
learning to run like stallions and mares.
    1

0_1_13 (literal/true or false)

WHICH SENTENCE IS FALSE?

Baby birds are born in the fall.
Many baby animals are born in spring.
You can see some babies in the parks.
Spring is special in Animal City.

0_1_14 (literal/true or false)     2
**It is true that
many animal babies are born in spring**
baby birds can't chirp
calves live high in the trees
few animal babies are born in spring 0_2_13 (causative/cause and effect)     3
**You can hear baby birds because they
are chirping**

Appendix E
Stimuli for Book Monkeys live in nests
are hiding in trees
make more noise than cows 0_2_14 (causative/cause and effect)      4
Spring in Animal City is a special time because
many baby animals are born
the weather is so warm
the cities parks are beautiful
lambs play games 0_3_13 (inferential/word)      5
*The words "stallions and mares" most likely mean*
NOTE: "stallion," "mare" are Grade 4 adult horses
young sheep
animals who run
baby cows

0_3_14 (inferential/word)      6
The story says, "In the parks, you can watch calves following their mother cows." the word "calves" most likely means
NOTE: "calves" is Grade 4 (though "calf" is a Kindergarten word.)
baby cows
mother cows
groups of pigs
city people

0_8
    All people need fresh water to live. That is why most large cities are near fresh water. Cities near a lake or river have a steady supply of fresh water close-by. Those in the desert or near the saltwater ocean may not. These cities must get fresh water from other places. Their water is carried to them through pipes from freshwater rivers and lakes.
Nonfiction 0_1_15 (literal/true or false)      1
Which sentence is false?
Cities near lakes have a supply of salt water.
All people need fresh water.
Most large cities are near fresh water.
Water is carried through pipes.

0_1_16 (literal/true or false)      2
It is true that
all people need fresh water
few large cities are near fresh water
deserts have plenty of fresh water
all rivers and lakes have salt water 0_2_15 (causative/cause and effect)      3

Cities in the desert get water piped in because
there is no fresh water nearby
there are many rivers in the desert vii Appendix E
Stimuli for Book Monkeys they need salt water
desert people don't need water 0_2_16 (causative/cause and effect)      4

Cities near the ocean get fresh water
from rivers and lakes
right from the ocean
sent from the desert
only from rain 0_3_15 (inferential/title)      5
The best title for this story would be

*Water for Cities*

Life beside the Ocean
Desert Lakes
All about Pipes

0_3_16 (inferential/pronoun)      6
The story says, "Their water is carried to them through pipes from freshwater rivers and lakes." The word "their" is talking about cities not near lakes or rivers
cities near lakes
people in America
rivers and lakes

0_9

Most tall buildings have elevators. Elevators carry people and things between floors. First, you press a button to choose whether to go up or down. When the elevator arrives, get in and choose the number for the floor you want. A bell rings to signal that you have arrived at the right floor. I like elevators because I'd rather not climb hundreds of stairs!      Nonfiction 0_1_17 (literal/true or false)      1
Which sentence is true?
Elevators go up and down.
All buildings have elevators.
Elevators carry only people.
Tall buildings never have stairs.

0_1_18 (literal/true or false)      2
Which sentence is false?
Tall buildings never have stairs.
Most tall buildings have elevators.
Elevators go up and down.
You must choose which floor you want.

0_2_17 (causative/cause and effect)      3
You press an elevator button because
you must choose which floor you want
you don't want the doors to open
someone asks you to Appendix E
Stimuli for Book Monkeys a bell is ringing 0_2_18 (causative/cause and effect)     4
Some people like elevators because they are faster and easier than stairs
elevators only go up
elevators were built long ago
they are afraid of tall buildings 0_3_17 (inferential/word)     5
The story says, "A bell rings to signal when you have arrived at the right floor." The word "signal" most likely means     NOTE: "signal" is Grade 4
give a cue
ring like a bell
start a song
nice or kind 0_3_18 (inferential/next)     6

*Which sentence would most likely come next?*

Climbing stairs makes me tired.
I love climbing stairs.
Elevators aren't very useful.
That's why I don't like elevators!

0_10
    Cities often honor important people and events. They might build a monument to help people remember a special time. Some monuments honor war heroes. Other monuments honor important leaders, such as presidents. Most have a sign telling you what the monument is for. When you look at the monument and read the sign, you are learning about a city's history.     Nonfiction 0_1_19 (literal/true or false)     1
WHICH SENTENCE IS FALSE?

Monuments never honor leaders.
Monuments help people remember.
Some monuments have signs.
Cities often honor people.

0_1_20 (literal/true or false)     2
It is true that
monuments help people remember
monuments never have signs
you can't learn anything from a monument
cities never honor events 0_2_19 (causative/cause and effect)     3
Cities build monuments because they
want to honor an important person or time
don't like building signs
are trying to forget the city's past Appendix E
Stimuli for Book Monkeys need a place for people to live 0_2_20 (causative/cause and effect)      4
Most monuments have signs because
they explain what the monument is for
people should practice reading
city people like signs
leaders shouldn't be forgotten 0_3_19 (inferential/title)      5
The best title for this story would be
City Monuments
Remembering War
Parks of the City
Who Likes History?

0_3_20 (inferential/main idea)      6
This story is mostly about
what monuments are for
how monuments are built
why presidents are important
who studies history

0_11
    If you like baseball, you might enjoy living in a big city. Almost every large      Nonfiction
city in America has its own baseball team. If you buy a ticket, you can visit the
ballpark. You can sit with other fans and cheer for your favorite team. Chicago
and New York have two teams each! I guess people in those cities are crazy
about baseball.

0_1_?? (literal/true or false)      1
This story does not tell you
the rules for playing baseball
two cities where baseball is played
if you will need a ticket
whether or not you can cheer 0_1_?? (literal/true or false)      2
It is true that
New York has two baseball teams
Chicago has only one baseball team
only a few large cities have baseball teams
every city has two baseball teams 0_2_?? (causative/cause and effect)      3
You can visit a ballpark because you
buy a ticket
are a good ballplayer
are at least eight years old
are crazy about baseball 0_2_?? (causative/cause and effect)      4
The writer of this story thinks people in New York and Chicago are crazy
about baseball because
both of those cities have two teams each x

Appendix E
Stimuli for Book Monkeys they travel long distances to see a game
they cheer louder than other fans
the writer lives in New York 0_3_?? (inferential/title) 5
The best title for this story would be
Big-City Baseball
Why I Love Baseball
Let's Visit Chicago
A Hitter's Game 0_3_?? (inferential/next) 6
Which sentence would most likely come next in the story?
I wonder how they choose which team to watch.
New York has three baseball teams!
They probably like basketball, too.
It is more fun to visit the country.

0_12
    Big cities usually have several large highways. It takes many years to plan   Nonfiction
and build them. First, the city government uses a map to decide where the   NOTE: "freeway" is Grade 2
highway should go. Next, they buy all the necessary land. Then, hundreds of
workers remove anything on that land. Over several years, the new road is built.
When it is finished, cars, trucks, and busses will use it every day.

0_1_?? (literal/true or false) 1
You can tell from this story that
many people work together to build a new highway
it is easy to build a highway
most cities have too many old roads
highways are not very useful 0_1_?? (literal/true or false) 2
Which sentence is false?
Most highways are built quickly.
Highways take a lot of planning.
The government helps to make decisions.
Many workers clear the land.

0_2_?? (causative/cause and effect) 3
The city government uses a map because
they need to plan where the highway should go
it is hard to find your way on a highway
the workers often get lost
they sell maps to earn money 0_2_?? (causative/cause and effect) 4
A highway takes years to build because
it is a big job using many people
trucks won't get out of the way
every worker has to vote
most city people don't like highways 0_3_?? (inferential/word) 5
The story says, "First, the city government uses a map to decide where the   NOTE: "highway" is Grade 4 xi

Appendix E
Stimuli for Book Monkeys highway should go." The word "highway" means
a main road
a road built on a high bridge
any road that only trucks use
a map of a large city 0_3_?? (inferential/pronoun) 6
The story says, "Next, they buy all the land needed for the highway." The word "they" is talking about
the city government
the highways
cars and trucks
people who clear the land Appendix E
Stimuli for Book Monkeys

Book Monkeys Stimuli

*Level 1*

1_1

Many animals work together at the City Flower Garden. First, dogs and foxes dig all the holes for the plants. Then birds drop seeds into the holes. Raccoons water the seeds so they will grow. Sheep and cows especially like eating grass.     Fiction 1_1_1 (literal/true or false)     1
This story is about
animals working together
a visit to a garden
how flowers grow
keeping a garden neat 1_1_2 (literal/true or false)     2
This story does not tell you
raccoons dig holes
cows eat grass
animals work together
birds plant the seeds 1_2_1 (causative/cause and effect)     3
The animals dig the holes first because
then there is a place for seeds
dogs and foxes work harder than birds
sheep are best at digging
the raccoons like to go first 1_2_2 (causative/cause and effect)     4
The raccoons water the seeds because
seeds need water to grow
the dogs tell them to
they like to
the grass needs water 1_3_1 (inferential/next)     5
Which sentence would most likely come next?
They keep the grass nice and short.
The cows help the birds plant seeds.
The foxes always fight with the dogs.
Raccoons always come late.

1_3_2 (inferential/word)     6
The story says, "Sheep and cows especially like eating grass." The   NOTE: "especially" is Grade
word "especially" most likely means   4
very much
won't try
don't like
never will

1_2

Appendix E
Stimuli for Book Monkeys

The city needs a leader to be in charge. Every four years, the animals vote for mayor. This year, a tiger won and now she runs the city. She is very smart and strong. All the animals like her even though she has sharp teeth!   Fiction 1_1_3 (literal/true or false)   1
This story is about
who runs the city
how animals vote
what tigers are like
having sharp teeth 1_1_4 (literal/true or false)   2
It is true that
the animals chose the tiger
most animals don't like tigers
every animal doesn't vote
the city doesn't have a leader 1_2_3 (causative/cause and effect)   3
The animals vote for a leader because
someone must run the city
the tiger has sharp teeth
two years have passed
tigers are very smart 1_2_4 (causative/cause and effect)   4
Every four years, the animals
vote for a new mayor
vote for a tiger
like their leader
choose a new tiger 1_3_3 (inferential/pronoun)   5
The word "she" is talking about
the tiger
all animals
a voter
every leader 1_3_4 (inferential/word)   6
The word "mayor" means   NOTE: "mayor" is Grade 4 level.

someone in charge of the city
a very mean tiger
a city animal
someone who votes

1_3
The city has busses and trains. They take the animals from place to place. A lot of the slower animals ride on them. You might ride with a hen, a turtle, or some pigs. Fast animals would rather run or fly.   Fiction 1_1_5 (literal/true or false)   1
Many slow animals

Appendix E
Stimuli for Book Monkeys ride on busses and trains
like to run
don't want to ride
always go from place to place 1_1_6 (literal/true or false)     2
You can tell that
fast animals don't often ride
fast animals always ride trains
pigs like to run
slow animals never ride 1_2_5 (causative/cause and effect)     3
You might ride with a hen because
hens ride on busses and trains
turtles don't like to ride
people always ride on trains
pigs won't ride 1_2_6 (causative/cause and effect)     4
Fast animals don't take busses because they
would rather run or fly
don't like slow animals
would all rather fly
only like to take trains 1_3_5 (inferential/title)     5
The best title for this story is
How Animals Get Around
The City's Trains
What Fast Animals Like
Pigs, Hens, and Turtles 1_3_6 (inferential/next)     6
Which sentence would most likely come next?
You won't see a horse on your bus!
You better buy a ticket today.
Why does the city have trains?
Busses are better than trains.

1_4
    Many snakes are good at climbing trees. That is why they fix the city's    Fiction
streetlights. When a light breaks, a snake is called to that street. The
snake ascends the light pole. Soon the city night is bright again.

1_1_7 (literal/true or false)     1
Snakes fix lights because they
are good at climbing poles
are not afraid of lights
know the city is bright
break a lot of streetlights 1_1_8 (literal/true or false)     2
When snakes do their job
the city night has light

Appendix E
Stimuli for Book Monkeys they always climb trees
lights never break
the night is dark 1_2_7 (causative/cause and effect)     3
When a light breaks, snakes help because they
are good at climbing trees
live on the ground
need a lot of light
are very smart 1_2_8 (causative/cause and effect)     4
Why does the story say, "Soon the city night is bright again"?
Because the snakes fixed the lights.
Because the snakes like to climb.
Because the city needs lights.
Because the lights are broken.

1_3_7 (inferential/word)     5
The story says, "The snake ascends the light pole." The word    NOTE: "ascends" is Grade 4
"ascends" most likely means
climbs up
fixes
jumps down
breaks 1_3_8 (inferential/next)     6
Which sentence would most likely come next?
That snake can go home for the night.
Too bad those snakes can't climb!
It is very dark tonight in the city.
Those snakes need to get some more help.

1_5
    A building is on fire! Quickly someone calls the fire department. Here    Fiction
come the elephants, racing to the scene. They shoot water from their
trunks and soon the fire goes out. The animals are lucky to have
elephant heroes.

1_1_9 (literal/true or false)     1
In this story
a building is on fire
an elephant is in trouble
elephants start fires
the fire won't go out 1_1_10 (literal/true or false)     2
In this story, which of the following is false?
Elephants are afraid of fire.
Elephants shoot water on the fire.
Someone calls for help.
The animals feel lucky.

1_2_9 (causative/cause and effect)     3
The elephants hurry to the fire because they

Appendix E
Stimuli for Book Monkeys are the fire department
are good at running
like watching fires
own the burning building 1_2_10 (causative/cause and effect)     4
The fire goes out because
elephants shoot water on it
there is a big rainstorm
the building burns down
the animals have good luck 1_3_9 (inferential/word)     5
The elephants "shoot water from their trunks." The word "trunks"     NOTE: "trunk" is Grade 4
most likely means
long noses
tree parts
large ears
big suitcases 1_3_10 (inferential/title)     6
The best title for this story is
The Elephant Heroes
Why Buildings Burn
One Sad Day
Elephants on Fire

1_6
   In a zoo, animals live in cages and glass houses. Our city does not     Fiction THIS PARAGRAPH
have a zoo. If people visit our city, they will see all kinds of animals. They     WOULD COME FIRST.
might even think that Animal City is a giant zoo. Except, of course, the
animals are running free.

1_1_11 (literal/true or false)     1
You can tell from this story that animals in a zoo
often live in cages
live in Animal City
run free
don't like people 1_1_12 (literal/true or false)     2
In Animal City, which of the following is NOT true?
Animals live in cages.
People who visit will see animals.
Animals are free in their city.
Animal City doesn't have a zoo.

1_2_11 (causative/cause and effect)     3
People who visit Animal City will see
animals running free
only three kinds of animals
a giant zoo
a city full of people 1_2_12 (causative/cause and effect)     4

Appendix E
Stimuli for Book Monkeys

People might think Animal City is a giant zoo because
they will see all kinds of animals
there are many zoos there
all the animals live in cages
people like zoos 1_3_11 (inferential/title)                                    5
The best title for this story would be
No Zoos Here!
I Like Zoos
How Animals Live
Let's Build Zoos 1_3_12 (inferential/next)                                     6
Which sentence would most likely come next?
You won't see any cages.
You won't see any buildings.
The animals will be fighting.
They are building a new zoo.

1_7
   The streets in a big city can get very dirty. Most cities have special     Nonfiction
trucks called street sweepers to clean up the litter. These trucks have
large brushes that remove the litter from the street. All the cars must
move off the street when it is being cleaned.
                                                              1

1_1_13 (literal/true or false)
Street sweepers clean the streets because
the streets are dirty
they are special trucks
they dropped the litter
the cars won't move away 1_1_14 (literal/true or false)                                2
Which of the following is false?
Cars use brushes to sweep streets.
Street sweepers are trucks.
Street sweepers clean up litter.
Cars must move off the street when streets are cleaned.

1_2_13 (causative/cause and effect)                           3

*The brushes on street sweepers* remove the litter from the street
move cars off the dirty street
need to be cleaned very often
help cars to stay clean 1_2_14 (causative/cause and effect)                           4
The cars must move because
the street sweeper is coming
the city is getting dark
the police told them to xviii Appendix E
Stimuli for Book Monkeys litter is removed by the truck 1_3_13 (inferential/title)     5
The best title for this story is
Let's Clean the Streets
Clean Up Those Cars
How to Build a Street Sweeper
Litter and Brushes 1_3_14 (inferential/next)     6
Which sentence would most likely come next?
Now the street sweeper has room to clean.
Street sweepers are special trucks.
Most cities get very dirty.
We need to find a way to stop litter.

1_8
   Many cities have theaters where you can watch a play. If you buy a ticket, you can see actors work on stage. Actors wear costumes and pretend to be someone else. They might sing, dance, or make you laugh. When the play is over, you clap to show you enjoyed it.

Nonfiction
NOTE: "theater" is Grade 3 level. Thus I offer 2 options for question 6.)

1_1_15 (literal/true or false)     1
This story is about
seeing a play
wearing costumes
what cities have
why actors live in cities 1_1_16 (literal/true or false)     2
It is true that
actors work on stage
all plays are done in the country
actors always go see plays
actors clap after a play 1_2_15 (causative/cause and effect)     3
*You clap to* show you enjoyed the play
get a ticket to the play
pretend you are someone else
put a play on in a city 1_2_16 (causative/cause and effect)     4
You can see actors work
if you buy a ticket
if you are wearing a costume
because you have clapped
because you can sing and dance 1_3_15 (inferential/title)     5
The best title for this story is

Appendix E
Stimuli for Book Monkeys

Seeing a Play
How to Buy a Ticket
Wearing Costumes
Why We Clap

1_3_16 (inferential/pronoun)     6
The story says, "They might sing, dance, or make you laugh."
"They" is talking about the
actors
people watching
theater
plays

1_9
   Big ships come to the city harbor. The ships are bringing necessary     Nonfiction
supplies. The ships come across oceans and rivers. The ships dock at
the city's harbor and unload their cargo. Everyone in the city is thankful
for this cargo. Now they have things they need to live and work.

1_1_17 (literal/true or false)     1
It is true that
ships come to the harbor
ships never bring supplies
no one likes ships
ships have trouble docking 1_1_18 (literal/true or false)     2
This story is mostly about
what ships do for a city
how ships go across rivers
how ships dock
how a harbor works 1_2_17 (causative/cause and effect)     3
The ships come to the city because
they are bringing supplies
the city has a harbor
they have crossed oceans
everyone in the city is thankful 1_2_18 (causative/cause and effect)     4
Everybody is thankful because
they have the things they need
the ships dock at the harbor
the ships cross rivers and oceans
big ships travel very quickly 1_3_17 (inferential/title)     5
The best title for this story is
Helpful Ships
Crossing Oceans
What We Want
Things We Need 1_3_18 (inferential/word)     6

Appendix E
Stimuli for Book Monkeys

Another word for "cargo" is      NOTE: "cargo" is Grade 5
supplies
cities
ships
harbor

1_10
    A taxi is a car that takes someone from place to place. Each taxi has      Nonfiction
a meter that keeps track of how long the ride took. The taxi driver starts
the meter as soon as the rider gets in the car. When the cab gets to the
right address, the driver stops the meter. The rider must pay the amount
the meter shows.

1_1_19 (literal/true or false)      1
This story is about
how taxis work
why riders take taxis
what drivers think
going for a ride 1_1_20 (literal/true or false)      2
It is false that
riders pay before the ride
drivers take money
each taxi has a meter
the driver stops the meter 1_2_19 (causative/cause and effect)      3
The driver starts the meter when
the rider gets in the car
they have reached the right address
the rider has left the car
the car goes from place to place 1_2_20 (causative/cause and effect)      4
When the car gets to the right address
the rider needs to pay the driver
the driver has to start the meter
the meter keeps running
the taxi ride has just begun 1_3_19 (inferential/next)      5
Which sentence would most likely come next?
The taxi moves on to pick up someone else.
Now the rider drives the taxi.
The driver stops the car's meter.
The rider has to start the taxi's meter.

1_3_20 (inferential/title)      6
The best title for this story is
A Taxi Ride
City Cars
No Meters Here
You Can Drive Appendix E
Stimuli for Book Monkeys

ALTERNATES

1_?
The animals are on parade, marching down the street.   Fiction
Frogs and crickets play a tune, while horses keep the beat.
Next comes a troop of kangaroos who hop a fancy dance.
Look! Lines and lines of zebras who trot and buck and prance!
I'm glad we came! I'm glad we stayed
to see the animals on parade!

1_1_? (literal/true or false)   1
This poem is about
watching an animal parade
how animals learn to march
working with animals
why parades aren't fun 1_1_? (literal/true or false)   2
The frogs and crickets
play a tune
do a special dance
ride on the zebras
like to watch the parade 1_2_? (causative/cause and effect)   3
The animals are marching because
they are putting on a parade
someone told them to
kangaroos are chasing them
it is too hot to run 1_2_? (causative/cause and effect)
You can tell that the   4
zebras come after the horses
horses play a tune
frogs come last
kangaroos come first 1_3_? (inferential/title)   5
The best title for this poem is
A Special Parade
Cricket Music
Why Frogs March
I'm So Glad 1_3_? (inferential/word)
The poem says that the zebras "trot and buck and prance." "Trot"   6
most likely means   NOTE: "trot" is Grade 5
walk quickly
won't move
get angry
go swimming xxii Appendix E
Stimuli for Book Monkeys

1_?
A drawbridge is a bridge that can open and close. If a ship taller than the bridge comes by, the bridge needs to open. The bridge operator stops the cars and trucks from crossing. He makes sure the bridge is clear before it opens. The bridge looks like it breaks in half to let the ship go under it.

Nonfiction

1_1_? (literal/true or false)
This story is about
what a drawbridge does
how cars and trucks stop
why ships use bridges
what happens on the river

1

1_1_? (literal/true or false)
It is true that
a drawbridge can open and close
a drawbridge carries tall ships
every bridge can break in half
cars often cross an open drawbridge

2

1_2_? (causative/cause and effect)
The bridge needs to open because
the ship is taller than the bridge
cars and trucks need to cross the river
it looks like it breaks in half
it is called a drawbridge

3

1_2_? (causative/cause and effect)
The cars and trucks stop because
the bridge is going to open
the ship has stopped on the river
they want to watch the tall ship
a drawbridge is not for cars

4

1_3_? (inferential/title)
The best title for this story is
The Drawbridge
All About Bridges
Tall Ships
Life on the River

5

1_3_? (inferential/word)
The story says, "The bridge operator stops the cars..." The word
"operator" most likely means
person in charge
river ships
truck driver
breaking in half 6
NOTE: "operator" is Grade 5

Appendix E
Stimuli for Book Monkeys

Book Monkeys Stimuli
Level 2

2_1

The blues band is playing in the park tonight. They are expecting a huge crowd because the concert is free. Some of the animals bring chairs so they will feel comfortable. They like to arrive early to get a good spot. Other animals bring blankets. They will lie out under the stars as the music plays. Giraffes and elephants usually stand in the back because they are so tall.   Fiction 2_1_1 (literal/true or false)   1
It is false that the blues band
is selling tickets
is playing in the park
is playing at night
expects a big crowd 2_1_2 (literal/true or false)   2
This story is mostly about
going to hear music
setting up chairs
why animals bring blankets
what tall animals do 2_2_1 (causative/cause and effect)   3
The band expects a huge crowd because
the concert is free
they are playing at night
the park is very pretty
giraffes love music 2_2_2 (causative/cause and effect)   4
Some animals arrive early because they
want to get a good spot
need to practice the music
are carrying heavy blankets
are very tall 2_3_1 (inferential/title)   5
The best title for this story would be
When the Band Plays
Life in the Park
Music for Money
Under the Stars 2_3_2 (inferential/pronoun)   6
When the story says "...they will lie out under the stars," the word "they" is talking about
animals who bring blankets
animals who bring chairs
giraffes and elephants
the blues band

2_2

Many artists live in the city. Some of them like to mold things out of clay.   Fiction Appendix E
Stimuli for Book Monkeys Others like to draw or paint. A gorilla named John is famous for his paintings. He stands in his studio wearing a plastic suit and gloves. He reaches into cans and throws paint of all colors. The paint splashes against big pieces of paper.

2_1_3 (literal/true or false)     1
You can tell from this story that
some animals draw and paint
all animals like to use clay
the city doesn't have enough artists
only gorillas use paint 2_1_4 (literal/true or false)     2
Which sentence about John is false?
John draws great pictures.
John is famous.
John wears special clothing.
John throws paint.

2_2_3 (causative/cause and effect)     3
John reaches into cans because he
needs to get paint
wants more brushes
left his gloves there
likes to mold things 2_2_4 (causative/cause and effect)     4
The paint splashes against paper because
John throws the paint
John is very famous
the gorilla is angry
gorillas aren't artists 2_3_3 (inferential/next)     5
Which sentence would most likely come next?
What a messy way to paint!
No one likes John.
The gorilla needs more clay.
He puts on his plastic suit.

2_3_4 (inferential/word)     6
The story says "He stands in his studio..." The word "studio" most likely    NOTE: "studio" is
means    GR 5
a place where an artist works
somewhere movies are made
a good place to keep a gorilla
a quiet room for studying

2_3
    The city streets are crowded and busy. Sometimes the cars and trucks are     Fiction
backed up for miles! No one likes all that traffic. You hear a lot of honking horns
and squeaking brakes. You also hear angry barking and growling! When drivers
aren't careful, there may be a crash. To avoid such trouble, many animals walk.

2_1_5 (literal/true or false)     1
This story is mostly about

Appendix E
Stimuli for Book Monkeys problems on the city's streets
why animals like to drive
who drives cars and trucks
listening in the city 2_1_6 (literal/true or false)     2
It is false that
all city animals walk
you might hear squeaking brakes
some animals growl
the city is crowded 2_2_5 (causative/cause and effect)     3
There may be a crash when
drivers aren't careful
animals walk too fast
horns honk too loud
the city gets quiet 2_2_6 (causative/cause and effect)     4
Some animals walk because
they want to avoid trouble
the city is too noisy
their cars have crashed
the streets are empty 2_3_5 (inferential/title)     5
The best title for this story would be
Crowded Streets
Angry Animals
Trucks Are Trouble
Growling and Barking 2_3_6 (inferential/word)     6
The story says, "No one likes all that traffic." The word "traffic" most likely means     NOTE: "traffic" is GR 5 the movement of cars and trucks
walking very fast
streets and roads
the problems with angry animals

2_4
    Martha is a canary who loves to sing. She is studying to improve her voice.     Fiction
Living in a big city gives her an advantage. There are many teachers and schools
to help Martha. Every Thursday, she goes to see Master Mockingbird. He is an
expert singer. With his teaching, Martha will become a great singer, too.

2_1_7 (literal/true or false)     1
This story is mostly about
a canary who studies singing
why mockingbirds are good teachers
why canaries like cities
the problems with singing class 2_1_8 (literal/true or false)     2

Appendix E
Stimuli for Book Monkeys

You can tell that Martha
wants to improve
isn't a good singer
can't find the right teacher
would rather be flying 2_2_7 (causative/cause and effect)                                                3
Martha may become a great singer because she
has a good teacher
is a canary
lives in the country
doesn't like studying 2_2_8 (causative/cause and effect)                                                4
Living in the city is an advantage because
there are many different schools
all canaries like the city
classes are on Thursday
it is such a quiet place 2_3_7 (inferential/pronoun)                                                       5
The story says, "She is studying to improve her voice." The word "she" is
talking about
a canary named Martha
every canary
Master Mockingbird
a singing teacher 2_3_8 (inferential/word)                                                          6
The story says, "He is an expert singer." The word "expert" most likely       NOTE: "expert" is
means                                                                         GR 5
someone with a special skill or knowledge
any mockingbird who teaches
an animal who wants to learn
terrible and mean

2_5
   Every home and business in the city needs water. The water travels from the    Fiction
city's lakes through pipes. The pipes lie under the city's streets in tunnels. These
tunnels were dug by moles. Thousands of moles spent many years digging. They
worked day and night to complete the task. Every thirsty animal is grateful to
those moles.

2_1_9 (literal/true or false)                                                     1

YOU CAN TELL FROM THIS STORY THAT MOLES work day and night
like water
don't enjoy working
are very happy

2_1_10 (literal/true or false)                                                    2
This story is mostly about

Appendix E
Stimuli for Book Monkeys moles who dug tunnels
the city's lakes
why animals need water
why moles build businesses 2_2_9 (causative/cause and effect)     3
The city needs tunnels
so there is a place for water pipes
since moles get very thirsty
because the lakes are going dry
so moles have a place to live 2_2_10 (causative/cause and effect)     4
The animals are grateful because
the moles helped bring them water
the city has so many lakes
moles are good at building pipes
tunnels are under the streets 2_3_9 (inferential/next)     5
Which sentence would most likely come next?
Without them, the city would be dry.
Moles have to work day and night.
Every city needs lots of water.
Tunnels and pipes are not too important.

2_3_10 (inferential/title)     6
The best title for this story is
Those Helpful Moles
Very Thirsty Animals
Moles at Home
Why Cities Need Water

2_6
   Bob is a bear who hates to cook. Life in the city is perfect for Bob. When he is     Fiction
hungry, he goes out to eat. The city has many places to dine. Bob's favorite meal
is salmon with honey. He goes to a restaurant and orders three plates full! The
cook works quickly to feed that hungry bear.

2_1_11 (literal/true or false)     1
Bob likes the city because
it has many places to dine
it is busy and crowded
he likes to cook for others
he has so many friends 2_1_12 (literal/true or false)     2
The story doesn't say
what Bob's job is
what the cook does
how Bob feels about cooking
what Bob likes to eat 2_2_11 (causative/cause and effect)     3
Bob goes out to eat because xxviii

Appendix E
Stimuli for Book Monkeys he is hungry
he loves to cook
a friend asks him to
he is out of salmon

2_2_12 (causative/cause and effect)     4
The cook works quickly because
Bob is a very hungry bear
he always is in a hurry
Bob is angry and mean
life in the city moves fast 2_3_11 (inferential/word)     5
The story says, "He goes to a restaurant and orders three plates full!" The     NOTE: "restaurant"
word "restaurant" most likely means     is GR 5
a place to eat a meal
anywhere that bears like
somewhere bears go to cook
a large city house 2_3_12 (inferential/pronoun)     6
When the story says, "When he is hungry...," the word "he" is talking about
a bear named Bob
the cook
any bear
a salmon

2_7
    Every city needs a government to help it run smoothly. The government is     Nonfiction
elected by the citizens of the city. The members of the government make
important decisions every day. They create a budget to decide how to spend the
city's money. For example, the budget tells how much money goes to fix roads,
schools, and hospitals. When more money is needed, the government raises
taxes.
    1
2_1_13 (literal/true or false)
This story is mostly about
things government does
how citizens elect a government
what city schools need
where money comes from 2_1_14 (literal/true or false)     2
Which of the following is false?
There is no money for roads.
The government makes decisions.
The government might raise taxes.
Citizens elect the government.

2_2_13 (causative/cause and effect)     3

EVERY CITY NEEDS A GOVERNMENT BECAUSE cities need to run smoothly

Appendix E
Stimuli for Book Monkeys citizens spend too much money
hospitals are in trouble
no one likes to run the schools 2_2_14 (causative/cause and effect)     4
**The government raises taxes when
more money is needed**
the citizens elect a government
they can't make plans
the city needs new leaders 2_3_13 (inferential/pronoun)     5
**The story says, "They create a budget to decide how to spend the city's
money." The word "they" is talking about**
the city's government
the teachers in school
anyone living in the city
the doctors in the hospitals 2_3_14 (inferential/word)     6
The story says, "They create a budget to decide how to spend the city's     NOTE: "budget" is
money." The word "budget" most likely means     GR 5
a plan for using money
what a government does
a way to get taxes
a way to fix schools

2_8
    Just imagine the amount of mail arriving in a city each day! Now consider all     Nonfiction
the mail leaving the city. The postal service is very busy. The postal workers
have to sort the mail to get it to the right address. They must transport all the mail
from place to place. It takes a lot of work just to get one letter through. A single
letter may travel on four trucks and several airplanes!

2_1_15 (literal/true or false)     1
**This story is mostly about
how the postal service works**
why mail is important
trucks that carry mail
why addresses are important 2_1_16 (literal/true or false)     2
**A single letter
travels in many ways**
is not much work
never leaves the city
doesn't get sorted 2_2_15 (causative/cause and effect)     3
**The mail is sorted because
it must get to the right address**
it travels by airplane
there are many postal workers
packages can cause problems Appendix E
Stimuli for Book Monkeys 2_2_16 (causative/cause and effect)     4
In this story, trucks and airplanes are important because
they carry mail from place to place
the postal service needs to get the right address
they help to sort the mail
they help the city's people get around 2_3_15 (inferential/title)     5
The best title for this story would be
The City's Mail
One Single Letter
A Day in the City
Buy a Stamp 2_3_16 (inferential/word)     6
The story says "They must transport all the mail from place to place." The     NOTE: "transport" is
word "transport" most likely means     GR 5
to carry something from one place to another
anything that needs to be sorted
the best way to address a letter
think about and decide

2_9
   Every city takes pride in its tall buildings. Special buildings, new and old, give     Nonfiction
the city a certain look. When you see a postcard of a city, you may recognize it
by its skyline. You know the city by the shape and outline of the buildings. Only
the skyline of Chicago has the huge, black Sears Tower. The city of Seattle is
known for the Space Needle. These landmarks make each city individual.

2_1_17 (true/false/literal)     1
This story is mostly about
special buildings in cities
the city of Chicago
why we like Seattle
looking at postcards 2_1_18 (literal/true or false)     2
Big cities take pride in
their tall buildings
having good postcards
mostly their new buildings
only their old buildings 2_2_17 (causative/cause and effect)     3
You might recognize a city because
you see buildings you know
someone tells you the city's name
a lot of cities are alike
every city has the same buildings 2_2_18 (causative/cause and effect)     4
Each city is individual because
it has special landmarks
it has the Space Needle
they are fun places to visit xxxi Appendix E
Stimuli for Book Monkeys everyone likes new buildings 2_3_17 (inferential/title)  5
The best title for this story would be
City Buildings
Old Buildings Must Go
A Trip to Seattle
Chicago's Sears Tower 2_3_18 (inferential/word)  6
The story says, "Only the skyline of Chicago has the huge, black Sears NOTE: "skyline" is
Tower." The word "skyline" most likely means GR 5
buildings forming an outline against the sky
the way a postcard picture is taken
why we like cities
the clouds that you see in every big city

2_10  Nonfiction
    If you like watching sports, a city is great! You can see a big league baseball
team play on their home field. You might go to an indoor arena. Many cities have
hockey, basketball, and football teams. Sports fans fill the arena to cheer for their
favorite team. If you buy a ticket, you can join the crowd. Indoors or outdoors,
you can see a game throughout the year.

2_1_19 (literal/true or false)  1
This story is mostly about
seeing sports in a city
why cities are crowded
how to buy a ticket
baseball and hockey 2_1_20 (literal/true or false)  2
This story doesn't say
how much tickets cost
where you could see games
anything about baseball
what sports cities have 2_2_19 (causative/cause and effect)  3
A city is great for sports because
there are games throughout the year
baseball is a country game
sports fans like to cheer
all the tickets are free 2_2_20 (causative/cause and effect)  4
You can see a team play if
you buy a ticket
you are a good player
they build a new field
you visit in the winter 2_3_19 (inferential/title)  5
The best title for this story would be
Watching City Teams

Appendix E
Stimuli for Book Monkeys

Let's See Football
The Summer Games
Why Teams Play

2_3_20     6
The story says, "You might go to an indoor arena." The word "arena" most     NOTE: "arena" is
likely means     GR 5
a building for activity
a place for outdoor sports
any place for ice skating
an empty room

ALTERNATES
2_?
Beautiful, floating butterflies—     Fiction
the flowers of the air!
They do not live for very long.
I wonder, do they care?
Delicately dancing,
they fill the summer skies.
I'm glad to be a person
who can view these butterflies!

2_1_? (literal/true or false)     1
This poem is about
what butterflies are like
being a happy person
caring about summer
why butterflies dance 2_1_? (literal/true or false)     2
Which sentence is false?
Butterflies live a long time.
Butterflies live in the summer.
Butterflies look beautiful.
Butterflies seem to dance.

2_2_? (causative/cause and effect)     3
The person in this poem is glad because she
can see butterflies
flies through the air
lives in the city
lives a long time 2_2_? (causative/cause and effect)     4
Butterflies are called "the flowers of the air" because they
are beautiful like flowers
can fly and so can flowers
grow like flowers
think like flowers 2_3_? (inferential/title)     5

Appendix E
Stimuli for Book Monkeys

The best title for this poem would be
Sky Dancers
I Wonder
Fancy Flowers
The City Air 2_3_? (inferential/word) — 6
The poem says the butterflies are "delicately dancing." The word — NOTE: "delicately" is
"delicately" most likely means — GR 5
gently
butterfly
big
heavily

2_?
The boss shouts, "Call the bicycle messenger!" This means an important — Nonfiction
report needs to get across town in a rush. A bicycle messenger arrives, takes the
report, and rides off. He moves faster than cars and trucks. He can dart in and
out at high speeds. Of course, he better know his way around the city pretty well.
His job is to ride quickly, safely, and know the right address!

2_1_? (literal/true or false) — 1
This story is mostly about
what a messenger does
how cars and trucks drive
why reports are important
riding bikes safely 2_1_? (literal/true or false) — 2
The bicycle messenger rides off because he
needs to get the report there fast
is afraid of the boss
wants to get home very quickly
has to learn his way around the city 2_2_? (causative/cause and effect) — 3
The boss shouts because
an important report needs to go
the workers don't listen very well
bicycle messengers can't hear
he is angry at someone 2_2_? (causative/cause and effect) — 4
The messenger is faster than cars and trucks because
he darts in and out quickly
he works for the boss
his report is very important
he knows the correct address 2_3_? (inferential/title) — 5
The best title for this story would be
Go, Messenger, Go!
An Important Report
Bicycle Safety
Get a Fast Car Appendix E
Stimuli for Book Monkeys 2_3_? (inferential/word) 6
The story says, "...he better know his way around." The word "he" is talking about the
bicycle messenger
boss who is shouting
truck driver
guy who wrote the report Appendix F
Stimuli for Hog Hat Zone

HOG HAT ZONE STIMULI (270 TRIALS IN 165 PASSAGES)

TIER 1

PIPE SCENE

"Somebody must be driving a herd of cattle along the road," thought Tom.
"{————} hope they don't get in my way, or, rather, I hope I don't get in {————}."
[I, Me, My, He], 1_1_1
[theirs, their, they, them], 1_4_1

1P1
30 words in 2 sentences
[tsm]

Tom Swift, his face rather pale from his narrow escape, leaped from {————} bicycle, and stood regarding the automobile.
[his, her, him, it], 1_3_1

1P2
19 in 1; [tsm]

{————} is the first chance I've ever had to get acquainted with
Jerusha Abbott. I think I'm going to like {————}.
[This, Them, These, Those], 1_5_1
[her, she, he, they], 1_2_1

1P3
21 in 2; acquainted=4; [dll]

So {————} was the way the Doctor came to know that animals
had a language of {————} own and could talk to one another.
[that, them, these, those], 1_5_2
[their, they, there, its], 1_4_2

1P4
24 in 1; [dd]

Aunt Em dropped her work and came to the door. One glance told {————} of the danger close at hand.
"Quick, Dorothy!" {————} screamed. "Run for the cellar!"
[her, she, him, he], 1_2_2
[she, her, he, they], 1_3_2

1P5
28 in 4
[wwo]

Either the well was very deep, or she fell very slowly, for {————}
had plenty of time as she went down to look about her and to wonder what
{————} going to happen next.
[she, he, her, you], 1_1_2
[was, were, is, has], 1_6_1

1P6
34 in 1
[aaw]

After much tugging and pulling they got a large dried prune out of the jar on
to the shelf and began to nibble at it. {————} was even better
than the brown sugar.

1P6
33 in 2
[cmcm]

Appendix F
Stimuli for Hog Hat Zone

[This, These, They, Those], 1_5_3

"What are {————————} looking at?" said the Rat presently, when the edge of their hunger was somewhat dulled, and the Mole's eyes
{————————} able to wander off the tablecloth a little.
[you, your, I, she], 1_1_3
[were, was, are, is], 1_6_2

1P8
31 in 1
[ww]

"I am looking," said the Mole, "at a streak of bubbles that {————————} see traveling along the surface of the water. {————————} is a thing
that strikes me as funny."
[I, me, he, us], 1_1_4
[That, These, Those, Them], 1_5_4

1P9
32 in 2
[ww]

"There is a lad who knows a motorboat from stem to stern, if {————————} are the right words. I don't know much about boats except what I'm told, but Tom Swift does."
[those, that, them, this], 1_5_5

1P10
31 in 1; stern=4
[tsmb]

Among {————————} unfinished tales is that of Mr. James Phillimore, who, stepping back into his own house to get his umbrella, was never more seen in this world.
[these, this, that, them], 1_5_6

1P11
28 in 1
[ptb]

GIRDER SCENE

It seems queer to be writing letters to somebody {————————} don't
know. It seems queer for {————————} to be writing letters at all—I've never written more than three or four in my life, so please overlook it if
{————————} are not a model kind.
[you, your, me, it], 1_2_3
[me, he, she, I], 1_2_4
[these, them, this, that], 1_5_7

1G1
45 in 3
queer=4
[dll]

Up they got, early next morning, out of the silken beds; and {————————} saw that the sun
{————————} shining brightly and that the wind was blowing from the South.
[they, them, there, us], 1_1_5
[was, were, has, have], 1_6_3

1G2
29 in 1
[dd]

The friendly cow all red and white,
{————————} love with all my heart:
She gives me cream with all {————————} might,
To eat with apple tart.
[I, Me, We, He], 1_1_6
[her, she, his, it], 1_3_3

1G3
25 in 1
(poem)
[cgv]

ii

Appendix F
Stimuli for Hog Hat Zone

Whenever Auntie moves around,
{—————————} dresses make a curious sound,
They trail behind {—————————} up the floor,
And trundle after through the door.
[her, his, she, its], 1_4_3
[her, she, it, them], 1_2_5

1G4
23 in 1
(poem); trundle=0
[cgv]

Before leaving yesterday morning, Mrs. Lippett and I had a very serious talk. {—————————} told me how to behave all the rest of {—————————} life, and especially how to behave towards the kind gentleman who is doing so much for {—————————}. I must take care to be Very Respectful.
[She, He, It, Her], 1_3_4
[my, I, me, his], 1_4_4
[me, I, she, we], 1_2_6

1G5
49 in 3
[dll]

It was very dark, and the wind howled horribly around {—————————},
but Dorothy found she {—————————} riding quite easily. After the first
few whirls around, and one other time when the house tipped badly, she felt as
if {—————————} were being rocked gently, like a baby in a cradle.
[her, she, him, they], 1_2_7
[was, were, has, had], 1_6_4
[she, he, her, him], 1_3_5

1G6
49 in 2
[wwo]

'Well!' thought Alice to herself, 'after such a fall as this,
{—————————} shall think nothing of tumbling downstairs!
How brave they'll all think {—————————} at home! Why, I
wouldn't {—————————} anything about it, even if I fell off
the top of the house!' (Which was very likely true.)
[I, me, she, her], 1_1_7
[me, I, she, my], 1_2_8
[say, said, says, saying], 1_7_1

1G7
49 in 4
[aaw]

And now, when he walked down the street in {—————————} high hat,
people would say to one another, "There goes John Dolittle, M.D.! There was
a time when {—————————} was the best known doctor in the West
Country—Look at {—————————} now—He hasn't any money and his
stockings are full of holes!"
[his, her, its, he], 1_4_5
[he, she, his, it], 1_3_6
[him, her, she, it], 1_3_7

1G8
53 in (4)
[dd]

An old mouse {—————————} running in and out over
the stone doorstep, carrying peas and beans to her family in the
wood. Peter asked her the way to the gate, but she had such a
large pea in her mouth that she could not answer. She only
shook {—————————} head at him. Peter began to cry.
[was, were, are, have], 1_6_5

1G9
56 in 4
[pr]

iii

Appendix F
Stimuli for Hog Hat Zone

[her, she, his, she's], 1_4_6

There was a table set out under a tree in front of the house, and the March
Hare and the Hatter {————————} having tea at it: a Dormouse was
sitting between {————————}, fast asleep, and the other two were
using it as a cushion, resting {————————} elbows on it, and talking
over its head.

1G10
54 in 1
[aaw]

[were, was, are, is], 1_6_6
[them, they, him, it], 1_2_9
[their, his, they, her], 1_4_7

"But I thought all witches were wicked," said the girl, who was half
frightened at facing a real witch. "Oh, no, {————————} is a great
mistake. There were only four witches in all the Land of Oz, and two of them,
{————————} who live in the North and the South, are good witches.
I know this is true, for I am one of them myself, and cannot be mistaken."

1G11
69 in 4
frightened=5
[wwo]

[that, these, them, they], 1_5_8
[those, them, that, this], 1_5_9

When Dorothy was left alone she began to feel hungry. So she went to the
cupboard and cut herself some bread, which {————————} spread
with butter. She gave some to Toto, and taking a pail from the shelf she
carried {————————} down to the little brook and filled it with clear,
sparkling water.

1G12
56 in 3
sparkling=5
[wwo]

[she, her, it, he], 1_1_8
[it, him, her, them], 1_3_8

"I was born the son of a woodman who chopped down trees in the forest and
sold the wood for a living. When {————————}grew up, I too became
a woodchopper, and after my father died I took care of my old mother as long
as she lived. Then I made up {————————}mind that instead of living
alone I would marry, so that I might not {————————}lonely."

1G13
69 in 3
[wwo]

[I, me, she, her], 1_1_9
[my, me, I, his], 1_4_8
[become, became, becomes, becoming], 1_7_2

So she was considering in {————————} own mind (as well as
{————————} could, for the hot day made her feel very sleepy
and stupid), whether the pleasure of making a daisy-chain would
{————————} worth the trouble of getting up and picking the
daisies, when suddenly a White Rabbit with pink eyes ran close by her.

1G14
55 in 1
[aaw]

[her, our, she, his], 1_4_9 iv

Appendix F
Stimuli for Hog Hat Zone

[she, her, she's, hers], 1_1_10
[be, been, being, is], 1_7_3

"Humph," remarked the inventor; "your little pleasure-jaunt might {——————} ended disastrously. I suppose Andy and his chums
are off on their trip. I remember Mr. Foger speaking to me about it the other day. {——————} said Andy and some companions {——————} going on a tour, to be gone a week or more."
[have, has, are, was], 1_6_7
[He, She, It, Him], 1_3_9
[were, was, is, am], 1_6_8

1G15
69 in 6
jaunty, disastrous=6
[tsm]

'They don't keep this room so tidy as the other,' Alice thought to herself, as she noticed several of the chessmen down in the hearth among the cinders: but in another moment, with a little 'Oh!' of surprise, she was down on her hands and knees watching {——————}. The chessmen were walking about, two and two!
[them, they, her, she], 1_2_10

1G16
56 in 2
chess=4, hearth=5, cinder=?
[lg]

Clearly the squint-eyed youth had not been the mysterious visitor to the boathouse and {——————} not unlocked the forward compartment.
But if it was not he, who could it have been and how did the keys get there?
{——————} were questions which racked Tom's brain.
[had, have, are, was], 1_6_9
[These, This, That, Them], 1_5_10

1G17
45 in 3
compartment=6, squint=?
[tsmb]

Altogether the *Red Streak* was a very fine boat and {——————}
cost considerably more than had Tom's, even when the latter was new.
All these things the young owner of the *Arrow* thought of as he steered {——————} craft over the course.
[had, have, are, was], 1_6_10
[his, he's, him, he], 1_4_10

1G18
42 in 2
steered=4
[tsmb]

When I am grown to man's estate
I shall {——————} very proud and great,
And {——————} the other girls and boys
Not to meddle with my toys.
[be, been, being, am], 1_7_4
[tell, tells, telling, told], 1_7_5

1G19
27 in 1; (poem)
meddle=6, estate=4
[cgv]

Now Tom would be a driver and Maria go to sea,
And my papa's a banker and as rich as he can be;
But I, when I am stronger and can {——————} what I'm to do,
O Leerie, I'll go round at night and {——————} the lamps with you!
[choose, choosing, chooses, chose], 1_7_6
[light, lights, lighting, lit], 1_7_7

1G20
49 in 1
(poem)
[cgv]

v

Appendix F
Stimuli for Hog Hat Zone

In spite of our wisdom             1G21
   And sensible talking,             17 in 1
We on our feet must {————————}           (poem)
   Plodding and walking.             [cgv]
[go, gone, going, goes], 1_7_8

"Let us both fly up to town!             1G22
There I'll {————————} you such a gown!       26 in 3; (poem)
Which, completely in the fashion,         sash=6
You shall {————————} a sky blue sash on."    [nssba]
[buy, bought, buying, buys], 1_7_9
[tie, tied, ties, tying], 1_7_10

"I never thought I'd see this place," he said at last, in a whisper.    1G23
"Did you know about it?" asked Mary.           50 in 4
She had spoken aloud and he made a sign to {————————}.    [sg]
"We must talk low," he said, "or someone'll hear us an' wonder what's
to do in here."
[her, him, he, them], 1_3_10

TIER 2

PIPE SCENE

Then the Mayor pulled out of his pocket a still {————————}    2P1
parcel                           18 in 1; [dd]
and said, "Where is the dog?"
[larger, large, largest, largely], 2_1_1

The Badger sat in the armchair, reading the paper, and not    2P2
concerning himself in the {————————} about what    25 in 1; slightest=4; [ww]
was going to happen that very evening.
[slightest, slight, slighter, slightly], 2_1_2

He will stay and do his work faithfully as long as he can, and we won't    2P3
ask for                          28 in 1; [lw]
him back a minute {————————} than he can be spared.
[sooner, soonest, soon, someday], 2_1_3

Amy, though the {————————} of the          2P4
four {————————}, was a most important        15 in 1; [lw]
person—in her own opinion at least.           Mod: added *of the four sisters*
[youngest, young, youngish, younger], 2_1_4
[sisters, sister, sister's, sit-ups], 2_2_1

Then the six great {————————} flapped their big wings and    2P5
flew back to their homes in the mountains and the rocks.     21 in 1; [dd]
[birds, bird, bird's, ball's], 2_2_2

Appendix F
Stimuli for Hog Hat Zone

"It's my sister Margaret, and you knew it was! Do you think she is pretty?"
"Yes; she makes me think of the German girls, she {————————} so
fresh and quiet, and {————————} like a lady."
[looks, look's, look, looking], 2_3_1
[dances, dance, dance's, dancing], 2_3_2

2P6
35 in 2
[lw]

"Look at the balloon!" called John from the carriage house. "It's going to land in the orchard." This announcement caused all the children to hurry up
to the orchard, for everybody {————————} to "catch" a balloon.
[likes, like, liking, licks], 2_3_3

2P7
36 in 3; carriage, orchard=5
[btc]

"Well, you have certainly all done very nicely," Mrs. Bobbsey said. "And that kind of play is like {————————} to school,
for it {————————} you important lessons in nature."
[going, go, gone, goes], 2_4_1
[teaches, teach, teaching, telling], 2_3_4

2P8
29 in 2
[btc]

"And if there is too much pressure against the stone wall that
{————————} the dam, the wall may be carried away.
That's what we call the dam bursting," finished Uncle Daniel.
[makes, make, making, may], 2_3_5

2P9
31 in 2
[btc]

And Dab-Dab was glad, too, to get back to the house she knew so well—
although there was a terrible lot of {————————} to be done, with cobwebs everywhere.
[dusting, dust, dusts, dusty], 2_4_2

2P10
29 in 2
[dd]

"When we get to the country we will plant trees, go {————————
}, and
pick blackberries," Nan said one day.
"Yes, and I'm going with Harry out {————————}," Bert announced.
[fishing, fished, fish's, fishes], 2_4_3
[exploring, explore, explored, explores], 2_4_4

2P11
29 in 2
[btc]

Dorothy was going to ask another question, but just then the Munchkins, who
had been {————————} silently by, gave a loud shout and pointed to the
corner of the house where the Wicked Witch had been {————————
—}.
[standing, stand, stood, stands], 2_5_1
[lying, lie, lied, lies], 2_5_2

2P12
37 in 1
[wwo]

"You said, the other day, you thought we were a deal {————————
—}
than the King children, for they were {————————} and fretting all
the time, in spite of their money."
[happier, happy, happiest, happily], 2_1_5
[fighting, fight, fights, fought], 2_5_3

2P13
30 in 1; fretting=5
[lw]

Appendix F
Stimuli for Hog Hat Zone

"Now come, children," Mr. Bobbsey told the {————————————} youngsters.
"Keep track of your things. Sam will be ready in a few minutes, and then we
must be off."
[excited, excite, excites, excitedly], 2_6_1

2P14
28 in 3; excited=4
[btc]

By this time the much {————————————} lady had found out it was only a
little kitten, and {————————————} very foolish she sat down and coaxed
Snoop into her lap again. Mr. Bobbsey hurried to apologize.
[scared, scare, scares, scaring], 2_6_2
[feeling, feel, felt, feels], 2_8_1

2P15
35 in 2; coaxed, apologize=6
[btc]

"Potatoes first!" Harry announced, "because they may get cold," and at this
order everybody broke the freshly {————————————} potatoes into the
paper napkins and touched it up with the extra butter that had come along.
[roasted, roast, roasting, roasts], 2_6_3

2P16
35 in 1; roasted=4
[btc]

"We have {————————————} all the seas and all the countries and all the
islands and all the cities and all the villages in this half of the world. But we
have {————————————}."
[searched, search, searching, searches], 2_7_1
[failed, fail, failing, fails], 2_7_2

2P17
32 in 2
[dd]

The cat family had quite {————————————}. They invited him to stay to
dinner. The dumpling had been {————————————} off Tom Kitten, and
made separately into a bag pudding, with currants in it to hide the smuts.
[recovered, recover, recovering, recovers], 2_7_3
[peeled, peel, peels, peeling], 2_7_4

2P18
36 in 3; recovered=4, smuts=?
[rpp]

Jo told her adventures, and, by the time she had {————————————}, they
were at home.
[finished, finish, finishing, finishes], 2_7_5

2P19
15 in 1;[lw]

GIRDER SCENE

"You seem very clever at {————————————} words, Sir," said Alice.
"Would you kindly tell me the meaning of the poem called 'Jabberwocky'?"
"Let's hear it," said Humpty Dumpty. "I can explain all the
{————————————} that were ever invented—and a good many
that haven't been invented just yet."
[explaining, explain, explains, explained], 2_4_5
[poems, poem, poetic, poetry], 2_2_3

2G1
48 in 4
[lg]

Appendix F
Stimuli for Hog Hat Zone

Uncle Henry sat upon the doorstep and looked anxiously at the sky, which was even {——————} than usual. Dorothy stood in the door with Toto in her arms, and looked at the sky too. Aunt Em was {——————} the {——————}.
[grayer, gray, grayest, greatly], 2_1_6
[washing, wash, washes, washed], 2_5_4
[dishes, dish's, houses, house's], 2_2_4

2G2
40 in 3
anxiously=4
[wwo]

Somehow, it soon seemed taken for granted by all three of them that the trip was a {——————} thing; and the Rat, though still {——————} in his mind, allowed his good nature to override his personal objections.
[settled, settle, settles, settling], 2_6_4
[unconvinced, convince, unconvincing, convincing], 2_6_5

2G3
36 in 1
unconvinced=4
[ww]

All day a fine rain had fallen steadily, and the mists hung heavy over the valley. The lower hills were wrapped as in a winding sheet; dank and cold. The trees were {——————} with moisture. The stranger looked {——————} and wet.
[dripping, drip, dripped, drips], 2_8_2
[tired, tire, tiring, tires], 2_6_6

2G4
41 in 4
dank=?
[sh]

The people greeted Dorothy kindly, and invited her to supper and to pass the night with them; for this was the home of one of the {——————} Munchkins in the land, and his {——————} were gathered with him to celebrate their freedom from the bondage of the Wicked Witch.
[richest, richness, richly, riches], 2_1_7
[friends, friend, friend's, fires], 2_2_5

2G5
49 in 1
celebrate=4; bondage=6
[wwo]

The Rat knotted the horse's reins over his back and took him by the head, {——————} the bird cage and its hysterical occupant in the other hand. "Come on!" he said grimly to the Mole. "It's five or six miles to the {——————} town, and we shall just have to walk it. The {——————} we make a start the better."
[carrying, carry, carries, carried], 2_8_3
[nearest, near, nearly, nearer], 2_1_8
[sooner, soon, soonest, quickly], 2_1_9

2G6
60 in 4
hysterical=6
[ww]

"I'll try and be what he {——————} to call me, 'a little woman,' and not be rough and wild; but do my duty here instead of {——————} to be somewhere else," said Jo, thinking that keeping her temper at home was a much {——————} task than facing a rebel or two down South.
[loves, love, loving, lovely], 2_3_6
[wanting, want, wants, wanted], 2_8_4

2G7
53 in 1
temper=4, rebel=0
[lw]

ix

Appendix F
Stimuli for Hog Hat Zone

[harder, hard, hardest, hardly], 2_1_10

After a few hours the road began to be rough, and the {———— —} grew so difficult that the Scarecrow often stumbled over the yellow bricks, which were here very uneven. Sometimes, indeed, they were broken or {————————} altogether, leaving {————————} that Toto jumped across and Dorothy walked around.
[walking, walks, walked, walk's], 2_4_6
[missing, miss, missed, misses], 2_8_5
[holes, hole, hole's, holed], 2_2_6

2G8
48 in 2
stumbled=4
[wwo]

Alice had been {————————} over his shoulder with some curiosity.
"What a funny watch!" she remarked. "It {————————} the day of the month, and doesn't tell what o'clock it is!"
"Why should it?" muttered the Hatter. "Does your watch tell you what year it is?"
[looking, look, looked, looks], 2_5_5
[tells, tell, telling, told], 2_3_7

2G9
45 in 5
muttered=4
[aaw]

The children built a castle, of course, but castle-{————————} is rather poor fun when you have no hope of the {————————} tide ever coming in to fill up the moat and wash away the drawbridge, and, at the happy last, to wet everybody up to the waist at least.
[building, build, builds, built], 2_4_7
[swishing, swish, swishes, swished], 2_8_6

2G10
49 in 1
no grade info for moat
[fci]

"I don't care about the color," the Tiger-lily remarked.
"If only her petals curled up a little more, she'd be all right."
Alice didn't like {————————} criticized, so she began asking questions. "Aren't you sometimes frightened at being planted out here, with nobody to take care of you?"
[being, be, been, is], 2_4_8

2G11
48 in 4; remark=4, petal=5, criticize=5; [lg]
changed "colour" to "color"
changed "criticised" to "criticized"

"Well, in our country," said Alice, still panting a little, "you'd generally get to somewhere else—if you ran very fast for a long time, as we've been doing."
"A slow sort of country!" said the Queen. "Now, here, you see, it takes all the {————————} you can do, to keep in the same place. If you want to get somewhere else, you must run at least twice as fast as that!"
[running, run, ran, rerun], 2_4_9

2G12
72 in 4
[lg]

They talked over the new plan while old Hannah cleared the table; then out came the four little work-baskets, and the needles flew as the girls made sheets for Aunt March. It was uninteresting {————————}, but tonight no one grumbled.
[sewing, sew, sews, sewed], 2_4_10

2G13
40 in 2
grumbled=5
[lw]

And the pushmi-pullyu was glad they had come; because he liked the green grass so much better than the dried apples he had been {————————} on the ship. And Gub-Gub squeaked for joy when he found a whole valley full of wild sugarcane.

2G14
43 in 2
[dd]

x

Appendix F
Stimuli for Hog Hat Zone

[eating, eat, eaten, ate], 2_5_6

After they had {———————} up the anchor without a sound, and were {———————} the ship very, very carefully out of the bay, Gub-Gub suddenly sneezed so loud that the pirates on the other ship came rushing upstairs to see what the noise was.  
[pulled, pull, pulls, pulling], 2_7_6  
[moving, move, moves, moved], 2_5_7

2G15  
43 in 1  
[dd]

The sun had baked the {———————} land into a gray mass, with little cracks running through it. Even the grass was not green, for the sun had {———————} the tops of the long {———————} until they were the same gray color to be seen everywhere.  
[plowed, plow, plows, plow'd], 2_6_7  
[burned, burn, burning, burns], 2_7_7  
[blades, blade, blade's, bladed], 2_2_7

2G16  
45 in 2  
plow=4  
[wwo]

"His little nephew is on the ship with me here," said the Doctor. "And he is terribly afraid that the pirates threw his uncle into the sea. Would you be so good as to find out for me, for sure, whether he has been {———————} or not?"  
[drowned, drown, drowns, drowning], 2_7_8

2G17  
47 in 3  
[dd]

"Those who dwelt in the East and the West were, indeed, wicked witches; but now that you have {———————} one of them, there is but one Wicked Witch in all the Land of Oz—the one who {———————} in the West."  
"But," said Dorothy, after a moment's thought, "Aunt Em has told me that the {———————} were all dead—years and years ago."  
[killed, kill, kills, killing], 2_7_9  
[lives, live, living, life's], 2_3_8  
[witches, witch, witch's, waits], 2_2_8

2G18  
63 in 2  
dwelt, wicked=4  
[wwo]

"My mother knows old Mr. Laurence; but says he's very proud, and doesn't like to mix with his neighbors. He {———————} his grandson shut up, when he isn't riding or {———————} with his tutor, and makes him study very hard. We invited him to our party, but he didn't come. Mother says he's very nice, though he never {———————} to us girls."  
[keeps, keep, keeping, says], 2_3_9  
[walking, walk, walked, walks], 2_5_8  
[speaks, speak, speaking, sneaking], 2_3_10

2G19  
62 in 4  
tutor=6  
[lw]

xi

Appendix F
Stimuli for Hog Hat Zone

There was a table set out under a tree in front of the house, and the March Hare and the Hatter were {——————} tea at it: a Dormouse was sitting between them, fast asleep, and the other two were {——————} it as a cushion, resting their {——————} on it, and talking over its head.
[having, had, have, has], 2_5_9
[using, uses, use, used], 2_5_10
[elbows, elbowed, elbowing, elbowroom], 2_2_9

2G20
54 in 1
elbows=4, cushion=?
[aaw]

There were a number of tiny little brooks {——————} straight across it from side to side, and the ground between was divided up into squares by a number of little green {——————}, that reached from brook to brook. "I declare it's {——————} out just like a large chessboard!" Alice said at last.
[running, run, ran, runner], 2_8_7
[hedges, hedge, hedge's, hedged], 2_2_10
[marked, marks, marking, marker], 2_6_8

2G21
52 in 2
hedge=4, divide=4, declare=5
[lg]

"Can I help you?" said a friendly voice; and there was Laurie, with a full cup
in one hand and a plate of ice in the other.
"I was trying to get something for Meg, who is very tired, and some one shook
me; and here I am, in a nice state," answered Jo, {——————} dismally
from the {——————} skirt to the coffee-colored glove.
[glancing, glance, glances, glanced], 2_8_8
[stained, stain, staining, stains], 2_6_9

2G22
64 in 2
dismally=?
[lw]

Freddie and Flossie were the younger of the two pairs of twins that belonged to the Bobbsey family. The little ones were four years old, both with light curls {——————} pretty {——————} faces, and both being just fat enough to be good-natured.
[framing, frame, frames, framed], 2_8_9
[dimpled, dimple, dimples, dimpling], 2_6_10

2G23
42 in 2
dimpled=?
[btc]

Now, I daresay you will have {——————} that if you have to wait
for your dinner till long after the proper time, and then eat a great deal more
dinner than usual, and sit in the hot sun on the top of a church-tower—or even
anywhere else—you become soon and strangely sleepy.
[noticed, notice, notices, noticing], 2_7_10

2G24
55 in 1
[fci]

"It is the same thing with you," said the Hatter, and here the conversation dropped, and the party sat silent for a minute, while Alice thought over all she
could remember about ravens and {——————} desks, which wasn't
much.
[writing, write, writes, wrote], 2_8_10

2G25
40 in 1
conversation=5
[aaw]

Appendix F
Stimuli for Hog Hat Zone

TIER 3

PIPE SCENE

Now this is what had been happening to Tom Kitten, and it shows how very
{───────────} it is to go up a chimney in a very old house, where a
person does not know his way, and where there are enormous rats.
[unwise, wise, wisely, wisest], 3_1_1

3P1
42 in 1; enormous=4
[rpp]

Then the Prince, taking a bunch of copper keys from his pocket,
{───────────} the great double locks.
[undid, done, did, doing], 3_1_2

3P2
17 in 1; copper=4; [dd]

The house whirled around two or three times and rose {───────────
───}
through the air. Dorothy felt as if she were going up in a balloon.
[slowly, slow, slowness, slowest], 3_3_1

3P3
25 in 2; [wwo]

The afternoon passed with wonderful {───────────}. It was very
exciting; but none of them, except Robert, could feel all the time that this
was real {───────────} dangerous work.
[quickness, quick, quickly, quicker], 3_6_1
[deadly, dead, deader, deadest], 3_3_2

3P4
29 in 2; dangerous=6
[fci]

"Can you swim?" the boys asked Bert, who of course had learned that
{───────────} art long ago.
[useful, use, using, used], 3_4_1

3P5
17 in 1; [btc]

Anthea was persuasive, and very {───────────} in tears,
because it is
most trying to feel enormously hungry and unspeakably {───────────
───}
at one and the same time.
[nearly, near, nearing, neared], 3_3_3
[sinful, sin, sinning, sins], 3_4_2

3P6
26 in 1; persuasive=5,
enormously=4; [fci]

"My friends, I am afraid it is {───────────} to ask the Doctor to
stay.
He owes money in Puddleby; and he says he must go back and pay it."
[useless, use, used, useful], 3_5_1

3P7
29 in 2; [dd]

Having thanked the sharks again for their {───────────}, the
Doctor
and his pets set off once more on their journey home in the swift ship
with the
three red sails.
[kindness, kind, kindly, kindest], 3_6_2

3P8
30 in 1; swift=4
[dd]

Appendix F
Stimuli for Hog Hat Zone

And now Willum came back, with a {——————} grin on his face, and at his back a policeman, with whom Mr. Peasemarsh spoke long in a hoarse, earnest whisper.
[spiteful, spite, spiting, spited], 3_4_3

3P9
29 in 1; hoarse=5, earnest=4
[fci]

Then everybody started to hunt for Jip. And at last Dab-Dab found him on the other side of the village in a stable-yard, where all the dogs of the countryside were standing round him {——————} with admiration and respect.
[speechless, speech, speaks, speeches], 3_5_2

3P10
39 in 2; admiration=5
[dd]

"He'll mend of his {——————} with time," said Martha; "and as for his {——————}, I don't think you'd fancy carrying of him any more, however big he was."
[youngness, young, younger, youngest], 3_6_3
[smallness, small, smaller, smallest], 3_6_4

3P11
28 in 1
[fci]

"There you have it," said Sherlock Holmes, knocking out the ashes of his after-breakfast pipe and slowly {——————} it. "That is the gentleman I await."
[refilling, filling, filled, refilled], 3_1_3

3P12
25 in 2
[ptb]

"Well, Mr. Gibson, I was just saying to Dr. Watson that you were somewhat overdue." The Gold King had {——————} the room in a more chastened mood than he had left it.
[reentered, entered, enter, entering], 3_1_4

3P13
32 in 2; mood=3, chastened=?
[ptb]

"How would you like to {——————} see a poor little {——————} baby spinning along downhill beside you with its feet up on a bicycle it had lost control of?"
[suddenly, sudden, suddenness, sure], 3_3_4
[helpless, helpful, helped, helps], 3_5_3

3P14
33 in 1
[fci]

It was truly {——————}. Here was an innocent man accused of robbery through that silly wish of Jane's, and it was absolutely {——————} to tell the truth.
[awful, awfully, awe, awesomely], 3_4_4
[useless, used, uses, using], 3_5_4

3P15
29 in 1; innocent=5, accused=4
[fci]

The tiny fairies who were hidden away there weren't used to staying still, and they were getting {——————}.
[restless, restful, resting, rests], 3_5_5

3P16
18 in 1; fairies=4; [tf]

The thought made her suddenly marvelously big and strong and {——————}. Never had she dreamed that she could be so big.
[powerful, powerless, power, powering], 3_4_5

3P17
21 in 2; marvelously=4; [c]

xiv

Appendix F
Stimuli for Hog Hat Zone

And outside I peep over the snow and see a stream of ruddy light from a crack
in the window shutter, and I nod out here alone in the dark, thinking how {————————} it is.
[beautiful, beauty, beautify, beautifully], 3_4_6

3P18
34 in 1; ruddy=?, shutter=4
[bb]

Dorothy was an innocent, {————————} little girl, who had been carried by a cyclone many miles from home; and she had never killed anything in all her life.
[harmless, harm, harmful, harms], 3_5_6

3P19
28 in 1; innocent=5, cyclone=?
[wwo]

It makes me downright sorry to see you fellows, who ought to know better,
spending all your energies in that {————————} manner.
[aimless, aim, aiming, aimlessly], 3_5_7

3P20
22 in 1; energy=4; [ww]

GIRDER SCENE

The next day was Saturday, and in the morning the Hut Club met, as usual, and prepared to have an open-air dinner for this day. The furnace, which had been knocked down during the week by the East Siders, was {————————}, and the skillet and other utensils were brought from the nearest kitchens.
[rebuilt, built, rebuild, builder], 3_1_5

3G1
53 in 2
furnace=4, utensil=6
[br]

When the pool on the floor had been mopped up, and the leaping, gasping goldfish had been collected and put back in the water, the Baby was taken away to be entirely {————————} by Martha, and most of the others had to change {————————}.
[redressed, redresses, dressing, undresses], 3_1_6
[completely, complete, completed, completing], 3_3_5

3G2
44 in 1
gasping=4
[fci]

The Hatter was the first to break the silence. "What day of the month is it?" he said, turning to Alice: he had taken his watch out of his pocket, and was looking at it {————————}, shaking it every now and then, and holding it to his ear.
[uneasily, easily, easy, easier], 3_1_7

3G3
48 in 2
[aaw]

Anthea woke in the morning from a very real sort of dream, in which she was walking in the Zoological Gardens on a pouring wet day without any umbrella. The animals seemed desperately {————————} because
of the rain, and were all growling {————————}. When she awoke,
both the growling and the rain went on just the same.
[unhappy, happy, happiness, happily], 3_1_8
[gloomily, gloomy, gloom, gloomier], 3_3_6

3G4
57 in 3
desperately=5, growling=4
[fci]

Appendix F
Stimuli for Hog Hat Zone

At last hunger and fright and {————————} and tiredness—four very
nasty things—all joined together to bring one nice thing, and that was sleep.
The children lay asleep in a row, with their {————————} eyes shut
and their beautiful mouths open. Anthea woke first. The sun had set, and the
twilight was coming on.
[crossness, cross, crossly, crossed], 3_6_5
[beautiful, beauty, beautifully, beauties], 3_4_7

3G5
57 in 4
nasty, twilight=?
[fci]

They had high brown boots on their long legs, and they came towards him with
such great strides that Robert remembered the {————————} of his
own legs and did not run away. He knew it would be {————————-} to
himself, and he feared it might be irritating to the foe. So he stood still—and
the two men seemed quite pleased with him.
[shortness, short, shortly, shorter], 3_6_6
[useless, use, useful, used], 3_5_8

3G6
65 in 3
irritating=6
[fci]

So the Doctor ran downstairs with the news and told the nephew, who
clapped his hands with {————————}. And the pushmi-pullyu
took the little boy on his back and gave him a ride round the dining-room
table; while all the other animals followed behind, beating the dish-covers
with spoons, pretending it was a parade.
[happiness, happy, happier, happiest], 3_6_7

3G7
54 in 2
[dd]

One of the big trees had been partly chopped through, and standing
beside it, with an uplifted axe in his hands, was a man made entirely
of tin. His head and arms and legs were jointed upon his body, but he
stood perfectly {————————}, as if he could not stir at all.
[motionless, motion, moving, movement], 3_5_9

3G8
53 in 4
[wwo]

You know how a jug always breaks if you happen to drop it by accident. If
you happen to drop it on purpose, it is quite different. Anthea dropped that
jug three times, and it was as {————————} as ever. So at last she
had to take her father's boot-tree and break the jug with that in cold blood.
It was {————————} work.
[unbroken, broken, break, brokenly], 3_1_9
[heartless, heart, heartlessness, hearten], 3_5_10

3G9
63 in 5
accident=4
[fci]

Appendix F
Stimuli for Hog Hat Zone

The thoughtful Robert had brought one solid brown bottle of ginger beer with him, relying on a thirst that had never yet failed him. This had to be {————————} hurriedly—it was the only wet thing within reach, and it was necessary to wash the sand out of the Lamb's eyes somehow. Of course the ginger hurt {————————}, and he howled more than ever.
[uncorked, corked, uncorks, corking], 3_1_10
[horribly, horrible, horrid, horrify], 3_3_7

3G10
64 in 3
relying=5, cork=6, howled=4
[fci]

"I entirely believe you, madam," said Sherlock Holmes. "The recital of these events must be very {————————} to you, and perhaps it will make it easier if I tell you what occurred, and you can check me if I make any material mistake."
[painful, painless, painlessly, painfully], 3_4_8

3G11
43 in 2
recite=5, occur=3, material=5
[hb]

"Oh, mamma, come quick!" called Flossie, running along a path at the edge of the wood. "There's a tree over there pouring water, and it isn't raining a drop!" Everybody set out now to look at the {————————} tree, which was soon discovered where Flossie had found it.
[wonderful, wonders, wonderfully, wonderfulness], 3_4_9

3G12
48 in 3
[btc]

At this the country boys began looking around for young maples, and as small limbs of the trees were broken the girls caught the drops in their tin cups. It took quite a while to get a little, but by putting it all together a {————————} was {————————} gathered.
[cupful, cupped, cupping, cupcake], 3_4_10
[finally, final, finalize, finalist], 3_3_8

3G13
49 in 2
[btc]

This piece of {————————} was more than Alice could bear: she got up in great disgust, and walked off; the Dormouse fell asleep {————————}, and neither of the others took the least notice of her going, though she looked back once or twice, half hoping that they would call after her: the last time she saw them, they were trying to put the Dormouse into the teapot.
[rudeness, rudely, rude, rudest], 3_6_8
[instantly, instant, instance, instantaneous], 3_3_9

3G14
67 in 1
disgust=5
[aaw]

After an hour or so the light faded away, and they found themselves stumbling along in the {————————}. Dorothy could not see at all, but Toto could, for some dogs see very well in the dark; and the Scarecrow declared he could see as well as by day. So she took hold of his arm and managed to get along {————————} well.
[darkness, darkly, darker, darken], 3_6_9
[fairly, fair, fairer, fairest], 3_3_10

3G15
62 in 3
declared=5, managed=4
[wwo]

xvii

Appendix F
Stimuli for Hog Hat Zone

"All the same," said the Scarecrow, "I shall ask for brains instead of a heart; for a fool would not know what to do with a heart if he had one." "I shall take the heart," returned the Tin Woodman; "for brains do not make one happy, and {————————} is the best thing in the world."
[happiness, happy, happier, happily], 3_6_10

3G16
56 in 2
[wwo]

TIER 4

PIPE SCENE

Ribby and Tabitha searched and searched. They both heard a curious roly-poly noise under the attic floor. But {————————} was nothing to be seen.
[there, they, their, they're], 4_1_1

4P1
24 in 3; attic, roly-poly=?
[rpp]

The two cats ran to look at the dough pan. Sure enough {————————} were marks of little scratching fingers, and a lump of dough was gone!
[there, they, their, they're], 4_1_2

4P2
26 in 1;
dough=5,scratching=4;[rpp]

The chimney itself was wide enough inside for a man to stand up and walk about. So {————————} was plenty of room for a little Tom Cat.
[there, were, they're, we're], 4_1_3

4P3
27 in 2; [rpp]

"Oh, I believe you all right," answered Tom, for there could be no doubting {————————} manner, even though he and the young inventor were not on good terms. "But how did your keys get in my boat?"
[Andy's, Andy, Tom's, Tom], 4_2_1

4P4
37 in 2
[tsmb]

"Those men who were sneaking around—Happy Harry and his gang. They stole the boat once and {————————} do it again. Those men took your boat, Tom."
[they'd, they, their, he's], 4_4_1

4P5
27 in 3
[tsmb]

"{————————} one of your kittens at least," said Ribby, dragging Moppet out of the flour barrel.
[Here's, Here, He'll, He'd], 4_5_1

4P6
16 in 1; barrel=4; [rpp]

"{————————} a wise old bird," said the Doctor. "How old are you really? I know that parrots and elephants sometimes live to be very, very old."
[You're, Your, You'd, You], 4_6_1

4P7
26 in 3; [dd]

"I think {————————} better tow you to my dock," the young inventor said to Andy. "I can use some tools from the shop then, and by tonight {————————} have the *Red Streak* in running order."

4P8
36 in 2
[tsmb]

xviii

Appendix F
Stimuli for Hog Hat Zone

[I'd, I'll, I'm, I've], 4_7_1
[I'll, I'd, I'm, I've], 4_3_1

"Wait until my motor runs smoother and I'll give you a big handicap and beat you. My {————————} faster than yours. It ought to be. It cost fifteen hundred dollars and {——————} a racer."
[boat's, boat, boats, boating], 4_5_2
[it's, its, it, it'd], 4_5_3

4P9
34 in 4
[tsmb]

Mr. Swift considered a moment. He did need a rest, for he had been working hard and his brain was weary with thinking of many problems. His {————————} program sounded very attractive.
[son's, son, sons, suns], 4_2_2

4P10
32 in 3; weary=4, attractive=5
[tsmb]

As to her, she was worthy to be his partner in every sense of the term. If {——————} not high praise, tell me higher, and {————} use it.
[that's, that, that'll, this], 4_5_4
[I'll, I, I'd, I'm], 4_3_2

4P11
28 in 2; partner=5, praise=4
[cc]

"Oh, you think {——————} mighty smart, don't you? I could lick you with one hand tied behind me, if I wanted to."
[you're, your, you've, yours], 4_6_2

4P12
22 in 1
[ats]

"Come in!" and {——————} gruff voice sounded gruffer than ever, as Jo tapped at his door. "{——————} only me, sir, come to return a book," she said blandly, as she entered.
[Mr. Lawrence's, Mr. Lawrence, Mr. Lawrences, her], 4_2_3
[It's, Its, It, I], 4_5_5

4P13
31 in 2; blandly=?
[lw]

The colonel assured him that he would be in no danger, even if he were caught by the rebels, for they would never suspect a boy of {——————} age and size of being a spy.
[Archie's, Archie, Archies, Archie'd], 4_2_4

4P14
35 in 1; rebel=?, suspect=5
[br]

"I don't work anywhere. {——————} on my way to New York, where I expect to find a position, and I thought perhaps {——————} allow me to do a little work here this morning to earn my breakfast."
[I'm, I'll, I, I'd], 4_5_6
[you'd, you're, your, you've], 4_4_2

4P15
37 in 2; expect, position=2
[br]

He hesitated no longer, but gave the order to march ahead. "{——————} evidently found the cowards at last," he muttered to Archie. "You stay here, where you will be out of danger."
[They've, They'll, They're, Their], 4_7_2

4P16
32 in 3; mutter, hesitate=4, evident=5; [br]

"Ah, you have a right to know about him. That is the cause of all the mischief, the wicked Hugo, who started the Hound of the Baskervilles. {——————} not likely to forget him."
[We're, We, We'd, We'll], 4_6_3

4P17
33 in 3; mischief=4, wicked=5
[hb]

Appendix F
Stimuli for Hog Hat Zone

In a few words he told them his simple story, and they all laughed and sat
down again about the fire, making a place for him. "{——————}" one
of us, then, laddie," said the leader of the gang.
[You're, Yore, Your, You], 4_6_4

4P18
38 in 2
[br]

The colonel looked on in amazement. "Why are you packing your knapsack!"
he asked. "You surely don't think {——————} going with us? You
never in the world can stand this hard march in the hot sun."
[you're, you'll, you'd, Yule], 4_6_5

4P19
36 in 4; knapsack=4
[br]

"Her paw went into your eye? Well, that's your own fault, for
keeping your eyes open—if {——————} shut them
tight up, it wouldn't have happened."
[you'd, you'll, you've, you're], 4_7_3

4P20
26 in 2
[lg]

"Let's pretend that {——————} the Red Queen, Kitty! Do you
know, I think if you sat up and folded your arms, {——————}
look
exactly like her. Now do try, there's a dear!"
[you're, your, you, yew], 4_6_6
[you'd, you, I'd, I], 4_4_3

4P21
32 in 3
[lg]

"But oh!" thought Alice, suddenly jumping up, "if I don't make haste I shall
have to go back through the looking-glass, before {——————}
seen
what the rest of the house is like! Let's have a look at the garden first!"
[I've, I'll, I'd, I'm], 4_7_4

4P22
40 in 2; looking-glass=?
[lg]

"The beach is disgracefully crowded this season. {——————}
met
at least a hundred seals from Lukannon Beach, house-hunting. Why can't
people stay where they belong?"
[I've, I'll, I'd, I'm], 4_7_5

4P23
25 in 3; disgracefully=?
[jb]

"The good and dear people always do die," groaned Jo, but she
stopped crying, for her {——————} words cheered her
up, in spite of her own doubts and fears.
[friend's, friends, friend, friendship], 4_2_5

4P24
29 in 1
[lw]

"Shall I have a cab called?" "{——————} prefer to walk, for this
affair has flurried me rather."
"I'll join you in a walk, with pleasure," said his companion.
[I'd, I've, I'm, I'll], 4_4_4

4P25
35 in 4; flurried=?
[hb]

She enjoyed herself very much that evening, for she danced to her
{——————} content; everyone was very kind, and she
had three compliments.
[heart's, heart, hearty, hearts], 4_2_6

4P26
24 in 1; compliment=5
[lw]

xx

Appendix F
Stimuli for Hog Hat Zone

Suddenly, Uncle Henry stood up. "{————————} a cyclone coming, Em," he called to his wife. "{————————} go look after the stock." Then he ran toward the sheds where the cows and horses were kept.
[There's, Theirs, They're, They'll], 4_5_7
[I'll, We're, I, It'll], 4_3_3

4P27
34 in 3;cyclone, sheds=?
[wwo]

GIRDER SCENE

"Look here," she said, "don't bite me—listen to reason. If you'll only do what we want today, we'll never ask you for another wish as long as we live." The Psammead was much moved. "{————————} do anything," it said in a tearful voice.
[I'd, I've, I'm, It'll], 4_4_5

4G1
45 in 4
[fc]

"And how would you describe Mr. Sherlock Holmes?" The cabman scratched his head. "Well, he wasn't altogether such an easy gentleman to describe. {————————} put him at forty years of age, and he was of a middle height, two or three inches shorter than you, sir."
[I'd, I'm, I've, Aisle], 4_4_6

4G2
46 in 4
[hb]

"Yes, dear," said Mrs. Dunn, softly, "and when {————————} finished your supper I have something for you. I won't give it to you now for fear you won't be able to eat, but as soon as you have finished your meal, you shall have it."
[you've, your, you're, you'll], 4_7_6

4G3
45 in 4
[br]

After a while, with the {————————} help, the Doctor got to learn the language of the animals so well that he could talk to them himself and understand everything they said. Then he gave up being a people's doctor altogether.
[parrot's, parrot, parrots, parsnips], 4_2_7

4G4
40 in 2
[dd]

{————————} was an Old Man with a nose,
Who said, "If you choose to suppose,
That my nose is too long,
You are certainly wrong!"
That remarkable Man with a nose.
[There, Their, They, They're], 4_1_4

4G5
31 in 1
(limerick)
remarkable=4
[bn]

The *Red Streak* had a very sharp prow, designed to cut through the water. It was of the type known as an automobile launch. That is, the engine was located forward, under a sort of hood, which had two hinged covers like a {————————} wings.
[bat's, bats, cats, cat's], 4_2_8

4G6
45 in 3
[tsmb]

Appendix F
Stimuli for Hog Hat Zone

"That man's got sense. {————————} what you ought to do.      4G7
Be an animal-doctor. Give the silly people up—if they haven't brains      45 in 6
enough to see {————————} the best doctor in the world.      [dd]
Take care of animals instead—{————————} soon find it out.
Be an animal-doctor."
[That's, That'll, That, There], 4_5_8
[you're, you, your, yours], 4_6_7
[they'll, they, they're, their], 4_3_4

"Have some wine," the March Hare said in an encouraging tone.      4G8
Alice looked all round the table, but there was nothing on it but tea.      52 in 4
"I don't see any wine," she remarked. "{————————} isn't any,"      encourage, remarked=4
said the March Hare.      [aaw]
"Then it wasn't very civil of you to offer it," said Alice angrily.
[There, Their, They're, Than], 4_1_5

The best part of it all was that {————————} were no rules      4G9
about not going to places and not doing things. In London almost      54 in 1
everything is labeled "You mustn't touch," and though the label is      jolly=4
invisible it's just as bad, because you know {————————}      [fci]
there, or if you don't you jolly soon get told.
[there, their, they're, then], 4_1_6
[it's, it'd, it'll, its], 4_5_9

The table was a large one, but the three were all crowded together at      4G10
one corner of it: "No room! No room!" they cried out when they saw      51 in 2
Alice coming. "{————————} plenty of room!" said Alice      indignantly=5
indignantly, and she sat down in a large armchair at one end of the table.      [aaw]
[There's, They're, Theirs, There], 4_5_10

The *Red Streak* was a more speedy boat, and, with proper      4G11
handling, could have beaten the *Arrow*. That was where      48 in 4
{————————} superior knowledge came in useful.      superior=4
"Just you wait, {————————} beat you yet," called      [tsmb]
Andy, after the young inventor, but the latter made no answer.
[Tom's, Tom, he's, he'd], 4_2_9
[I'll, I'm, I've, I], 4_3_5

"Now, these are a really very fine series of portraits."      4G12
"Well, I'm glad to hear you say so," said Sir Henry, glancing      53 in 3
with some surprise at my friend. "I don't pretend to know much      portrait=5
about these things, and {————————} be a better judge      [hb]
of a horse or a steer than of a picture."
[I'd, I'm, I, I've], 4_4_7

"Tell me all about it, and let me cure it as I often did the other."      4G13
"You can't; {————————} is no cure."      40 in 3
There {————————} voice gave away, and, clinging to her sister,      desperate=5
she cried so despairingly that Jo was frightened.      [lw]
[there, they're, here, hear], 4_1_7
[Beth's, Beth, him, his], 4_2_10

Appendix F
Stimuli for Hog Hat Zone

Down, down, down. {———————} was nothing else to do,     4G14
so Alice soon began talking again. "{———————} miss me     72 in 7
very much tonight, I should think!" (Dinah was the cat.) "I hope     [aaw]
{———————} remember her saucer of milk at teatime.
Dinah my dear! I wish you were down here with me!"
[There, They're, Their, They], 4_1_8
[Dinah'll, Dinah, Dinah's, She's], 4_3_6
[they'll, they're, their, these], 4_3_7

But {———————} was another danger, however, and this was     4G15
that he might run into another boat. True, there were not many on Lake     43 in 2
Carlopa, but {———————} were some, and one of the few     [tsmb]
motorboats might be out in spite of the bad weather.
[there, they're, their, they], 4_1_9
[there, they're, their, they], 4_1_10

"We'll make our way down into that, and try and find some sort of     4G16
shelter, a cave or hole with a dry floor to it, out of the snow and the     62 in 2
wind, and there {———————} have a good rest before we try     shelter=4
again, for {———————} both of us pretty dead beat. Besides,     [ww]
the snow may leave off, or something may turn up."
[we'll, were, we're, we], 4_3_8
[we're, we, were, we'll], 4_6_8

"Andy certainly is getting the speed out of her now," he     4G17
remarked. "{———————} beat me if we were racing,     52 in 3
but the trouble with his boat and engine is that he can't always     remarked=4
depend on it. I guess he doesn't understand how to run it. I     [tsmb]
wonder if {———————} offer to race now?"
[He'd, Heel, He's, He'll], 4_4_8
[he'll, heed, he, he's], 4_3_9

"Now, Mr. Holmes, as we walk down to the place there is one question I     4G18
should like to ask you. {———————} breathe it to no soul but     53 in 4
you."     utter=4
He looked round as though he hardly dare utter the words.     [ptb]
"Don't you think there might be a case against Mr. Neil Gibson himself?"
[I'd, I'm, You'd, You'll], 4_4_9

There really was a sort of Magic about Dickon, as Mary always privately     4G19
believed. When Mr. Roach heard his name he smiled quite leniently.     42 in 3
"{———————} be at home in Buckingham Palace or at the     lenient=?
bottom     [sg]
of a coal mine," he said.
[He'd, Heed, He's, These], 4_4_10

"Yes, but boys will be boys, Mrs. Sullivan, and {———————}     4G20
better     49 in 3
keep them contented at home as long as we can. {———————}     anxious=4
be     [br]
leaving us soon enough. It seems that no boys are content to stay in
town any
longer; {———————} all anxious to be off to the city."
[we'd, weed, I'd, eyed], 4_7_7
[They'll, They're, Their, They've], 4_3_10

Appendix F
Stimuli for Hog Hat Zone

[they're, their, they'll, they've], 4_6_9

"But it certainly was funny," (Alice said afterwards, when she was telling her sister the history of all this,) "to find myself singing 'Here We Go Round The Mulberry Bush.' I don't know when I began it, but somehow I felt as if {——————} been singing it a long long time!"
[I'd, I've, I'll, I], 4_7_8

4G21
51 in 2
[lg]

"I'll go with you to the end of the wood—What's the dish for?"
"It's meant for plum cake," said Alice.
"{——————} better take it with us," the Knight said.
"It'll come in handy if we find any plum cake."
[We'd, Weed, We'll, Wheel], 4_7_9

4G22
48 in 5
[lg]

"What!" he exclaimed, "you want to be a reporter. Why, my dear boy, how old are you?"
"I'll be eighteen my next birthday," said Archie, "and, sir,
{——————} had some experiences in the last two weeks,
which
make me feel as if I were about five years older than I really am."
[I've, I'll, I, I'd], 4_7_10

4G23
52 in 3
experience=4
[br]

"I was thinking about people," said Polynesia. "People make me sick. They
think {——————} so wonderful. The world has been going on now
for thousands of years, hasn't it? And the only thing in animal-language that
*people* have learned to understand is that when a dog wags his tail he means
'I'm glad!'—It's funny, isn't it? You are the very first man to talk like us."
[they're, they, their, they'll], 4_6_10

4G24
67 in 7
[dd]

TRIAL NUMBER KEY

Tier_Category_TrialNum. "3_4_2" is tier 3, category 4, trial number 2 (of 10). There are 10 trials per category.

PARAGRAPH NUMBER KEY

Tier Scene Paragraph Number: "1P3" is tier 1, pipes scene, paragraph number 3. "3G7" is tier 3, girder scene, paragraph number 7.

BIBLIOGRAPHY AND CODE KEY xxiv

Appendix F
Stimuli for Hog Hat Zone

*CITATION* [CITATION CODE]NUMBER OF EXCERPTS

*The Adventures of a Boy Reporter,* Harry Steele Morrison (1900) [br]9

*The Adventures of Tom Sawyer,* Mark Twain (1884) [ats]1

*Alice's Adventures in Wonderland,* Lewis Carroll (1865) [aaw]12

"The Blackberry-Bush," (as told by) Sara Cone Bryant,
from *Stories to Tell to Children: Fifty-One Stories With Some Suggestions for Telling* (1907) [bb]1

*The Bobbsey Twins in the Country,* Laura Lee Hope [btc]11

*The Book of Nonsense,* Edward Lear (1846, 1855) [bn]1

*A Child's Garden of Verses,* Robert Louis Stevenson (1895) [cgv] 5

"The City Mouse and the Country Mouse," (as told by) Sara Cone Bryant,
from *Stories to Tell to Children: Fifty-One Stories With Some Suggestions for Telling* (1907) [cmcm]1

*A Christmas Carol,* Charles Dickens (1843) [cc]1

"The Cloud," (as told by) Sara Cone Bryant,
from *Stories to Tell to Children: Fifty-One Stories With Some Suggestions for Telling* (1907) [c]1

*Daddy Long-Legs,* Jean Webster (1912) [dll]3

*Five Children and It,* E. Nesbit (1902) [fci]16

*Hound of the Baskervilles,* Arthur Conan Doyle (1902) [hb]5

The Jungle Book, *Rudyard Kipling (1899) [jb]1*

*Little Women,* Louisa May Alcott (1869) [lw]13

*Nonsense Songs, Stories, Botany, and Alphabets,* Edward Lear (1871) [nssba]1

"The Problem of Thor Bridge," *The Casebook of Sherlock Holmes,* Arthur Conan Doyle (1922) [ptb]4

*The Roly-Poly Pudding,* Beatrix Potter (1908) [rpp]6

*The Secret Garden,* Frances Hodgson Burnett (1911) [sg]2

*The Shepherd of the Hills,* Harold Bell Wright, (1907)[sh]1

*The Story of Doctor Dolittle,* Hugh Lofting (1920) [dd]19

*The Tale of Peter Rabbit,* Beatrix Potter (1900) [pr]1

"The Ten Fairies," (as told by) Sara Cone Bryant,
from *Stories to Tell to Children: Fifty-One Stories With Some Suggestions for Telling* (1907) [tf]1

Appendix F
Stimuli for Hog Hat Zone

*Through The Looking Glass*, Lewis Carroll (1871) [lg]10

*Tom Swift and His Motor-cycle, or Fun and Adventures on the Road*, Victor Appleton (1910) [tsm]3

*Tom Swift and His Motor-Boat, or The Rivals of Lake Carlopa*, Victor Appleton (1910) [tsmb]12

*The Wind In The Willows,* Kenneth Grahame (1908) [ww]7

*The Wonderful Wizard of Oz*, Frank L. Baum (1900) [wwo]17

We claim:

1. A method on a computing device for training a student to decode words into a plurality of categories, where the plurality of categories including a plurality of category types such as semantic, syntactic, phonological, and morphological, the method comprising:
   a) providing on the computing device, a graphical setting onto which two or more of the plurality of categories are presented, each having a plurality of words associated with them;
   b) graphically presenting one of the plurality of words, from one of the two or more of the presented categories to the student;
   c) requiring the student to categorize the presented one of the plurality of words into one of the two or more of the presented categories, by indicating a selection of one of the two or more of the presented categories; and
   d) recording whether the student correctly categorized the presented one of the plurality of words into its associated category.

2. The method as recited in claim 1 further comprising:
   e) repeating steps b) through d).

3. The method as recited in claim 2 further comprising:
   f) after a predetermined umber of trials determining if the student has correctly categorized the presented words for at least 90% of the trails.

4. The method as recited in claim 3 further comprising:
   if the student has correctly categorized the presented words for at least 90% of the trails, providing alternate ones of the plurality of categories in step a) for further training.

5. The method as recited in 3 further comprising:
   if the student has correctly categorized the presented words for at least 90% of the trails, increasing the number of categories presented in step a) to three or more.

6. The method as recited in claim 3 further comprising:
   if the student has correctly categorized a predetermined percentage of words for all of the plurality of categories, providing additional categories of a different category type to training.

7. The method as recited in claim 1 wherein the plurality of categories within a syntactic category type comprises:
   nouns, verbs, adjective, and prepositions.

8. The method as recited in claim 1 wherein the plurality of categories within a phonological category type comprises:
   two syllables, the same vowel sound as ate, the "s" sound, and one consonant sound.

9. The method as recited in claim 1 wherein the plurality of categories within a morphological category type comprises:
   a plurality noun, a compound word, and a suffix that means happened in the past.

10. The method as recited in claim 1 wherein the graphical setting of step a) comprises; an animated story that illustrates the process of sorting.

11. The method as recited in claim 1 wherein said step b) further comprises:
    providing a first help box which, when selected by the student, provides a visual definition of the presented one of the plurality of words; and
    providing a second help box which, when selected by the student, aurally presents the one of words to the student, via the computing device.

12. The method as recited in claim 1 wherein said step c) of indicating a selection of one or more of the presented categories comprises:
    using an input device of the computing device to select one of the two or more of the presented categories.

13. The method as recited in claim 1 wherein said step c) further comprises:
    if the student correctly categorized the presented one of the plurality of words, auditorily indicating to the student that the student was correct; and
    if the student incorrectly categorized the presented one of the plurality of words, auditorily indicating to the student that the student was incorrect.

14. The method as recited in claim 13 wherein said visually indicating step further comprises:
    visually highlighting the correct one of the two or more of the presented categories for the presented one of the plurality of words.

15. A method on a computing device for training a student to categorize a plurality of words into a plurality of categories, each of the plurality of categories associated within one of a plurality of category types such as semantic, syntactic, phonological, and morphological, the method comprising:
    a) selecting a first one of the plurality of category types for training;
    b) presenting on the computer device two or more of the plurality of categories associated with the first one of the plurality of category types, as possible selections;
    c) presenting on the computer device one of the plurality of words for categorization into one of the presented plurality of categories to the student;
    d) recording which of the presented plurality of categories has been selected by the student as a category for the presented one of the plurality of words;
    e) repeating steps b) through d); and
    f) after the student has correctly categorized a predetermined percentage of the plurality of words, selecting a second one of the plurality of category types for continued training.

16. The method as recited in claim 15 wherein the first one of the plurality of category types is semantic.

17. The method as recited in claim 15 wherein said steps b) through c) are presented by providing an animation scene on a display of the computing device.

18. The method as recited in claim 15 wherein the student is cross-training by training the student to categorize a number of words in different category types.

19. A method on a computing device for training a student to categorize words into a plurality of categories, where the plurality of categories include a plurality of category types such as semantic, syntactic, phonological, and morphological, the method comprising:
    a) presenting an animated scene representative of a categorization process to the student;
    b) within the animated scene, presenting two or more of the plurality of categories as possible selections for categorization words therein;
    c) visually presenting the words to the student, for categorization into the presented two or more of the presented categories; and
    d) after the student has correctly categorized a predetermined percentage of the words for a first category types, changing the category type for training to a second category type and repeating step b) through c).

20. The method as recited in claim 19 wherein the computing device comprises:
    a personal computer having an input device a display for presentation of the animated scene, and speakers.

21. The method as recited in claim 19 wherein the animated scene representative of a categorization process provides an entertaining backdrop illustrative of categorizing items into particular categories.

22. The method as recited in claim 19 wherein said step b) further comprises:

after the student has correctly categorized a second predetermined percentage of the words for the presented two or more of the plurality of categories, increasing the number of the plurality of categories that are presented to the student.

23. The method as recited in claim 19 where said step c) further comprises:

if the student requests clarification of the visually presented words, providing a definition box containing a written definition of the visually presented words.

24. The method as recited in claim 23 where said step c) further comprises:

if the student requests further clarification of the visually presented word, auditorily presenting the visually presented words.

25. The method as recited in claim 19 where said step b) further comprises:

if the student requests clarification of the resented two or more of the plurality of categories, auditorily presenting the two or more of the plurality of categories.

26. The method as recited in claim 19 wherein in said step c) the presented words are visually presented to the student, one at a time.

* * * * *